United States Patent [19]

Sugiura et al.

[11] Patent Number: 5,426,727
[45] Date of Patent: Jun. 20, 1995

[54] HIGH-QUALITY CHARACTER GENERATING SYSTEM AND METHOD FOR USE THEREIN

[75] Inventors: Masayuki Sugiura; Masato Maeda, both of Tokyo, Japan

[73] Assignee: Asahi Kogaku Kogyo K.K., Japan

[21] Appl. No.: 161,310

[22] Filed: Dec. 3, 1993

Related U.S. Application Data

[63] Continuation of Ser. No. 466,903, Jan. 18, 1990, abandoned.

[30] Foreign Application Priority Data

Jan. 20, 1989 [JP] Japan .................................. 1-2496
Jan. 20, 1989 [JP] Japan .................................. 1-12495

[51] Int. Cl.$^6$ .................................. G06F 3/14
[52] U.S. Cl. .................................. 395/151
[58] Field of Search .................... 382/46, 56; 395/143, 395/144, 150, 151, ; 345/141, 142, 143, 144

[56] References Cited

U.S. PATENT DOCUMENTS 4,298,945 11/1981 Kyte et al. ........................ 395/150
4,951,228 8/1990 Hirawa et al. .................... 364/520
5,048,099 9/1991 Lee .................................. 382/22

FOREIGN PATENT DOCUMENTS 53-15624 5/1978 Japan .
53-41017 10/1978 Japan .

OTHER PUBLICATIONS

Pixel, No. 15, pp. 149–153; Pixel, No. 16, pp. 136–141; Pixel, No. 18, pp. 129, 133 (1984).
Newman et al "Principles of Interactive Computer Graphics" (2nd Edition) (1981), pp. 20–27.

Primary Examiner—Phu K, Nguyen
Attorney, Agent, or Firm—Sughrue, Mion, Zinn, Macpeak & Seas

[57] ABSTRACT

A character generation system, in which multiple operations are performed in parallel to achieve higher-speed processing, includes a circuit for converting character contour data into coordinate axis data, a circuit for generating dot data expressive of the contour from the coordinate axis data, a circuit for sorting the coordinate axis data in a prescribed sequence and a circuit for performing image drawing operations in correspondence with the sorted data. At least two of these circuits include sufficient channels to permit the performance of their designated functions in parallel. The required image drawing time is reduced by a decrease in the required number of accesses to a bit map using a polygon approach to character generation. The invention selects only the starting point and terminating point for its image drawing process out of the coordinates which form the polygon and draws a character on the bit map while generating the coordinates incremented by a predetermined value from the starting point to the terminating point. The invention also relates to a method for image drawing.

14 Claims, 101 Drawing Sheets

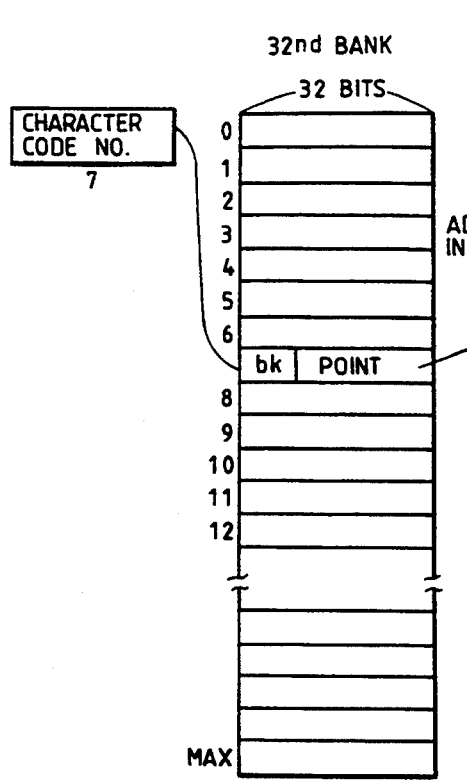
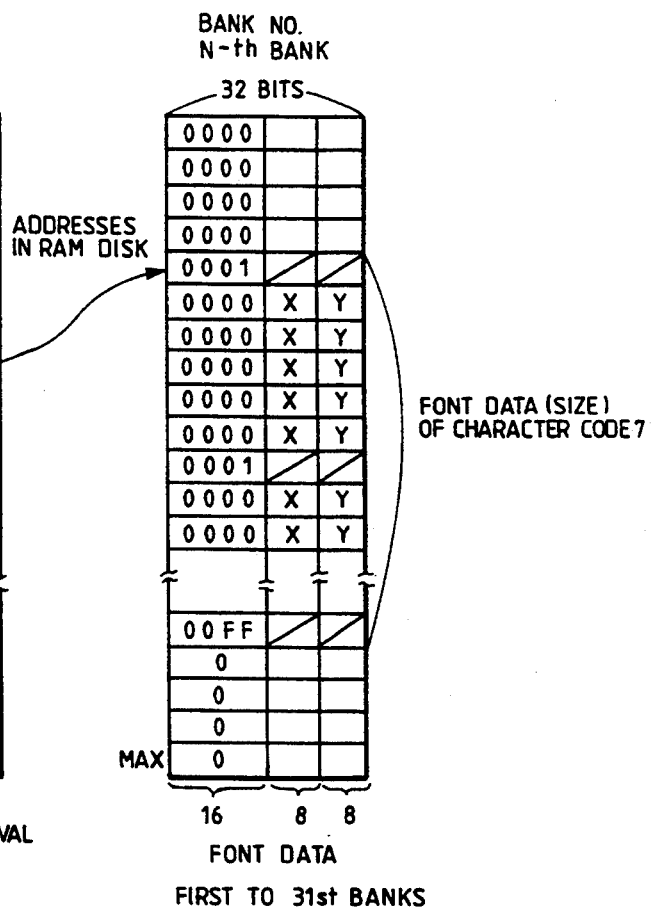
FIG. 4(b)   FIG. 4(a)
TABLE FOR RETRIEVAL
32nd BANK
FONT DATA
FIRST TO 31st BANKS
FIG. 5
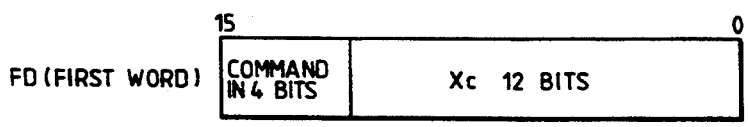
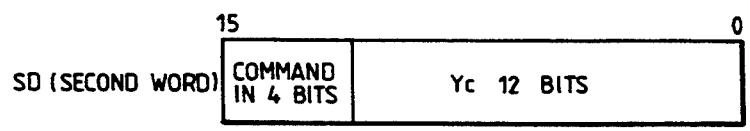

Command Packet

FIG. 29(3)

C_ PFAllEnd

B

S81 — TRANSFER V POSIX TO RG SYSTEM

S82 — ADD V OFFSET TO V POSIY AND TRANSFER THE SUM TO RG SYSTEM

S83 — TRANSFER V TEXTURE TO RG SYSTEM

S84 — PositionTrans

RETURN

AFTER THE OPERATION BRANCHES OFF WITH V MODE ≠ 0, THE SEQUENCE IS THE SAME AS IN THE OPERATION FOLLOWING V MODE=0, BUT THE CONVERSION OF THE COORDINATES HAS BEEN CHANGED FROM $$\begin{cases} WR4 = (X * V\ CELLX)/256 \\ WR3 = (X * V\ CELLY)/256 \end{cases}$$

TO $$\begin{cases} WR4 = X * V\ CMTA + Y * V\ CMTB + V\ CMTC \\ WR3 = X * V\ CMTD + Y * V\ CMTE + V\ CMTF. \end{cases}$$

FIG. 33
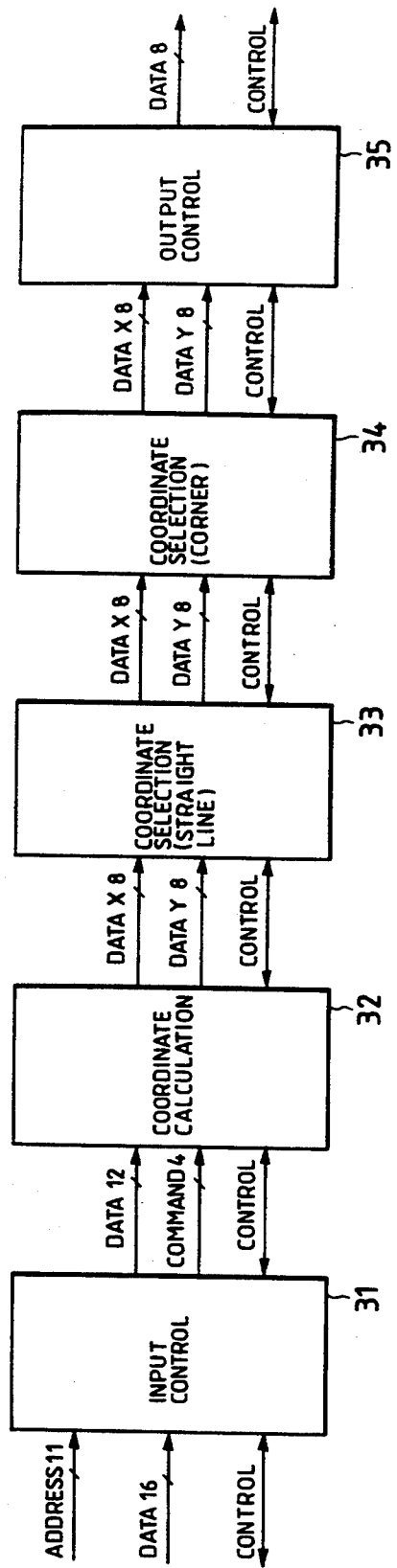
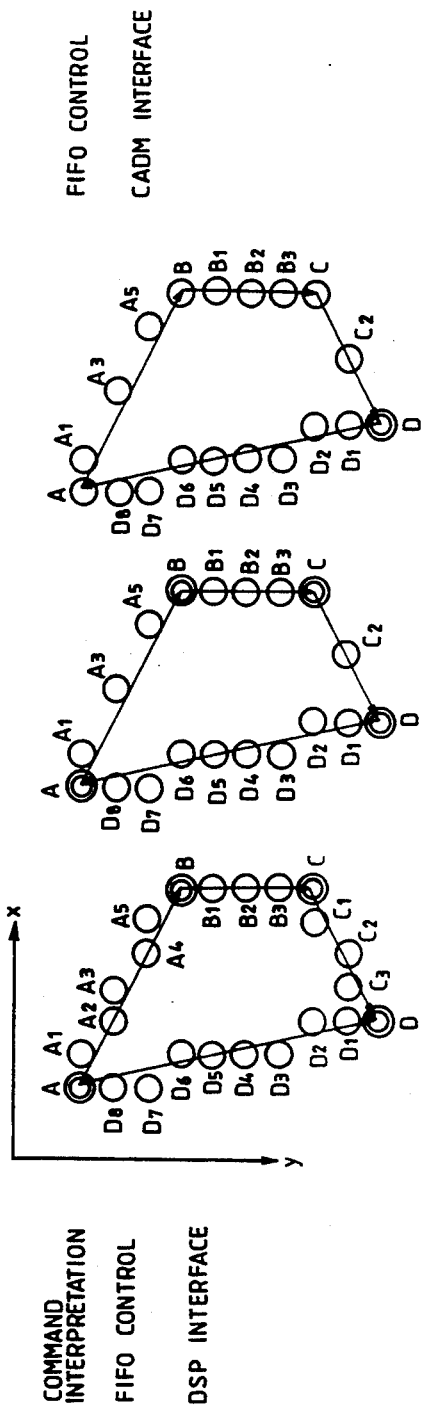

SETTING OF INITIAL VALUE

CALCULATION OF COORDINATES -1

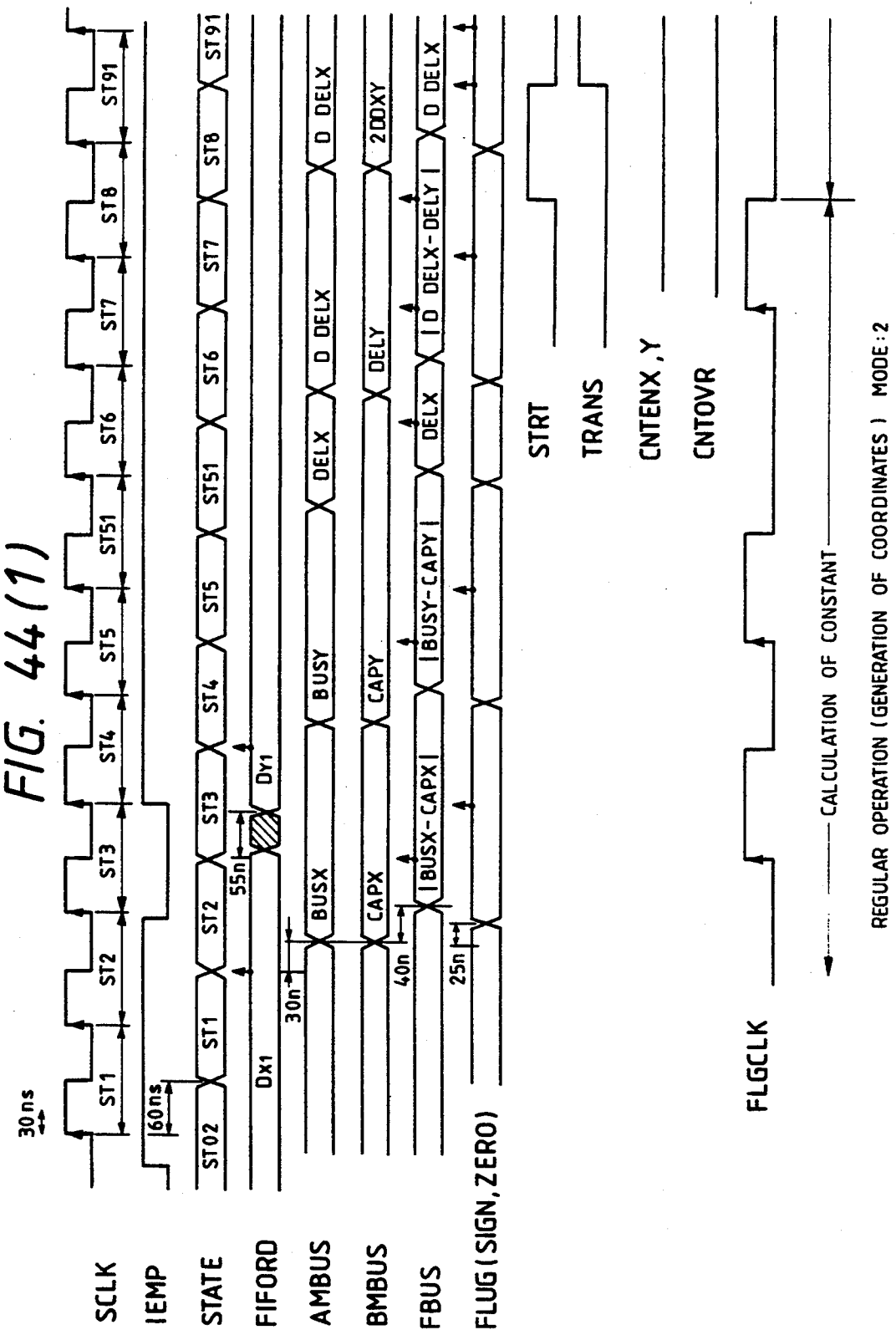

COMMAND TRANSFER PROCESS

⊘ : POINT TO BE SELECTED

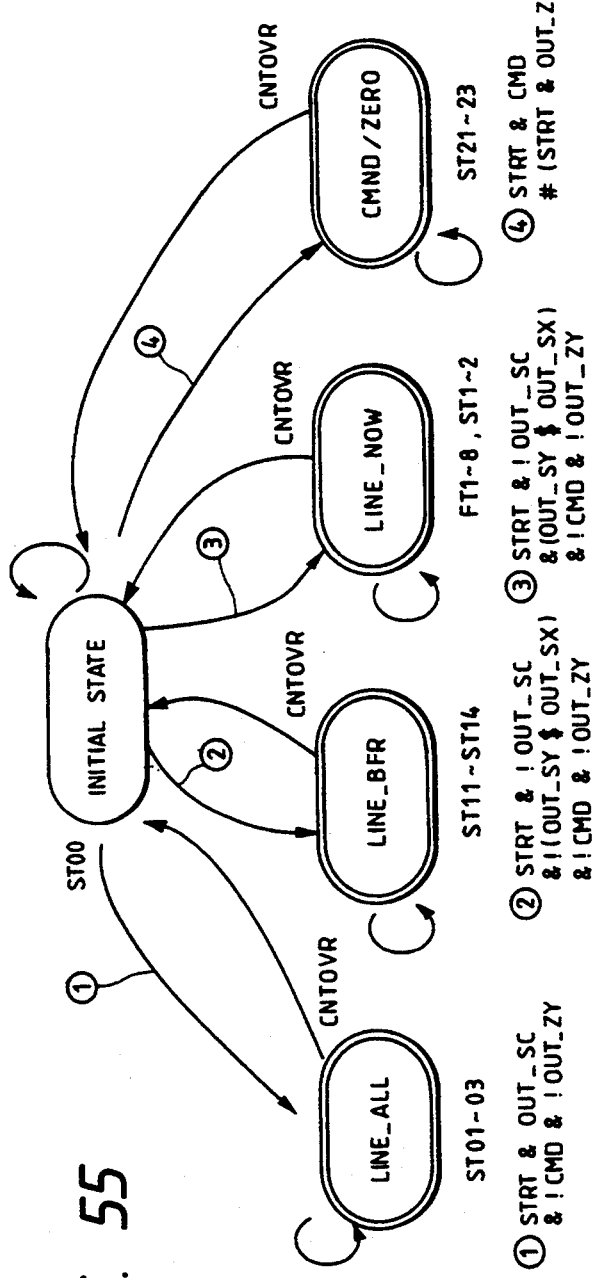
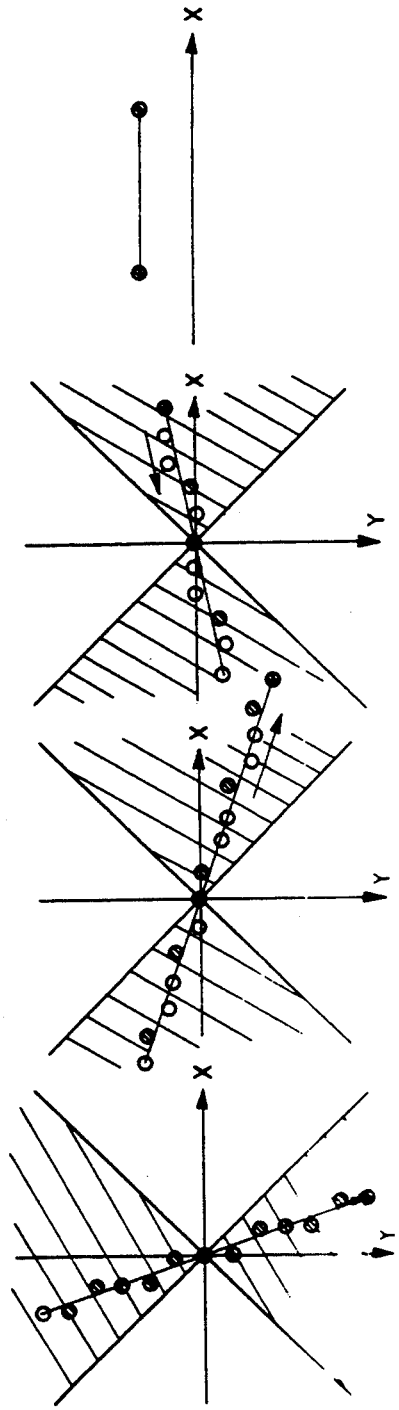
FIG. 55

FIG. 59
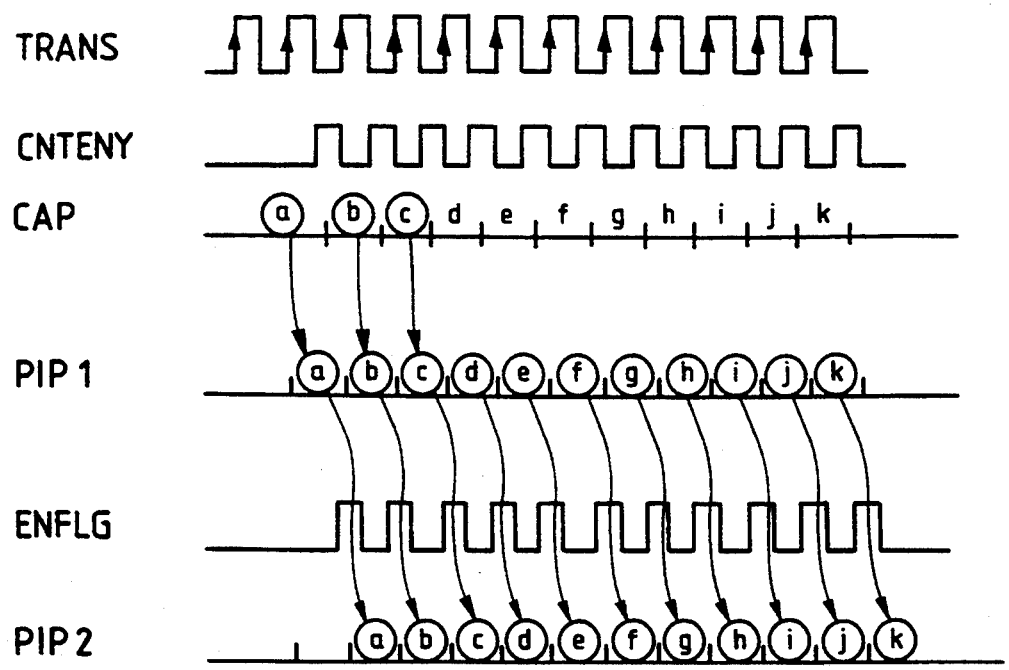
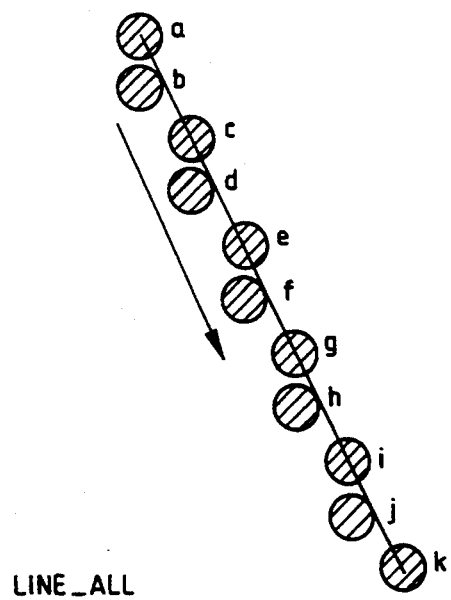
LINE_ALL

FIG. 63
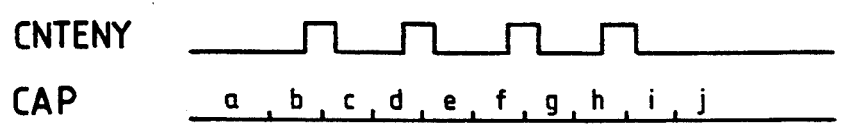
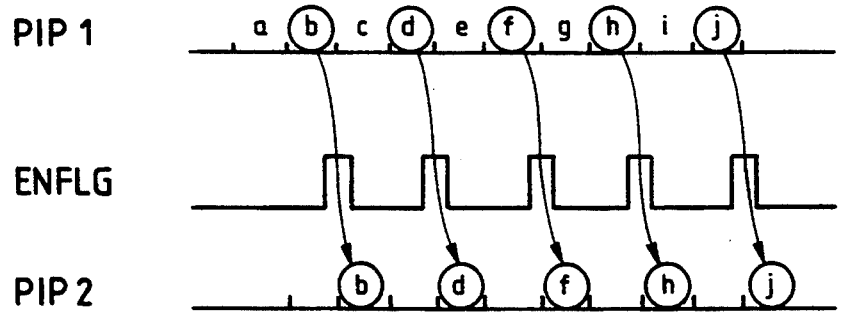
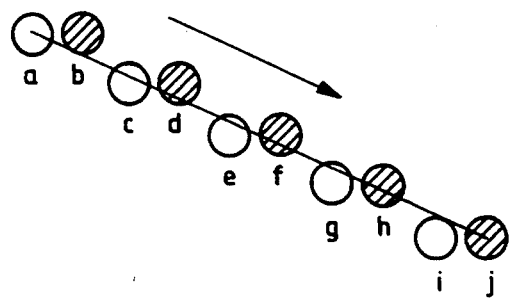
LINE_BFR

FIG. 68
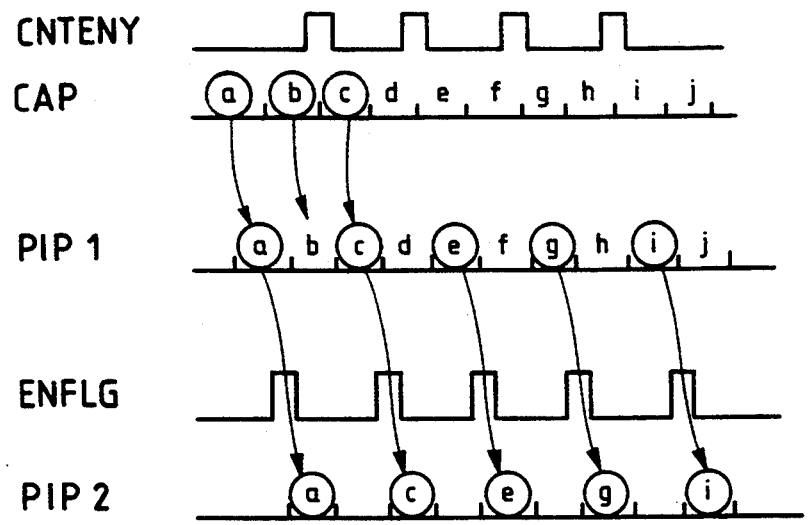
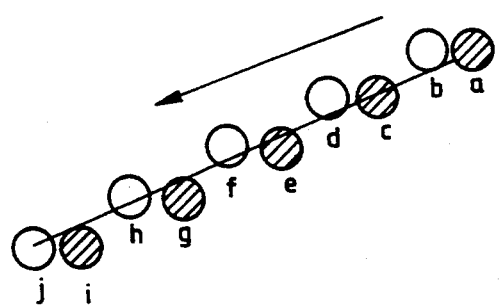
LINE_NOW

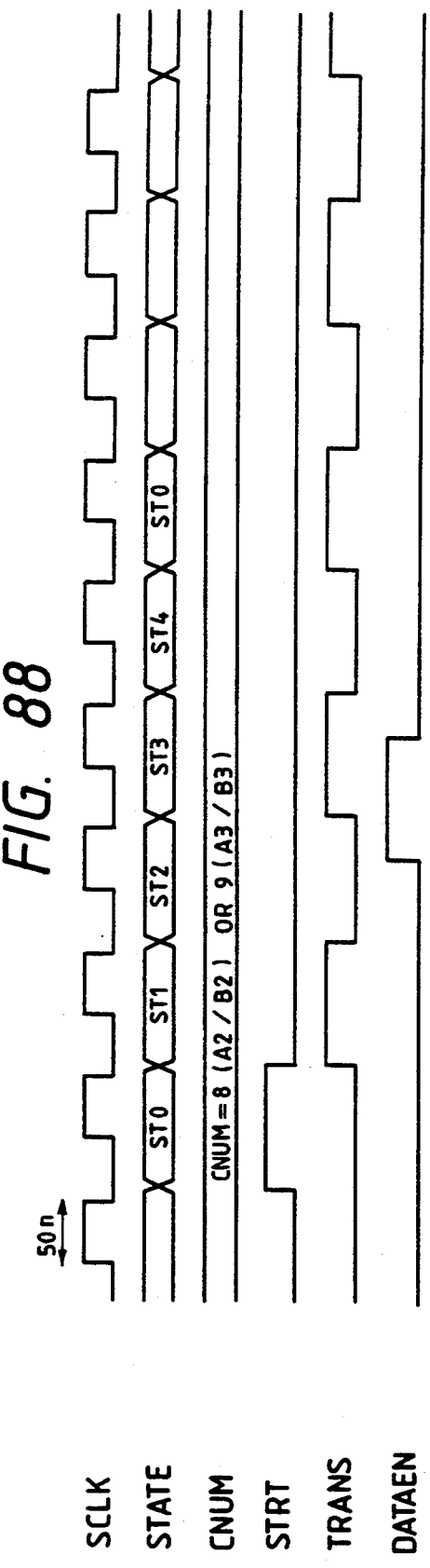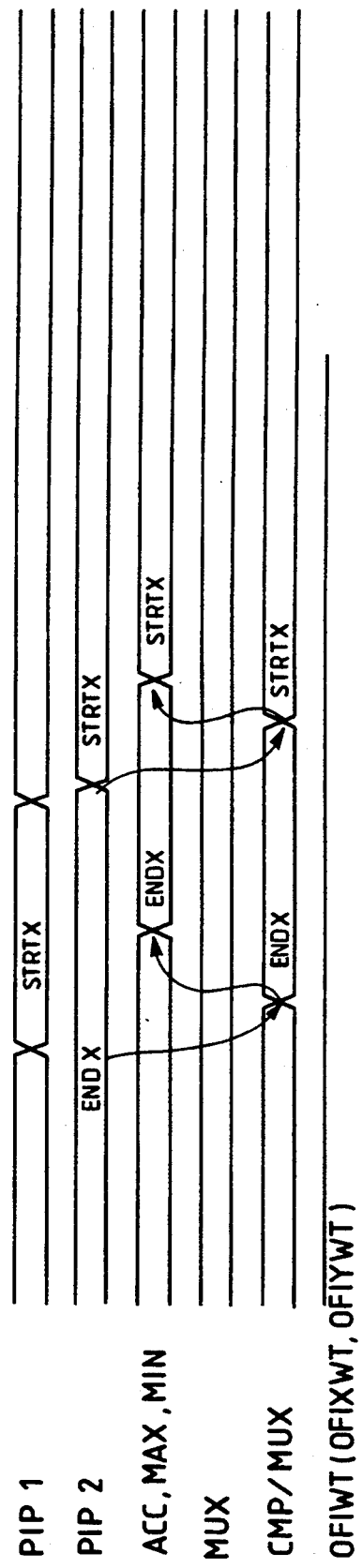
FIG. 88
CORNER PROCESSING CTYP = 5

FIG. 90
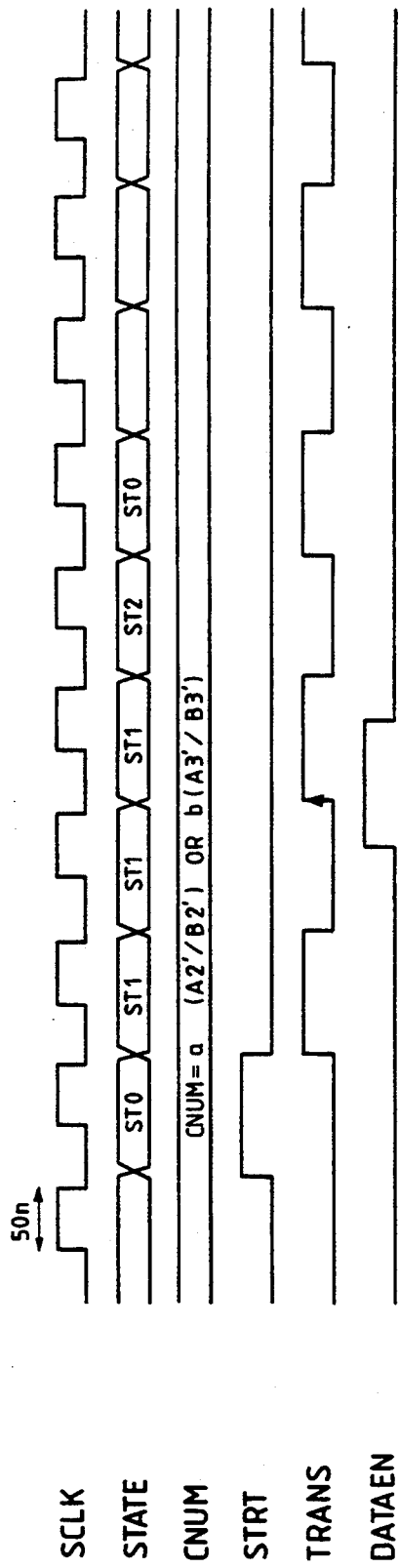
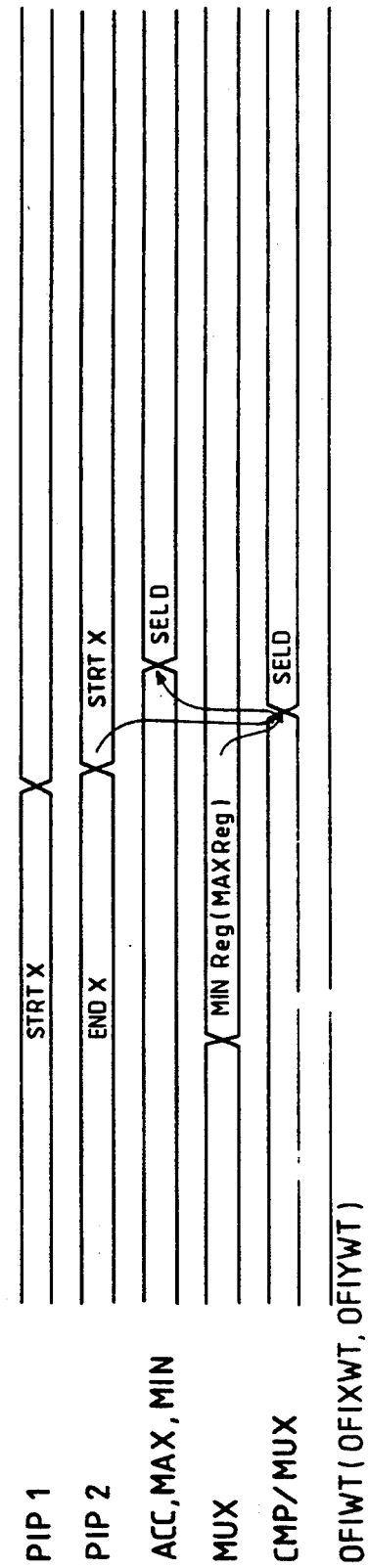
CORNER PROCESSING CTYP = 6

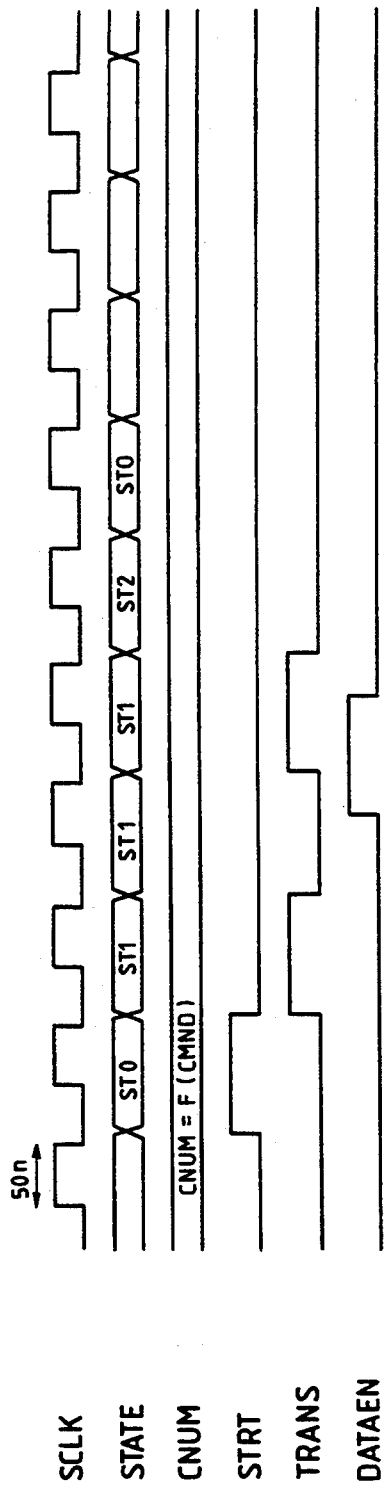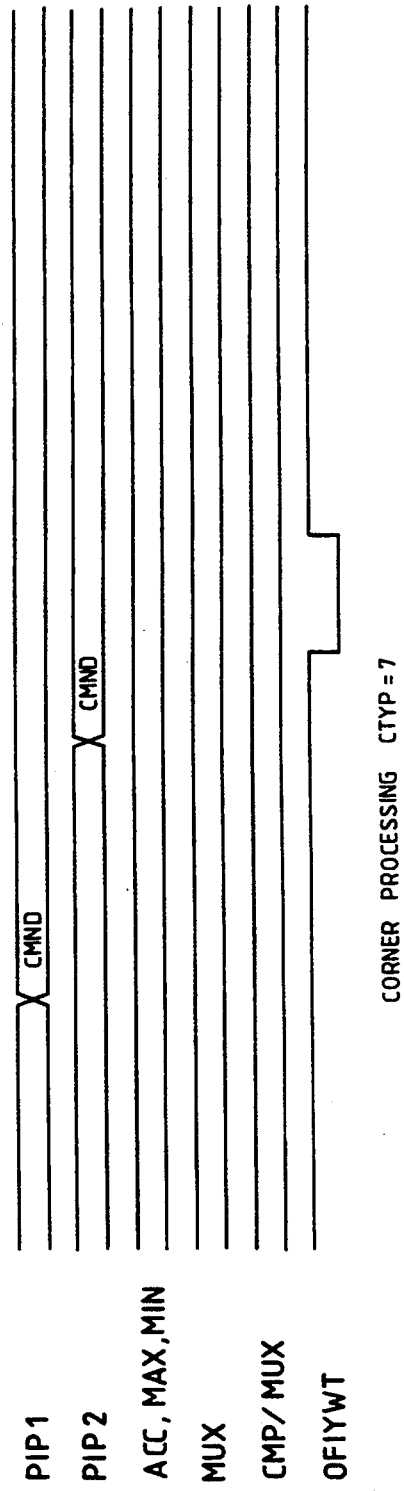
FIG. 92

STRAIGHT LINE PROCESSING

SINGLE MODE

DOUBLE MODE

FIG. 112
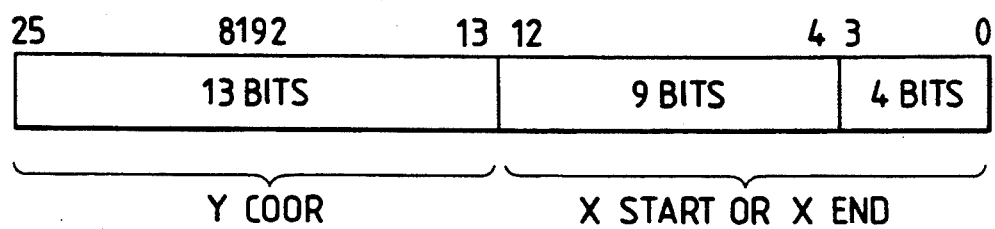
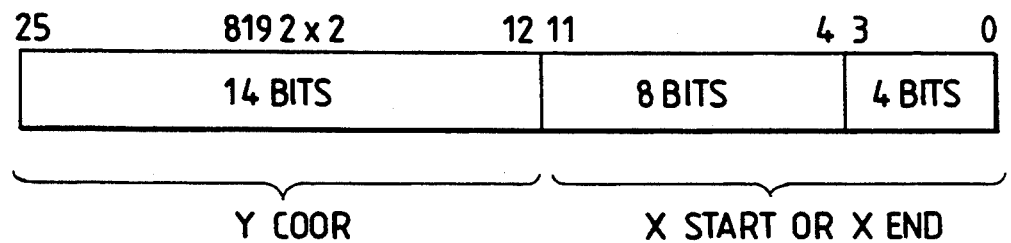

ROM MODE  01   01   00   00   10   10

(NUMBER OF TIMES OF WRITE : FOUR TIMES)

ROM MODE  01   01   10

(NUMBER OF TIMES OF WRITE : TWO TIMES)

ROM MODE  11

(NUMBER OF TIMES OF WRITE : ONE TIME)

FIG. 119
FIG. 120
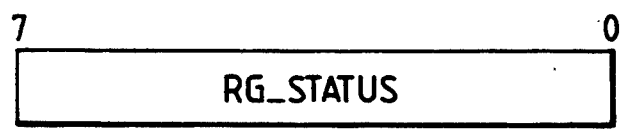
FIG. 121
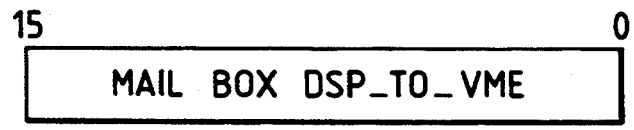
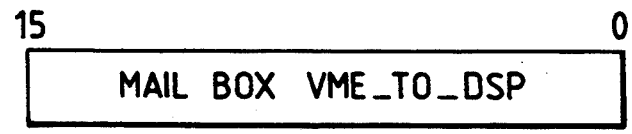

HIGH-QUALITY CHARACTER GENERATING SYSTEM AND METHOD FOR USE THEREIN

This is a Continuation of application Ser. No. 07/466,903 filed Jan. 18, 1990, now abandoned.

BACKGROUND OF THE INVENTION

This invention relates to a high-quality character generating system which generates visible high-quality characters, symbols, and the like from coded digital character data, for example, in a laser printer, a CRT disk player, and a phototypographic composing machine with an electronic computer.

Digital character generating approaches include the dot process and the vector process approaches. The dot process approach generates characters readily, because the characters are stored beforehand in a memory as the same dot data as are used for displaying the characters. On the other hand, the dot process requires extremely large memory capacity, because spaces must be stored in coded form, as well as the picture elements of characters. As a result, a larger amount of data is required for one character: Also, the dot process needs separate character data for different sizes of characters, even for different sizes of the same character.

In contrast to this, the vector process approach can work with a smaller capacity memory because it stores only the segments of lines in characters as vector data in the memory. As a result, the vector process is capable of displaying characters through free variation of the prescribed value to produce desired sizes of characters, even only if one set of character data is stored in the memory.

Moreover, this vector process includes the stroke process and the outline (polygon) process. The stroke process, which is composed of a small amount of data, can display characters at high speed, but has difficulty in expressing minute and delicate changes in character type styles. In contrast, the outline process, which works with contours of characters converted to data, is capable of expressing finer details of type styles, even though it is slightly slower compared with the stroke process.

In FIG. 2, which illustrates a conventional principle used for the display of the letter A by the outline process, the contour of the letter A is expressed by segments of a line connecting the peak points a through l on the memory forming the bit map. Then, this bit map is scanned, for example, in the direction of the x axis, and the position for drawing the image (to be painted out is detected. Subsequently, this detected position (the area inside the contour line) is painted out (filled).

Thus, conventional systems are designed to operate with software so that the contour of a character is drawn on the bit map, and then the bit map is scanned and the area inside the contour is painted out. Therefore, the existing process takes a relatively long time to display a character.

SUMMARY OF THE INVENTION

The present invention has been made in view of these circumstances, and offers an improvement on the outline process whereby high-quality characters displayed at high speed.

The high-quality character generating device according to this invention is provided with a first memory, which stores outline fonts composed of the data expressing character contours; a coordinate converter, which converts the coordinates of the data stored in the first memory; a contour coordinate generator, which generates dot data corresponding to character contours from the data processed by the coordinate conversion; a sorter, which sorts the output from the contour coordinate generator according to prescribed rules; an image drawing device, which generates character data expressed as dots, based on the data sorted by the sorter; and a second memory, which stores the characters expressed in dot form in correspondence with the output from the image drawing device.

Further, according to the invention, at least two of the coordinate converter, the contour coordinate generator, the sorter, and the image drawing device mentioned above are operated in parallel, to achieve higher-speed operation.

In operation, character contour data output from the first memory are converted into prescribed coordinate axis data by the coordinate converter. From the prescribed coordinate axis data, dot data representing a character contour are generated by the contour coordinate generator. These dot data then are sorted into a prescribed sequence by the sorter and thereafter are input into the image drawing device. The image drawing device draws the images of the dots, for example, between the odd-number dots and the even-number dots of the data input therein. At least two of the above-mentioned devices operate in parallel.

Therefore, it is possible for the equipment embodying this invention to display characters at a higher speed.

Another deficiency of conventional equipment is that it has taken a longer time to draw a character on the bit map. This is because such equipment is designed to write the contour of a character once on the bit map and thereafter to search the starting point and terminating point for the image drawing (painting out) process by scanning the bit map, for example, in the x-axis direction. Subsequently, then, the device draws the image (paints out the area for the image) from the starting point to the terminating point as identified by such searching operations. As a result, conventional equipment has required a large number of accesses to the bit map.

The present invention also has been made in view of these circumstances, and offers a system whereby the required number of acceses to the bit map can be reduced, so that the image drawing time will be shortened.

Thus, the high-quality character generating system according to another embodiment of this invention is provided with a first memory, which stores character contour data; a coordinate generator, which generates coordinates for the character contour data read out of the first memory; a coordinate selector, which selects the coordinates generated by the coordinate generator, so that an even number of the selected coordinates will be arranged in an axial direction of the image drawing operation; an image drawing device which generates coordinates which are incremented in regular succession along the direction of the image drawing axis from the coordinates in the odd-number positions in the direction of the image drawing axis out of the coordinates selected by and output from the coordinate selector, until the generated coordinates agree with the coordinates in the even-number positions; and a second memory for storing the data generated by the image drawing device, wherein the specified character is drawn in correspondence with the coordinates from the odd-number position to the even-number position as generated by the image drawing device.

In operation, the polygon data read out by the first memory are converted into coordinate data by the coordinate generator. The coordinate data are selected by the coordinate selector so that, for example, the two coordinates are positioned on the same y-axis. The image drawing device immediately generates coordinates incremented in regular succession from the first coordinate to the last coordinate on the same y-axis as among the coordinates so selected and then draws a character in the second memory in correspondence with the generated coordinates.

Therefore, it is possible for the equipment embodying this invention to operate with a smaller number of accesses to the second memory, because fewer coordinates are generated, so that the system is capable of drawing characters at a higher speed.

BRIEF DESCRIPTION OF THE DRAWINGS

The foregoing and other objects and features of the invention now will be described in detail with reference to the accompanying drawings, in which:

FIG. 4 is a chart for explaining the formats for a RAM disk which is used in the invention;

FIG. 5 is a chart for explaining the commands and data output from the coordinate converter used in the invention;

FIG. 33 is a block diagram for the contour coordinate generator used in the invention;

FIG. 55 is a state transition chart for the straight line coordinate selecting section;

FIGS. 57–59 are timing charts for LINE ALL;

FIGS. 61–63 are timing charts for LINE BFR;

FIGS. 66–68 are the timing charts for LINE NOW;

FIG. 88 is a timing chart for the processing of the corners of CTYP5;

FIG. 90 is a timing chart for the processing of the corners of CTYP6;

FIG. 92 is a timing chart for the processing of the commands of CTYP7;

FIG. 112 is a chart for explaining the image drawing addresses and the formats for the bit patterns;

FIG. 119 is a chart for explaining the formats for the RG CONTROL COMMAND;

FIG. 120 is a chart for explaining the formats for the RG STATUS;

FIG. 121 is a chart for explaining the formats for the MAILBOX;

DETAILED DESCRIPTION OF THE PREFERRED EMBODIMENTS

Figure 1:
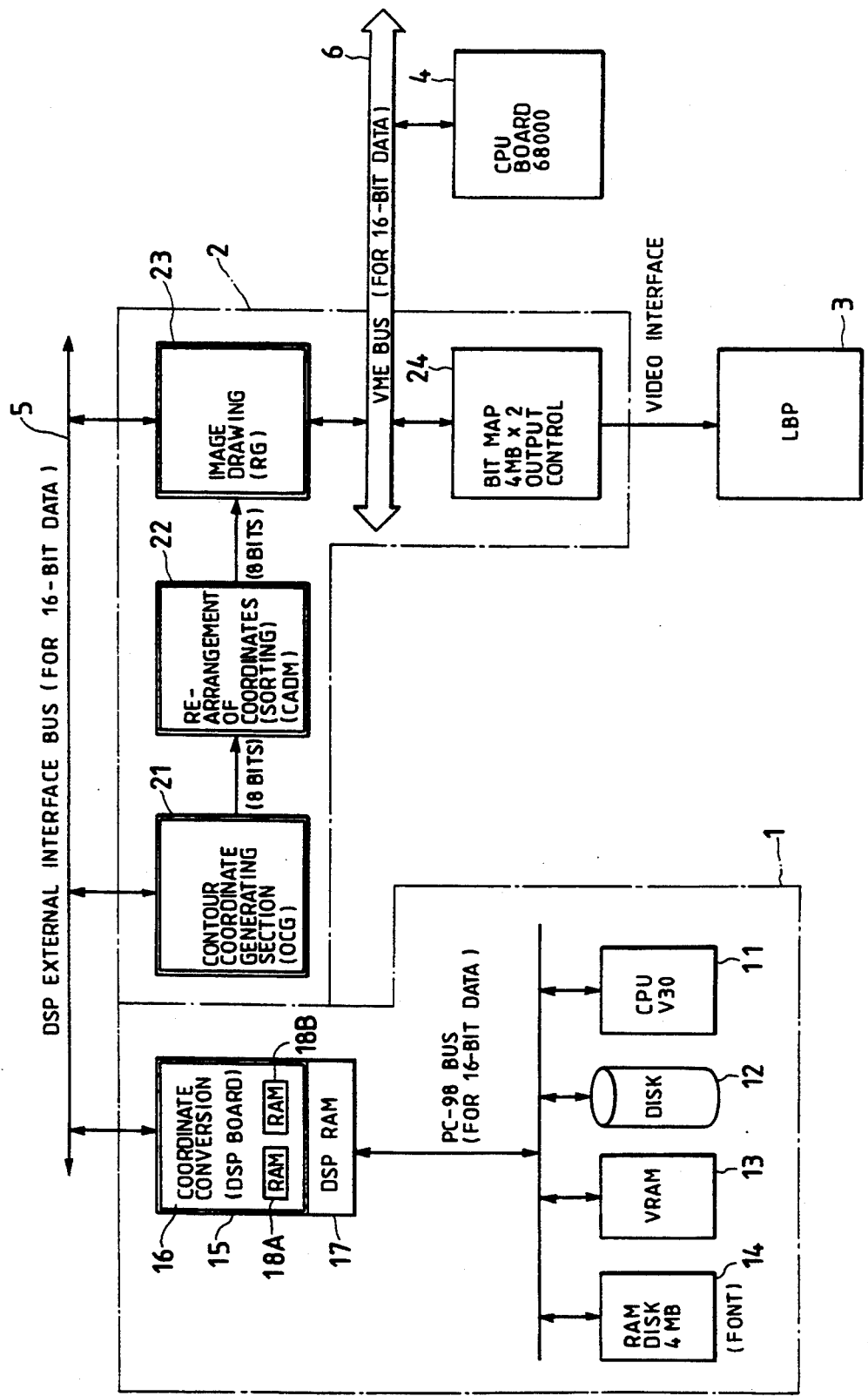
FIG. 1 presents a block diagram of the high-quality character generating system according to this invention.
Figure 2:
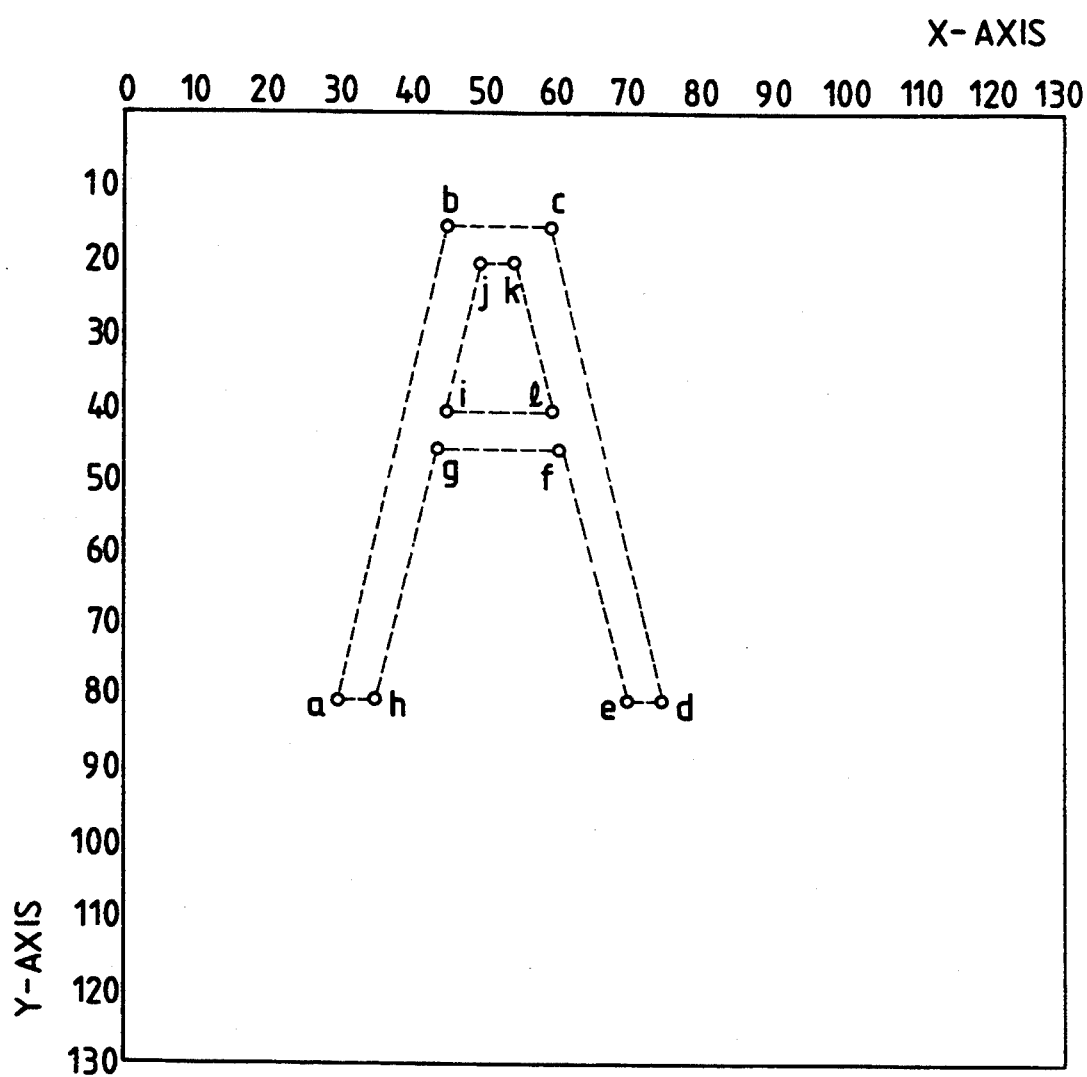
FIG. 2 is a chart showing the principle of the outline approach.

FIG. 1 illustrates the basic configuration of a high-quality character generating device embodying this invention. In this Figure, an editor 1, which consists of a personal computer or the like, composes the text to be displayed. The editor 1 is provided with a CPU 11, which controls the text editing and displaying operations; a hard disk unit 12 which stores the edited text; a virtual random access memory (VRAM) 13, to which the data stored in the hard disk unit 12 are transferred; and a RAM disk 14, which stores the outline fonts in its memory. A coordinate converter 15 (DSP) is connected as an additional unit to the editor 1, and is composed of a DSP board 16 and a DSP RAM 17. The DSP board 16 also is provided with built-in RAMs 18A and 18B.

The character engine (CE) system hardware 2 is connected between the editor 1 and the laser beam printer (LBP) 3, and is provided with a contour coordinate generator (OCG) 21, a sorter (CADM) 22, an image drawing device (RG) 23, and a bit map 24. The coordinate converter 15, the contour coordinate generator 21, and the image drawing device 23 are connected with one another via the DSP external interface bus 5. CPU 4, which controls the bit map 24, is connected to the image drawing device 23 and the bit map 24 via an ordinary data bus VME 6 through which data having the number of bits up to 32 bits can be transmitted.

Figure 3:
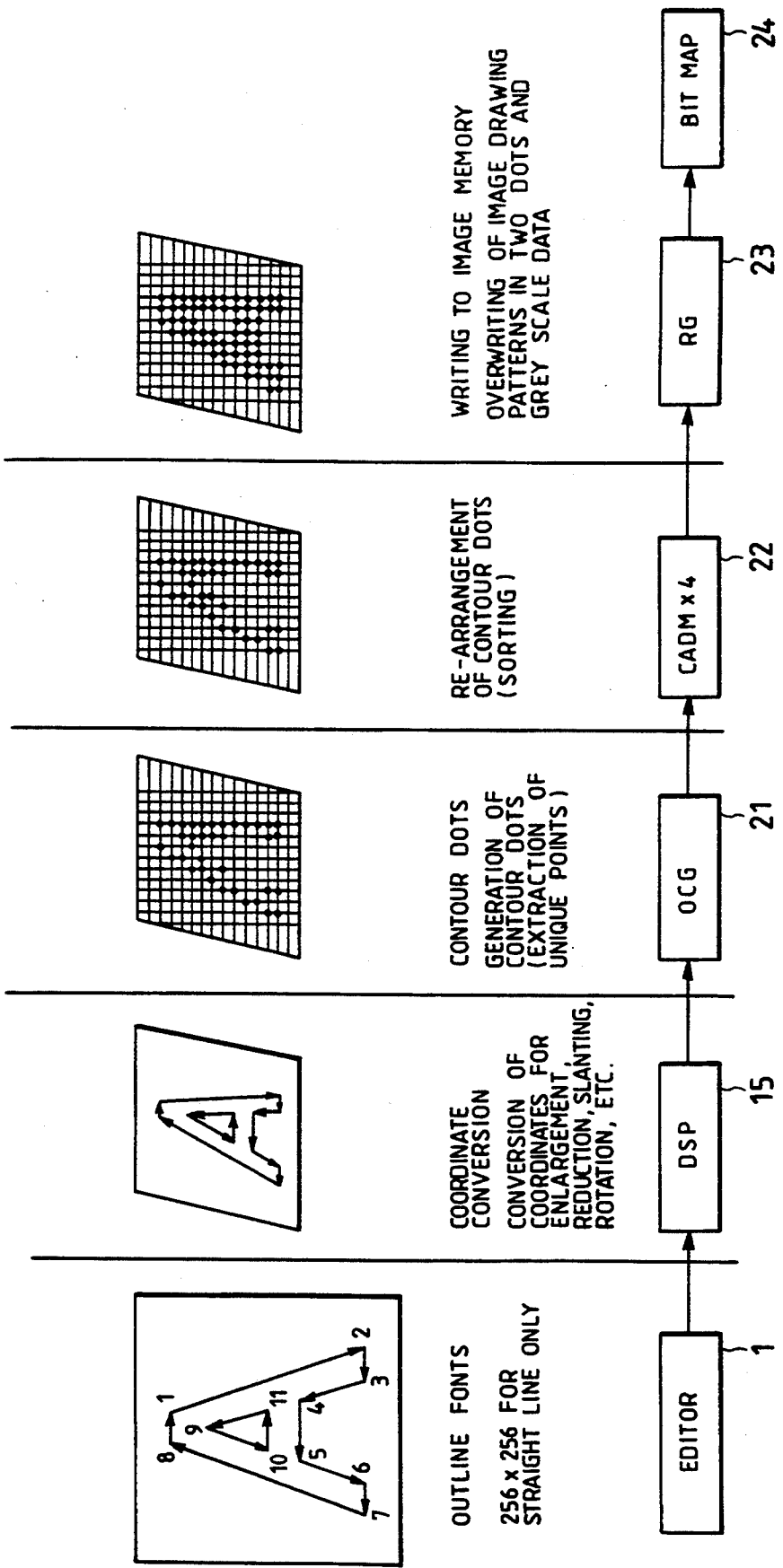
FIG. 3 is a chart for explaining the process performed with the high-quality character generating system according to this invention.

FIG. 3 illustrates the sequence of operations leading to the step in which the character edited by the editor 1 is drawn (i.e. stored) on the bit map 24. When a text (data) file is compiled in the editor 1, the CPU 11 first stores in the RAM disk 14 the outline font data of the character expressed, for example, as a 256×256 matrix of dots stored in the hard disk unit 12, in a form easily transmittable to the coordinate converter 15.

The RAM disk 14 is composed of 32 banks, of which the banks from 1 to 31 (as shown in FIG. 4(a)) store the font data while the bank 32 (FIG. 4(b)) stores the table for retrieval. The addresses in the 32nd bank correspond to the character codes. The four more significant bits (bk) represent the bank (one of the banks from 1 through 31) where the character code data are stored, while the 28 less significant bits (points) are taken as the addresses of the banks (bk) where the font data corresponding to the character code are stored.

Of the data on the individual addresses in the banks from 1 through 31, the values expressing the prescribed commands are stored in the 16 more significant bits, the values respectively representing the starting point of the polygon when the 16 more significant bits are H (which stands for hexadecimal numbers) 0001 while they represent the finish of data for one character when those bits are H 00FF. The X-coordinates (the x-axis addresses) are stored in the subsequent 8 less significant bits, while the Y-coordinates (the y-axis addresses) are stored in the 8 least significant bits.

Moreover, since the points in the 28 less significant bits express the address of the font data for the character code, it is possible to find the size of the font data based on the difference from the point in the next address.

A text file is compiled in the state where outline fonts are stored in the memory of the RAM disk 14. It would take time to access the text file stored in the memory of the hard disk unit 12. Therefore, the CPU 11 transmits the compiled text file from the hard disk unit 12 to the VRAM 13 and has the file stored therein. Furthermore, the CPU 11 makes a data packet, reading the character data corresponding to the text file (for example, the letter A) stored in the VRAM 13 out of the RAM disk 14, and transmits the data packet, together with a command packet, to the coordinate converter 15.

The coordinate converter 15 performs coordinate conversion on the input outline fonts to effect an enlargement, a reduction, an inclination, a rotation, a horizontal shift, etc. of the character. The font data so processed for coordinate conversion are fed into the contour coordinate generator 21.

FIG. 5 shows the formats of the command and the data fed out from the coordinate converter 15 to the contour generator 21. As illustrated in the Figure, the four more significant bits in the first (FD) 16-bit word (WORD) contain the command, while the X-coordinate value (Xc) for the peak point coordinate of the polygon is set in the 12 less significant bits of that word. Moreover, the four more significant bits of the second (SD) 16-bit word (WORD) contain a command, while the Y-coordinate value (Yc) for for the peak point coordinate is set in the 12 less significant bits of the second word.

The commands (which are in binary numbers) are defined, for example, as shown in the following Table:

| Command | Contents |
| --- | --- |
| 0000 | Data on the peak point of the polygon |
| 0001 | Start data for the polygon |
| 0010 | End data for the polygon |
| 0011 | Data on the end of one character |
| 0100 | Command for direct transfer to CADM (The eight less significant bits of Xc are transferred as a command to CADM.) |
| 0101 | Data for direct transfer to CADM (The eight less significant bits of Xc are transferred as data to CADM.) |
| 0110 | Second data for the polygon |
| 1000 | For resetting the hardware of the OCG |
| 1001–1111 | For control of the hardware of the OCG |

The contour coordinate generator 21 calculates and generates the dot data on the contour on the basis of the contour coordinates of the character input into it. The contour dot data are sorted by the sorter 22, to generate the combinations of the odd-number dots (the dots in the odd-numbered bits in the bit sequence) and the even-number dots (the dots in the even-numbered bits in the bit sequence). The sorted data are input into the image drawing device 23, which stores the odd-number dots and the even number dots input into it at their respective addresses on the bit map 24 and also draws (i.e. paints out) the space (as dots) between the two types of dots.

With the command fed by the CPU into the output control circuit provided inside this bit map 24, the image of the bit map is transferred from the video interface to the laser beam printer, and the character drawn therein is output to the laser beam printer 3, where the character is printed on the specified paper.

Moreover, the input from the VRAM 13 and the RAM disk 14 into the coordinate converter 15 and the processing of the data in the CE system hardware 2 are performed in parallel, to speed up overall operation.

The text file is described in the form of an ASCII shift file, and the Japanese language characters are represented by the shift JIS code. Also, it is possible to describe the following commands in the text file, and to have them executed:

1) w r value1 value2 Write a "2" (base 10) at the address for the value 1 (base 10) at the side of the DSP system.
2) re value1 Read the address data for the value1.
3) ps Initialize the DSP system and prepare for print output.
4) pe Finish print output.
5) p p value1 Set the margin for the type of paper (A3, A4, etc.) for the value1.
6) p m value1 value2 value1=0 Draw the character in the character image set by .cw. value1=1 Convert coordinates and draw an image for the character by CMT (concatenation of matrix transformations) matrix: value2=0 lateral writing value2=1 vertical writing
7) m g value1 value2 value3 value4 value1=left margin value2=right margin value3=top margin value4=bottom margin
8) s c value1 value2 Set the shifting step for the drawing of a character (character pitch) value1=X value2=Y
9) p o value1 value2 Specify the absolute position for the drawing of a character. value1=X value2=Y
10) c w value1 value2 Specify the size of the character to be drawn. value1=X value2=Y
11) r t value1 Specify the rotating angle of a character. value1=angle
12) s l value1 Specify the angle of inclination for a character value1=angle
13) s p value1 specify the number of divisions for the spline conversion (value1=the number of divisions).
14) t x value1 Specify the texture and density for the drawing of a character.
15) f f Specify the form feed and the output of paper.
16) l f Specify the line feed, accompanied with a new line start and a return to the original position.
17) dg For Debuging.
18) r g value1 value2 For debuging the RG board.
19) b t value1 value2 value3 For debuging the RG board.
20) m t value1 value2 value3 value4 Set the CMT matrix. value1→CMTA value2→CMTB value3→CMTD value4→CMTE Any other line specified by the shift JIS code is taken as a line of characters and elicits the image-drawing action.

The program for making the CPU 11 execute the individual operations is written in the C language. In this program, the two functions given below are employed.

The first of these is the main ( ) function, and the processing as described below is performed with respect to this function.

1) set-mode ( ) function
With this function, initialization specified by the command line is performed.
1a) TEXT IN
With this, the text file is taken out line by line and the btoj(rramp, buf) command explained below is executed (for example, a text file is developed in the VRAM 13).
1b) HEX SET
With this, the instruction code for the DSP is transferred from the CPU 11 to the DSP 15 and gives a startup to the DSP (Trans( )).
2) (*communicat)( ) function
With this function, the text file developed over the VRAM 13 is taken out, and, in the case of a character, the memmen( ) function is called up. The font data present in the RAM disk 14 are combined with a command packet and transferred to the DSP RAM (DUAL PORTRAM) 17 of the DSP 15. When the text data in the VRAM 13 are brought to its end, the variable, sys status, is set FALSE.

3) When the sys status is FALSE, the operation gets out of this loop.

4) Next( ) function

With this function, communication processing of the command packet transferred to the DSP RAM 17 by the (*communicat)( ) function is performed.

5) Then, the operation returns to 2) above.

6) In case the operation has got out of the loop under the condition 3) above, the main ( ) function is brought to an end.

Figure 6A:
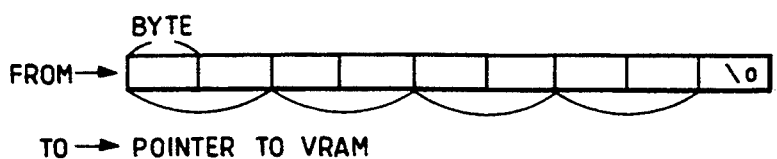
FIG. 6 is a chart for explaining the processing of the btoj function used in the invention.
Figure 6B:
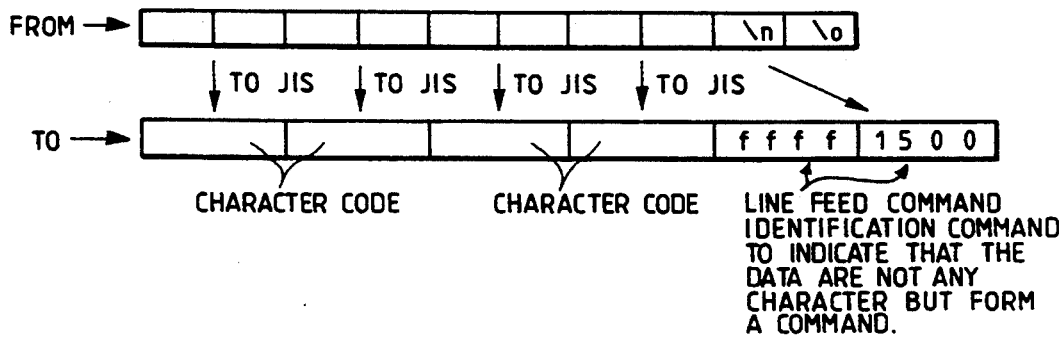

The second of these functions is the btoj( ) function, in which the characters for one line of the text file (one character takes two bytes in the shift JIS code) are sent, as shown by "from" in FIG. 6(a) to the pointer of the VRAM 13 as indicated by "to" in the same Figure. An address (pointer) for the VRAM 13 is stored in "to" and the data after the conversion thereof are written at the address. In this regard, "//O" indicates the end of the characters for one line. For example, as shown in FIG. 6(b), when the initial byte in the "from" arrangement is a shift JIS code, the shift JIS code is converted into the sector and point code for the JIS code and then is transferred to the VRAM 13.

Figure 6C:
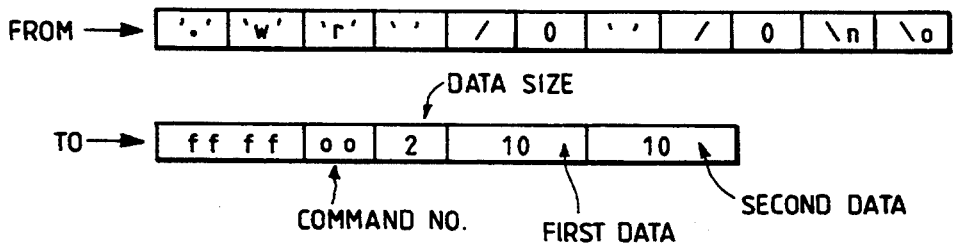
Figure 6D:
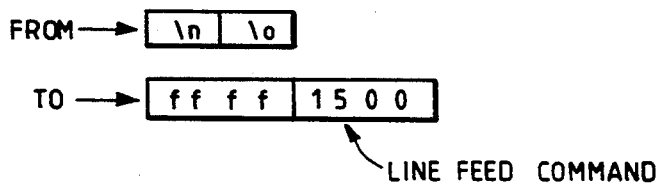

The new line start mark "//n" and the line end mark "//0" are converted into the identifying format "Hffff", which indicates that the subsequent code is not a character but a command, and a line feed command "H1500", respectively. Moreover, when the initial byte in the "from" arrangement is "." as shown in FIG. 6(c), the command No. H00 (.wr is represented by the command No. H00) is set after the identifying format "Hffff", and then the data size in the next position, and subsequently the first data (10) and the second data (10) are set in the stated order. When the initial byte in the from arrangement is "//n" as shown in FIG. 6(d), the new line start mark "//n" and the line end mark (//0) are converted into the identifying format "Hffff" and the command set in the next position (which is the line feed command "H1500" in the case of this embodiment, which has "//0").

Figure 7:
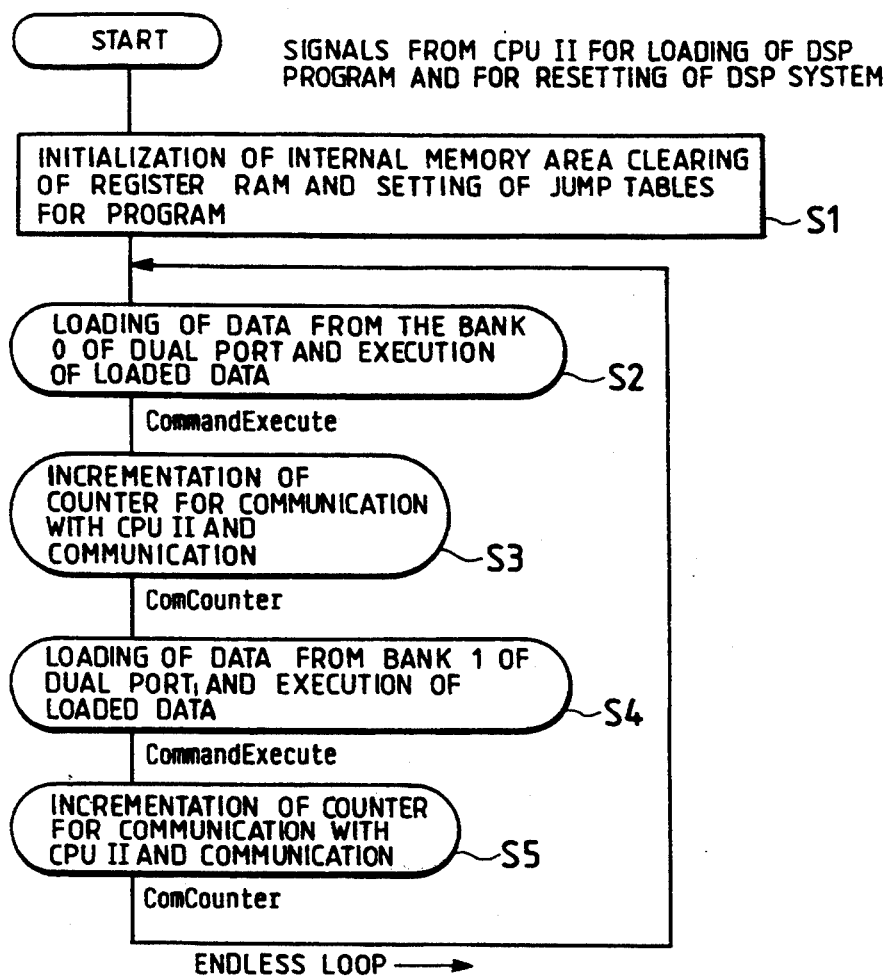
FIG. 7 is a flow chart for the coordinate converting process.

Next, the flow chart for the operations in the coordinate converter (DSP) 15 will be explained. When the DSP program is loaded from the CPU 11 to the coordinate converter 15, as illustrated in FIG. 7, the coordinate converter 15 is reset, and the internal area is initialized. At this time, the registers inside the DSP 15 and the RAM 18 are cleared, and the jump table for the program is set (S1).

Next, an endless loop consisting of the subroutines is executed. The loop includes:

i) loading of the data from the dual port0 bank of the DSPRAM (dual portRAM) 17 and the execution of the loaded data (CommandExecute) (S2);

ii) incrementing of the counter for communication with the CPU 11 (ComCounter)(S3);

iii) loading of the data from the dual port1 bank and the execution of the loaded data (CommandExecute)(S4), and iv) incrementing of the counter for communication with the CPU 11 and communication (ComCounter)(S5).

Figure 8:
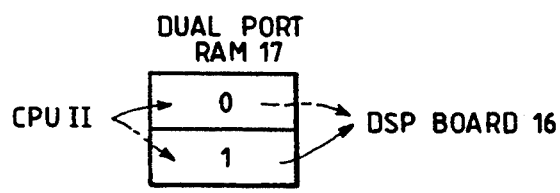
FIG. 8 is a chart for explaining a dual port RAM used in the invention.

In other words, as illustrated in FIG. 8, the DSP RAM 17 is composed of a dual port RAM, and is designed to communicate via the channel composed of the CPU 11, the dual port RAM 0 (or 1), the dual port RAM 1 (or 0), and the DSP board 16. The communication counter is used for counting the number of times of communications. Based on the number, it is determined whether the data transfer has been carried out normally.

Figure 9:
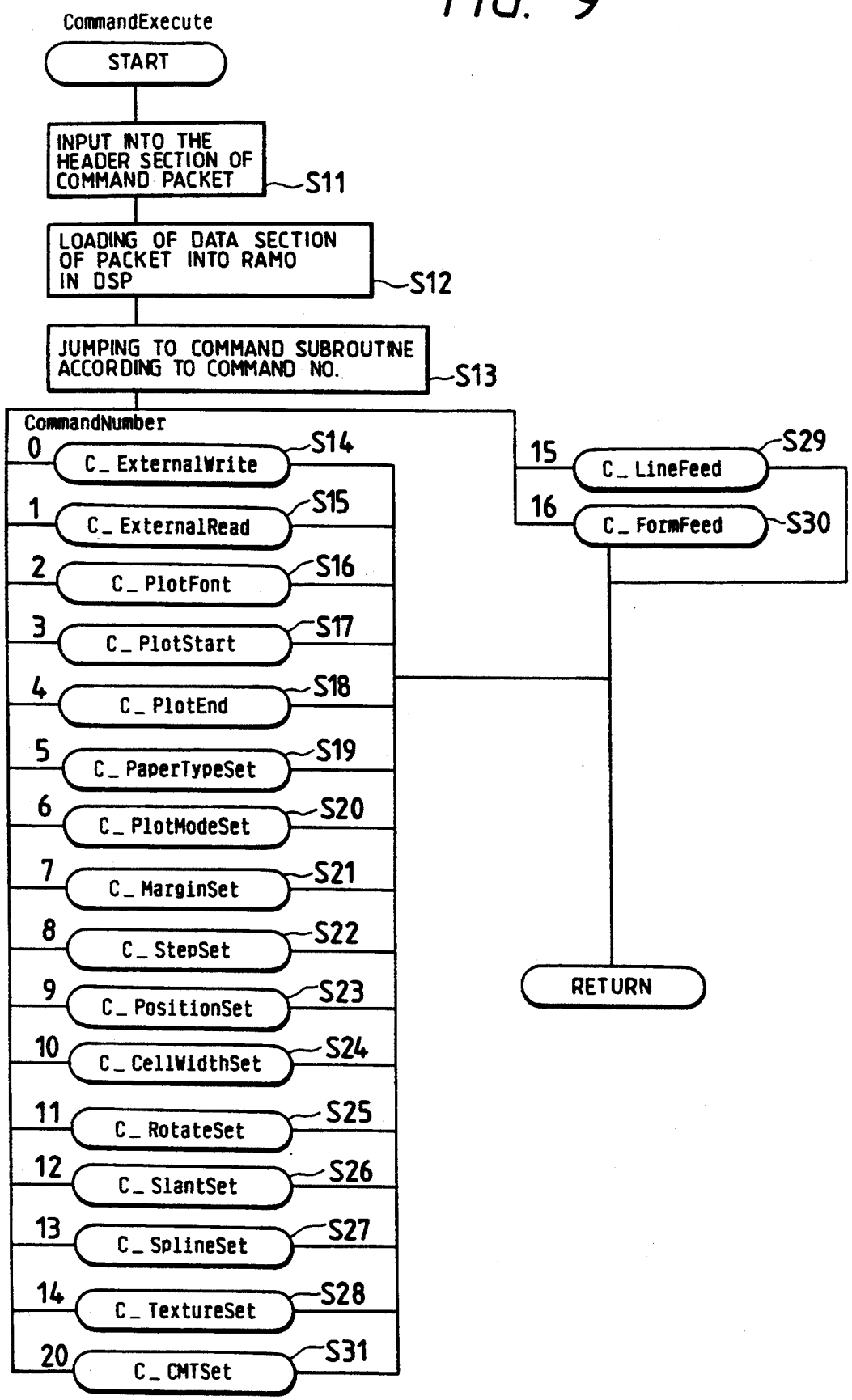
FIG. 9 is a flow chart for the subroutines for the loading of the data from bank 0 of the dual port RAM and the execution of the loaded data.
Figure 10:
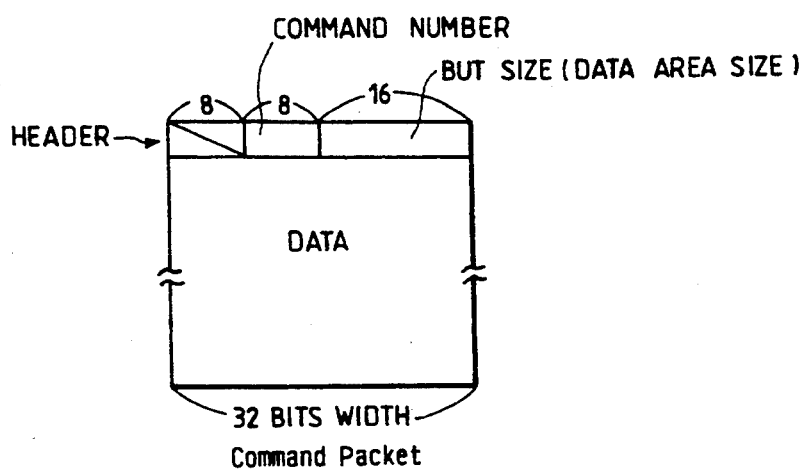
FIGS. 10–25 are charts for explaining the command packets used in the inventive system.

The details of the subroutine (S2) for the loading of the data from the dual port0 bank and the execution of the loaded data are as shown in FIG. 9 (The same applies also to the subroutine (S4) of the dual port1 bank). First, the header part of the command packet is input (S11). As illustrated in FIG. 10, the header part of the command packet has its initial eight bits vacant. A command number occupies the next eight bits. The size (i.e. the buffer size) of the data part, which follows the header part, is set in the subsequent 16 less significant bits, respectively.

Next, the data part of the command packet is loaded (S12) into one of the RAMs (for example, RAM 18A)(RAM 0) inside the DSP board 16. Furthermore, according to the command No. 0 through 16 and 20, the operation shifts to one of C ExternalWrite(S14), C ExternalRead (S15), C PlotFont(S16), C PlotStart(S17), C PlotEnd (S18), C PaperTypeSet(S19), C PlotModeSet(S20), C MarginSet(S21), C StepSet(S22), C PositionSet(S23), C CellWidthSet(S24), C RotateSet(S25), C SlantSet(S26), C SplineSet(S27), C TextureSet(S28), C LineFeed(S29), C FormFeed(S30), or C CMTSet(S31)(S13).

Figure 11:
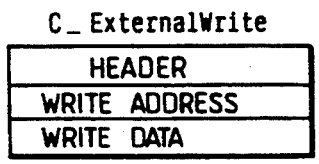

In subroutine C ExternalWrite, the command packet has the WRITE ADDRESS and the WRITE DATA set in regular sequence after the header, as illustrated in FIG. 11, and the WRITE DATA is written at the address specified by the WRITE ADDRESS.

Figure 12:
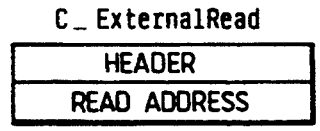

In subroutine C ExternalRead, the command packet has the READ ADDRESS set next to the header, as shown in FIG. 12. In this case, the system reads the data written at the address specified by the READ ADDRESS.

Figure 13:
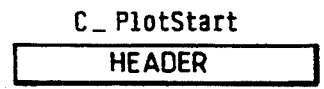
Figure 14:
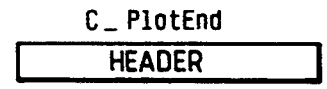

The command packets for the subroutines C PlotStart and C PlotEnd are respectively composed only of the header, as illustrated in FIG. 13 and FIG. 14. In the case of the former, the mail on the Plot Start is sent out to the CPU 4, and a reply from the CPU 4 is received thereto. Also, in the case of the latter, the mail indicating the Plot End is sent to the CPU 4 and a reply is received thereto from the CPU 4.

Figure 15:
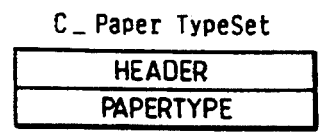

In subroutine C PaperTypeSet, the command packet has the PAPERTYPE set next to the header, as illustrated in FIG. 15. The Paper Type is transferred as the variable V PAPER to the RAM18B, and the RAM18B thus is reinitialized. For exampled if the initialized state is already set at a Cell Width (character size) of 40×40, and at the maximum value for the margin for the paper, these values are set in the operation just mentioned.

Figure 16:
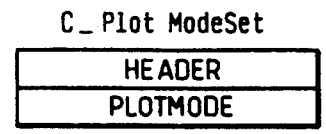

In subroutine C PlotModeSet, the command packet has the plot mode added after the header, as illustrated in FIG. 16. In this instance, the plot mode is transferred as the variable V MODE to the RAM 18B inside the DSP board.

Figure 17:
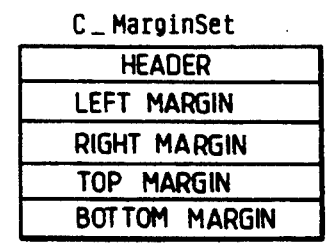

In subroutine C MarginSet, the command packet is composed of the header, the left margin, the right margin, the top margin, and the bottom margin, as shown in FIG. 17. In this case, the margins at the left, the right, the top, and the bottom are transmitted respectively as the variables V MARGINL, V MARGINR, V MARGINT, and V MARGINB to the RAM 18B inside the DSP board 16.

Figure 18:
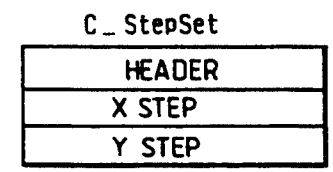

In subroutine C StepSet, the command packet is composed of the header, the X Step, and the Y Step, as shown in FIG. 18. In this case, the values of the X Step and the Y Step, as shown in FIG. 18, are transferred as the variables V STEPX and V STEPY to the RAM 18B.

Figure 19:
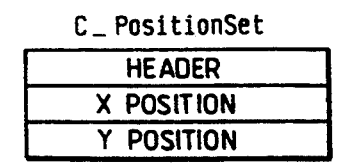

In subroutine C PositionSet, the command packet is composed of the header, the X Position, and the Y Position, as illustrated in FIG. 19. In this case, the value of the X position and the Y position are transferred as the variables V POSIX and V POSIY to the RAM 18B.

Figure 20:
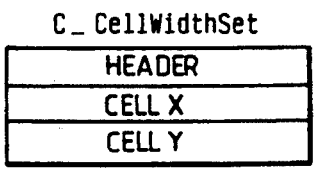

In subroutine C CellWidthSet, the command packet is composed of the header, the cell X, and the cell Y, as shown in FIG. 20, and the value of the cell X and that of the cell Y are transferred as the variables V CELLX and V CELLY to the RAM 18B.

Figure 21:
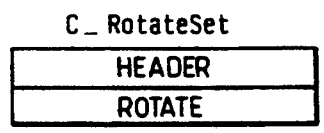

In subroutine C RotateSet, the command packet is composed of the header and the rotate, as shown in FIG. 21. In this case, the value of the ROTATE is transferred as the variable V ROTATE to the RAM 18B on the DSP board.

Since the size of the character is set by the variables V CELLX and V CELLY, while the rotating angle of the character is set by the variable, V ROTATE, the determinant for the rotation of the character is formed in the following manner.

$$\begin{bmatrix} V\ CELIX & 0 \\ 0 & V\ CELIX \end{bmatrix} = \begin{bmatrix} \cos(V\ ROTATE) & \sin(V\ ROTATE) \\ -\sin(V\ ROTATE) & \cos(V\ ROTATE) \end{bmatrix}$$

Figure 22:
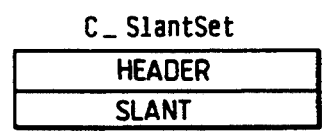

In subroutine C SlantSet, the command packet is composed of the header and the slant, as shown in FIG. 22, and the value of the slant is transferred as the variable, V SLANT, to the RAM 18B.

Since the size of the character is represented by the variables V CELLX and V CELLY, while the slanting angle of the character is expressed by the variable, V SLANT, the determinant of the slanting of the character is formed in the following manner.

$$\begin{bmatrix} V\ CELIX & 0 \\ 0 & V\ CELIX \end{bmatrix} = \begin{bmatrix} 1 & \tan(V\ SLANT) \\ 0 & 1 \end{bmatrix}$$

Figure 23:
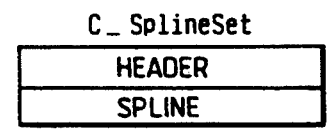

In subroutine C SplineSet the command packet is composed of the header and the spline, as illustrated in FIG. 23, and the value of the spline is transferred as the variable V SPLINE to the RAM 18B. In this manner, the initial value for the spline conversion is obtained.

Figure 24:
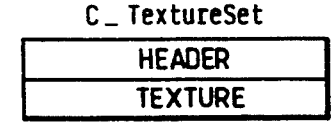

In subroutine C TextureSet, the command packet is composed of the header and the texture, as shown in FIG. 24. In this case, the value of the texture is transferred as the variable V TEXTURE to the RAM 18B.

Figure 25:
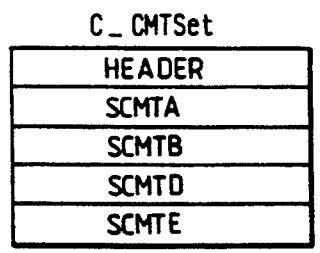

In the case of the C CMTSet subroutine, the command packet is composed of the header, SCMTA, SCMTB, SCMTD, and SCMTE, as shown in FIG. 25. These values are divided by the value 256 to convert them from a fixed decimal point expression to a floating decimal point expression, and then are transferred as the variables V CMTA, V CMTB, V CMTD, and V CMTE, respectively to the RAM 18B.

$$[XY1] = [xy1] \begin{bmatrix} V\ CMTA & V\ CMTD & 0 \\ V\ CMTB & V\ CMTE & 0 \\ V\ CMTC & V\ CMTF & 1 \end{bmatrix}$$

These variables V CMTA, V CMTB, V CMTD, and V CMTE are used in the subsequent CMT arithmetic operations.

Figure 26:
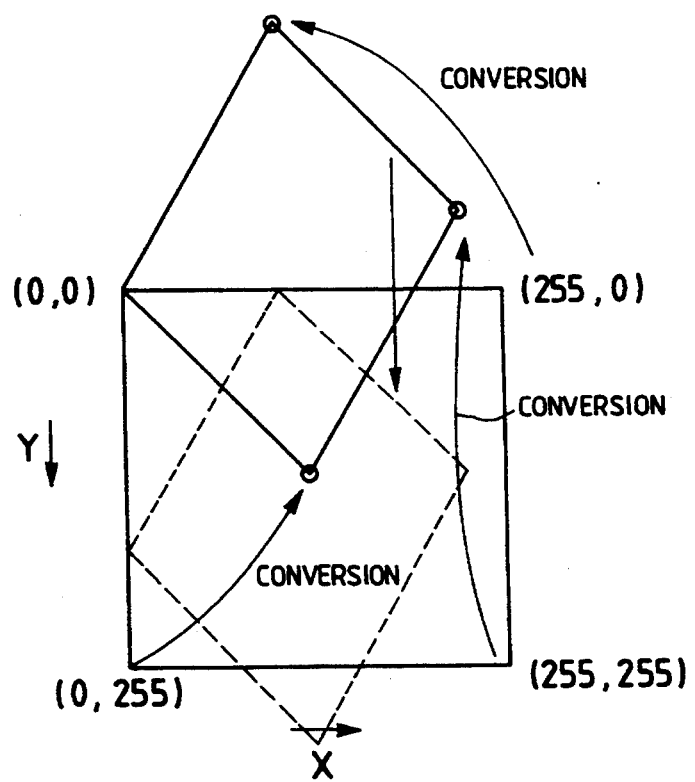
FIG. 26 is a chart for explaining the rotation, slanting, or horizontal shifting of characters.

Moreover, the minimum of the output data (X, Y) is obtained for the case in which the input data (x, y) for this matrix are set at (0, 255), (255, 0), and (255, 255), and, when the value is negative, the values X and Y, which are obtained by reversal of the code of the value, are taken up as the V CMTC and the V CMTF, and are transferred to the RAM 18B. This process is performed lest the converted coordinate have a negative value when the character is rotated, slanted, or moved horizontally as shown in FIG. 26.

Figure 27:
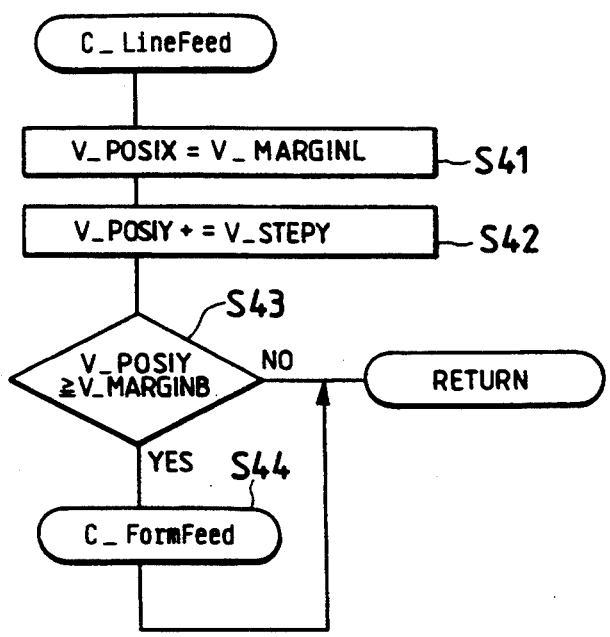
FIG. 27 is a flow chart for the subroutine C Line-Feed.

In subroutine C LineFeed, the value of the variable V POSIX is set at the variable V MARGINL (for the left margin), (S41) and the value of the variable V STEPV is added to the variable V POSIY (S42), as shown in FIG. 27. Here, moreover, V POSIY+=V STEPV expresses the following equation (The same applies to the subsequent steps).

V POSIY=V POSIY+V STEPY

Next, the variable V POSIY and the variable V MARGINB (for the bottom margin) are compared (S43), and, when V POSIY is greater than V MARGINB, the subroutine C FormFeed is executed (S44).

Figure 28:
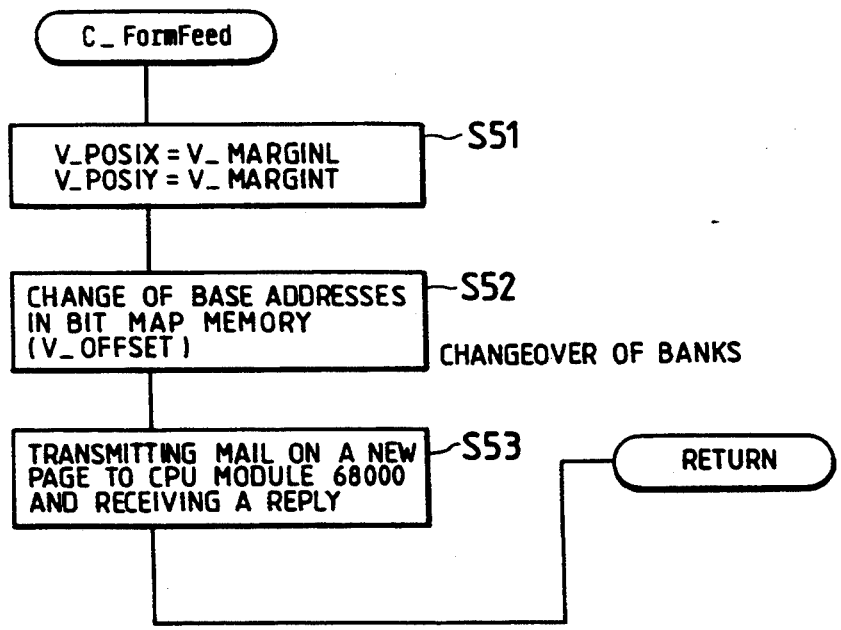
FIG. 28 is a flow chart for the subroutine C Form-Feed.

In subroutine C FormFeed the banks in the bit map memory 24 are changed over after the values of the variables V MARGINL (for the left margin) and V MARGINT (for the top margin), are respectively set in the variables V POSIX and V POSIY (S51), as shown in FIG. 28, the base address (Refer to FIG. 111) being changed as a result (V OFFSET shows the offset of the bank address in the bit map memory)(S52). Subsequently, the mail on the New Page is sent to the CPU 4, and its reply is received (S53).

Figure 29:
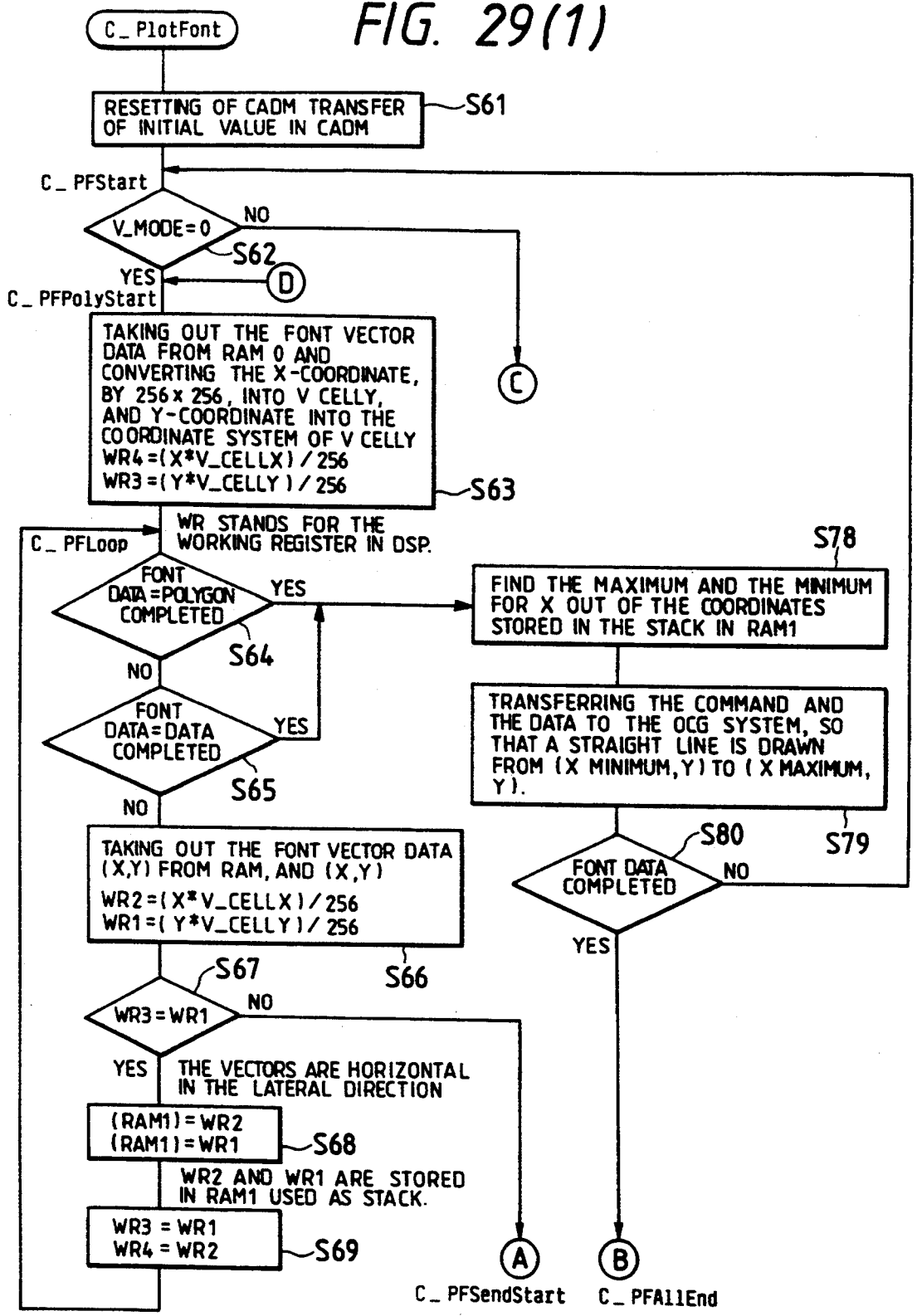
FIG. 29 is a flow chart for the subroutine. C Plot-Font.
Figure 29:
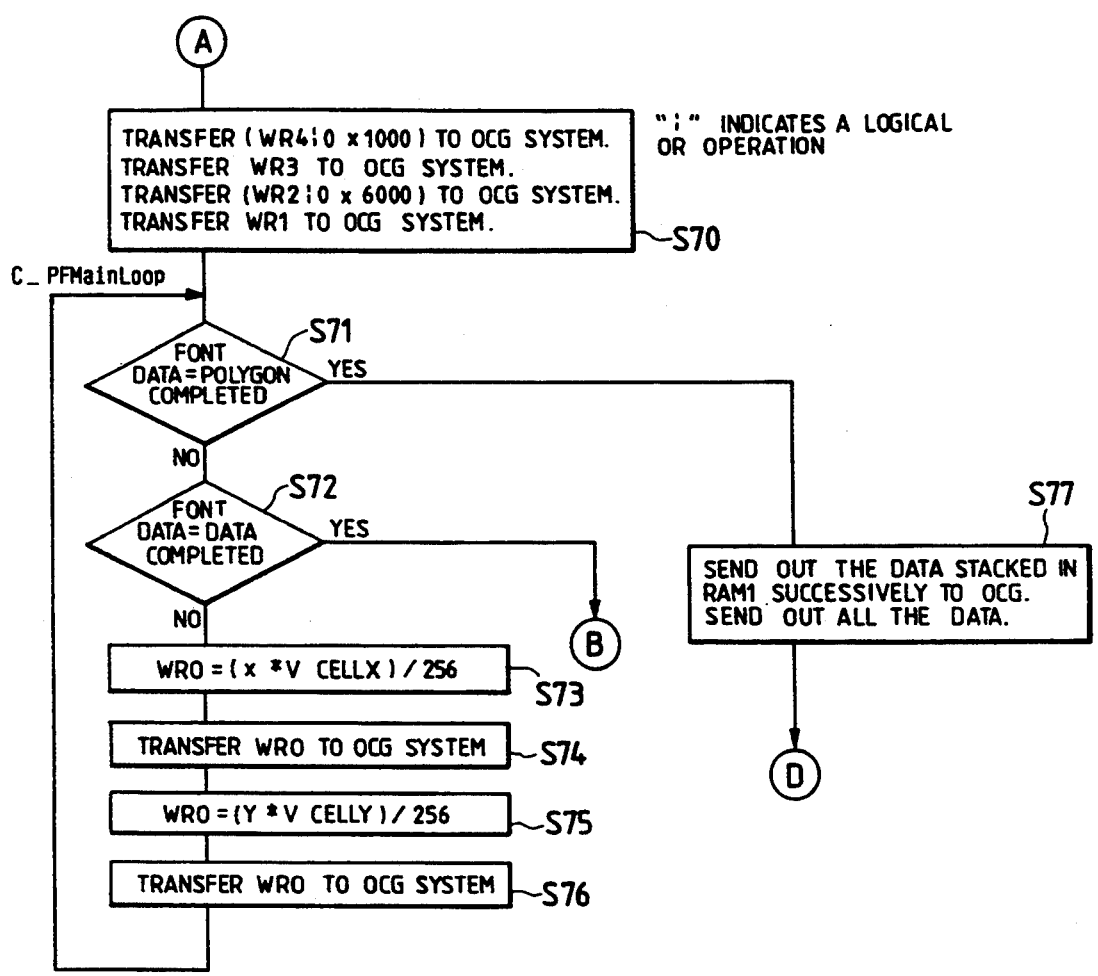

In subroutine C PlotFont, the sorter (CADM) 22 is reset, as shown in FIG. 29, and further the initial value is set (S61). When the variable V MODE is 0 (S62), the font vector data are read out of the RAM 18A (RAM 0) on the DSP board 16, and the x-axis coordinate and the y-axis coordinates for a 256×256 matrix are respectively converted into the coordinates for the variables V CELLX and V CELLY, in working registers WR3 and WR4 inside the DSP board 16, in accordance with the following equations (S63):

WR4=(x×(V CELLX))/256

WR3=(y×(V CELLY))/256

Figure 30:
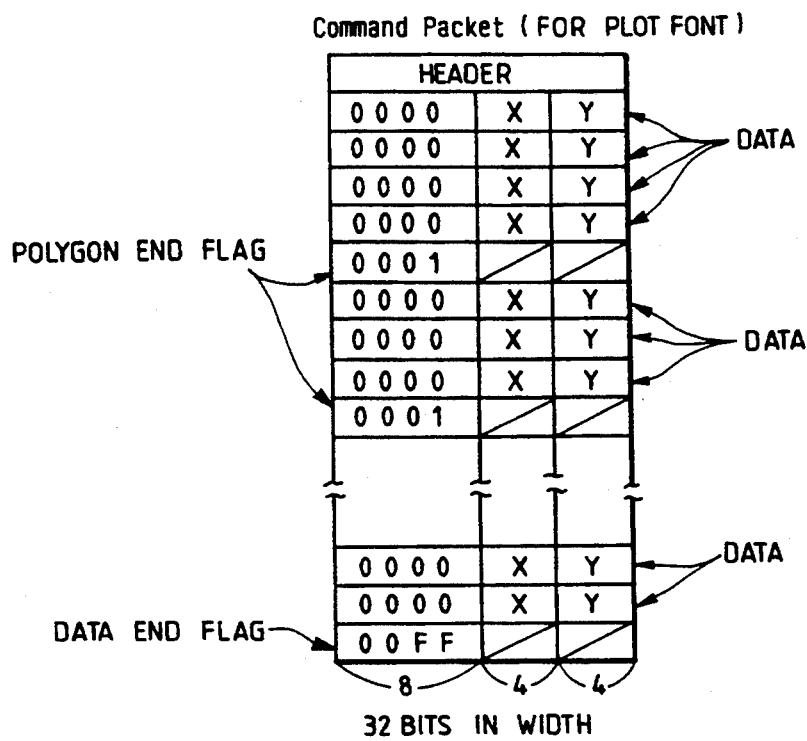
FIG. 30 is another chart for explaining the command packets.

In Plot Font, the command packet is composed as illustrated in FIG. 30. When the more significant eight bits next to the header are H00, the series of data for the x-axis are arranged in the next four bits and the series of data for the y-axis are arranged in the less significant four bits. If the more significant eight bits subsequent to the header are H01, the data are to be taken as signifying the completion of the polygon. If those bits are HFF, the data are to be taken as representing the end of the data.

Then, referring again to FIG. 29, the type of the font data read out of the RAM 18A is judged, and, when the data represent the completion of the polygon or the end of the data, the operation shifts to (S78), but, when the data do not represent the finish of the polygon or the end of the data, the font vector data (x, y) are read out of the RAM 18A, and the results from the next arithmetic operation are written in working registers WR1 and WR2 inside the DSP board 16, in accordance with the following equations (S66):

$$WR1=(y\times(V\ CELLY))/256$$

$$WR2=(x\times(V\ CELLX))/256$$

If WR1 and WR2 are equal (S67), that is, if the vector is horizontal in the lateral direction, the values developed in the working registers WR1 and WR2 are stored in the RAM 18B (S68). Furthermore, after the values developed in the working registers WR3 and WR4 are set in the working registers WR1 and WR2 respectively, the operation returns to S64 (S69).

If in S67 the values in the working registers WR1 and WR3 are not equal (that is, in case the vector is not horizontal in the lateral direction), the logical sum (OR) of the value of H0×H1000 and the value of the working register WR4 (OR) is found.

By this operation, the obtained value is expressed as a hexadecimal value, and H1 is set in the more significant four bits while the value of WR4 is set in the less significant twelve bits. The format employed at this time will be as illustrated in FIG. 5. In the same way, the logical sum H0×H6000 and the value of the working register WR2 are found, and the values are transferred, together with the values of the working registers WR1 and WR3, to the contour coordinate generator (OCG) 21 (S70). Subsequently, if the font data represent the completion of the polygon (S71), the data stored in the RAM 18B are transferred to the contour coordinate generator 21 (S77), the operation thereafter shifting to S63.

If the font data do not represent the completion of the polygon or the end of the data (S72), the next value found by arithmetic operation is set in the working register WR0, and the value is transferred to the contour coordinate generator 21 (S73 and S74).

$$WR0=(x\times(V\ CELLX)/256$$

Next, the arithmetic operation with the next equation is performed, iand the value obtained therefrom is transferred to the contour coordinate generator 21. Thereafter, operation returns to S71 (S75 and S76).

$$WR0=(y\times(V\ CELLY))/256$$

If the font data represent the end of the data (S72), the value of the variable, V POSIX, is transferred to the image drawing device 23 (S81), and the value obtained with the further addition of the variable V OFFSET to the variable V POSIY is transferred to the image drawing device 23 (S82). Moreover, after the variable, V TEXTURE, is transferred in the same way to the image drawing device 23 (S83), the subroutine PositionTrans is executed (S84).

When the font data represent the completion of the polygon or the end of the data at S64 or. S65, the maximum value (X max) and the minimum value (X min) are obtained for the value of the x-coordinate stored in the RAM 18B (S78), and command data are transferred to the contour coordinate generator 21 in such a way that a straight line is drawn from the point (X min y) to the point (X max y). And, if the font data are not yet finished, the operation returns to S62, and, if the data are finished, the operation shifts to S81.

In case the variable V MODE is not 0 at S62, the same process as that from S63 onward is executed, except that the equations for the arithmetic operations $$WR3=(x\times(V\ CELLY)/256$$

$$WR4=(x\times(V\ CELLX)/256$$

are changed to the equations given in the following:

$$WR3=x\times(V\ CMTD)+y\times(V\ CMTE)+(V\ CMTF)$$

$$WR4=x\times(V\ CMTA)+y\times(V\ CMTB)+(V\ CMTC)$$

Figure 31:
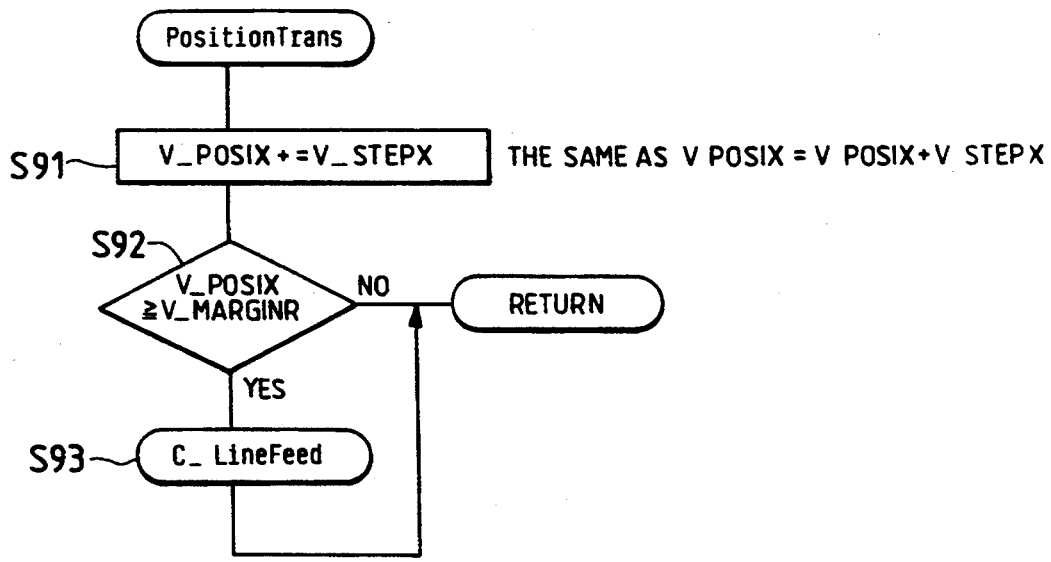
FIG. 31 is a flow chart for the subroutine Position-Trans.

In the case of subroutine PositionTrans, the variable V STEPX is added to the variable V POSIX, as shown in FIG. 31 (S91), and thereafter the variable V POSIX is compared with the variable V MARGINR (for the right margin)(S92). If the V POSIX is any larger than V MARGINR, the subroutine C Linefeed is executed (S93).

Figure 32:
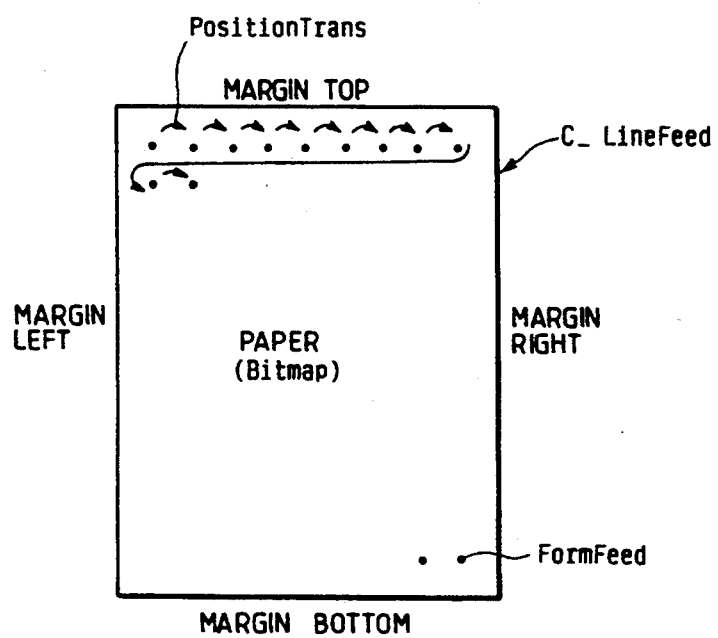
FIG. 32 is a chart for explaining the margins on the bit map.

FIG. 32 gives a schematic representation of how the individual subroutines are executed. As shown in the Figure, the character is shifted step by step to the right by the PositionTrans process on the bit map (which corresponds to the paper to be used for printing) with the left, right, top, and bottom margins set thereon, and, when the character comes to the position corresponding to the right margin, the process for C LineFeed (for starting a new line or for returning to the start of another line) is executed. Moreover, when the character comes to the position corresponding to the end of the line on the bottom margin, the process of FormFeed (for starting a new page) is executed.

Now the contour coordinate generator (OCG) 21 will be described. The basic functions of the contour coordinate generator 21 are:

1) To generate arithmetically the coordinates for the segment of a line formed by connecting the starting point and terminating point of the vector as identified by the vector coordinates input from the coordinate converter 15;
2) To select from the calculated and generated coordinates those coordinates which are suitable for the image drawing process (i.e. the painting out process) to be performed by the image drawing device 23 installed at a subsequent stage.

The two processes mentioned above are performed in parallel to achieve high-speed processing.

The contour coordinate generator 21 which performs these processes is composed of an input control section 31, a coordinate calculating section 32, a straight line coordinate selecting section 33, a corner coordinate selecting section 34, and an output control section 35, as shown in FIG. 33.

The input control section 31 stores the vector coordinates input from the coordinate converter (DSP) 15 in a built-in input FIFO (First In First Out) buffer. The coordinate calculating section 32 reads out the coordinates for the starting point and terminating point from the input FIFOS buffer and calculates and generates the coordinates for a line segment connecting the starting point and the terminating point. For example, when the coordinates for the point A (i.e. the starting point) and the point B (i.e. the terminating point) shown in FIG. 33 are read out, this coordinate calculating section 32 calculate the coordinates $A_1$ through $A_5$ for the dots forming the segment of a line (straight line) which connects the point A and the point B. In subsequent steps, the section successively finds the coordinates for the line segments (straight line) which connect the point B and the point C, the point C and the point D, and the point D and the point A respectively, performing its arithmetic operation the same way.

The straight line coordinate selecting section 33 selects only the necessary coordinates out of the straight line coordinates found. In other words, in order to perform the process of painting out the area inside the polygon formed by the segments of a line AB, BC, CD, and DA, which connect the points A and B, B and C, C and D, and D and A at a later stage, it is sufficient to specify only two points, i.e. the starting point and the ending point, for the direction in which the area is to be painted out (for example, the x-axis direction). For this reason, the selection of the coordinates is performed in such a way that there will be only two points On the same y-axis. For example, as the point $A_2$ and the point $A_3$ are present as the points having the same y-coordinate value as that of the point $D_8$, the coordinate selecting section selects only the point $A_3$, which is positioned on the outer side, in this case. As the result of this, the space between the point $D_8$ and the point $A_3$ is to be painted out at a later stage. At the subsequent steps, the same process is applied to select only those points which are necessary for the formation of a straight line.

The corner coordinate selecting section 34 selects the necessary points out of the points forming a corner. For example, there are four corners formed with the points A through D in the embodiment shown in FIG. 33, and yet, in the corner formed with the point D, among these corners, there is only one point which has the same y-coordinate. As a result, it will be impossible to specify the starting point and the terminating point for image drawing in the image drawing process performed at a later stage. In a corner like this, the point D is therefore selected also as the terminating point, at the same time as it is selected as the starting point, for the image drawing process.

The output control section 35 stores the coordinates subjected to straight line processing and corner processing in the memory of the built-in output FIFO buffer, and further outputs those coordinates to the sorter 22 provided at a later stage.

Furthermore, the five blocks from the input control section 31 to the output control section 35 individually operate in parallel for the purpose of high-speed processing.

Figure 34:
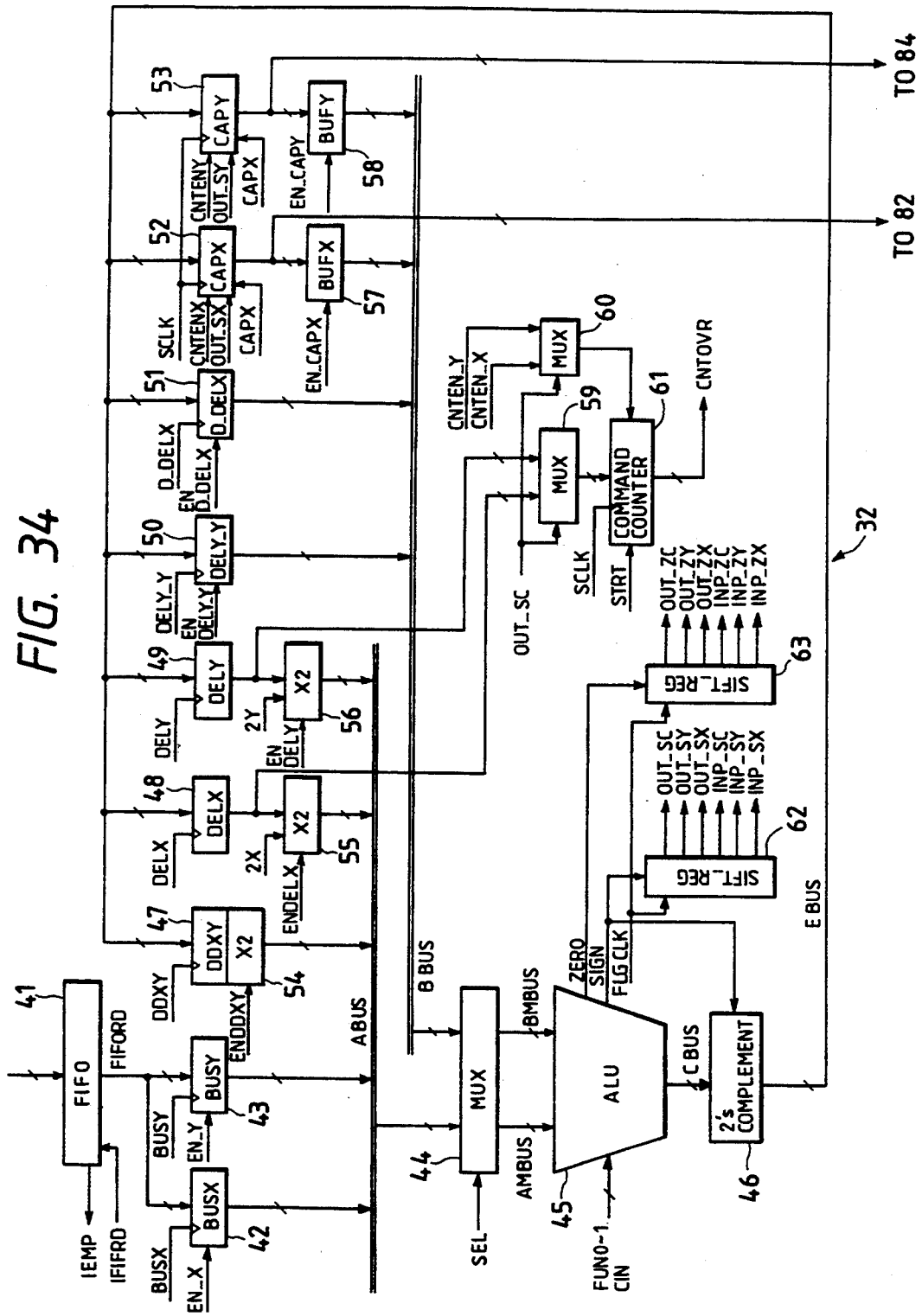
FIGS. 34 and 35 are block diagrams for the coordinating calculating section used in the invention.
Figure 35:
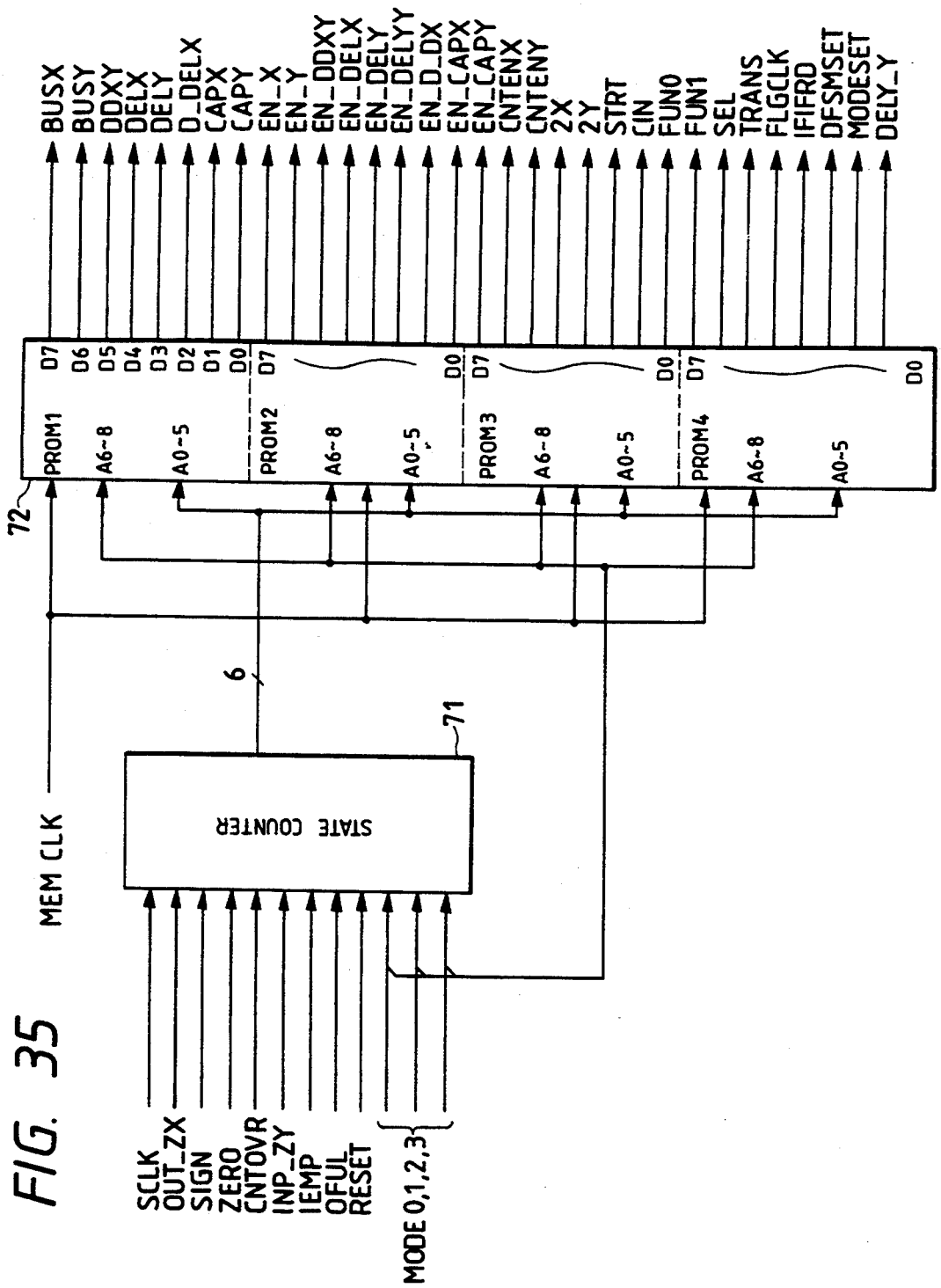

The coordinate calculating section 32 is composed, for example, as illustrated in FIG. 34, and it is controlled by a sequencer composed of a programmable logic device PLD provided with registers, as shown in FIG. 35.

In FIG. 34, in FIFO buffer 41, the vector coordinates input from the coordinate converter 15 are stored. Registers 42 and 43 store the x-coordinate (BUSX) and the y-coordinate (BUSY) as read out of the FIFO 41. A multiplexer 44 selectively outputs the signals from the ABUS or the BBUS. ALU 45 performs the arithmetic operations for processing the output from the multiplexer 44. Circuit 46 outputs the 2's complement for the output from the ALU 45. The output from the circuit 46 is fed to the registers 47 to 51 and the up-down counters CAPX 52 and CAPY 53.

The counter (CAPX) 52 receives the loading of the x-coordinate (the start x-coordinate) for the beginning point of the straight line among the coordinates input into the FIFO 41, and successively generates from the loaded coordinates the x-coordinates which form the segments of a line. The counter (CAPY) 53 receives the loading of the y-coordinate (the start y-coordinate) for the beginning point of the straight line and successively generates from the loaded coordinates the y-coordinates which form the segment of a line.

The register (DELX) 48 stores the absolute value ($|$BUSX-CAPX$|$) of the difference between the value stored in memory in the register (BUSX) 43 and the value (the start x-coordinate) stored in memory in the counter (CAPX) 53. This absolute value defines the amount of movement of the straight line in the x-axis direction. The flag SX, which expresses the code for (BUSX-CAPX), defines the direction with respect to the x-axis for the straight line, and the flag ZX, which indicates whether the value of the (BUSX-CAPX) is zero, defines whether the said straight line is parallel to the y-axis.

The register (DENY) 49 and the register (DENY Y) 50 store in memory the absolute value ($|$BUSY-CAPY$|$) of the difference between the register (BUSY) 43 and the counter (CAPY) 53 (the start y-coordinate). This absolute value defines the amount of movement of the straight line in the y-axis direction. The code flag SY for (BUSY-CAPY) defines the direction of the straight line with respect to the y-axis, and the zero flag ZY defines the parallel arrangement of the straight line in relation to the x-axis. The register (DDXY)-47 stores the absolute value ($|$DELX-DELY$|$) of the difference between the values stored respectively in the register (DELX) 48 and the register (DENY) 49. The code flag SC for the (DELX-DELY) defines whether the slant of the straight line in relation to the x-axis is 45 degrees or more, and the flag ZC, which expresses whether the (DELX-DELY) is zero, defines whether the slant is just 45 degrees. The register (D DELX) 51 stores the error term e in Bresenham's algorithm in the register (DELX) 48.

Shifters 54, 55, and 56 shift the data towards the left (i.e. to a more significant position) by one bit and double the data. Buffers 57 and 58 keep the timing for outputting the values of the counter (CAPX) 52 and the counter (CAPY) 53 to the BBUS. Multiplexer 50 selects the output from the register (DELX) 48 and the output from the register (DELY) 49, and the multiplexer 60 selects and outputs the count enable signal CNTENX from the counter (CAPX) 52 and the count enable signal CNTENY from the counter (CAPY) 53.

A down-counter 61 receives the input of the value stored in the register (DELX) 48 or the register (DELY) 49 as its initial value and then generates the CNTOVR signal, which expresses the completion of the generation of data with respect to one segment of a line by counting down the said input value. Six-stage shift registers 62 and 63 which store the status of each segment of a line, and respectively output the signals, OUT SC, OUT SY, OUT SX, INP SC, INP SY, and INP SX or the signals, OUT ZC, OUT ZY, OUT ZX, INP ZC, INP ZY, and INP ZX to represent the statuses of the individual segments of a line, taking two segments of a line as one group and applying the newly input segments of a line as the OUT (output) and the old segments of a line as the INP (input).

In FIG. 35, state counter 71 outputs the prescribed six-bit code signals in correspondence to the other input signals each time the system clock SCLK is input. An eight-bit PROM 72 having four registers processes a nine-bit input and an eight-bit output, the output therefrom being latched with the MEMCLK signal. Also, the output from the state counter 71 is fed to the six less significant bits of the nine-bit input, while signals expressing the MODES (MODE0 through MODE3) are fed to the three more significant bits of that input. These four MODES are generated by decoding the commands in the four more significant bits in the 16-bit signals transferred from the coordinate converter 15 shown in FIG. 5. Table 2 presents the correspondence of these bits.

The PROM 72 outputs various control signals shown in FIG. 35 in correspondence with the data input from the state counter 71. These control signals are fed to the individual registers and counters, etc. given in FIG. 34 and control their operations, The control signals used in the block diagram shown in FIG. 34 are put together in Table 3.

TABLE 2

| MODE | COMMAND | CONTENTS |
|---|---|---|
| 0 | 0001 | Data on the start (the first position) of the polygon |
| 1 | 0110 | Data on the second position of the polygon |
| 2 | 0000 | Data on the peak point of the polygon |
| 3 | 0100 | Command to the sorter 22 |
|   | 0101 | Data to the sorter 22 |

TABLE 3

| SIGNAL NAME | FUNCTION |
|---|---|
| BUSX | Latching signal for Register (BUSX) 42 |
| BUSY | Latching signal for Register (BUSY) 43 |
| DDXY | Latching signal for Register (DDXY) 47 |
| DELX | Latching signal for Register (DELX) 48 |
| DELY | Latching signal for Register (DELY) 49 |
| DELY Y | Latching signal for Register (DELY Y) 50 |
| D DELX | Latching signal for Register (D DELX) 51 |
| EN X | Enable signal for output from Register (BUSX) 42 |
| EN Y | Enable signal for output from Register (BUSY) 43 |
| EN DDXY | Enable signal for output from Register (DDXY) 47 |
| EN DELX | Enable signal for output from Shifter 55 |
| EN DELY | Enable signal for output from Shifter 56 |
| EN DELY Y | Enable signal for output from Register (DELY Y) 50 |
| EN D DELX | Enable signal for output from Register (D DELX) 51 |
| EN CAPX | Enable signal for output from Buffer (BUFX) 57 |
| EN CAPY | Enable signal for output from Buffer (BUFY) 58 |
| SCLK | Clock signals for Counter (CAPX) 52 and Counter (CAPY) 53 and synchronizing clock for Sequencer |
| CNTENX | Count enable signal for Counter (CAPX) 52 |
| CNTENY | Count enable signal for Counter (CAPY) 53 |
| CAPX | Loading signal for Counter (CAPX) 52 |
| CAPY | Loading signal for Counter (CAPY) 53 |
| ZX | Shift control signal of Shifter 55 |
| ZY | Shift control signal of Shifter 56 |
| SEL | Cross control signal (cross or through) for Multiplexer (MUX) 44 |

TABLE 3-continued

| SIGNAL NAME | FUNCTION |
|---|---|
| FUNO, 1, CIN | Setting of modes for arithmetic operations with arithmetic Unit ALU 45 |
| FLGCLK | Shift enable signals for Shift Registers (SHIFT REG) 62 and 63 |
| STRT | Used for Load Signal for Down Counter 61. Start signal for interpolating process for straight line |
| TRANS | Clock for transferring the the generated coordinates |
| DFSMSET | Signal for setting the DIF/SAM |
| MODESET | Signal for setting the Mode |
| SIGN | Sign flag for the result of arithmetic operations performed with Arithmetic Unit (ALU) 45 |
| ZERO | Zero flag for the result of arithmetic operations with Arithmetic Unit (ALU) 45 |
| IEMP | Status signal for reading out the input of FIFO 41 |
| CNTOVR | End signal for interpolating process for straight line |
| OFUL | Writing status signal for output FIFO |
| IFIFRD | Reading signal for input FIFO 41 |

Figure 36:
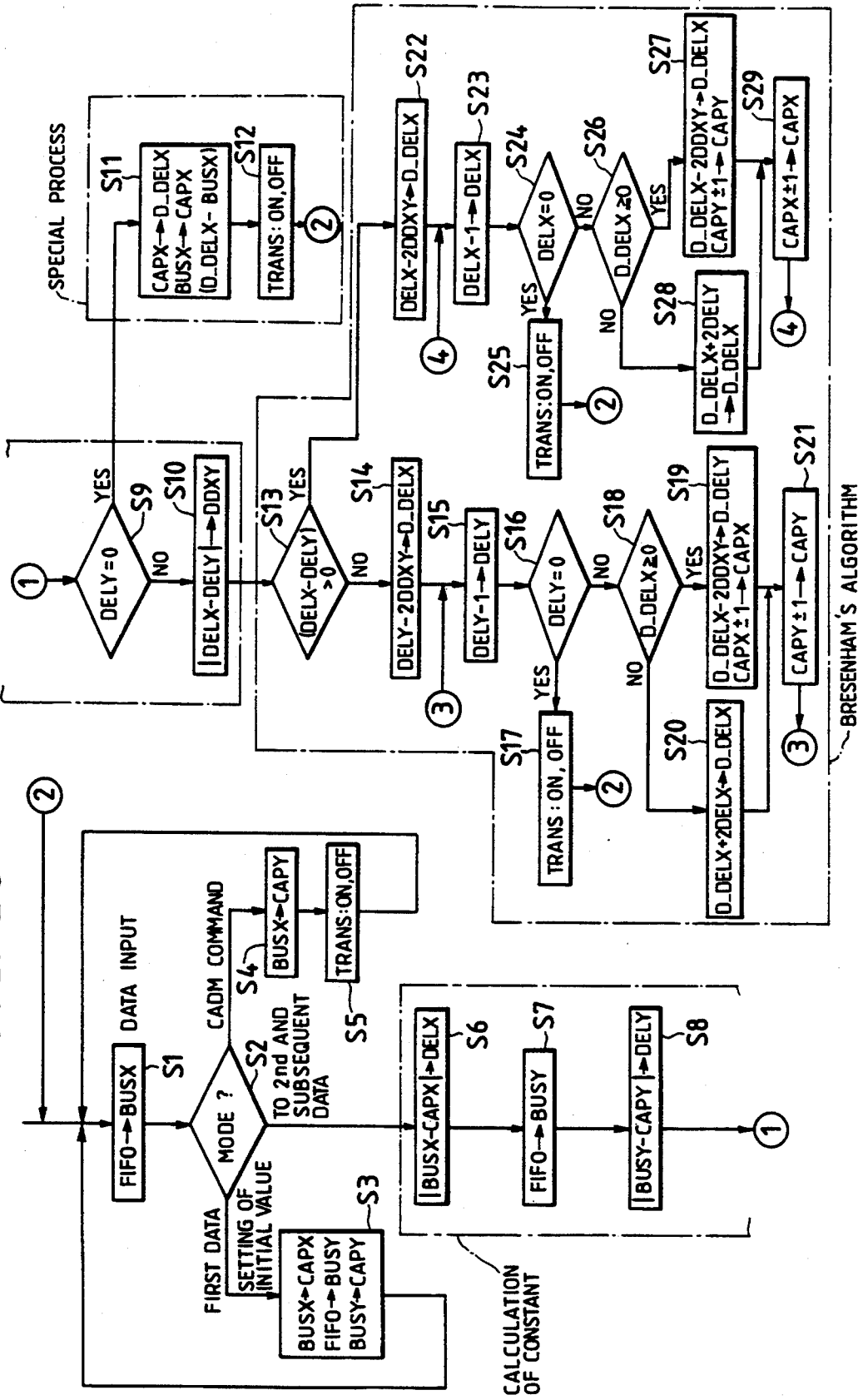
FIG. 36 is a flow chart for the calculation of the coordinates.

FIG. 36 is a flow chart showing the process of the arithmetic operations of coordinates represented in the block diagram in FIG. 34. The data input into the FIFO 41 first are stored in the register (BUSX) 42 (S1). Then, on the basis of the four more significant bits, it is judged, with reference to Table 2, in which of the modes shown therein the input data are (S2). When the data are in the Mode 0 (the data in the first position), the setting of the initial value is executed (S3). In specific terms, the value of the register (BUSX) 42 is transferred to the counter (CAPX) 52, the value input next in the FIFO 41 then is transferred to the register (BUSY) 43, and the value in the register (BUSY) 43 is transferred to the counter (CAPY) 53 respectively in succession. In this manner, the initial value (the starting coordinate for the polygon) is set in the counter (CAPX) 52 and the counter (CAPY) 53.

When the data are either in Mode 1 or Mode 2 (the data in the second position or any subsequent position in the polygon), step S6 and the subsequent steps for finding the constant by arithmetic operations as described later are performed.

When the data are in the Mode 3 (a command or data for transfer to the sorter 22), the value in the register (BUSX) 42 is transferred to the counter (CAPY) 53 (S4), and further turns ON and OFF the coordinate transfer clock TRANS (S5). By this, the command or the data will be transferred to the straight line coordinate selecting section 33.

To find the constant through arithmetic operation, the absolute value of the difference between the value in the register (BUSX) 42 and the value in the counter (CAPX) 52 is calculated, the determined value being stored in the register (DELX) 48 (S6). Next, the value of the FIFO 41 is stored in the register (BUSY) 43 (S7), after which the absolute value for the difference between the value in the register (BUSY) 43 and the value in the counter (CAPY) 53 is stored in the register (DELY) 49 (S8). Furthermore, it is judged whether the value in the register (DELY) 49 is zero, and, if it is zero (which represents a straight line parallel to the x-axis), a special process is begun (S9). If it is not zero, the absolute value for the difference between the value in the register (DELX) 48 and the value in the register (DELY) 49 is stored in the register (DDXY) 47, after which the operation shifts to the step for processing Bresenham's algorithm (S13 and the subsequent step) (S9 and S10).

In this way, the constant necessary for Bresenham's algorithm for generating the straight line coordinates is determined by arithmetic operations at the steps S6 through S10, and also the status of the straight line is produced. However, the constant for Bresenham's algorithm is modified as shown in the following:

DELX−2DDXY=DELX−2(DELX−DELY)=-2DELY−DELX (D DELX)−2DDXY=(D DELX)−2(DELX−DELY)=(D DELX)+2(DELY−DELX)

In the special process performed if the straight line is parallel to the x-axis, the value of the counter (CAPX) 52 is stored in the register (D DELX) 51, and the value of the register (BUSX) 42 is stored in the counter (CAPX) 52. Moreover, the code for the difference between the value of the register (D DELX) 51 and that of the register (BUSX) 42 is obtained (S11). Next, the clock TRANS is turned ON and OFF, and the operation returns to step S1 (S12). In this way, only the coordinate for the terminating point of the straight line is transferred as it is without using Bresenham's algorithm.

In processing with Bresenham's algorithm, the code for the differences between the values in the registers (DELX) 48 and (DELY) 49 is judged (S13). When this code is in the negative or zero (i.e. when the slant of the straight line in relation to the x-axis is 45 degrees or more), the value obtained by subtracting twice the value in the register (DDXY) 47 from the value of the register (DELY) 49 is stored in the register (D DELX) 51 (S14), and the value of the register (DELY) 49 is decremented by one (S15). Then, it is judged whether the value in the register (DELY) 49 is zero (S16). If it is zero, the clock TRANS is turned ON and OFF, and the operation returns thereafter to the step S1 (S17). If the value in the register (DENY) 49 is not zero, the code for the register (D DELX) 51 is judged (S18). If this value is positive or zero, the difference between the values of the register (D DELX) 51 and that twice as large as the value of the register (DDXY) 47 is stored in the register (D DELX) 51, and, depending on the conditions, the value of the counter (CAPX) 52 is incremented or decremented only by one (S19). If the value of the register (D DELX) 51 is negative, the value in the register (D DELX) 51 and twice the value in the register (DELX) 48 are added, and the sum is stored in the register (D DELX) 51 (S20). Whatever the value of the register (D DELX) 51 may be, the value of the counter (CAPY) 53 is incremented or decremented only by one after the processing of the value of the said register, and the operation then returns to the step S15 (S21).

When the difference between the value of the register (DELX) 48 and that of the register (DELY) 49 is positive at the step S13 (i.e. when the slant of the straight line to the x-axis is smaller than 45 degrees), the value obtained by subtracting twice the value in the register (DDXY) 47 from the value in the register (DELX) 48 is stored in the register (D DELX) 51 (S22), and the value in the register (DELX) 48 is decremented only one (S23). Then, it is judged whether the value in the register (DELX) 48 is zero (S24). If it is zero, the clock TRANS is turned ON and OFF, and then the operation returns to the step 1 (S25). When the value of the register (DELX) 48 is not zero, the value of the register (D DELX) 51 is judged (S26). When this value is positive or negative, the difference between the value in the register (D DELX) 51 and twice the value in the register (DDXY) 47 is stored in the register (D DELX) 51, and, depending on the conditions, the value of the counter (CAPY) 53 is incremented or decremented by only one (S27). When the value of the register (D DELX) 51 is negative, the value in the register (D DELX) 51 and twice the value that in the register (DELY) 49 are added, and the sum is stored in the register (D DELX) 51 (S28). Whatever the value in the register (D DELX), the value of the counter (CAPX) 52 is incremented or decremented by one after the processing of the value of the said register, the operation thereafter returning to the step S23 (S29).

Figure 37:
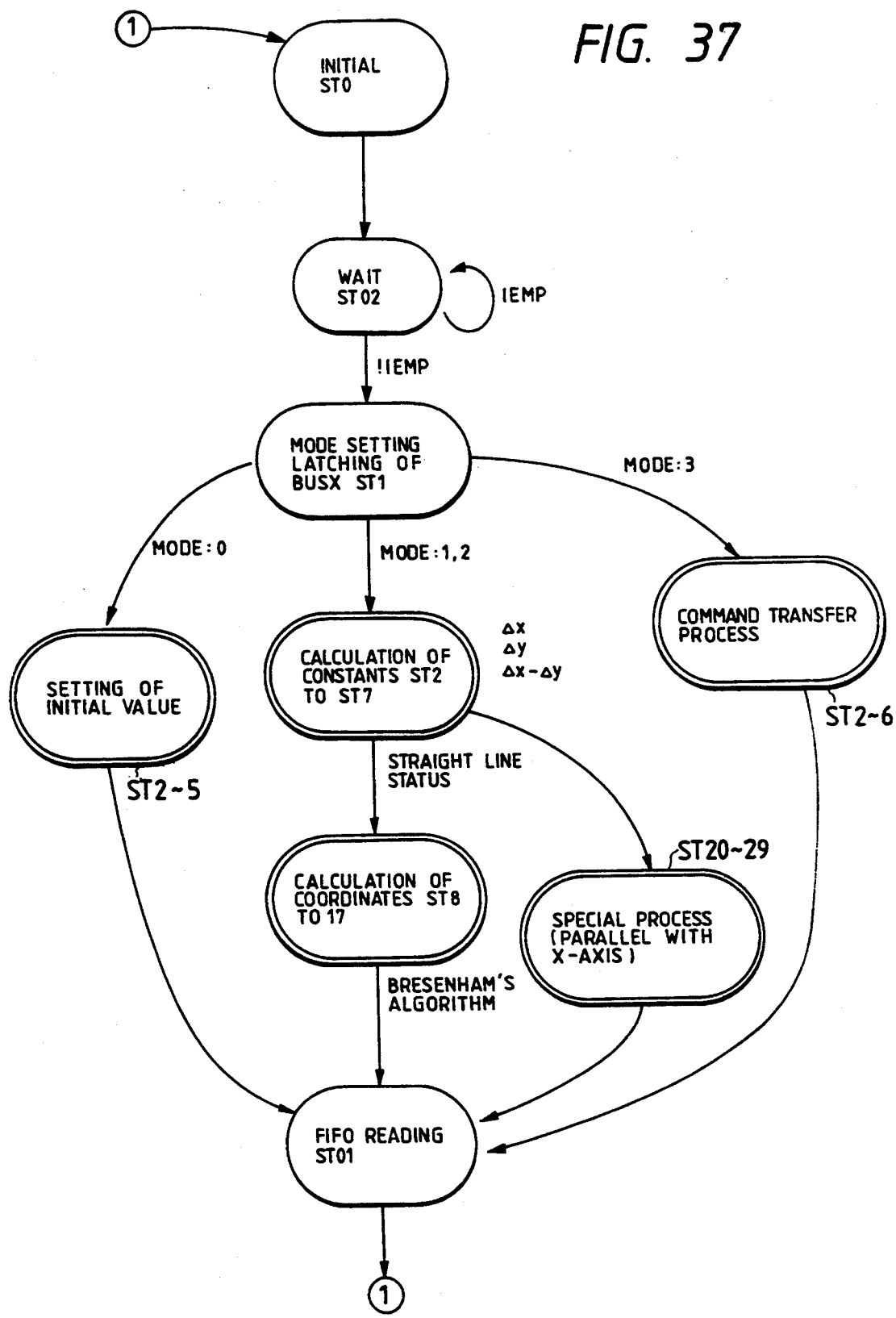
FIG. 37 is a state transition chart for the calculation of the coordinates.

The operation of the coordinate calculating section 32 shown in FIG. 34 can be explained with reference to the state transition chart expressing that operation as a flow of the state undergoing a transition every time one clock SCLK is generated. FIG. 37 represents the overall flow of the state transition. When a clock SCLK is generated in the initial state (ST0), the state shifts to the waiting (WAIT) state (ST02). In this state, the control signal IEMP is monitored, and, if the data in the FIFO 41 are not empty (i.e. the signal IEMP is logical 0) (i.e. if it is !IEMP), the state shifts to the state for setting the next MODE (ST1). In this regard, the mark "!" means "NOT". In the MODE-setting state, the data input from the FIFO 41 into the register (BUSX) 42 are latched, and the mode of the data (See Table 2) is determined.

In MODE 0 (for data in the first position in the polygon), the states (from ST2 through ST5) for the setting the initial value are executed, after which the state shifts to the FIFO read state (ST01). In the FIFO read state, the data stored in the FIFO 41 are read out. After the FIFO read state, the state returns again to the initial state (ST0).

In MODE 1 or MODE 2 (i.e. for the data in the second or subsequent position in the polygon), the states for the calculation of the constants (ST2 through ST7) are executed, and, after the calculations of DEL X (Δx), DELY (Δy) and DDXY (Δx−Δy) are performed, the states (from ST8 to ST17) for the calculation of the coordinates with Bresenham's algorithm are executed if the straight line is not parallel to the status of the x-axis in correspondence with the straight line, but states of the special process (From ST20 to ST29) are executed if the straight line is parallel to the x-axis. After these processing steps, the operation returns to the initial state (ST0) by way of the FIFO read state (ST01).

On the other hand, in MODE 3 (i.e. in the case of a command or data output to the sorter 22), the state for the processing of the commands (ST2 through ST6) is executed, after which the operation returns to the initial state (ST0) by way of the FIFO read state (ST01).

Figure 38:
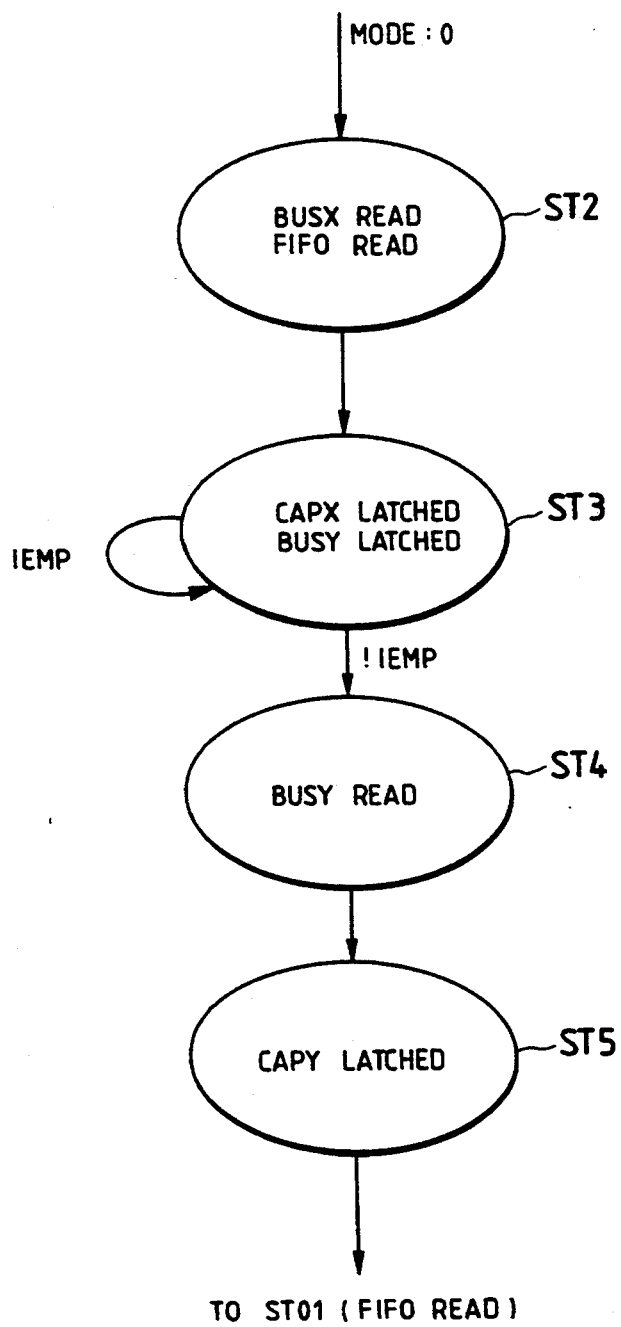
FIG. 38 is a state transition chart for the setting of a initial value.

FIG. 38 shows greater detail of the state for the setting of the initial value. First, the registers (BUSX) 42 and the FIFO 41 (ST2) are read, and the data read from these are latched respectively in the counter (CAPX) 52 and the register (BUSY) (ST3). If the FIFO 41 is empty (i.e. if the signal IEMP is on), the system remains in the waiting state as it is, but, if the FIFO 41 is not empty (i.e. if it is in the state of !IEMP), then the data in the register (BUSY) 43 are read out (ST4) and the data are latched in the counter (CAPY) 53 (ST5).

Figure 39:
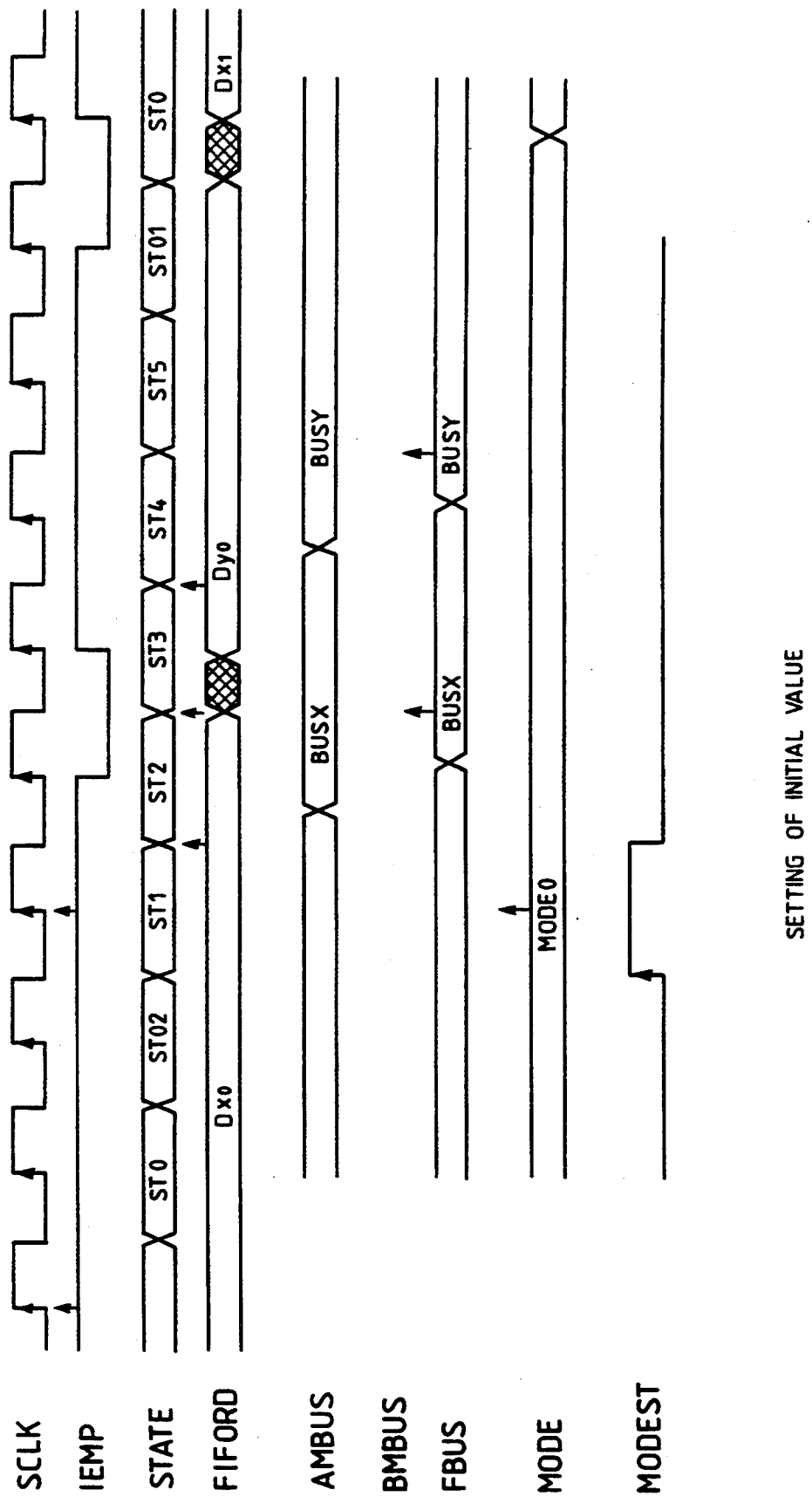
FIG. 39 is a timing chart for the setting of the initial value.

FIG. 39 represents the timing chart for setting the initial value. Each time the clock SCLK is input, the state changes in regular succession from ST0 to ST02, ST1, and ST2. There is a lag between the rising edge of the clock SCLK and the state transition because a slight delay occurs in the duration from the input of the clock SCLK in the state counter 71 and the output of the prescribed control signal from the PROM 72.

After the MODE (MODE 0 in the case of this embodiment) is set in correspondence with the control signal MODEST in the state ST1, the data in the register (BUSX) 42 are output to the AMBUS via the ABUS and via the multiplexer 44 in the state ST2. Furthermore, as these data are put through to the FBUS by the ALU 45, it becomes possible to latch the data in the counter (CAPX) 52 in the state ST3. Also, as the data $DX_0$ in the FIFO 41 are read out in the state ST2, the next data $DY_0$ are output to the FIFO RD in the next state ST3, and these data are latched in the register (BUSY) 43. when the FIFO 41 is not empty (i.e. when the signal IEMP is logical 1), the data in the register (BUSY) 43 are read out to the AMBUS and FBUS in the state ST4, and these data are latched in the counter (CAPY) 53 in the state ST5.

Figure 40A:
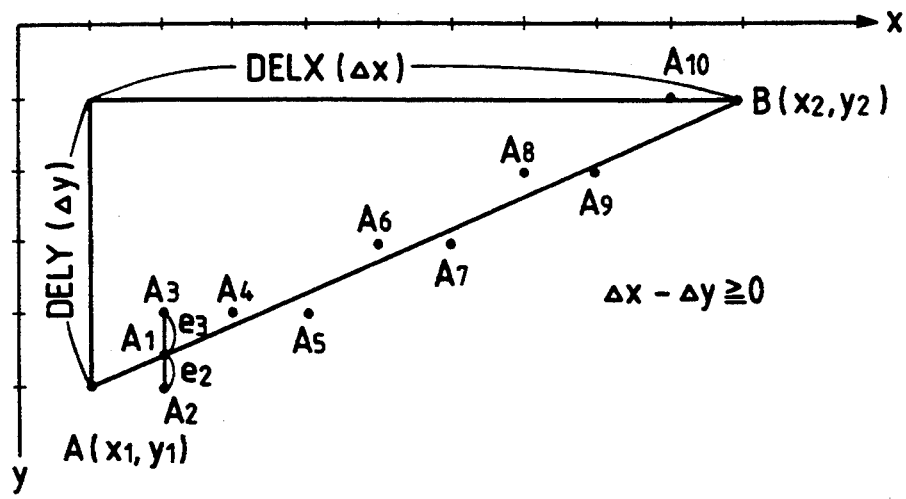
FIG. 40 is a chart for explaining Bresenham's algorithm which is used in implementing a preferred embodiment of the invention.

Next, the principle of Bresenham's algorithm will be explained with reference to FIG. 40 before the states for the calculation of the constant and the calculation of the coordinates for the execution of Bresenham's algorithm are described. As shown in FIG. 40, those dots positioned at the points which do not correspond to the integral multiples of the unit for the coordinate will be approximated by the dots in the positions corresponding to the integral multiples of the unit for the coordinate when the straight line connecting the starting point A and the terminating point B are expressed as a set of dots. In effecting this approximation, the value of one of the x-coordinate and the y-coordinate at the specified point on the straight line is left as it is while the value of the other is set to be the value of the coordinate corresponding to the integral multiples of the unit of the closest coordinate. That is to say, in the case of a straight line the slanting angle of which is 45 degrees or less as shown in FIG. 40(a) (i.e. when the difference $(x_2 \times x_1)$ of the x-coordinate and the difference $(y_2 \times y_1)$ of the y-coordinate between the starting point A $(x_1, y_1)$ and the terminating point B $(x_2, y_2)$ are taken as $\Delta x$ (to be expressed with the mark SX) and as $\Delta y$ (to be expressed with the mark SY) respectively, (that is, when the mark SC in $(|\Delta x| - |\Delta y|)$ is SC>=0), two points $A_2$ and $A_3$ are considered, for example, for the x-coordinate identical to that at the point $A_1$, to approximate the point $A_1$ on the straight line between A and B, and, when the errors between these points and the point $A_1$ are taken as $e_2$ and $e_3$, the point which has the smaller error (the point $A_2$ in this case since $e_2 < e_3$ in this case) is selected. Since the error e is not any larger than 1 (unit), the point where the value is not any larger than $\frac{1}{2}$ will eventually be selected as the approximating point. In the subsequent steps, the same process is applied and the straight line from A to B is approximated by the points, A, $A_2$, $A_4$, $A_5$ ... $A_{10}$, and B.

Figure 40B:
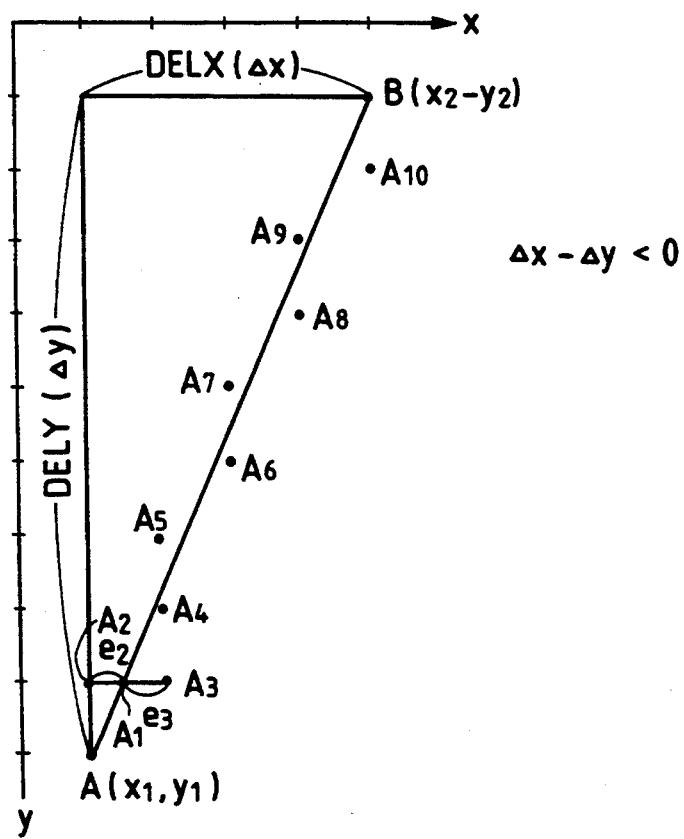

In case the slant of the straight line is larger than 45 degrees as shown in FIG. 40(b), the value of the coordinate in the y-axis direction is taken as it is while the coordinate in the x-axis direction is taken at the point where the error is not more than $\frac{1}{2}$.

The coordinate at such approximating points can be obtained by performing the arithmetic operations indicated by the program given below. For example, in the case shown in FIG. 40(a):

e:=2DELY−DELX for i:=1 to DELX do begin

Figure 41:
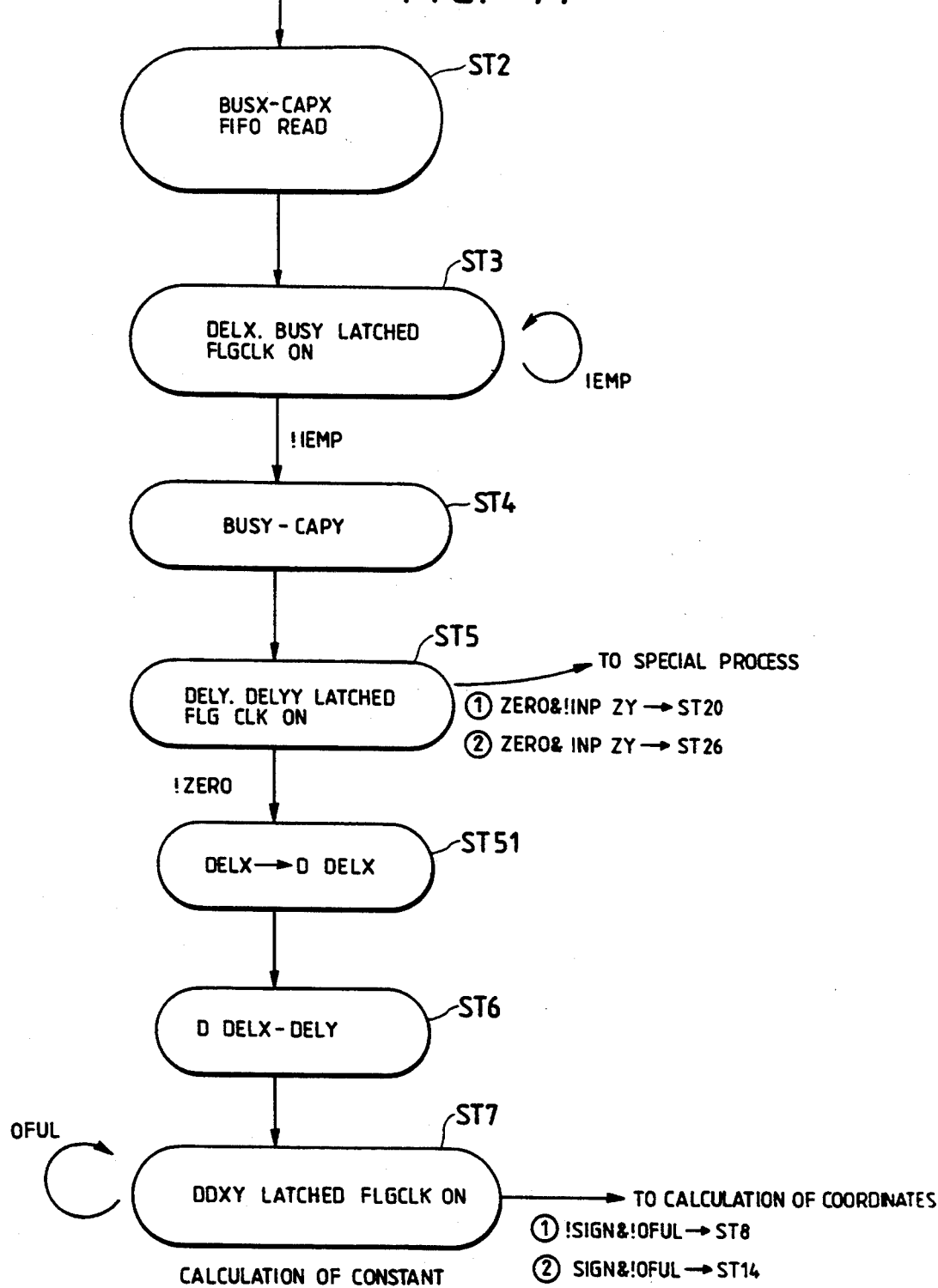
FIG. 41 is a state transition chart for the calculation of a constant.
Figure 42:
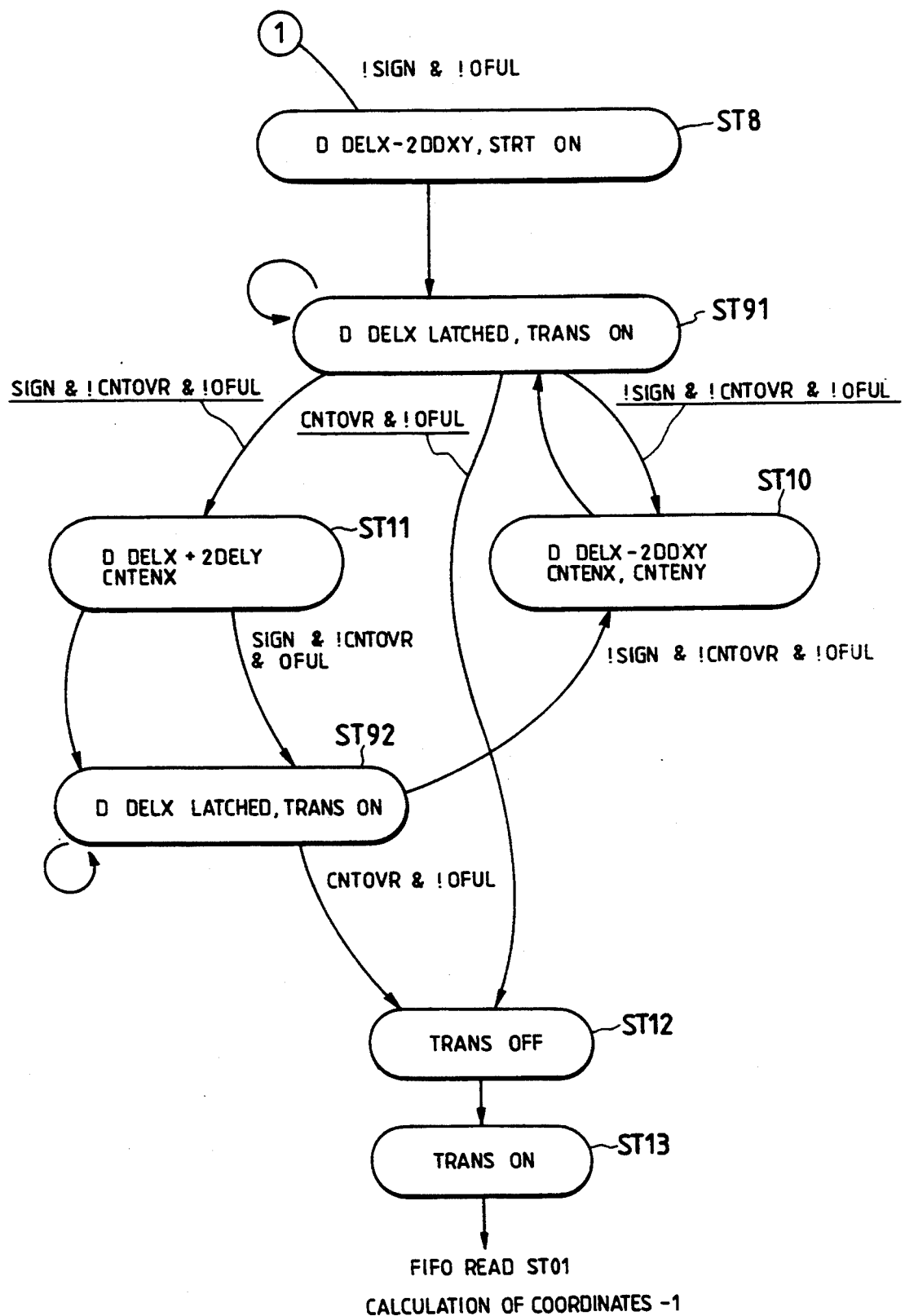
FIG. 42 and FIG. 43 are state transition charts for the calculation of the constants.
Figure 43:
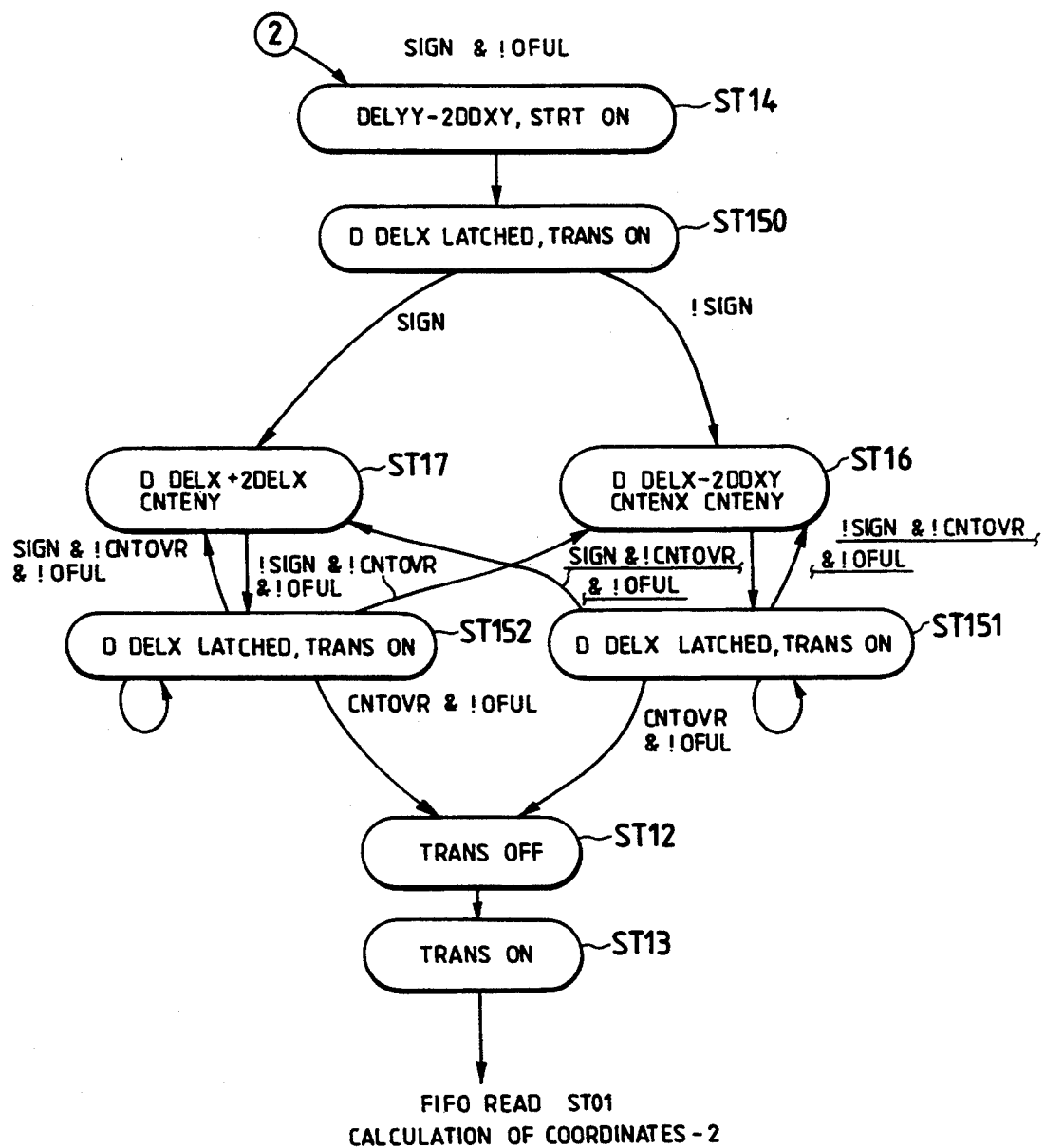

Plot (x, y);

if e>0, then begin y:=y+1;

e:=e+2 (DELY−DELX)

end else e:=e+2*DELY x:=x+1;

end;

The coordinate calculating section 32 shown in FIG. 34 performs this arithmetic operation with its hardware, and FIGS. 41 through 43 explain the operation with reference to the state transition charts presented therein.

FIG. 41 represents the state transition chart of the state for the calculation of the constant. In the statement of the calculation of this constant, the difference (BUSX−CAPX) between the value of the register (BUSX) 42 and the value of the counter (CAPX) 52 is first found by arithmetic operation with the ALU 45, and, at the same time, the data in the FIFO 41 are read out (ST2). In the next state, the result of the arithmetic operation is latched in the register (DELX) 48 while the data read out are latched in the register (BUSY) 43, and also the shift enable signal FLGCLK is turned ON, and the signals SIGN and ZERO, which are output by the ALU 45 are respectively stored in the shift registers 62 and 63 (ST3). If the FIFO 41 is not empty, the operation shifts to the next state, in which the difference (BUSY−CAPY) between the value of the register (BUSY) 43 and the counter (CAPY) 53 is found by arithmetic operation performed with the ALU 45 (ST4). The result of this arithmetic operation is latched in the register (DELY) 49 and the register (DELY Y) 50 (ST5) in the next state. In this state, also the clock FLGCLK is turned ON, and the outputs SIGN and ZERO from the ALU 45 are latched respectively in the shift registers 62 and 63. Additionally, if the signal ZERO is logical 1 (with the straight line being parallel with the x-axis), the operation shifts to the special processing sub-states (from ST20 to ST261).

If the straightline is not parallel to the x-axis, the value of the register (DELX) 48 is stored in the register (D DELX) 51, and the difference ((D DELX)−DELY) between the value of the register (D DELX) 51 and that of the register (DELY) 49 is found by the ALU 45 (ST51 and ST6). In the next state, the result of the arithmetic operation is latched in the register (DDXY) 47 and also the clock FLGCLK is turned ON, and the outputs SIGN and ZERO from the ALU 45 are latched respectively in the shift registers 62 and 63 (ST7). In this state, the operation is put into a waiting state if the output FIFOs 97 and 98 described later (FIG. 74) are full (i.e. when the control signal OFUL is logical 1), but shifts to the state of coordinate calculation if the said FIFOs are not full.

FIGS. 42 and 43 present the state transition charts for the calculation of coordinates. FIG. 42 shows the state to which the operation shifts from the state ST7 given in FIG. 41 when the output flag SIGN of the ALU 45 is logical 0 (i.e. when the slant of the straight line in relation to the x-axis is less than 45 degrees) provided that the output FIFO is not full. FIG. 43 shows the state to which the operation shifts from the said state ST7 in FIG. 41 when the said flag SIGN is logical 1 (i.e. when the slant of the straight line is 45 degrees or more) provided that the output FIFO is not full.

In FIG. 42, the difference ((D DELX)−2DDXY) between the value of the register (D DELX) 51 and twice the value in the register (DDXY) 47 is found by the ALU 45. The control signal STRT 7, which expresses the beginning of the coordinate calculation, is turned ON (ST8). In the next state, the result of the arithmetic operation performed with the ALU 45 is latched in the register (D DELX) 51 and at the same time the clock TRANS is turned ON, the coordinates for calculation being transmitted thereupon to the pipeline registers PIP1X 82 and the PIP1Y 84 (FIG. 54) described later (ST91). Moreover, the operation shifts from this state to the state ST11 when the flag SIGN is logical 1 and at the same time the flag CNTOVR and the flag OFUL are logical 0; to the state ST12 when the flag CNTOVR is logical 1 and at the same time the flag OFUL is logical 0; and to the state ST10 when all of the flags SIGN, CONTOVR and OFUL are logical 0. The operation is kept in the waiting state when the flags are none of the above.

In the state ST10, the difference ((D DELX)×2DDXY) between the value in the register (D DELX) 51 and the value in the register (DDXY) 47 is found by arithmetic operation, and the clock TRANS is turned OFF. Also, the count enable signals CNTENX and CNTENY for the counter (CAPX) 52 and the counter (CAPY) 53 are turned ON. After these processes are executed, the operation returns again from the state 10 to the state ST91.

In the state ST11, the value in the register (D DELX) 51 and twice the value in the register (DELY) 49 are added with the ALU 45, and the signal CNTENX is turned ON. In the next state, the sum is latched in the register (D DELX) 51, and the clock TRANS is turned ON (ST92). In this state, the operation shifts to the state ST11 when the flag SIGN and the flag OFUL are logical 1 and at the same time the flag CNTOVR is logical zero; to the state ST10 when all of the flag SIGN, the flag OFUL, and the flag CNTOVR are logical 0; and to the state ST12 when the flag CNTOVR is logical 1 and also the flag OFUL is logical 0, but the operation is kept in the waiting state when the flags are none of the above.

In the state ST12, the clock TRANS is turned OFF, and, after the clock TRANS is turned ON in the next state ST13, the operation returns to the state ST01.

In FIG. 43, the difference ((DELY Y)−2DDXY) between the value of the register (DELY Y) 50 and twice the value in the register (DDXY) 47 is found by the ALU 45, and the signal STRT is turned ON (ST14). Moreover, in the next state, the result from the ALU 45 is latched in the register (D DELX) 51 and the clock TRANS is turned ON (ST150). Furthermore, the operation shifts to the state ST16 when the flag SIGN output from the ALU 45 is logical 0, but it shifts to the state ST17 when the said flag is logical 1.

In the state ST16, the difference ((D DELX)−2DDXY) between the value of the register (D DELX) 51 and twice the value in the register (DDXY) 47 is found by the ALU 45, and the count enable signals CNTENX and CNTENY are turned ON. In the next state, the result of the arithmetic operation is latched in the register (D DELX) 51, and at the same time the clock TRANS is turned ON (ST151). In this state, the operation shifts to the state ST17 when the flag SIGN is logical 1 and the flag CNTOVR and flag OFUL are logical 0; to the state ST16 when all of the flag SIGN, the flag OFUL, and the flag CNTOVR are logical 0; and to the state ST12 when the flag CNTOVR is logical 1 and also the flag OFUL is logical 0, but the operation is kept in the waiting state in any other case.

In the state ST17, the value of the register (D DELX) 51 and twice the value in the register (DELX) 48 are added up ((D DELX)+2DELX) and also the signal CNTENY is turned ON. In the next state, the result of the arithmetic operation performed in the preceding state is latched in the register (D DELX) 51 and at the same time the clock TRANS is turned ON (ST152). In this state, the operation shifts to the state ST17 when the flag SIGN is logical 1 and also the flag CNTOVR and the flag OFUL are logical 0; to the state ST16 when all of the flags SIGN, OFUL, and CNTOVR are logical 0; and to the state ST12 when the flag CNTOVR is logical 1 and also the flag OFUL is logical 0, but the operation is kept in the waiting state in any other case.

In the state ST12, the clock TRANS is turned OFF, and it is turned ON in the next state ST13. Thereafter, the operation shifts to the state ST01 shown in FIG. 37.

Figure 44:
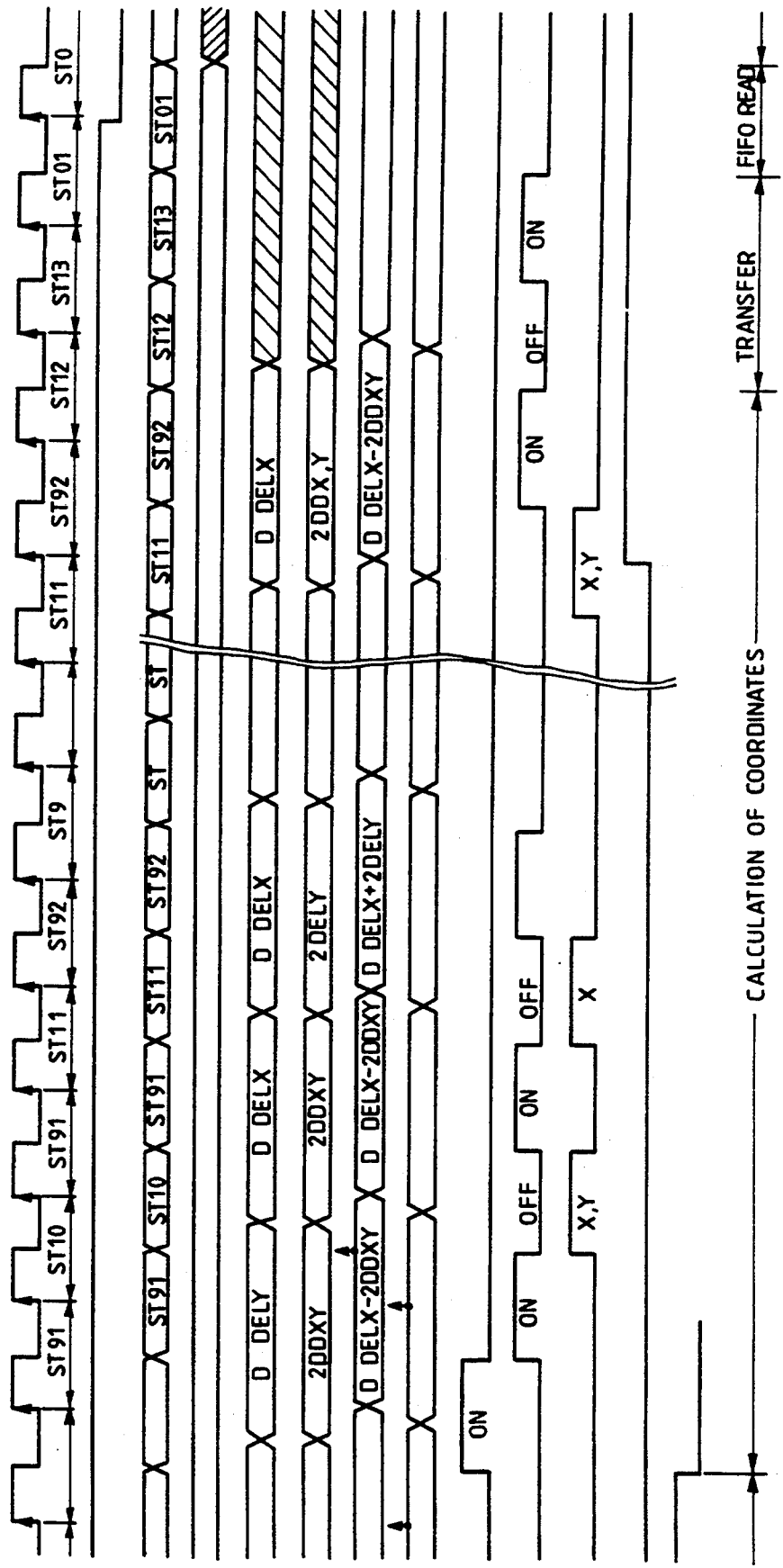
FIG. 44 is a timing chart for the calculation of the coordinates.

FIG. 44 shows the timing charts for the calculation of the constant and the calculation of the coordinates in MODE 2. In the state ST2, the data of the register (BUSX) 42 are read out to the ABUS to calculate the coordinates, and the data further are read out of the multiplexer 44 to the AMBUS. In the same way, the data of the register (CAPX) 52 are read out to the BBUS, and the data are further read out of the multiplexer 44 to the BMBUS. Then, arithmetic operations to find (BUSX−CAPX) are performed with the ALU 45, and the result of the calculation is output to the FBUS. Moreover, as the data $DX_1$ are read out to the FIFO 41, the next data $DY_1$ are output to the FIFO RD. As the result of this step, the data of the FBUS and the data of the FIFO RD are latched in the register (DELX) 48 and the register (BUSY) 43, respectively, in the state ST3. Moreover, the ALU 45 outputs the flag SIGN and the flag ZERO for the calculated value before the output of the result from the calculation of the (BUSX−CAPX). As a result, the data for the flag SIGN and the flag ZERO are latched respectively as the code SX and the code ZX for DELX ($\Delta x$=BUSX−CAPX) in the shift registers 62 and 63.

In the state ST4, the data of the register (BUSY) 43 and the data of the counter (CAPY) 53 are output to the AMBUS and the BMBUS respectively, and the difference between the two sets of data (BUSY−CAPY) is output to the FBUS from the ALU 45. In the state ST5, the data in the FBUS are latched in the register (DELY) 49 and the register (DELY-Y) 50, and also the clock FLGCLK is turned ON. Thereupon, the flag SIGN and the flag ZERO, which are output from the ALU 45 are latched as the code SY and the code ZY of the DELY ($\Delta y$=BUSY−CAPY) in the shift registers 62 and 63, respectively.

In the state ST51, the data in the register (DELX) 48 are output to the AMBUS via the ABUS and the multiplexer 44, are processed through the ALU 45, and are output to the FBUS and latched in the register (D DELX) 51. In the state ST6, the data in the register (D DELX) 51 and (DELY) 49 are output to the AMBUS and the BMBUS, and arithmetic operations are performed with the ALU 45, the result obtained therefrom being output to the FBUS. In the state ST7, the data in the FBUS are latched in the register (DDXY) 47. Also, the flag SIGN and the flag ZERO, being then output by the ALU 45 operating with the clock FLGCLK, are latched as the codes SC and ZC in the shift registers 62 and 63, respectively.

After the calculation of the constant, of the coordinates are calculated (the embodiment corresponds to the state shown in FIG. 42). In the state ST8, the data of the register (D DELX) 51 and the data of the shifter 54, which corresponds to twice the value in the register (DDXY) 47, are output to the AMBUS and to the BMBUS, respectively. The ALU 45 finds the difference between the two and outputs the result to the FBUS. This output is latched in the register (D DELX) 51 in the state ST91. Also, the clock TRANS is turned ON in the state ST91.

In the state ST10, the data of the shift register (D DELX) 51 and the data (2DDXY) of the shifter 54 are output to the AMBUS and to the BMBUS, the difference between the two is found by the ALU 45, and the result is output to the FBUS. Also at this time, the count enable signals CNTENX and CNTENY are turned on. Then, after the processing of the state ST91 is performed again, the operation shifts to the state ST11, in which the data of the register (D DELX) 51 and the data of the shifter 56, which corresponds to twice the value in the register (DELY) 49, are output to the AMBUS and the BMBUS, and the sum of these two values is output to the FBUS by the ALU 45. In the next state ST92, the data in the FBUS are latched in the register (D DELX) 51. In the state ST11, the signal CNTENX is turned ON, and, in the state ST92, the clock TRANS is turned ON.

Then, after the prescribed states are repeated, the clock TRANS is turned OFF and ON in the state ST12 and the state ST13. By this operation, the coordinates generated by the arithmetic operations are transferred to the next stage.

Figure 45:
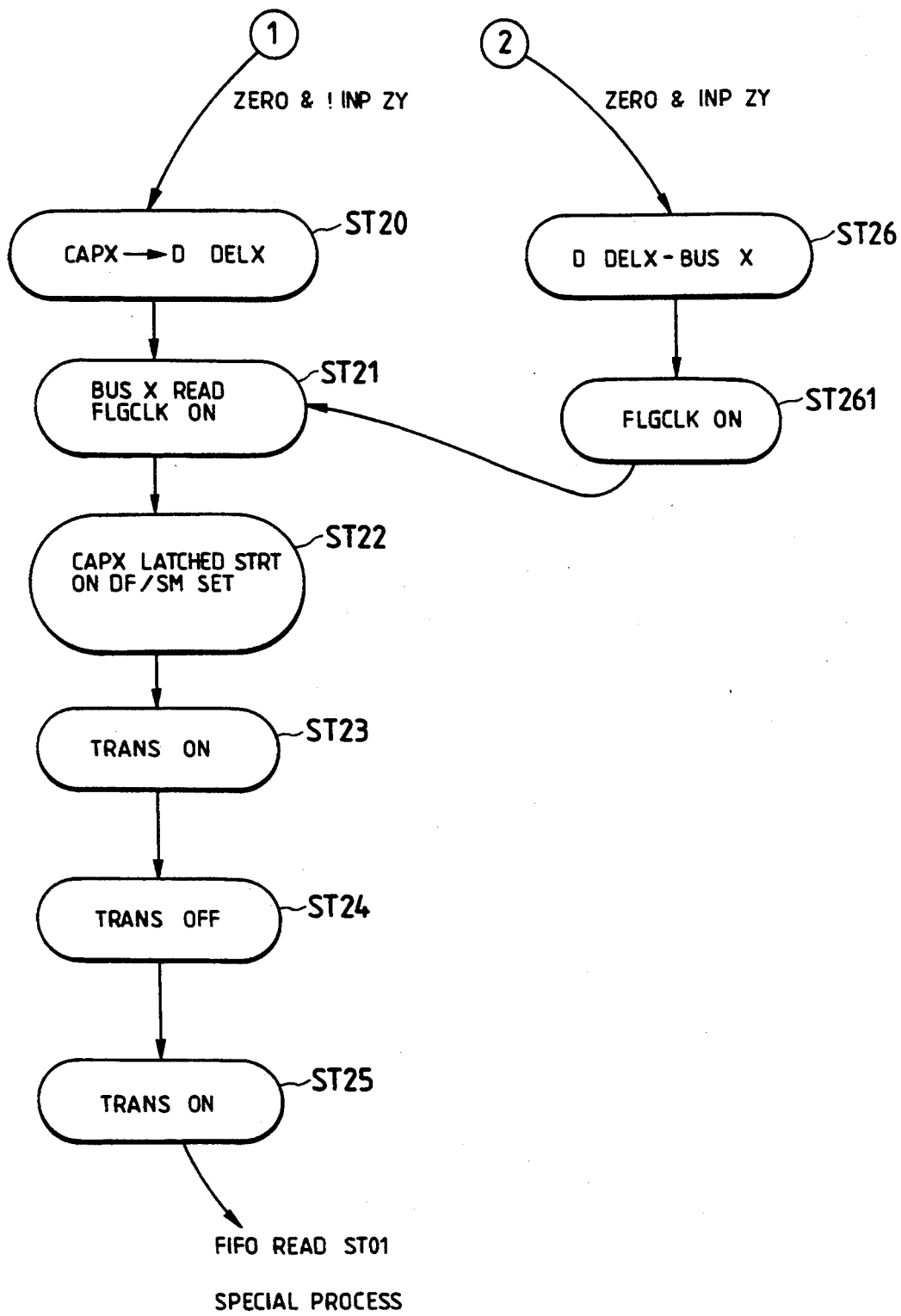
FIG. 45 is a state transition chart for the special process.

FIG. 45 is a state transition chart for the state of the special process. From the state ST5 in FIG. 41, this special process is executed when the flag ZERO is logical 1, and the operation shifts to state ST20 when the flag INP ZY is logical 0 (i.e. when the input segment of a line is not parallel to the x-axis) but to state ST26 when the said flag is logical 1 (i.e. when the input segment of a line is parallel to the x-axis).

In state ST20, the value of the counter (CAPX) 52 is set in the register (D DELX) 51, and the data are read out of the register (BUSX) 42 in the next state. At the same time, the clock FLGCLK is turned ON in order to adjust of the timing (ST21).

In state ST26, the difference between the data in the register (D DELX) 51 and the data in the register (BUSX) 42 is calculated, and the clock FLGCLK is turned ON in the next state (ST261). That is to say, the code DIF and the code SAM, which are described later, are found here for the performance of corner processing at a later stage. After the state ST261, the operation shifts to the state ST21.

In the state next to the state ST21, the data in the register (BUSX) 42 are latched in the counter (CAPX) 52 and, at the same time, the flag STRT is turned ON. Also the control signal DF/SM is set, and the flag SIGN, which is output by the ALU 45, is latched as DIF/SAM (ST22). Furthermore, after the clock TRANS is turned ON (ST23), OFF (ST24), and ON (ST25), the operation shifts to the state ST01 shown in FIG. 37.

Figure 46:
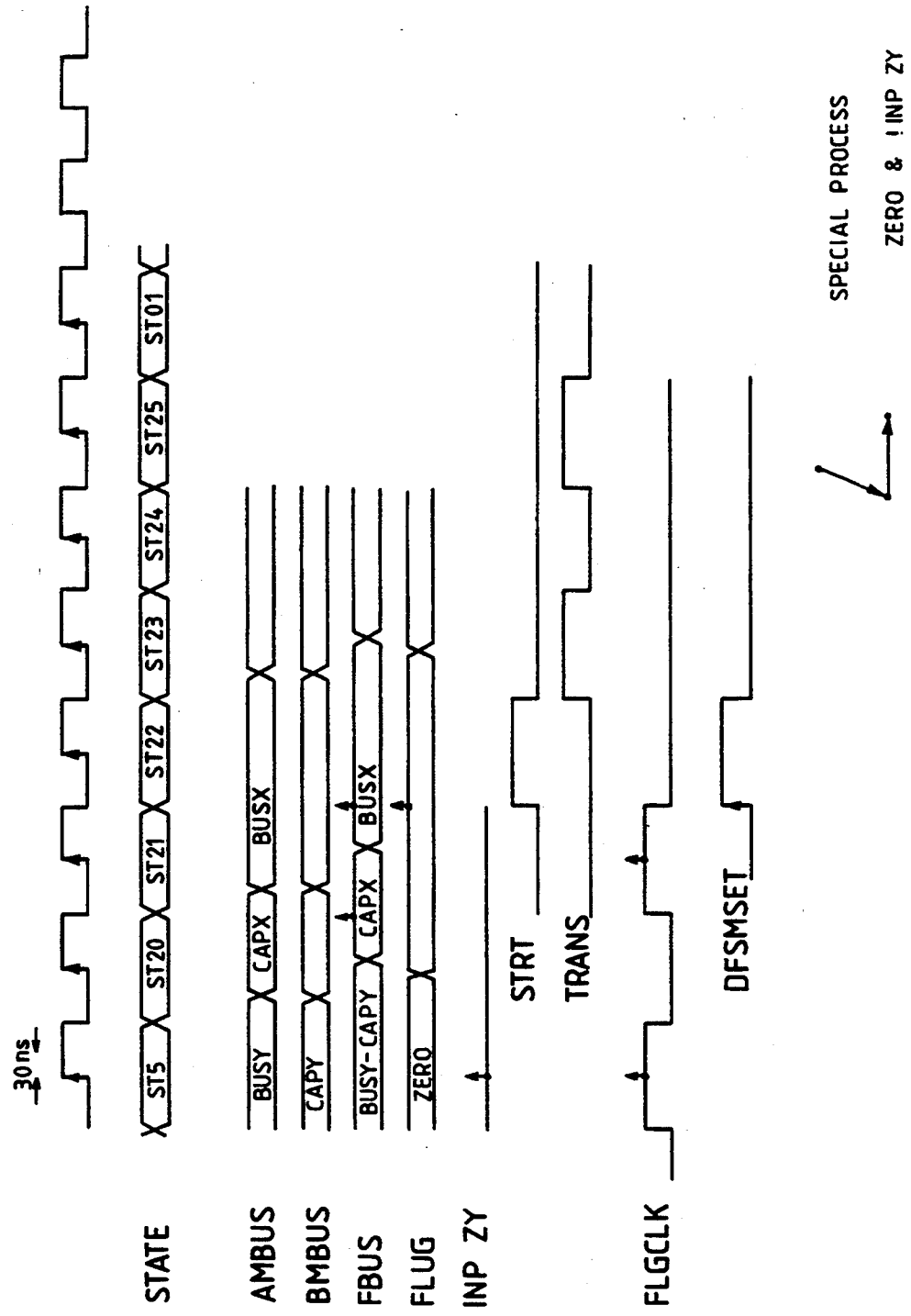
FIG. 46 and FIG. 47 are timing charts for the special process.

FIG. 46 presents the timing chart for the special process to be used when the output segment of a line is parallel to the x-axis while the input segment of a line is not parallel to the x-axis (ZERO&!INP ZY). In state ST20, the data in the counter (CAPX) 52 are output from the multiplexer 44 to the AMBUS and further from the ALU 45 to the FBUS, and the data are latched in the register (D DELX) 51. In the state ST21, the data of the register (BUSX) 42 are read out to the AMBUS and further to the FBUS. Then, the clock FLGCLK is turned ON in order to adjust the timing. In the state ST22, the data of the register (BUSX) 42 present on the FBUS are latched in the counter (CAPX) 52. Also, the flag STRT is turned ON and thereupon the control signal DF/SM is set.

Figure 47:
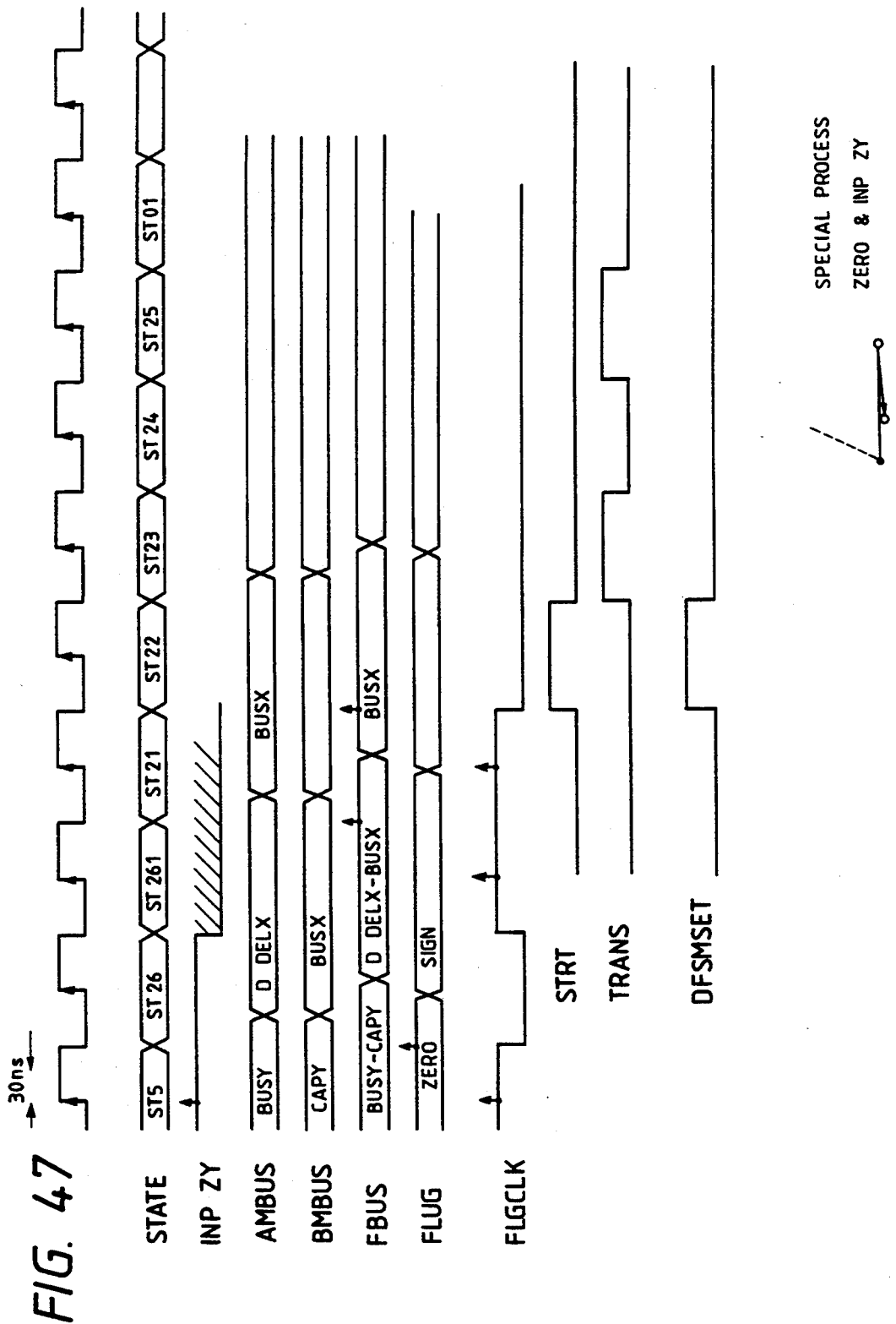

FIG. 47 presents the timing chart for the special process to be applied when the input segment of a line, as well as the output segment of a line, is parallel to the x-axis (ZERO&INP ZY). In this case, the data in the register (D DELX) 51 and the data in the register (BUSX) 42 are read out respectively to the AMBUS and the BMBUS in the state ST26. The difference between these two is calculated by the ALU 45, and the result therefrom is output to the FBUS. In the state ST261, the clock FLGCLK is turned ON, and the flags SIGN and ZERO from the ALU 45 are latched in the shift registers 62 and 63.

Figure 48:
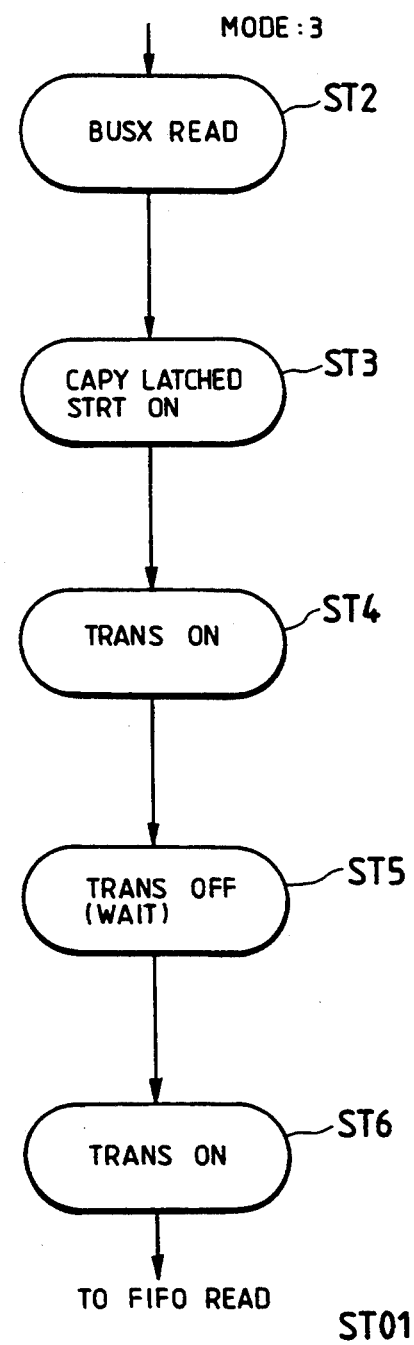
FIG. 48 is a state transition chart for the command transfer process.

FIG. 48 presents the state transition chart for the process of transferring the commands to be executed in case the MODE is 3 in the state ST1 shown in FIG. 37. In the state ST2, the data in the register (BUSX) 42 are read out, and, in the state ST3, these data are latched in the counter (CAPY) 53, and the flag STRT is turned ON. Furthermore, in the states from ST4 to ST6, the signal TRANS is set ON, OFF, and ON, and the operation returns thereafter to the state ST01 shown in FIG. 37.

Figure 49:
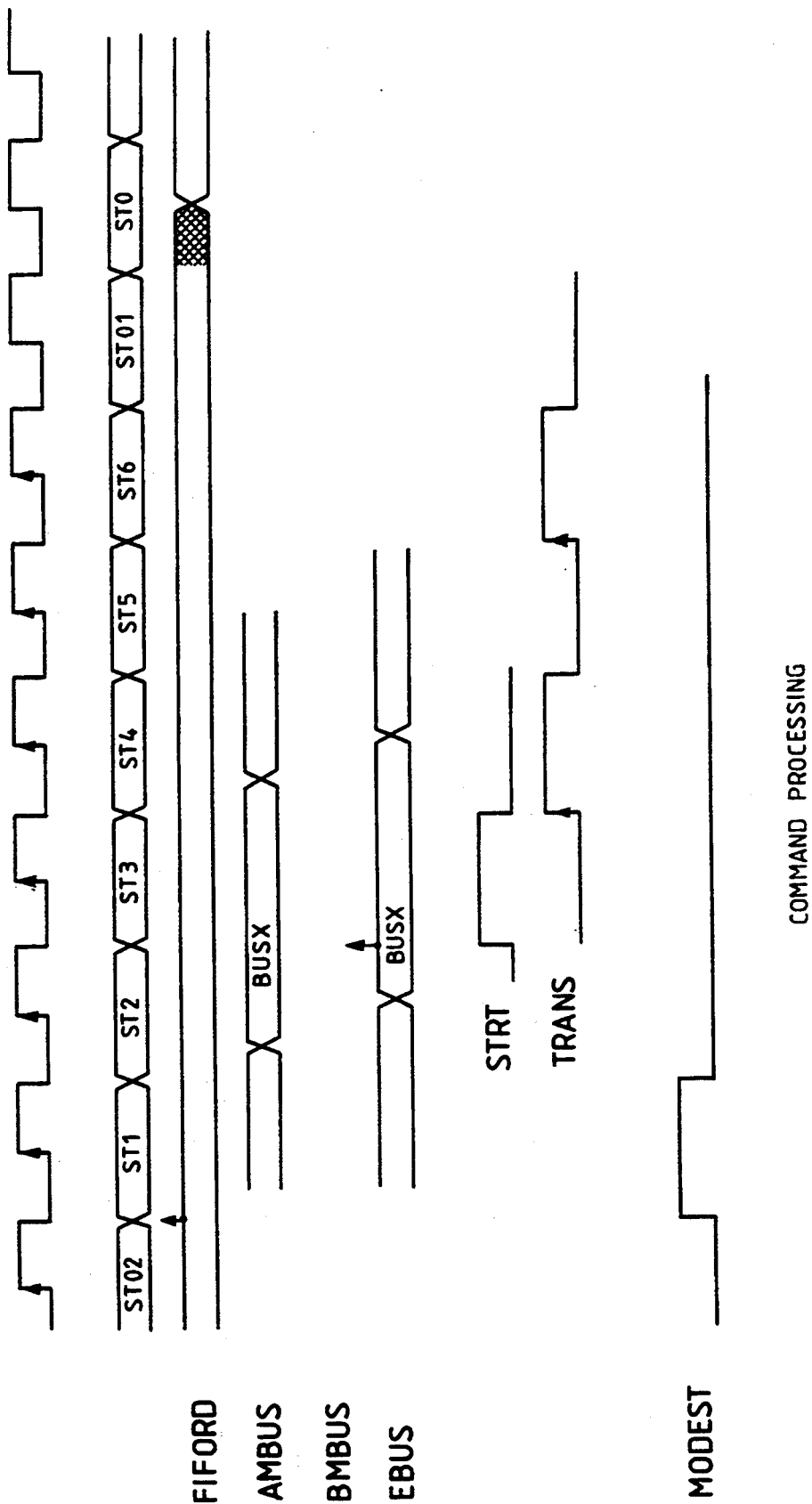
FIG. 49 is a timing chart for the command transfer process.

FIG. 49 presents the timing chart for the process of transferring commands. In the state ST2, the data in the register (BUSX) 42 are read out to the AMBUS and the FBUS and then the data are latched in the counter (CAPY) in the state ST3. Also, at this time, the flag STRT is set ON. In the states ST4 through ST6, the signal TRANS is set ON, OFF, and ON, and the data are thereby transferred.

Figure 50:
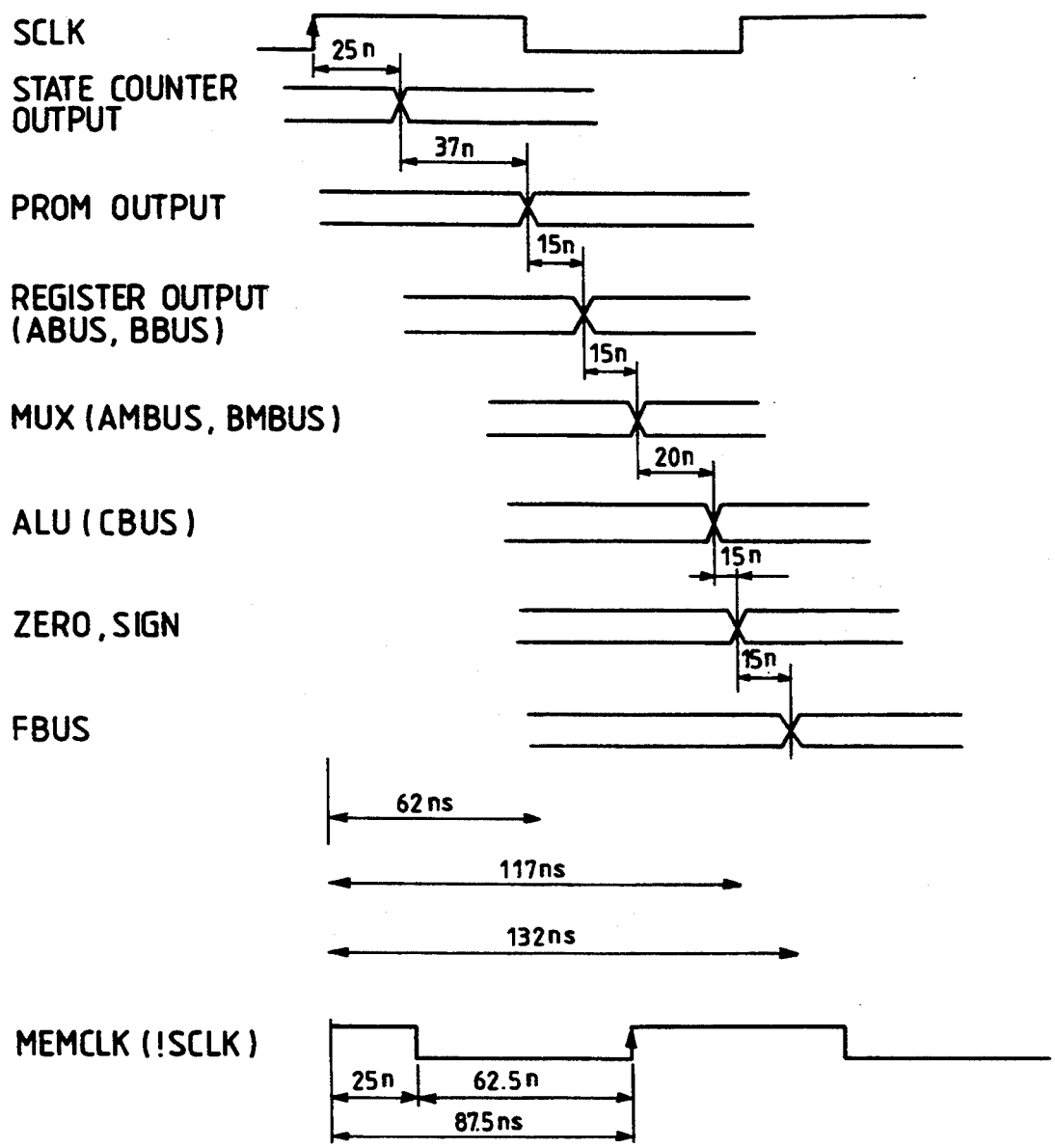
FIG. 50 is a chart for explaining the delay of the signals.

FIG. 50 expresses the state of delay of each signal in FIG. 34 and FIG. 35. The state counter 71 generates output to the PROM 72 25 ns after the input of the clock SCLK, and the PROM 72 outputs the prescribed control signal 37 ns after the signal is input thereinto from the state counter 71. The registers 42, 43, and 47 through 51 output their signals to the ABUS and the BBUS 15 ns after the control signal is input into them from the PROM 72, and the multiplexer 44 outputs its signal to the AMBUS and the BMBUS 15 ns from the individual Registers. The ALU 45 outputs its data to the CBUS 20 ns after the data are input into it from the AMBUS and from the BMBUS, and, after an additional 5 ns, the ALU 45 outputs the flag SIGN and the flag ZERO. Also, the circuit 46 for the 2's complements outputs the data to the FBUS 15 ns after the flag is output from the ALU 45.

The clock MEMCLK is a clock generated by reversal of the clock SCLK and with a delay of 25 ns. The output from the PROM 72 is latched with the rising edge of MEMCLK.

Next, the straight line coordinate selecting section 33 will be described, but before that, the principle of the selection of the straight line coordinates will be explained. It is assumed here that the polygon at the outer side is processed in the clockwise direction while the polygon at the inner side is processed in the counter-clockwise direction.

Figure 51:
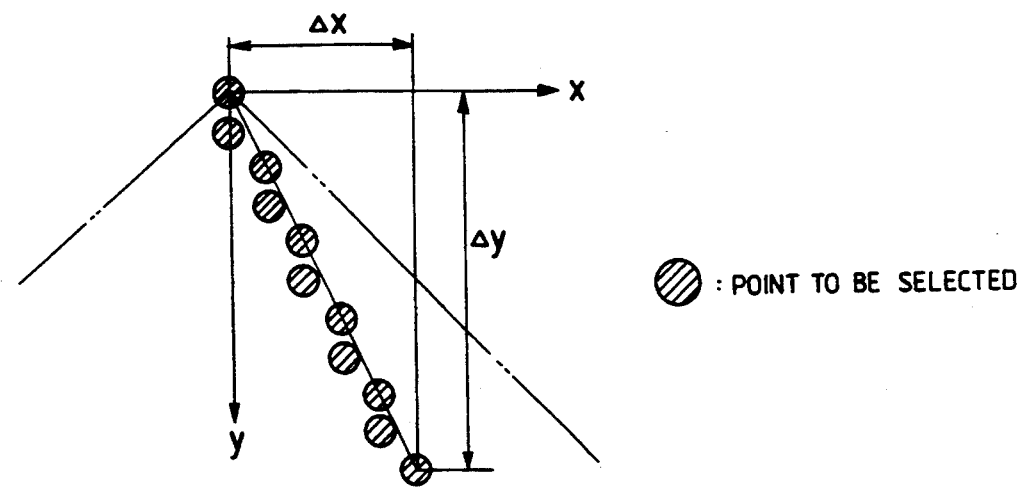
FIGS. 51–53 are charts for explaining the selection of the straight line coordinates.

As illustrated in FIG. 51, the straight line will be at an angle not less than 45 degrees in relation to the x-axis when the relation, $\Delta x - \Delta y < 0$, holds good (i.e. when SC=1). In other words, the straight line will be at an angle less than 45 degrees to the y-axis. In this case, all the points forming the straight line are selected (LINE ALL) because there are no more than two points forming a straight line in the direction of the x-axis.

Figure 52A:
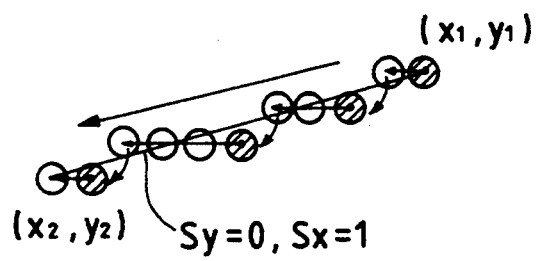
Figure 52B:
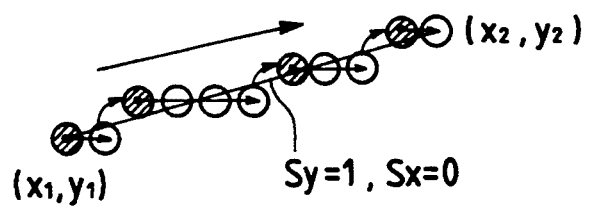

On the other hand, when the straight line has an angle less than 45 degrees in relation to the x-axis thereof (i.e. when the relation, $\Delta x - \Delta y \geq = 0$, holds, i.e. SC=0), with the right side of the said straight line rising upward, as shown in FIG. 52, there are more than two points in the direction of the x-axis. Now, when the starting points for the straight lines are expressed as $(x_1, y_1)$, the terminating points as $(x_2, y_2)$, the flag representing the code of $(x_2-x_1)$ as SX (wherein, SX=0 if $x_2-x_1 \geq 0$, SX=1 if $x_2-x_1<0$), and the flag representing the flag for $(y_2-y_1)$ as SY (wherein, SY=0 if $y_2-y_1 \geq 0$, and SY=1 if $y_2-y_1<0$), then the straight line with the left side thereof oriented downward (FIG. 52(*a*)) is to be expressed as SX=1, SY=0 while the straight line with the right side thereof oriented upward (FIG. 52(*b*)) is to be expressed as SX=0, SY=1 in these cases, the starting points $(x_1, y_1)$ and the coordinate generated by incrementing the coordinate y by only one are selected (LINE NOW).

Figure 53A:
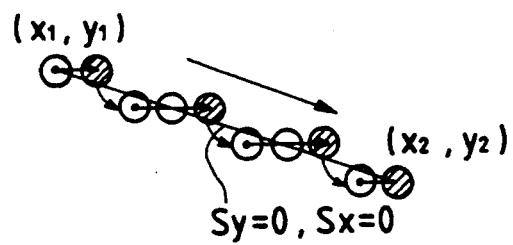
Figure 53B:
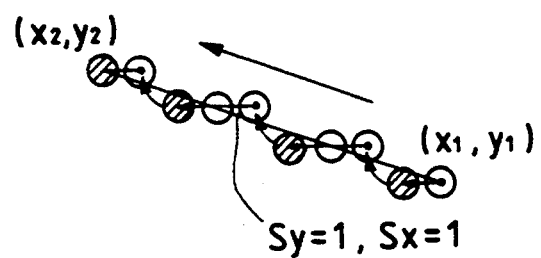

Furthermore, as shown in FIG. 53, there are more than two points in the direction of the x-axis also when the straight line is at an angle less than 45 degrees (i.e. SC=0) in relation to the x-axis, with the right side of the said straight line oriented downward. In the case of a straight line with its right side oriented downward (FIG. 53(*a*)), the line is expressed as SX=0, SY=0 and, in the case of a straight line with the left side oriented upward (FIG. 53(*b*)), the line is expressed as SX=1, SY=1. In these cases, the terminating points $(x_2, y_2)$ and the coordinate immediately preceding the coordinate generated by incrementing the coordinate y by only one are selected (LINE BFR). As there are cases in which the coordinate just before the increment is selected after the y-coordinate is incremented by only one in this manner, two stages (PIP1 and PIP2) are needed for the pipeline register described later.

The flag SC is 1 in the case shown in FIG. 51 and the flag SC is 0. The exclusive logical sum of the flags SX and SY is 1 in the case given in FIG. 52, and the flag SC is 0 and the exclusive logical sum of the flags SX and SY is 0 in the case shown in FIG. 53. Therefore, it is possible to judge each of these cases on the basis of these flags.

Now the straight line coordinate selecting section 33 will be described. The functions of the said section are as follows:

(1) To select the coordinates in accordance with the rules set forth in FIG. 52 and FIG. 53 mentioned above to the coordinates for the segments with a slant less than 45 degrees in relation to the x-axis out of the coordinates output from the coordinate calculating section 32 (i.e. the coordinates generated by the process of interpolation for the straight line)

(2) To select all of the coordinates with respect to those coordinates of the segments with a slant not less than 45 degrees in relation to the x-axis out of the coordinates output from the coordinate calculating section 32 (i.e. the coordinates generated by the process of interpolation for the straight line).

(3) To select the starting points, terminating points, and the commands and data for the CADM (the sorter 22) for the segments parallel to the x-axis as output from the coordinate calculating section 32.

Figure 54:
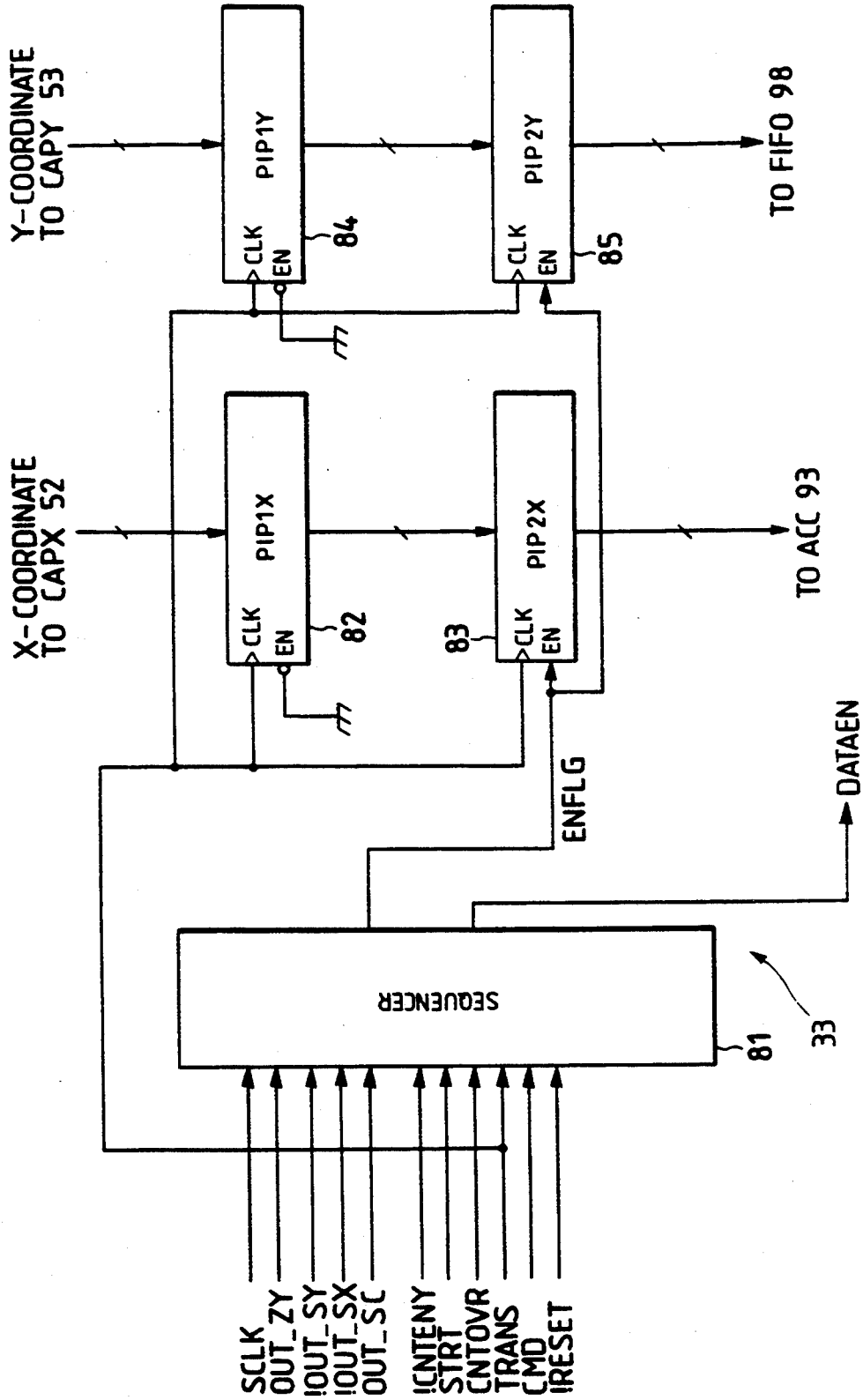
FIG. 54 is a block diagram of the straight line coordinate selecting section.

FIG. 54 is a block diagram of the hardware in the straight line coordinate selecting section 33, which performs the functions described above. In the Figure, a sequencer 81, which is composed with a pragrammable logic device PLD provided with a register, generates the latch enable signal, EN FLG, for the pipeline registers PIP2X 83 and PIP2Y 85 and the signal DATAEN for controlling the writing of the output FIFOs 97 and 98 (FIG. 74) at the next stage (the corner coordinate selecting section 34) in correspondence to the various types of input signals shown on the left side of FIG. 54. The pipeline registers PiP1X 82 and PIP1Y 84 are connected respectively to the counter (CAPX) 52 and the counter (CAPY) 53 shown in FIG. 34 and latch all the data input from those counters. The pipeline registers PIP2X 83 and PIP2Y 85 latch those coordinates which are generated when the flag EN FLG is ON out of the coordinates output from the pipeline registers PIP1X 82 and PIP1Y 84 at the preceding stage.

FIG. 55 is the state transition chart of the straight line coordinate selecting section 33 shown in FIG. 54. In the initial state ST00, the operation shifts to the corresponding state when any of the conditions mentioned below is satisfied, but remains in the waiting state when none of those conditions is fulfilled.

(1). LINE ALL STATE in case the flag STRT and the flag OUT SC are logical 1 and the flag CMD and the flag OUT ZY are logical 0 (i.e. when the angle of the straight line in relation to the x-axis is 45 degrees or more).

(2) LINE BFR STATE in case the flag STRT is logical 1 and all of the flag OUT SC, the exclusive logical sum ($) of the flag OUT SY and the flag OUT SX, the flag CMD, and the flag OUT ZY are logical 0 (i.e. when the angle of the straight line in relation to the x-axis is less than 45 degrees with the right side of the said straight line slanting downward).

(3) LINE NOW STATE in case the flag STRT and the exclusive logical sum of the flag OUT SY and the flag OUT SX is 1, and when all of the flag OUT SC, the flag CMD, and the flag OUT ZY are logical 0 (i.e. when the angle of the straight line in relation to the x-axis is less than 45 degrees, with the left side of the said straight line slanting downward).

(4) CMND/ZERO STATE in case the flag STRT and the flag CMD are logically, or in case the (#) flag STRT and the flag OUT ZY are logical 1 and the flag CMD are logical 0 (i.e. when the straight line is parallel to the x-axis).

In this regard, the flag CMD expresses whether the item to which the flag is attached is a command or data for the CADM.

In each of the states LINE ALL, LINE BFR, LINE NOW, and CMND/ZERO, the operation returns to the initial state when the flag CNTOVR becomes logical 1, but is put into the waiting state when the said flag is logical 0.

Figure 56:
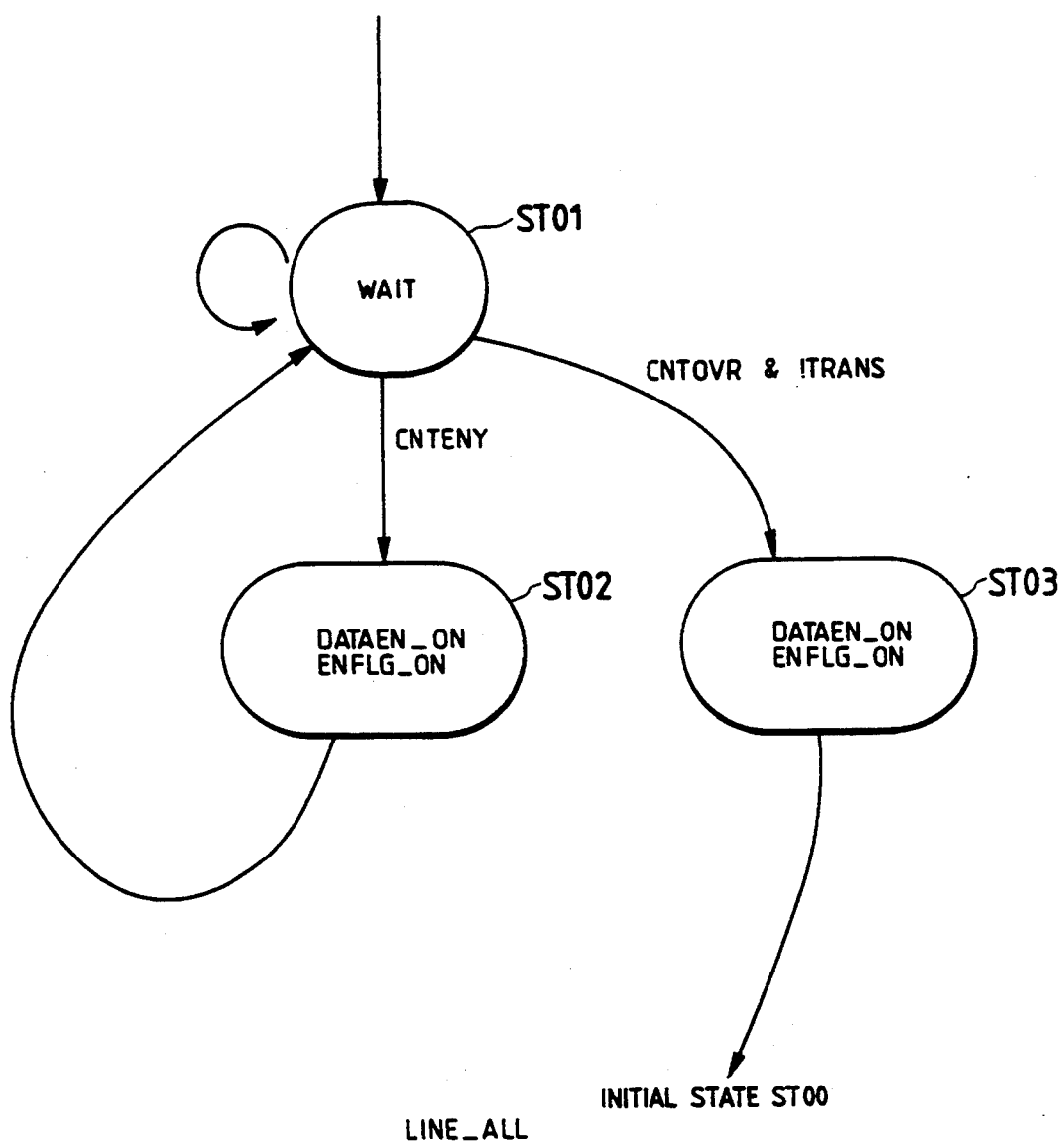
FIG. 56 is a state transition chart for LINE ALL, a routine used in the invention.

FIG. 56 illustrates the LINE ALL state. In the initial state ST01, the operation shifts to the state ST02 when the signal CNTENY is ON, and it shifts to the state ST03 when the flag CNTOVR is logical 1 while the clock TRANS is logical 0 (when the output FIFO is not FULL). In the state ST02, the operation returns to the state ST01 after the signal DATAEN and the signal ENFLG are set ON. In the state ST03, the operation returns to the state ST00 after the signal DATAEN and the signal ENFLG are turned ON.

Figure 57:
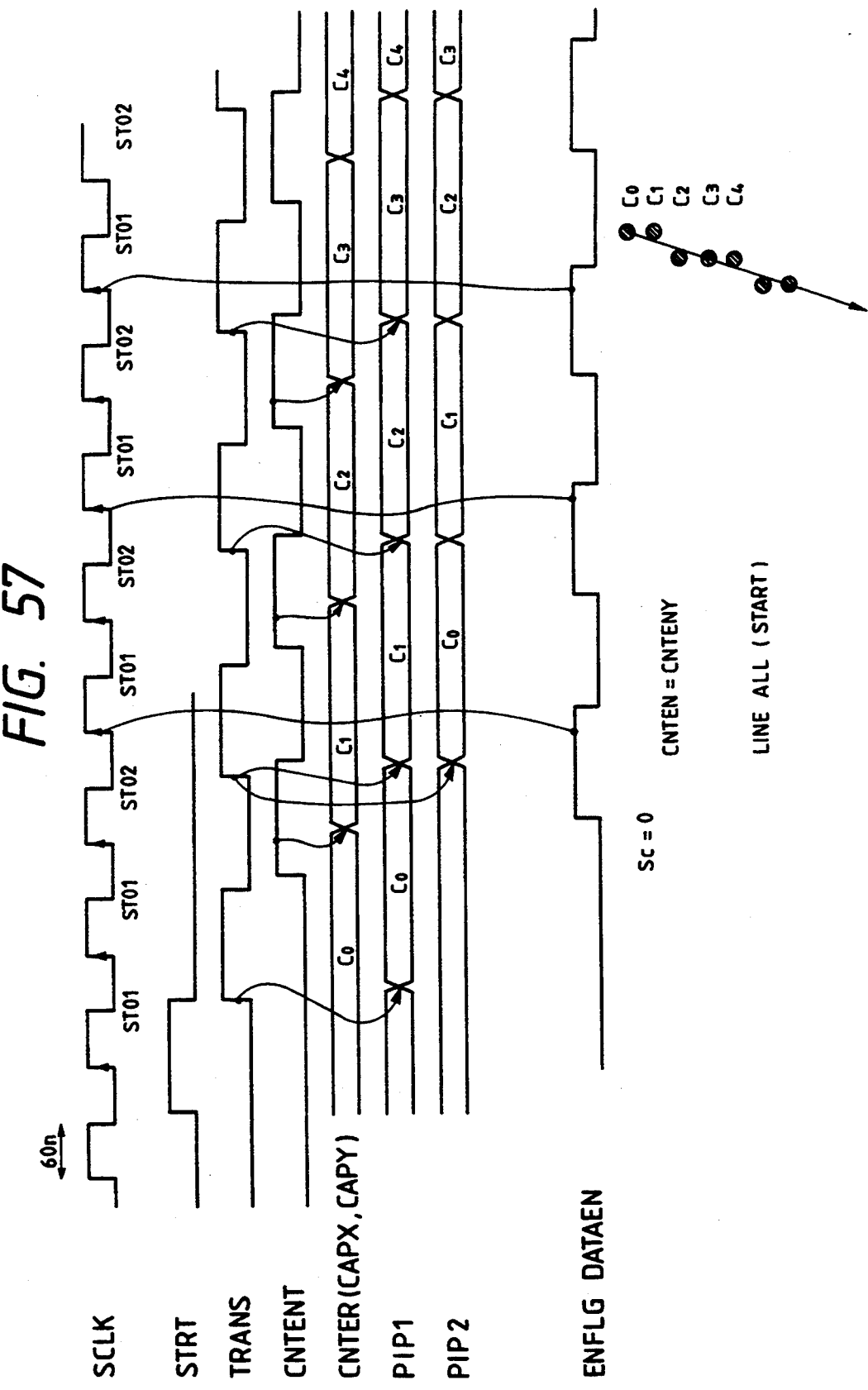

FIG. 57 shows the timing chart for the proximity of the starting point $C_0$ for the LINE ALL state. In the state ST01, the x-coordinate and the y-coordinate for the starting point C0, which are latched in the counter (CAPX) 52 and the counter (CAPY) 53, are transferred respectively to the pipeline registers PIP1X 82 and the PIP1Y 84 when the clock TRANS becomes logical 1. And, when the signal CNTENY becomes logical 1, the operation shifts to the state ST02, in which the x-coordinate and the y-coordinate for the next point $C_1$ are latched respectively in the counter (CAPX) 52 and the counter (CAPY) 53. Moreover, when the signal TRANS becomes logical 1, the coordinates $C_{ox}$ and $C_{oy}$ for the pipeline registers PIP1X 82 and PIP1Y 84 are transferred respectively to the pipeline registers PIP2X 83 and PIP2Y 85 and, at the same time, the coordinates $X_{1X}$ and $C_{1Y}$ for the counter (CAPX) 52 and the counter (CAPY) 53 are transferred respectively to the pipeline registers PIP1X 82 and the PIP1Y 84. When the signal DATAEN and the signal ENFLG become logical 1, then the operation returns to the state ST01 again, and the same operations are repeated, the coordinates $C_2$, $C_3$, and $C_4$ are input successively into the pipeline registers PIP1X 82 and PIP1Y 84 and the coordinates $C_1$, $C_2$, and $C_3$ are transferred in regular succession to the pipeline registers PIP2X 83 and PIP2Y 85.

Figure 58:
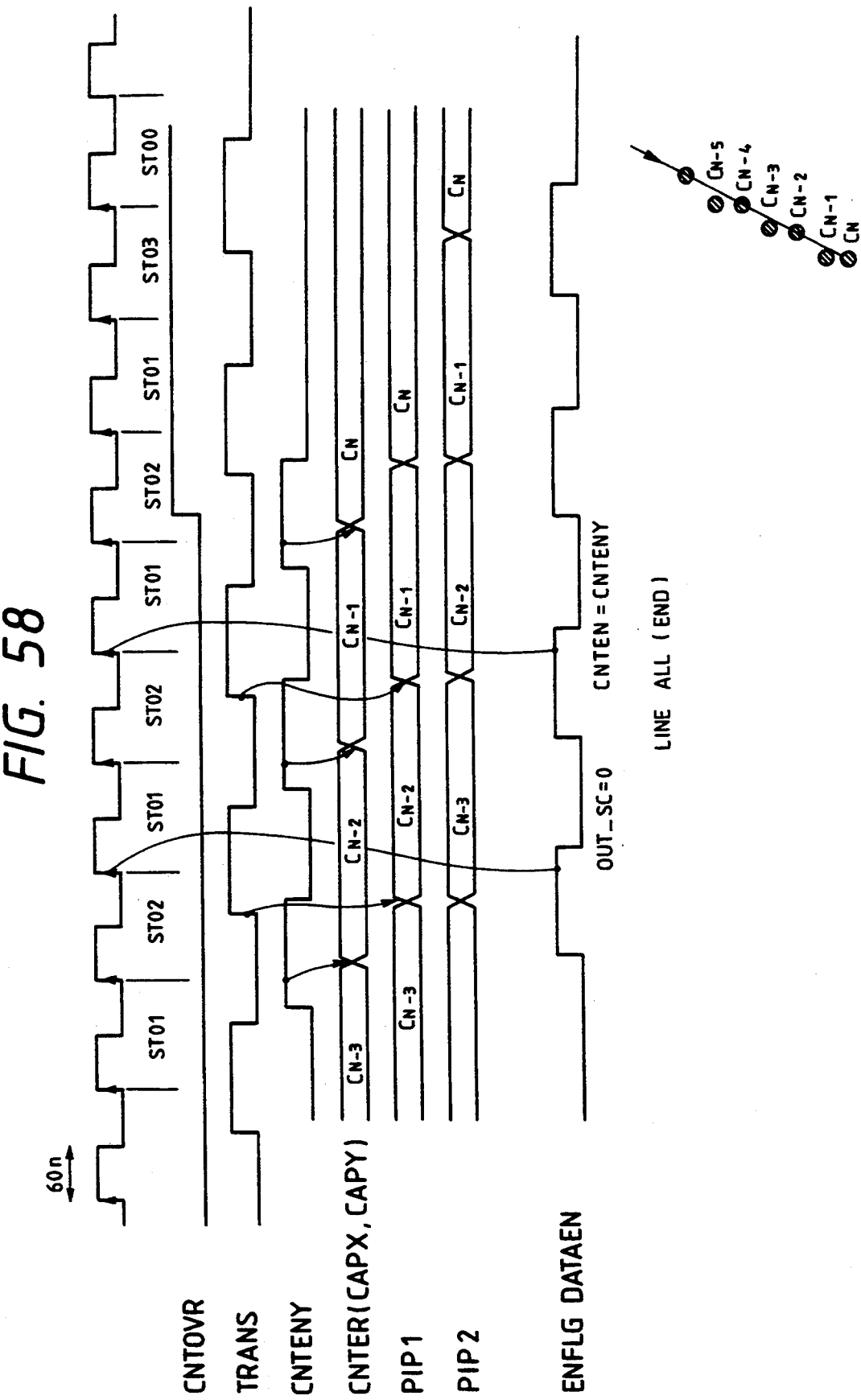

FIG. 58 represents the timing chart for the proximity of the terminating point $C_N$ in the LINE ALL state. Also in this case, the state ST01 and the state ST02 are repeated, and the coordinates for the points $C_{N-2}$ and $C_{N-1}$ are transferred in regular succession to the pipeline registers PIP1X 82, PIP1Y 84, PIP2X 83, and PIP2Y 85. When the coordinates for the terminating point CN are latched in the counter (CAPX) 52 and the counter (CAPY) 53, the signal CNTOVR becomes logical 1. In the state ST02, the operation shifts to the state ST03 when the signal CNTOVR becomes logical 1, and then shifts to the state ST00 after transferring the coordinates for the terminating point $C_N$ to the pipeline registers PIP2X 83 and PIP2Y 85.

FIG. 59 illustrates the way the timing is set for the successive latching of the coordinates in the pipeline registers PIP1X 82 and PIP1Y 84 and also in the pipeline registers PIP2X 83 and PIP2Y 85 in the LINE ALL state. Now, when the coordinates from a to k, which make up the straight line from the starting point a to the terminating point k, are generated successively the counter (CAPX) 52 and the counter (CAPY) 53, these coordinates are transferred in regular succession to the pipeline registers PIP1X 82 and PIP1Y 84 in synchronization with the rising edge of the signal TRANS, and all these coordinates further are transferred in their regular succession to the pipeline registers PIP2X 83 and PIP2Y 85 in synchronization with the rising edge of the signal TRANS when the signal ENFLG is logical 1.

Figure 60:
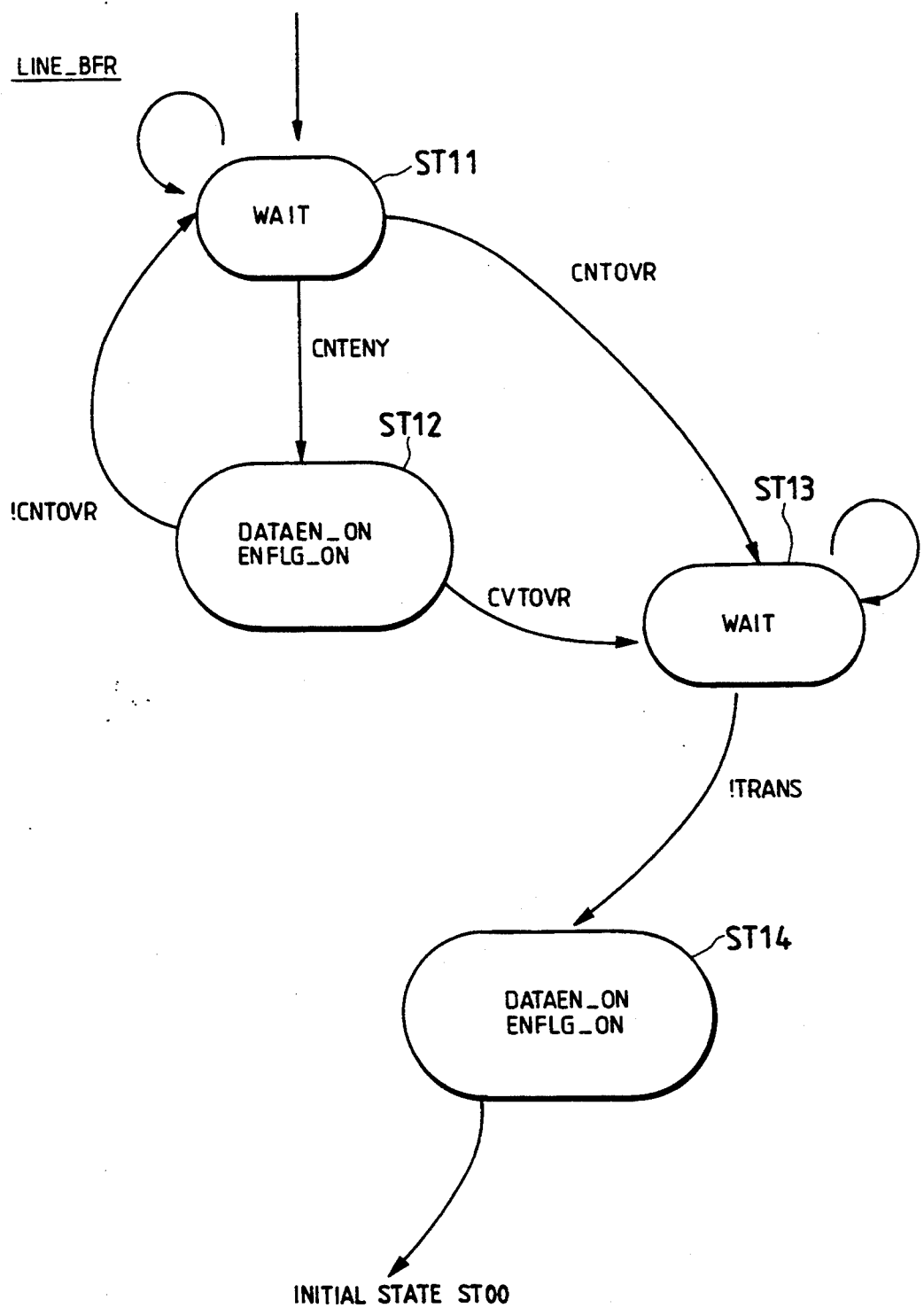
FIG. 60 is a state transition chart for LINE BFR, another routine used in the invention.

FIG. 60 represents the LINE BFR state. In state ST11, the operation shifts to state ST12 when the signal CNTENY is logical 1 and to state ST13 when the signal CNTOVR is logical 1, but is set in the waiting state in any other case. In state ST12, the signal DATAEN and the signal ENFLG are set ON, and the operation shifts to state ST11 when the signal CNTOVR is logical 0 and to state ST13 when the said signal is logical 1. In state ST13, the operation is put into the waiting state when the signal TRANS is logical 1 (i.e. when the output FIFO is full), and the operation shifts to state ST14 when the said signal is logical 0. In state ST14, the operation returns to state ST00 after the signal DATAEN and the signal ENFLG are set ON.

Figure 61:
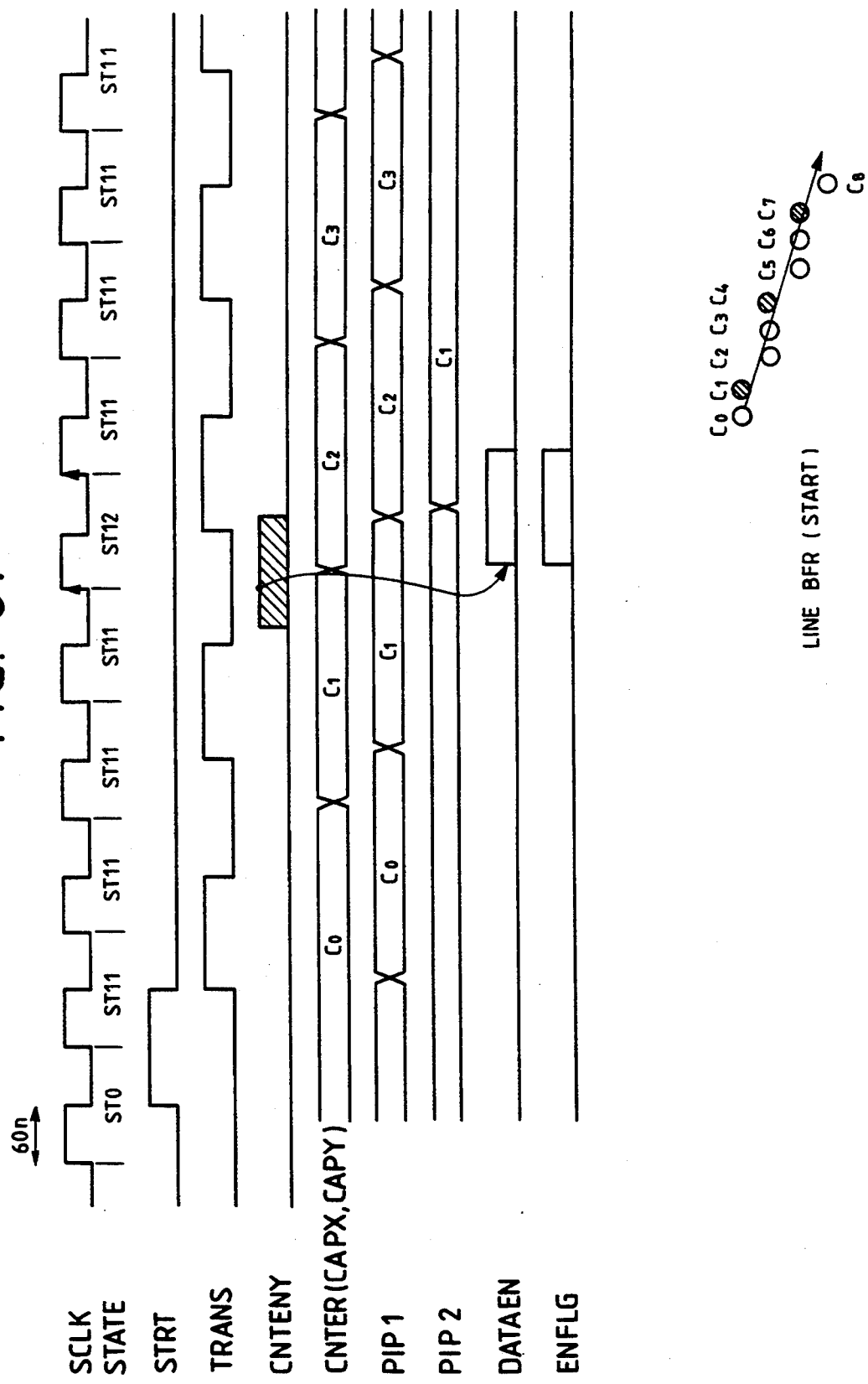

FIG. 61 represents the timing chart in the proximity of the starting point $C_0$ in the LINE BFR state. In state ST11, the signal CNTENY becomes logical 1 when the coordinates for the next point $C_1$ are latched in the PIP1X 82 and the PIP1Y 84, subsequently to the starting point $C_0$, and the operation shifts to the state ST12. In state ST12, at the same time as the signal DATAEN and the signal ENFLG are turned into logical 1, the coordinates for the point $C_1$ are latched in the pipeline registers PIP2X 83 and PIP2Y 85 at the rising edge of the signal TRANS. Thereafter, the operation returns to state ST11. In this manner only the coordinates for the points ($C_1$, $C_4$, $C_7$...) immediately preceding the points in which the y-coordinate is incremented by only one ($C_2$, $C_5$, $C_8$...) are transferred to the pipeline registers PIP2X 83 and PIP2Y 85.

Figure 62:
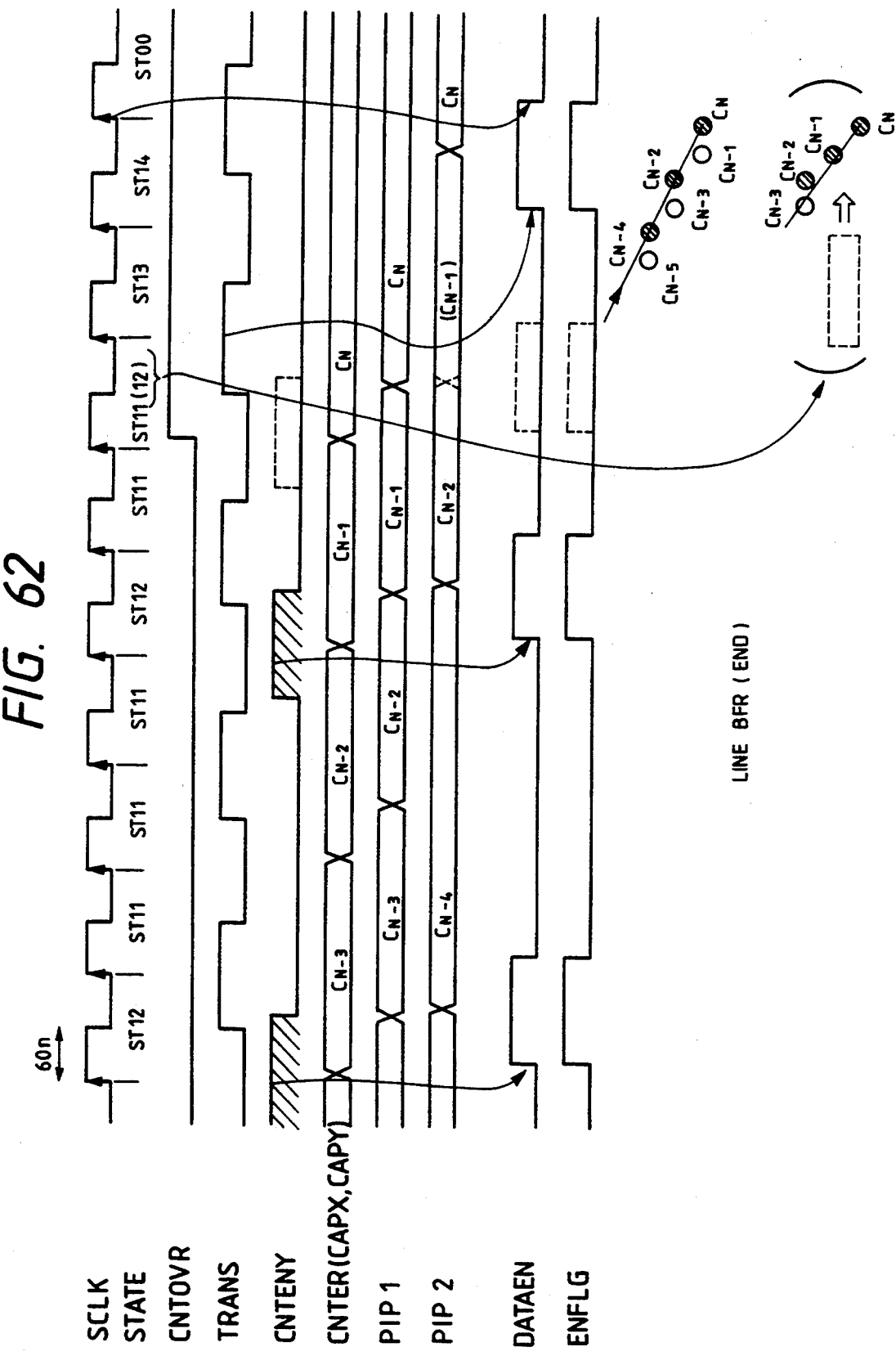

FIG. 62 represents the timing chart for the proximity of the terminating point $C_N$ in the LINE BFR state. After $C_{N-4}$ and $C_{N-2}$, which are positioned immediately before the points $C_{N-3}$ and $C_{N-1}$ where the y-coordinate has been incremented just by one, are latched in regular succession in the pipeline registers PIP2X 83 and PIP2Y 85, the coordinates for the terminating point $C_N$ are generated by the counters (CAPX) 52 and (CAPY) 53 in state ST11. When the signal CNTOVR becomes logical 1, the operation shifts to state ST13. In state ST13, the operation shifts to state ST14 when the signal TRANS becomes logical 0, and the signal DATAEN and the signal ENFLG are set at logical 1, with the terminating point $C_N$ being latched in the pipeline registers PIP2X 83 and PIP2Y 85.

In case the terminating point $C_N$ itself is a point attained by incrementing the y-coordinate by only one, the point $C_{N-1}$ is latched in the pipeline registers PIP2X 83 and PIP2Y 85 in the state ST12. Then, in state ST12, the signal CNTOVR becomes logical 1, and the operation shifts to state ST13.

FIG. 63 represents the way the timing is kept for the successive latching of the coordinates in the pipeline registers PIP1X 82, PIP1Y 84, PIP2X 83, and PIP2Y 85 in the LINE BFR state. As the coordinates from a through j, which form the straight line, are generated successively in the counters (CAP) 52 and 53, these coordinates are transferred in regular succession to the pipeline registers PIP1X 82 and PIP1Y 84 in synchronization with the rising edge of the signal TRANS.

Among these coordinates, only the coordinates b, d, f, h, and j, which are set at the timing which makes the signal ENFLG logical 1, are transferred to the pipeline registers PIP2X 83 and PIP2X 85 in synchronization with the signal TRANS.

Figure 64:
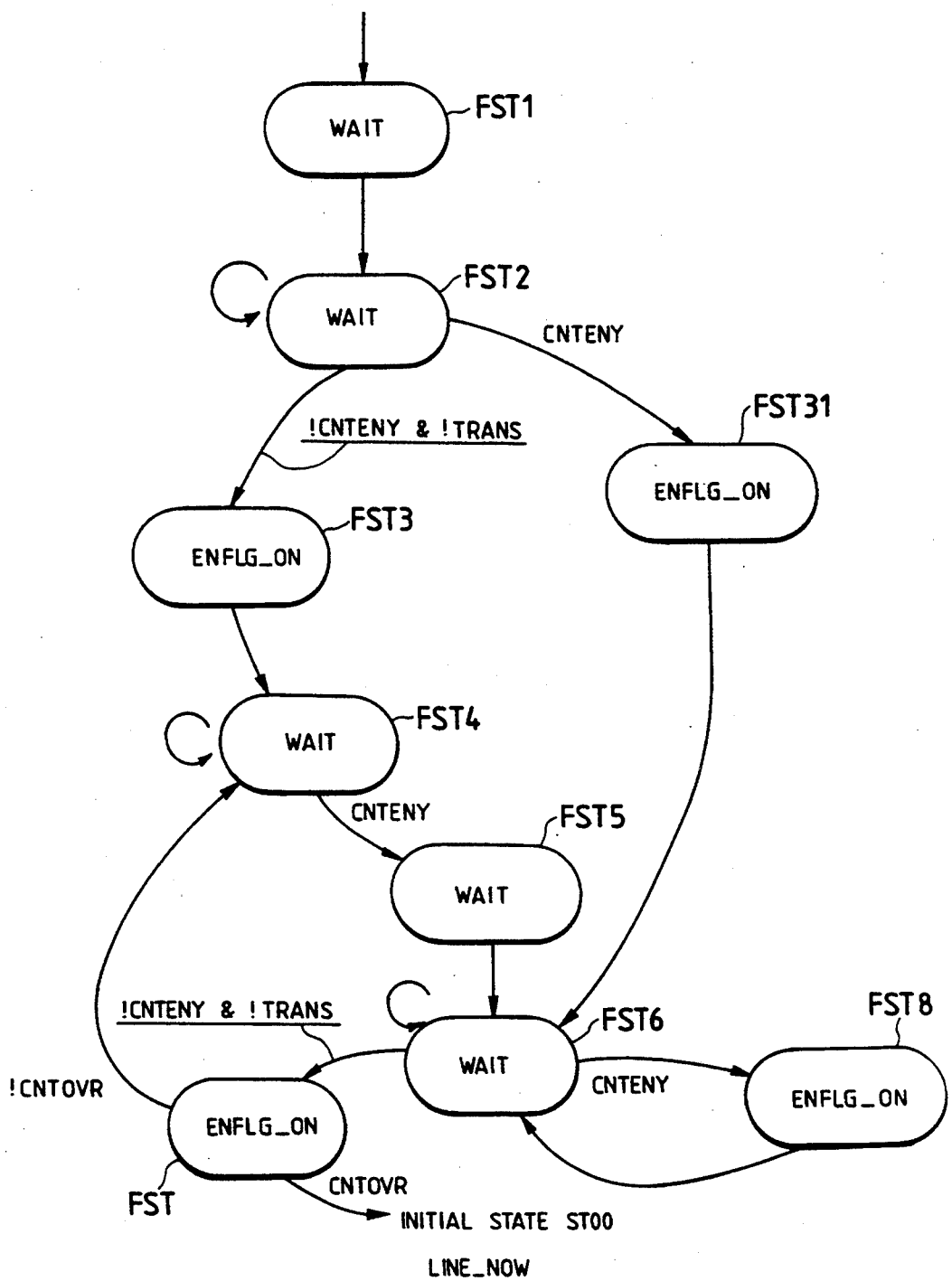
FIGS. 64 and FIG. 65 are state transition charts for LINE NOW, still another routine used in the invention.

FIG. 64 is a state transition chart relating to the signal ENFLG for the LINE NOW state. After the operation has shifted to state FST2 via state FST1, the operation shifts to state FST3 when the signal CNTENY and the signal TRANS are logical 0, and to state FST31 when the signal CNTENY is logical 1, but is kept in the waiting state in any other case. In state FST3, the operation shifts to state FST4. Also, in state FST31, the operation shifts to state FST6 after the signal ENFLG is set ON.

In state FST4, the operation shifts to state FST6 via state FST5 when the signal CNTENY is logical 1 but is kept in the waiting state in any other case. In state FST6, the operation shifts to state FST7 when the signal CNTENY and the signal TRANS are logical 0, and to state FST8 when the signal CNTENY is logical 1, but it is held in the waiting state in any other case. In state FST7, the operation shifts to state FST4 when the signal CNTOVR is logical 0 and to state ST00 when the said signal is logical 1. In state FST8, the operation returns to state FST6 after the signal ENFLG is set ON.

Figure 65:
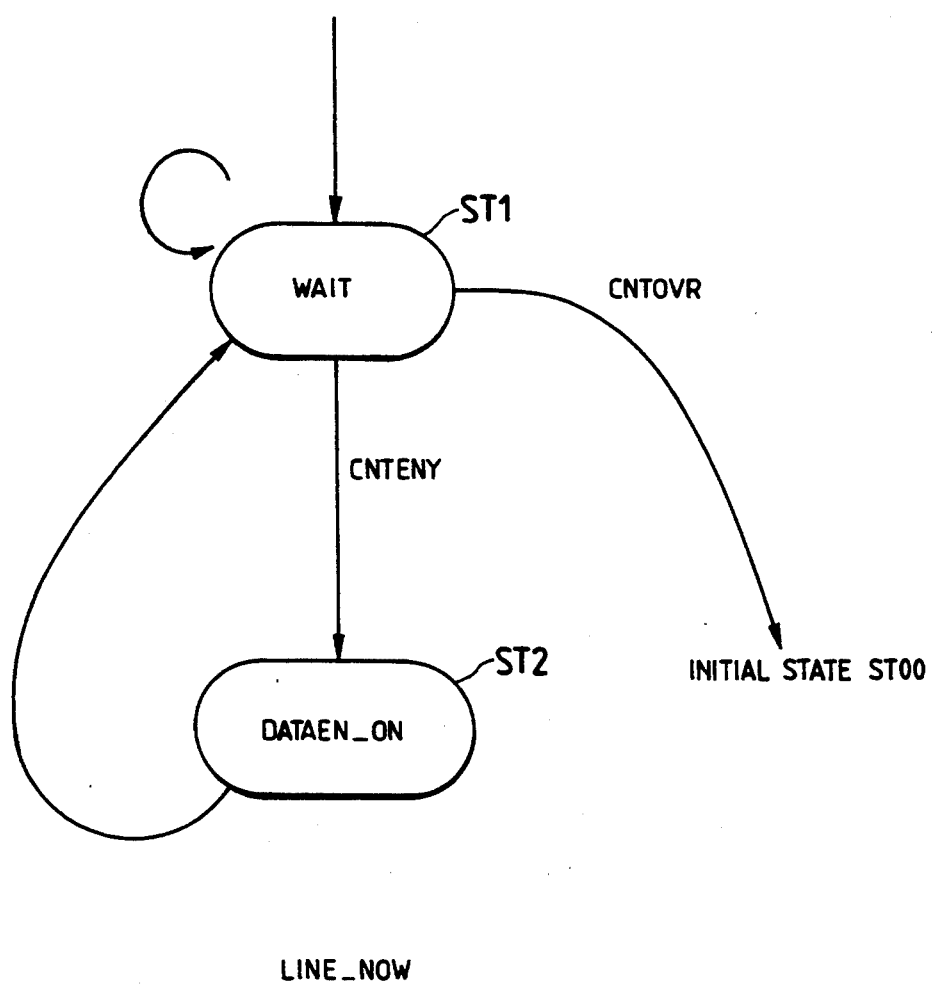

FIG. 65 shows the state transition chart relating to the signal DATAEN for the LINE NOW state. In state ST1, the operation shifts to state ST2 when the signal CNTENY is logical 1 and it shifts to state ST00 when the signal CNTOVER is logical 1, but it is kept in the waiting state in any other case. In state ST2, the operation returns to state ST1 after the signal DATAEN is set ON.

Figure 66:
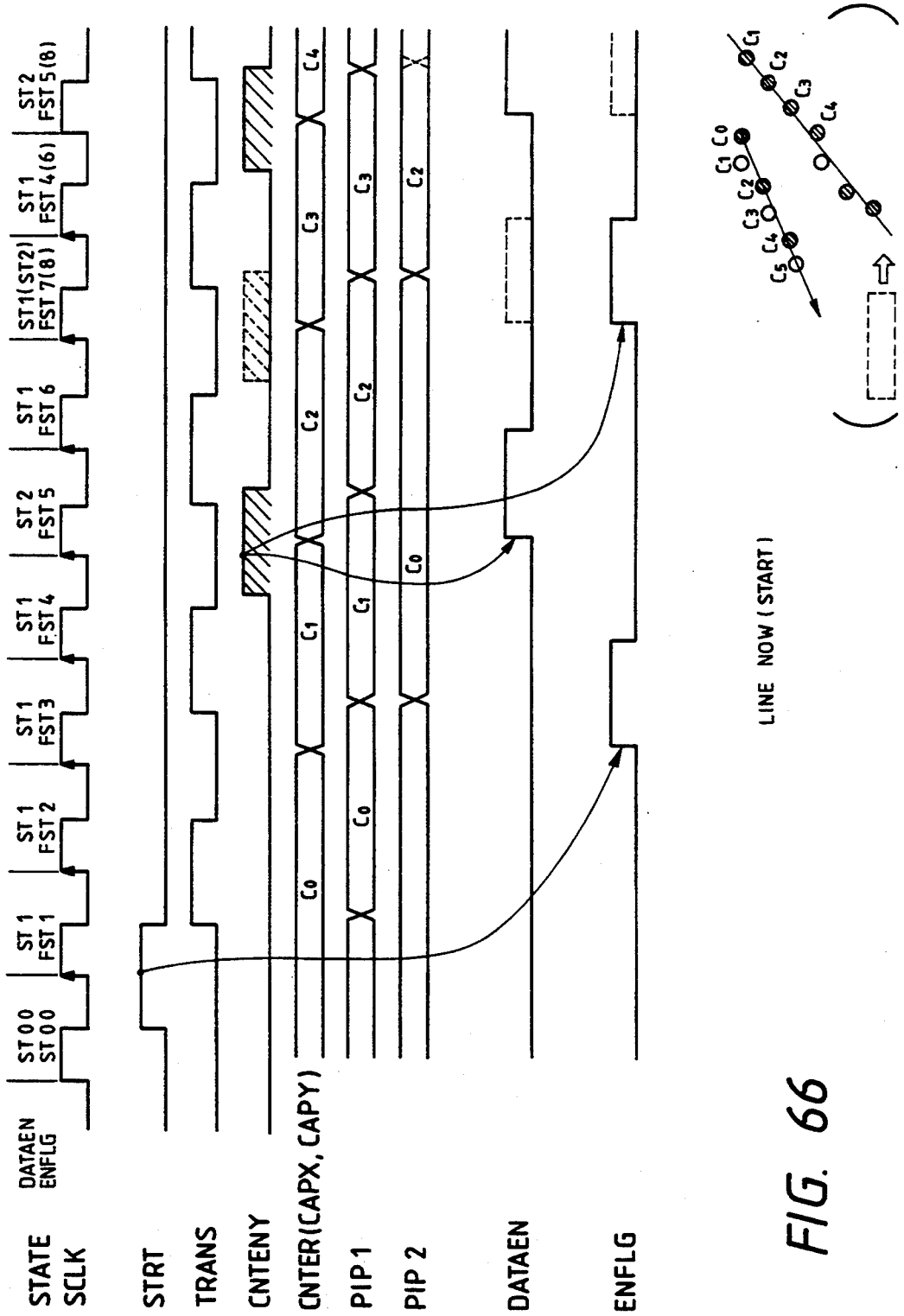

FIG. 66 presents the timing chart in the proximity of the starting point $C_0$ in the LINE NOW state. The description will begin with respect to the signal ENFLG. In state FST1, the starting point $C_0$, which is latched in the counter (CAPX) 52 and the counter (CAPY) 53, is transferred to the pipeline registers PIP1X 82 and PIP1Y 84, after which the signal ENFLG is set to logical 1 in state FST3. In state FST3, the latching coordinate $C_0$ for the pipeline registers PIP1X 82 and the PIP1Y 84 transferred to the pipeline registers PIP2X 83 and PIP2Y 85 in state FST3. In state FST4, the signal CNTENY is made logical 1. In state FST7, when the signal ENFLG is set at logical 1, the latching coordinate $C_2$ for the pipeline registers PIP1X 82 and PIP1Y 84 is transferred to the pipeline registers PIP2X 83 and PIP2Y 85. In this manner, the points $C_0$, $C_2$, $C_4$ . . . for the case in which the y-coordinate is incremented by only are transferred in regular succession to the pipeline registers PIP2SX 83 and PIP2Y 85.

In case the y-coordinate is incremented in succession from the point $C_1$, which is next to the starting point $C_0$, to the point $C_4$, states FST6 and FST8 are repeated, and, as shown in the broken line in FIG. 66, the signal ENFLG is set ON every time state FST8 sets in, and these coordinates are transferred in regular succession to the pipeline registers PIP2X 83 and PIP2Y 85.

Next, a description will be provided of the signal DATAEN. In state ST1, the operation shifts to state ST2 when the signal CNTENY becomes logical 1, and the signal DATAEN is set at logical 1.

Figure 67:
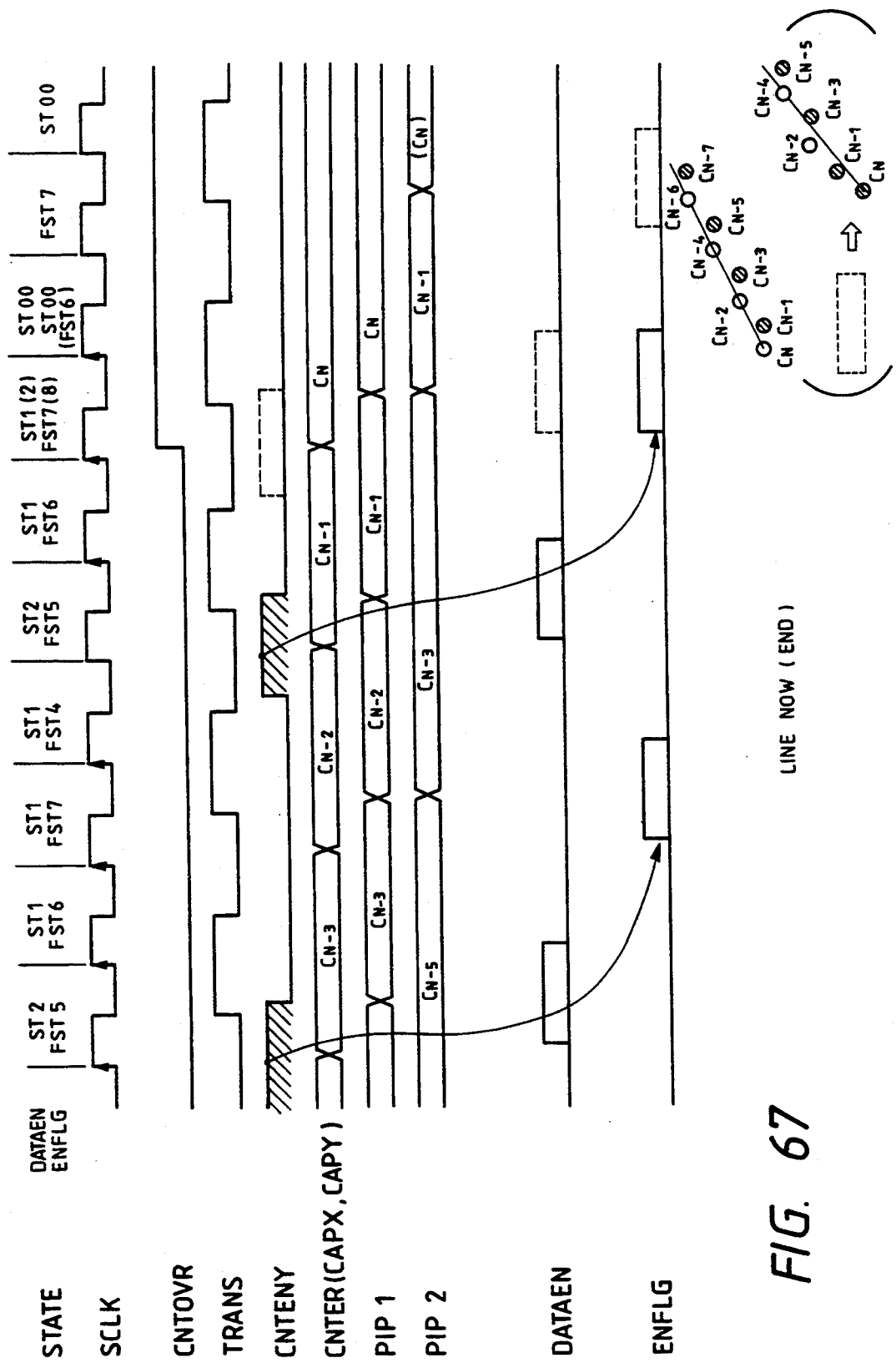

FIG. 67 presents the timing chart in the proximity of the terminating point $C_N$ of the LINE NOW state. First, with respect to the signal ENFLG, when the signal CNTENY attains logical 1 in state FST 4 and the signal ENFLG becomes logical 1 in state FST7, the latching coordinate $C_{N-3}$ for the pipeline registers PIP1X 82 and PIP1Y 84 are transferred to the pipeline registers PIP2X 83 and PIP2Y 85 in state FST7. When the operation returns to state FST4 again, with the signal CNTENY becoming logical 1, then the signal attains logical 1 in state FST7, and the latching coordinate $C_{N-1}$ for the pipeline registers PIP1X 82 and PIP1Y 84 are transferred to the pipeline registers PIP2X 83 and PIP2Y 85.

In case the terminating point $C_N$ also is a coordinate derived by incrementing the y-coordinate, the signal CNTENY becomes logical 1 in state FST6, and the operation shifts therewith to state FST8. After the signal ENFLG is set ON in state FST8, the signal ENFLG is turned ON-again when the operation has shifted to state FST7 via state FST6. In this manner, the terminating point $C_N$ is transferred from the pipeline registers PIP1X 82 and PIP1Y 84 to the pipeline registers PIP2X 83 and PIP2Y 85.

Next, with respect to the signal DATAEN, the state ST1 and state ST2 are repeated, and the signal DATAEN is set at logical 1 in state ST2.

FIG. 68 presents the timing chart for the successive transfers of the individual points on a straight line consisting of the points a through j of the points from the starting point a to the terminating point j in regular succession from the pipeline registers PIP1X 82 and PIP1Y 84 to the pipeline registers PIP2X 83 and PIP2Y 85 in the LINE NOW state.

All of the coordinates a through j which are generated by the counter (CAPX) 52 and the counter (CAPY) 53 are transferred in regular succession to the pipeline registers PIP1X 82 and PIP1Y 84. Yet, since the signal ENFLG is generated in correspondence with the points at which the y-coordinate is incremented, only the points a, c, e, g, and i are transferred in regular succession from the pipeline registers PIP1X 82 and PIP1Y 84 to the pipeline registers PIP2X 83 and PIP2Y 85.

Figure 69:
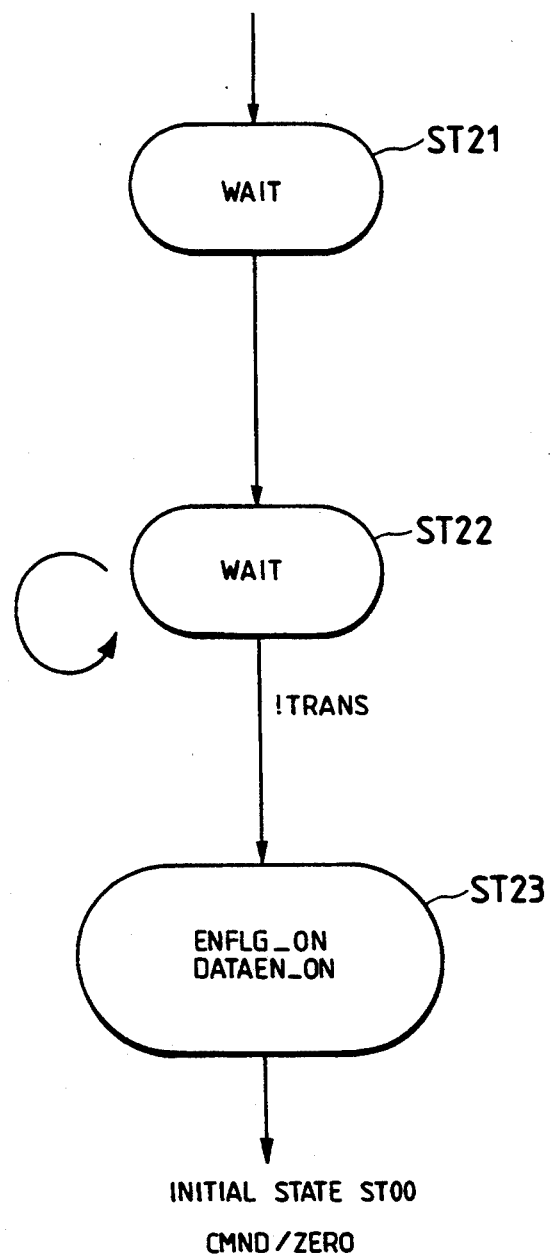
FIG. 69 is a state transition chart for CMND/ZERO, yet another routine used in the invention.

FIG. 69 shows the state transition chart of the CNBD/ZERO state. When the operation shifts to state ST22 by way of state ST21, the operation is held in the waiting state if the signal TRANS is logical 1, but shifts to state ST23 if TRANS is logical 0. In state ST23, the operation returns to state ST00 after the signal ENFLG and the signal DATAEN are set ON in state ST23.

Figure 70:
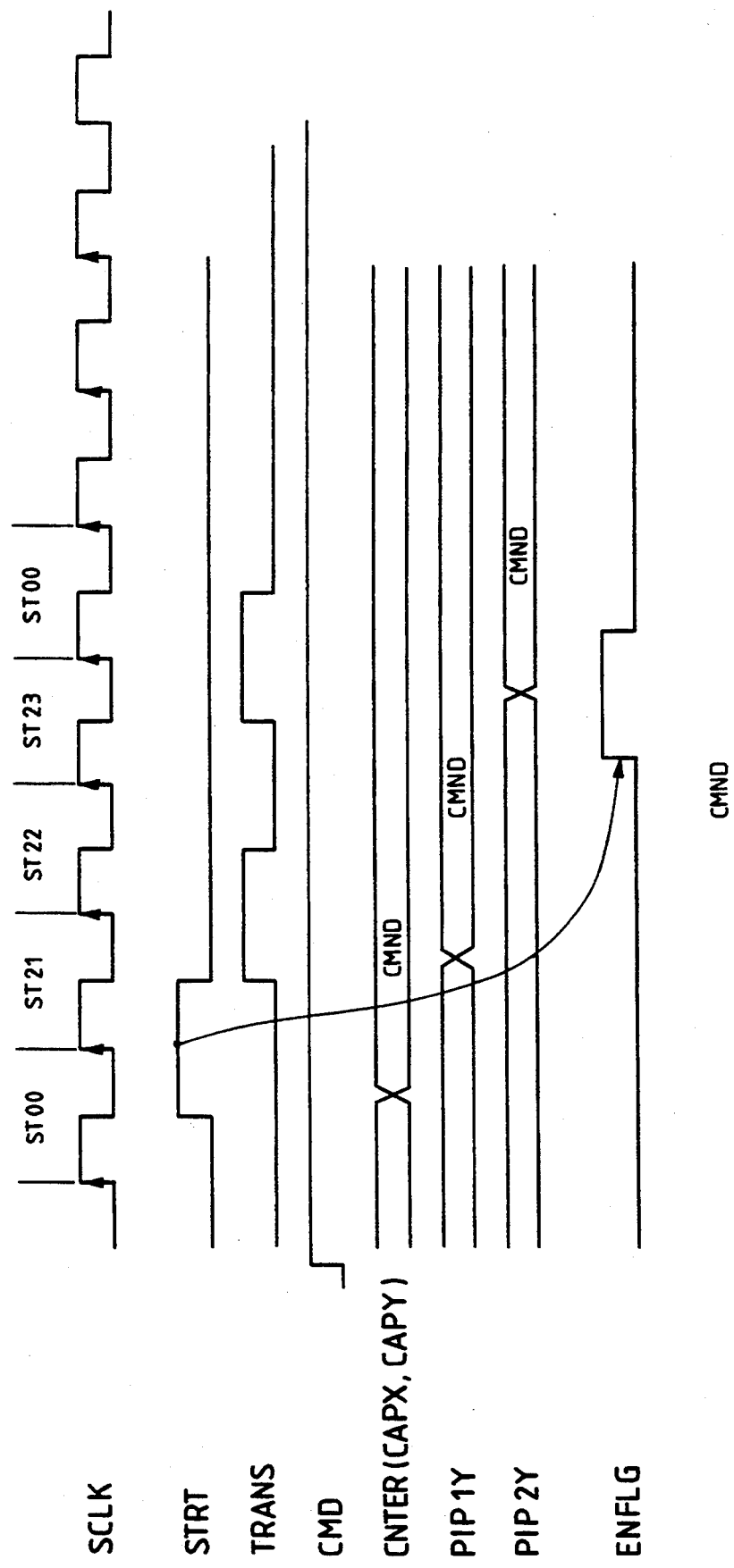
FIG. 70 is a timing chart for CMND.

FIG. 70 shows the timing chart for the CMND/ZERO state. In state ST00, the command CMND, which latched in the counter (CAPY) 53 in state ST00, is transferred to the pipeline register PIP1Y 84 in state ST21. When the signal ENFLG is set at logical 1 in state ST23, the command CMND for the pipeline register PIP1Y 84. is transferred to the pipeline register PIP2Y 85.

Figure 71:
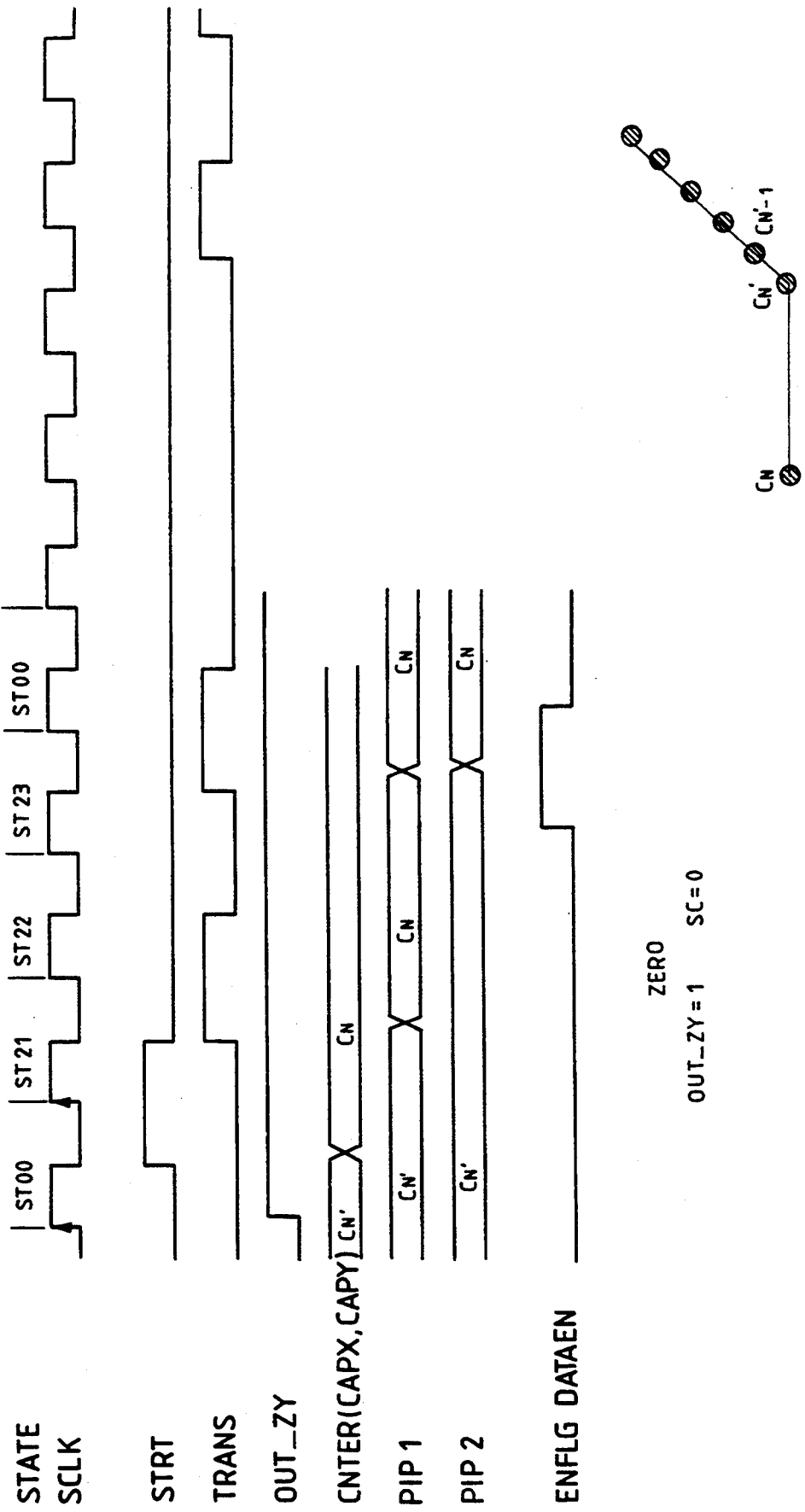
FIG. 71 and FIG. 72 are timing charts for ZERO.

FIG. 71 shows the timing chart for the ZERO coordinate (i.e. for the data of the segment of a line parallel to the x-axis) in the CMND/ZERO state in case the input straight line is at an angle of 45 degrees or more in relation to the x-axis (i.e. SC=0) and also the output straight line is parallel to the x-axis. When the terminating point $C_N$ of the output straight line is latched in the counter (CAPX) 52 and (CAPY) 53 in state ST00, this coordinate is transferred to the pipeline registers PIP1X 82 and PIP1Y 84 in state ST21. When the signal ENFLG and the signal DATAEN are set at logic 1 in state ST23, the coordinate $C_N$ of the pipeline registers PIP1X 82 and PIP1Y 84 are transferred to the pipeline registers PIP2X 83 and PIP2Y 85.

Figure 72:
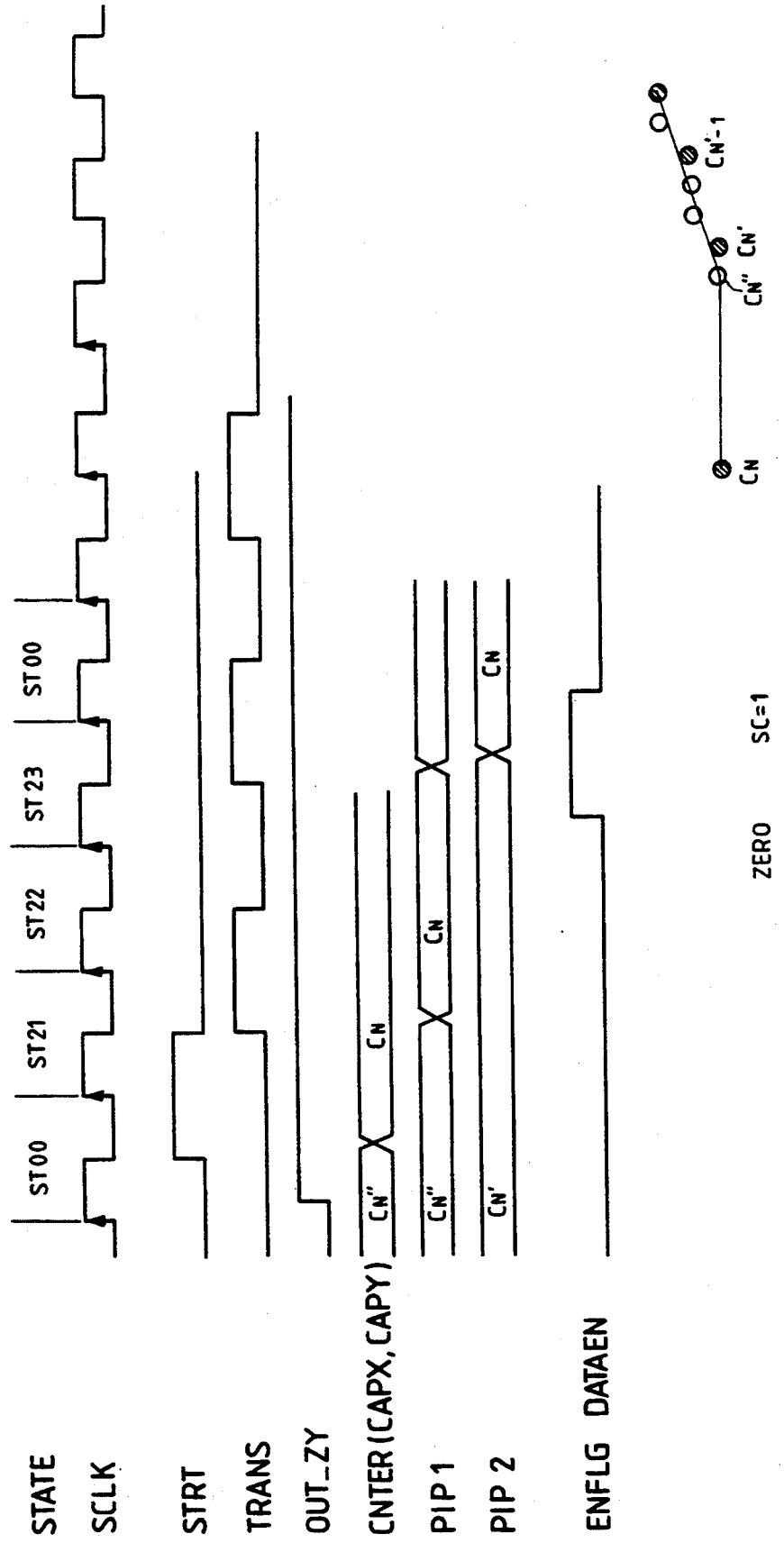

FIG. 72 shows the timing chart for the ZERO coordinate in the CMND/ZERO state where the input straight line is at an angle less than 45 degrees in relation to the x-axis and also the output straight line is parallel to the x-axis. The coordinate for the terminating point $C_N$ of the output segment of a line latched in the counter (CAPX) 52 and the counter (CAPY) 53 in state ST00 is transferred to the pipeline registers PIP1X 82 and PIP1Y 84 in state ST21. At this time, the coordinate of the point $C_N$, immediately preceding the starting point $C_N$, for the output segment of a line (i.e. the terminating point for the input segment) is latched in the pipeline registers PIP2X 83 and PIP2Y 85. When the signal ENFLG and the signal DATAEN are set at logical 1 in state ST23, the coordinate $C_N$ for the pipeline registers PIP1X 82 and PIP1Y 84 is transferred to the pipeline registers PIP2X 83 and PIP2Y 85.

The corner coordinate selecting section 34 has the following functions:

(1) To perform the corner selecting process on the coordinates of segments of a line, in accordance with the prescribed rules, out of those coordinates which are transferred from the straight line coordinate selecting section 33 (i.e. the pipeline registers PIP2X 83 and PIP2Y 85) at the preceding stage and to transfer those processed coordinates, together with the points for those segments other than Corners, to the output FIFO.

(2) To latch the starting point and terminating point of those segments of a line parallel to the x-axis, out of the coordinates transferred from the straight line coordinate selecting section at the preceding stage, in the registers (MIN 91 and MAX 92).

(3) To transfer the commands and data for the CADM (sorting) as they are to the output FIFO out of the coordinates transferred from the straight line coordinate selecting section 33 at the preceding stage.

Figure 73:
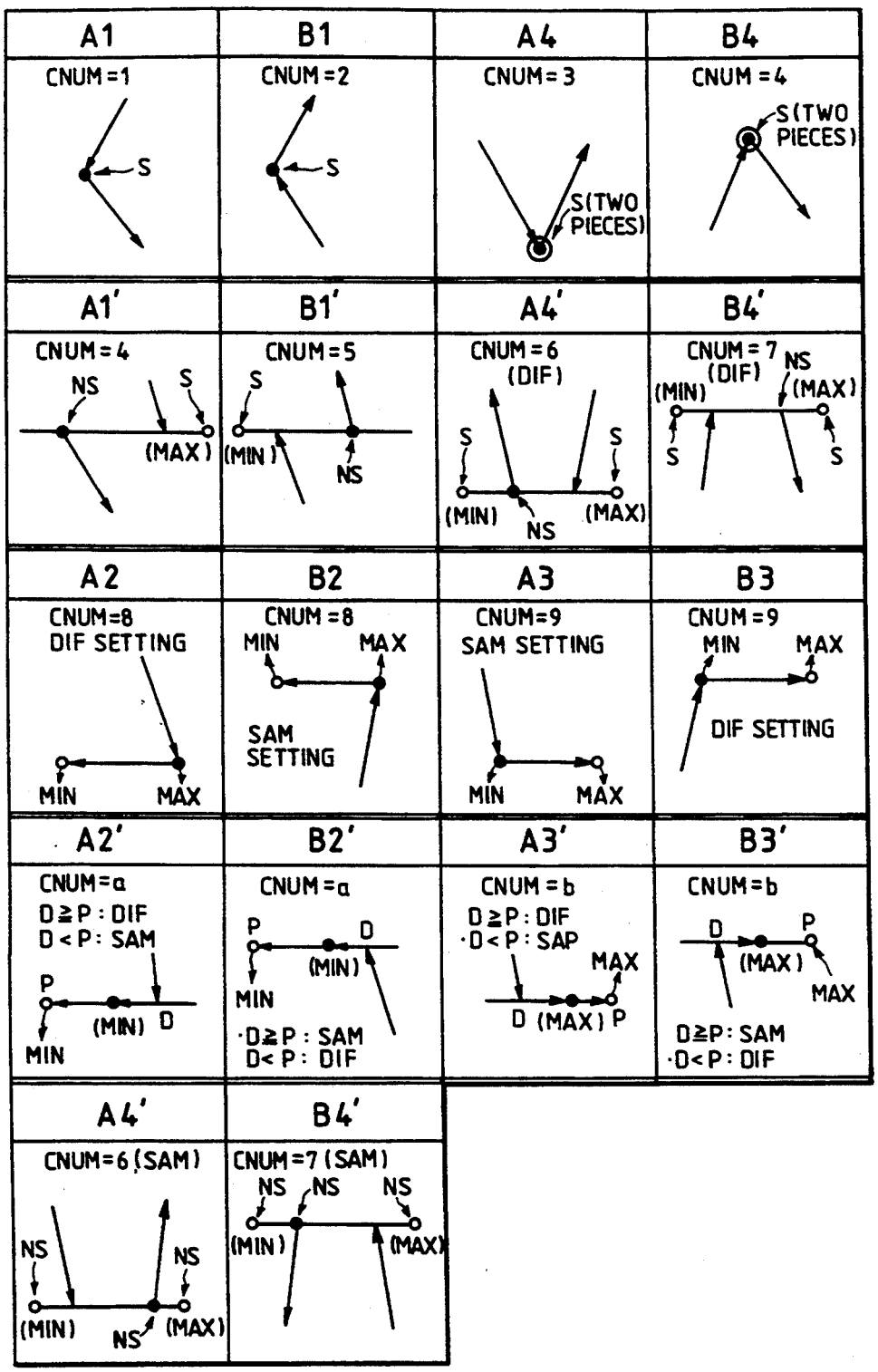
FIG. 73 is a chart for explaining the classification of the corners.

For the selection of the corner selecting process mentioned in (1) above, the corners are classified as shown in FIG. 73 on the basis of the status of the input straight line into the specified point and the status of the output straight line from that point. The particulars of the corner processing are determined for each of the individual corners.

The X-coordinate of the point effective at the terminating point for the input straight line is taken as the END X while the X-coordinate of the point effective at the starting point of the output straight line is taken as the START X. The selecting and storing processes performed on these points form the corner selecting process. As the selected coordinate is a point on the same Y-axis (as the scanning direction in image drawing is the direction of the X-axis), the corner selecting process is applied only to the X-coordinate.

The corners are classified into the following major categories: the ordinary corners ($A_1$, $B_1$, $A_4$, and $B_4$); the beginning of the special corners (A2, B2, A3, and B4); the middle of the special corners (A1, B2, A3, and B3'); and the departure from the special corners (A1', B1', A4', and B4').

The definitions of these types of corners are put together in Table 4.

At this juncture, the INP SY in the corners, A1', B1', A4', B4', A2', B2', A3', and B3', in which the input straight line is parallel to the X-axis (INP Z=1) is taken as the status of the straight line immediately before it becomes parallel to the X-axis in the straight line as positioned still ahead of the input straight line (which is parallel to the X-axis).

TABLE 4

| | Corners-Status of Straight Line | | | | |
|---|---|---|---|---|---|
| | INP ZY | INP SY | OUT ZY | OUT SY | OUT SX |
| Ordinary corner: | | | | | |
| A1 | 0 | 0 | 0 | 0 | X |
| A4 | 0 | 0 | 0 | 1 | X |
| B1 | 0 | 1 | 0 | 1 | X |
| B4 | 0 | 1 | 0 | 0 | X |
| Departure from special corner: | | | | | |
| A1' | 1 | 0 | 0 | 0 | X |
| A4' | 1 | 0 | 0 | 1 | X |
| B1' | 1 | 1 | 0 | 1 | X |
| B4' | 1 | 1 | 0 | 0 | X |
| Beginning of special corner: | | | | | |
| A2 | 0 | 0 | 1 | X | 1 |
| A3 | 0 | 0 | 1 | X | 0 |
| B2 | 0 | 1 | 1 | X | 1 |
| B3 | 0 | 1 | 1 | X | 0 |
| Middle of special corner: | | | | | |
| A2' | 1 | 0 | 1 | X | 1 |
| A3' | 1 | 0 | 1 | X | 0 |
| B2' | 1 | 1 | 1 | X | 1 |
| B3' | 1 | 1 | 1 | X | 0 |

For example, the corner A1 is defined as a case in which the input straight line is not parallel to the X-axis (INP ZY=0) but is oriented downward (INP SY=0) and the output straight line is not parallel to the X-axis (OUT ZY=0), either, but is oriented downward (OUT SY=0). Moreover, the corner A2 is defined as a case in which the input straight line is not parallel to the X-axis but is oriented downward and the output straight line is parallel to the X-axis (OUT ZY=1) but is oriented leftward (OUT SX=1).

The corner A1' is a case in which the input straight line is parallel to the X-axis (INP ZY=1) but the output straight line is not parallel to the X-axis (OUT ZY=0) and is turned downward (OUT SY=0) and additionally the straight line immediately before the straight line becomes parallel to the X-axis is oriented downward in the input straight line still before the input straight line in parallel to the X-axis. Therefore, this corner A1' also includes the case in which the straight line parallel to the X-axis moves both ways, i.e. rightward and leftward, several times.

The SAM mode or the DIF mode is set (defined) in correspondence with each of the corners such as the beginning of the special corners (A2, B2, A3, and B3) and the middle of the special corners (A2', B2', A3', and B3'). The corner A4' is defined as a corner in which the input straight line is parallel to the X-axis (INP ZY=1) but the output straight line is not parallel to the X-axis (OUT ZY=1) but is oriented upward (OUT SY=1) and additionally the straight line immediately before it becomes parallel to the X-axis is oriented downward (INP SY=0) in the straight line still preceding the input straight line parallel to the X-axis.

Therefore, there are two cases. In one case, the coordinate (X-coordinate) of the crossing point of the input straight line and the preceding straight line is larger than the coordinate (X-coordinate) of the crossing point of the input straight line and the output straight line (i.e. in the case of the DIF mode). In the other case, the former coordinate is smaller than the latter coordinate (i.e. in the case of the SAM mode). The DIF mode represents the clockwise movement, while the SAM mode represents the counter-clockwise movement, respectively in terms of the direction of the vector of the straight line. In the corner selecting process, which is described later, two points are selected in the DIF mode while none of those points is selected in the case of the SAM mode. This applies in the same way to the corner B4'.

Figure 74:
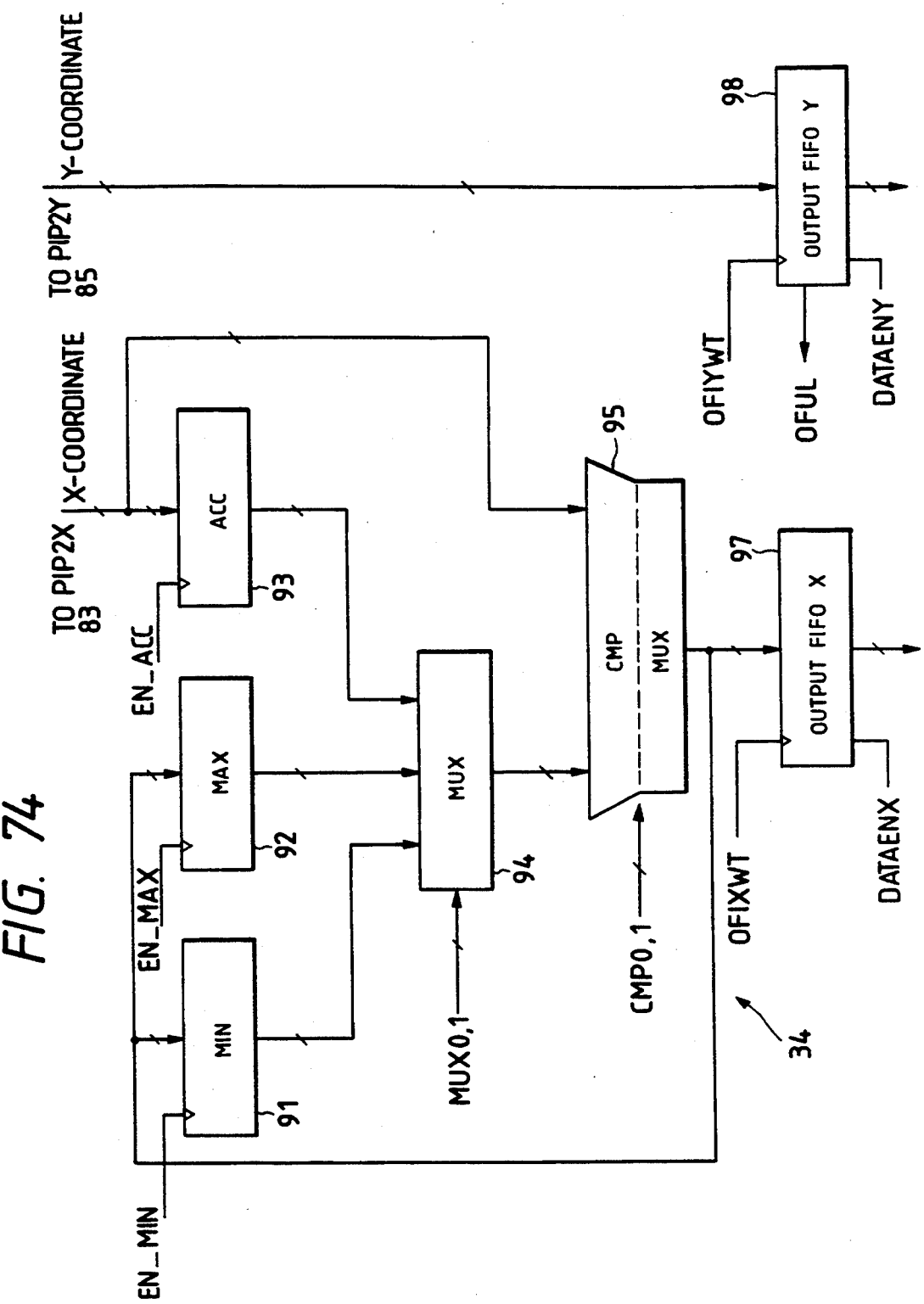
FIGS. 74 and 75 are block diagrams for the corner coordinate selecting section.

FIG. 74 is a block diagram showing the hardware of the corner coordinate selecting section 34. The register MIN 91 and the register MAX 92, respectively store the minimum data or the maximum data obtained after the arithmetic operations performed with the comparator CMP/MUX. The register ACC 93, temporarily stores the output from the pipeline register PIP2X 83. The multiplexer 94 selects the output from either one of the register MIN 91, the register MAX 92, and the register ACC 93. The comparator CMP/MUX 95 either outputs the larger data or the smaller data resulting from the arithmetic operations or puts through the output from the pipeline registers PIP2X 83. The output register FIFO-X 97 latches the X-coordinate output by the comparator CMP/MUX 95, and the output register FIFO-Y 98 latches the Y-coordinate output by the pipeline register PIP2Y 85.

The processing of the individual corners by this corner coordinate selecting section 34 is presented collectively as follows.

In the processing of the corner A1, the END X at the corner is stored tentatively in the register ACC 93, and the contents of the END X are compared with those of the START X, and the larger one of the two is selected (one data selection).

In the processing of the corner A4, the END X and the START X at the corner are selected as they are (two data selection).

In the processing of the corner B1, the END X at the corner is tentatively stored in the register ACC 93, and further the contents of the END X are compared with those of the START X, and the smaller of these two is selected (one data selection).

In the processing of the corner B4, the END X and the START X at the corner are selected as they are (two data selection).

In the processing of the corner A1', the value in the register MAX 92 and the START X at the corner are compared, and the larger one of these two is selected (one data selection).

In the processing of the corner A4', the value in the register MAX 91 is selected if the mode, in terms the difference between the DIF mode and the SAM mode, is the DIF mode. Further, the value in the register MIN 91 and the START X are compared, and the smaller one of these two is selected (two data selection). No such selection is made if the mode is the SAM mode (zero data).

In the processing of the corner B1', the value of the register MIN 91 and the START X at the corner are compared, and the smaller one of these is selected (one data selection).

In the processing of the corner B4', the value of the register MIN 91 is selected if the mode, in terms of the difference between the DIF mode and the SAM mode, is the DIF mode, and, by comparing the value in the register MAX 92 and the START X, the larger one of these is selected (two data selection). No such selection is made if the mode is the SAM mode (zero data).

In the processing of the corner A2, the mode, in terms of the difference between the DIF mode and the SAM mode, is set at the DIF mode, and the X-coordinate at the terminating point of the output straight line is stored in the register MIN 91. Further, the START X of the corner is stored in the register MAX 92 and the register (D DELX) 51 (FIG. 34)(zero data). The storing of this START X in the register (D DELX) 51 is performed in state ST20 for the special process in the course of the calculation of the coordinates illustrated in FIG. 45.

In the processing of the corner A3, the mode, in terms of the difference between the DIF mode and the SAM mode, is set at the SAM mode, and the X-coordinate of the terminating point of the output straight line stored in the register MAX 92. Further, the START X of the corner is stored in the register MIN 91 and the register (D DELX) 51 (zero data).

In the processing of the corner B2, the mode, in terms of the DIF mode or the SAM mode, is set at the SAM mode, and the X-coordinate of the terminating point of the output straight line is stored in the register MIN 91. Further, the START X of the corner is stored in the register MAX 92 and the register (D DELX) 51 (zero data).

In the processing of the corner B3, the mode, in terms of the DIF mode or the SAM mode, is set at the DIF mode, and the X-coordinate of the terminating point of the output straight line is stored in the register MAX 92. The START X of the corner is stored in the register MIN 91 and the register (D DELX) 51 (zero data).

In the processing of the corner A2', the value stored in the register (D DELX) 51 (i.e. the value of the X-coordinate of the starting point of the straight line which has become parallel to the X-axis for the first time) and the value of the X-coordinate at the terminating point in the output straight line are compared. If the value in the register (D DELX) 51 is larger than the other, then the mode is set at the DIF, but, if the value in the register (D DELX) 51 is smaller, the mode is set at the SAM mode. The X-coordinate at the terminating point and the value in the register MIN 91 are compared, and the smaller of these values is stored in the register MIN 91 (zero data). This comparing process is performed in state ST26 for the special process in the course of the calculation of the coordinates as illustrated in FIG. 45.

In the processing of the corner A3', the value stored in the register (D DELX) 51 (which is the value of the X-coordinate of the starting point of the straight line which has become parallel to the X-axis for the first time) and the value of the X-coordinate of the terminating point for the output straight line are compared. If the value in the register (D DELX) 51 is larger than the other, the mode, in terms of the DIF mode or the SAM mode, is set at the DIF mode, but, if it is smaller, the mode is set at the SAM mode. The X-coordinate for the terminating point of the output straight line and the value in the register MAX 92 are compared, and the larger one of these two is stored in the register MAX 92 (zero data).

In the processing of the corner B2', the value stored in the register (D DELX) 51 (i.e. the value of the X-coordinate for the starting point of the straight line which has become parallel to the X-axis for the first time) and the value of the X-coordinate for the terminating point of the output straight line are compared. If the value of the register (D DELX) 51 is the larger of the two, the mode, in terms of the DIF mode as contrasted with the SAM mode, is set at the SAM mode, but, if the value of the register (D DELX) 51 is smaller than the other, the mode is set at the DIF mode. The X-coordinate for the terminating point of the output straight line and the value in the register MIN 91 is compared, and the smaller of these two values is stored in the register MIN 91 (zero data).

In the processing of the corner B3, the value stored in the register (D DELX) 51 (i.e. the value of the X-coordinate of the starting point which has become parallel to the X-axis for the first time) and the value of the X-coordinate for the terminating point of the output straight line are compared, and if the value in the register (D DELX) 51 is larger than the other, the mode, in terms of the DIF mode or the SAM mode, is set at the SAM mode. If the value in the register (D DELX) 51 is smaller, the mode is set at the DIF mode. The X-coordinate for the terminating point of the output straight line and the value in the register MAX 92 are compared, and the larger of these values is stored in the register MAX 92 (zero data).

Figure 75:
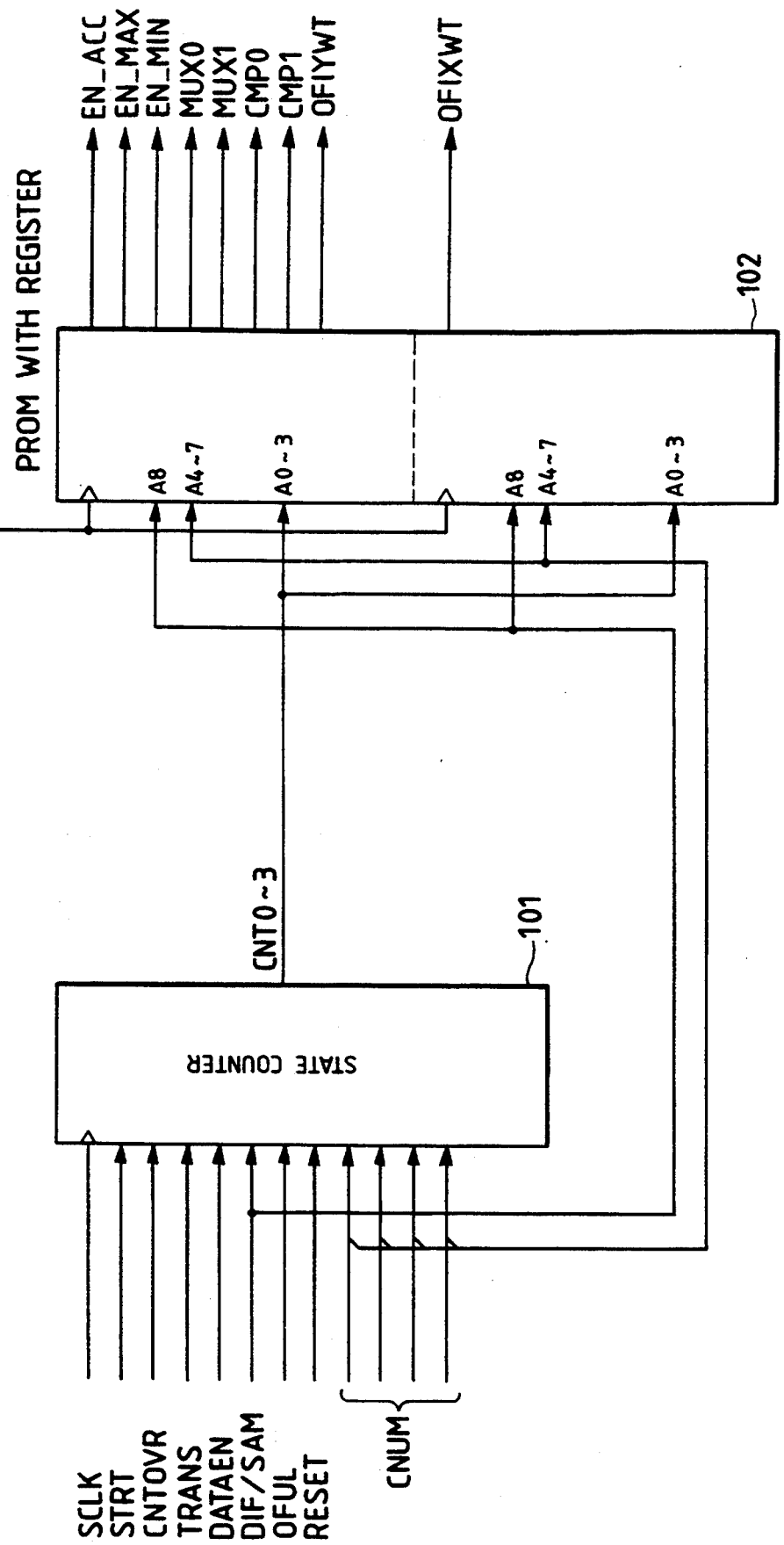

FIG. 75 shows the sequencer which generates the control signal for controlling the corner coordinate selecting section 34 given in FIG. 74. The sequencer is composed of a state counter 101 composed in turn of a programmable logic device PLD provided with a register and a PROM 102 provided with a register. The state counter 101 outputs the four-bit signal CNT 0 through 3 in correspondence with the signal listed on the left side in the Figure to the four less significant bits A0 through 3 in the PROM 102. In the most significant bit A8 of the PROM 102 is fed the signal DIF/SAM, which represents the DIF mode or the SAM mode, and the four-bit CNUM signal is fed to the middle four bits, bit A4 through 7. The PROM 102 outputs the individual control signals shown in Table 5 in response to these input signals.

The signals CNUM 0 through f(H) are the signals which are generated in correspondence with the statuses of the straight line and the Modes 0 through 3 shown in Table 2 and FIG. 37, and the signal CNUM 0 is generated when the polygon is formed and at the time when the Second coordinate is produced. The signals CNUM 1 through 7 or the signals CNUM8 through b are generated when the third coordinate and the subsequent coordinates of the polygon are produced, and the signal CNUM f is generated when the command or data for the CADM are issued.

TABLE 5

| | |
|---|---|
| EN MIN | The signal for latching the data in the register MIN 91 |
| EN MAX | The signal for latching the data in the register MAX 92 |
| EN ACC | The signal for latching the data in the register ACC 93 |
| MUX0, 1 | The selecting signal for the multiplexer 94 |
| CMP0, 1 | The control signal for the comparator CMP/MUX 95 |
| OFIWT | The writing signal for the output from FIFO 97 and 98 |

As mentioned later, nothing is processed when the signal CNUM 0 is generated, but the processing of the corners and the processing of the straight lines are performed with the signals CNUM 1 through 7, the corner processing is performed with the signals CNUM 8 through b, and the processing of the commands is performed with the signal CNUM f.

Figure 76:
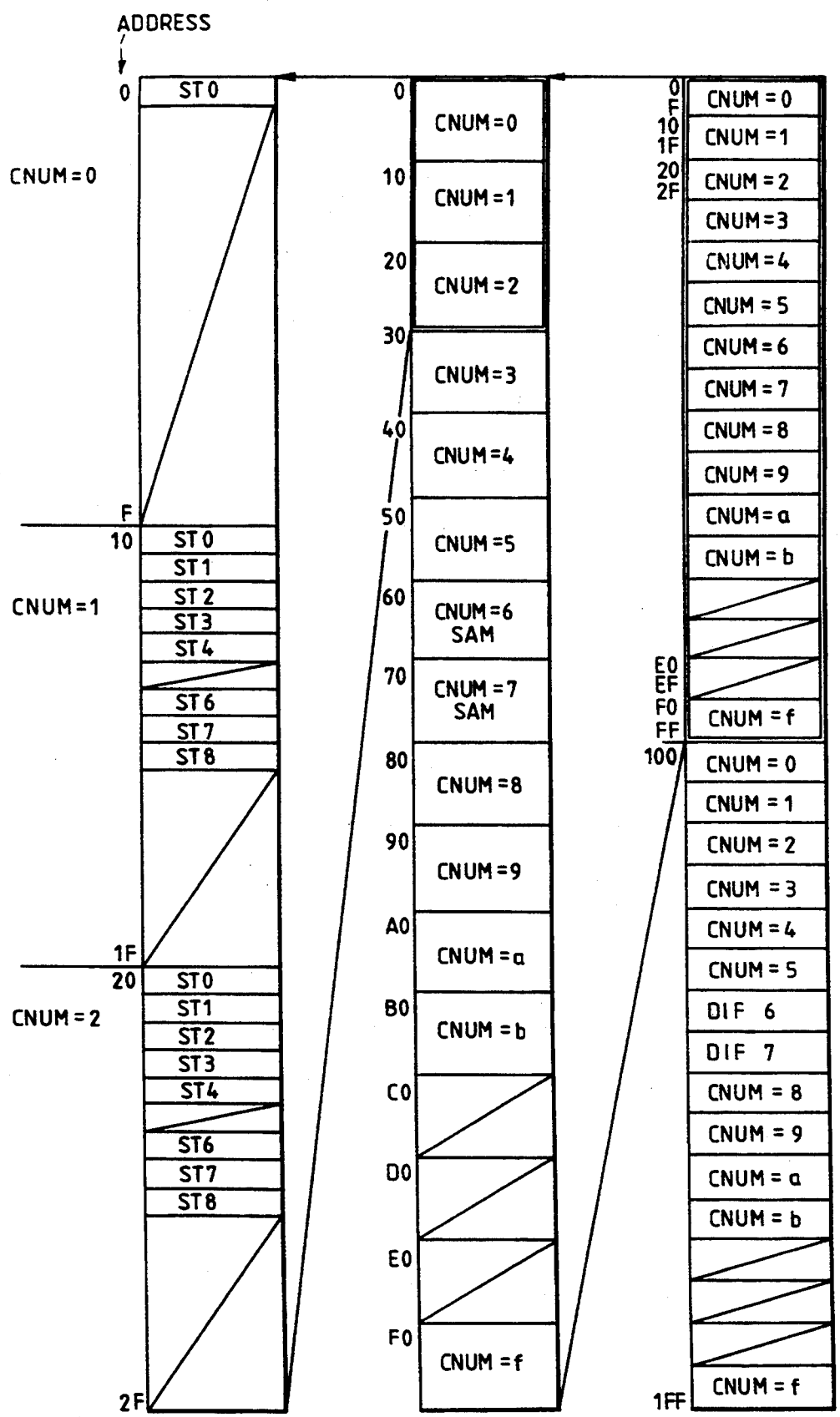
FIG. 76 is an arrangement chart for the control signals in the PROM.

FIG. 76 represents the arrangement of the control signals inside the PROM 102. Two sets are prepared of the data for the signals CNUM 0 through f; one set is employed for the SAM mode, while the other set is used for the DIF mode. The data in the SAM mode or the DIF mode are arranged in CNUM 6 and CNUM 7, while the data for the others, i.e. CNUM 0 through 5 and 8 through f, will be identical for the SAM mode and the DIF mode. The data in CNUM 0 through f are composed respectively of the data on states ST0 through STF positioned at the respective addresses from 0 to F. For example, in CNUM 0, state ST0 is positioned at the address 0 while the data of states ST0 through 4, 6, 7, and 8 are positioned respectively at the addresses 0 through 4, 6, 7, and 8 in CNUM 1 and CNUM 2.

Figure 77:
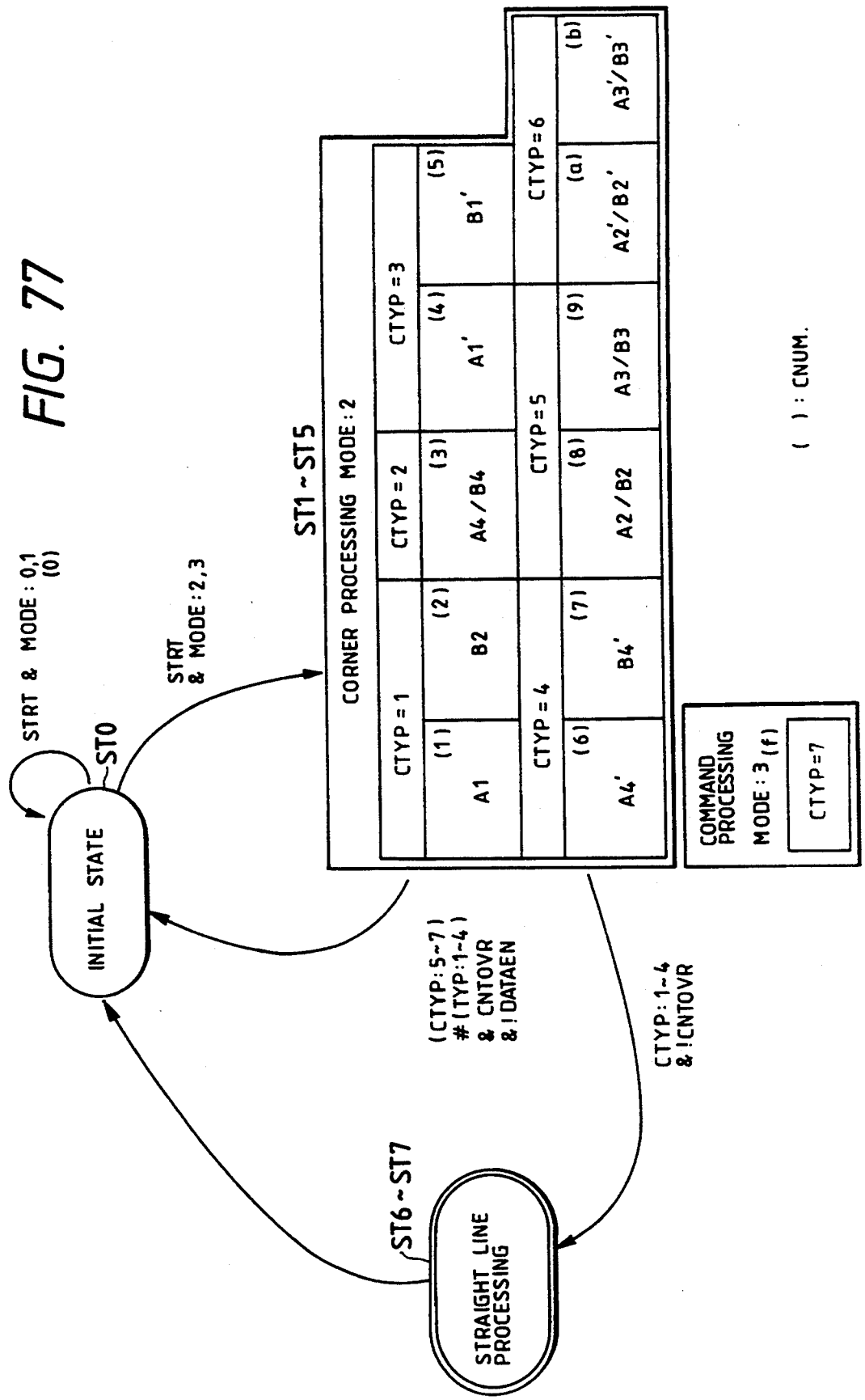
FIG. 77 is a state transition chart for the selection of corner coordinates.

FIG. 77 shows the state transition chart for the corner coordinate selecting section 34 given in FIG. 74. In the initial state ST0, if the signal STRT is turned ON and the mode is either MODE 0 (the start data for the polygon) or MODE 1 (the second data for the polygon) (i.e. in case the signal is CNUM 0), the operation is held in the waiting mode. If the signal STRT is turned ON and the mode is either MODE 2 (which represents the data on the top point of the polygon) or MODE 3 (which represents the command or data to the CADM), the operation shifts to the corner and command processing state.

In the corner and command processing state, the system executes the processing of the corners if the mode is MODE 2, while it executes the processing of the command if the mode is MODE 3.

The processes performed for the processing of the corners are classified into the six types, which are CTYP 1 through 6. CTYP 1 is executed for the corner A1 (CNUM 1) or the corner B1 (CNUM 2). CTYP 2 is executed for the corner A4 or the corner B4 (CNUM 3). CTYP 3 is executed for the corner A1' (CNUM 4) or B1' (CNUM 5). CTYP 4 is executed for the corner A4' (CNUM 6) or the corner B4' (CNUM7). CTYP5 is executed for the corner A2 or B2 (CNUM 8) or the corner A3 or B3 (CNUM 9). CTYP6 is executed for the corner A2' or B2' (CNUM a) or the corner A3' or B3' (CNUM b).

The command processing is executed for CNUM f and it is known as CTYP 7.

In the corner and command processing state, the operation returns to state ST0 when the type of corner processing is CTYP 1 through 4 or 5 through 7 and the signal CNTOVR is logical 1 and the signal DATAEN is logical 0. The operation shifts to the straight line processing state (ST6 and ST7) when the type of corner processing is CTYP 1 through 4 and the signal CNTOVR is logical 0. After the completion of the straight line processing state, the operation returns to state ST0.

Figure 78:
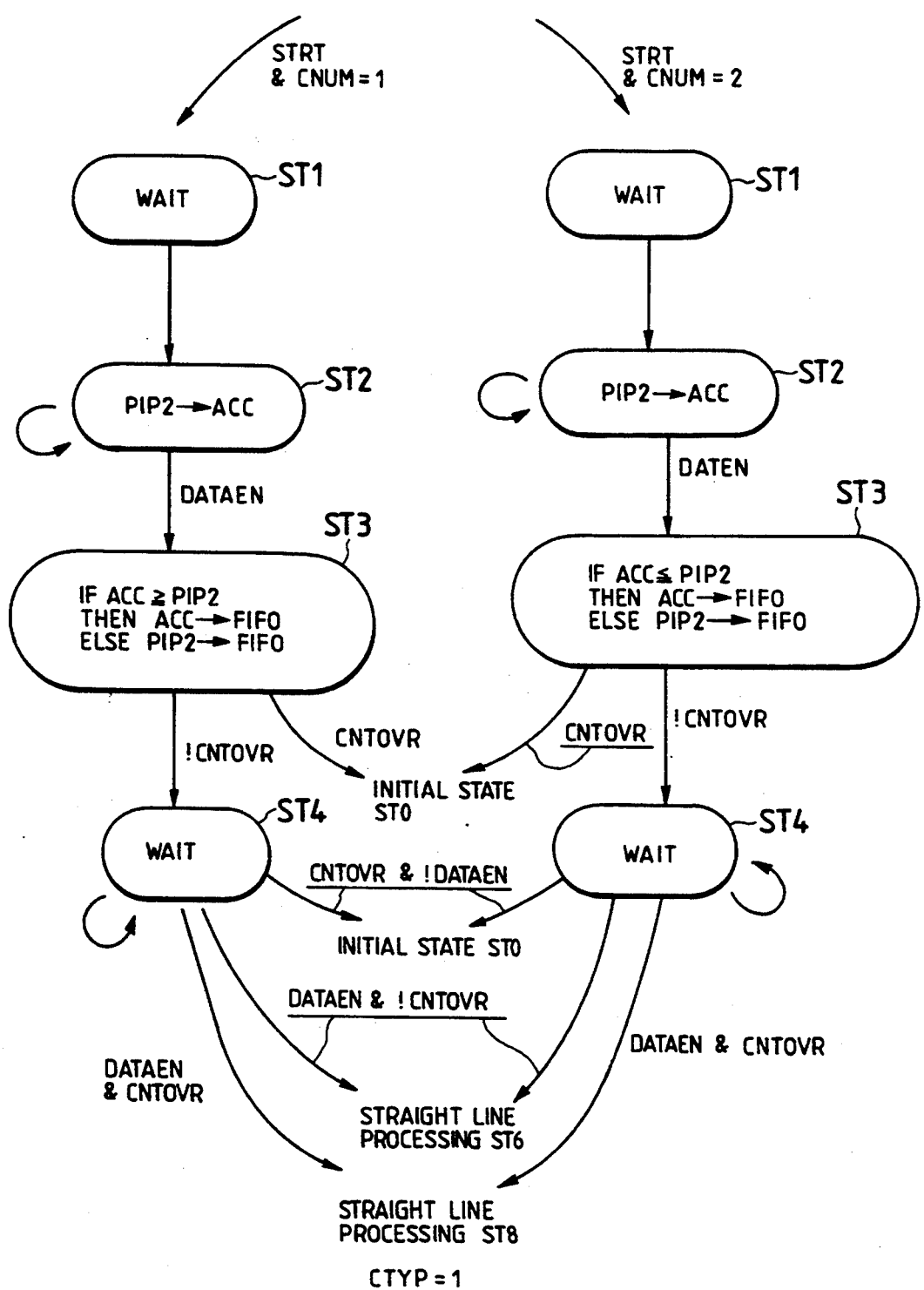
FIG. 78 is a state transition chart for the processing of corners of CTYP1.

FIG. 78 shows the state transition chart for the processing of the corners in the corner processing state CTYP 1. The processing operation shifts to state ST2 via state ST1 when the signal STRT is turned ON and the control signal is CNUM 1, and there the data (END X) in the pipeline register PIP2X 83 are latched in the register ACC 93. In state ST2, the operation is held in the waiting state when the signal DATAEN is logical 0, and shifts to state ST3 when the said signal DATAEN is logical 1 (i.e. when the START X is latched in the pipeline register PIP2X 83).

In state ST3, the value in the register ACC 93 and the value in the pipeline register PIP2X 83 are compared by the comparator CMP/MUX 95. If the former is equal to or larger than the latter, the value in the register ACC 93 is transferred to the FIFO X 97. If the former is smaller than the latter, the data in the pipeline register PIP2X 83 are transferred to the output FIFO X 97. Thus, the larger of the value in the register ACC 93 and the value in the pipeline register PIP2X 83 is transferred to the output FIFO X 97. In state ST3, the operation returns to initial state ST0 when the signal CNTOVR is logical 1, but shifts to state ST4 when the said signal is logical 0. In state ST4, the operation shifts to initial state ST0 when the signal CNTOVR is logical 1 and the signal DATAEN is logical 0; to state ST6 for the processing of the straight line when the signal CNTOVR is logical 0 and the signal DATAEN is logical 1; to state ST8 for the processing of the straight line when both of the signal CNTOVR and the signal DATAEN are logical 1; and is held in the waiting state in any other case.

With the signal CNUM 2, the same processes as with the signal CNUM 1 are performed, except that the smaller of the value in the register ACC 93 and the value in the pipeline register PIP2X 83 is transferred to the output FIFO X 97 in state ST3.

Figure 79:
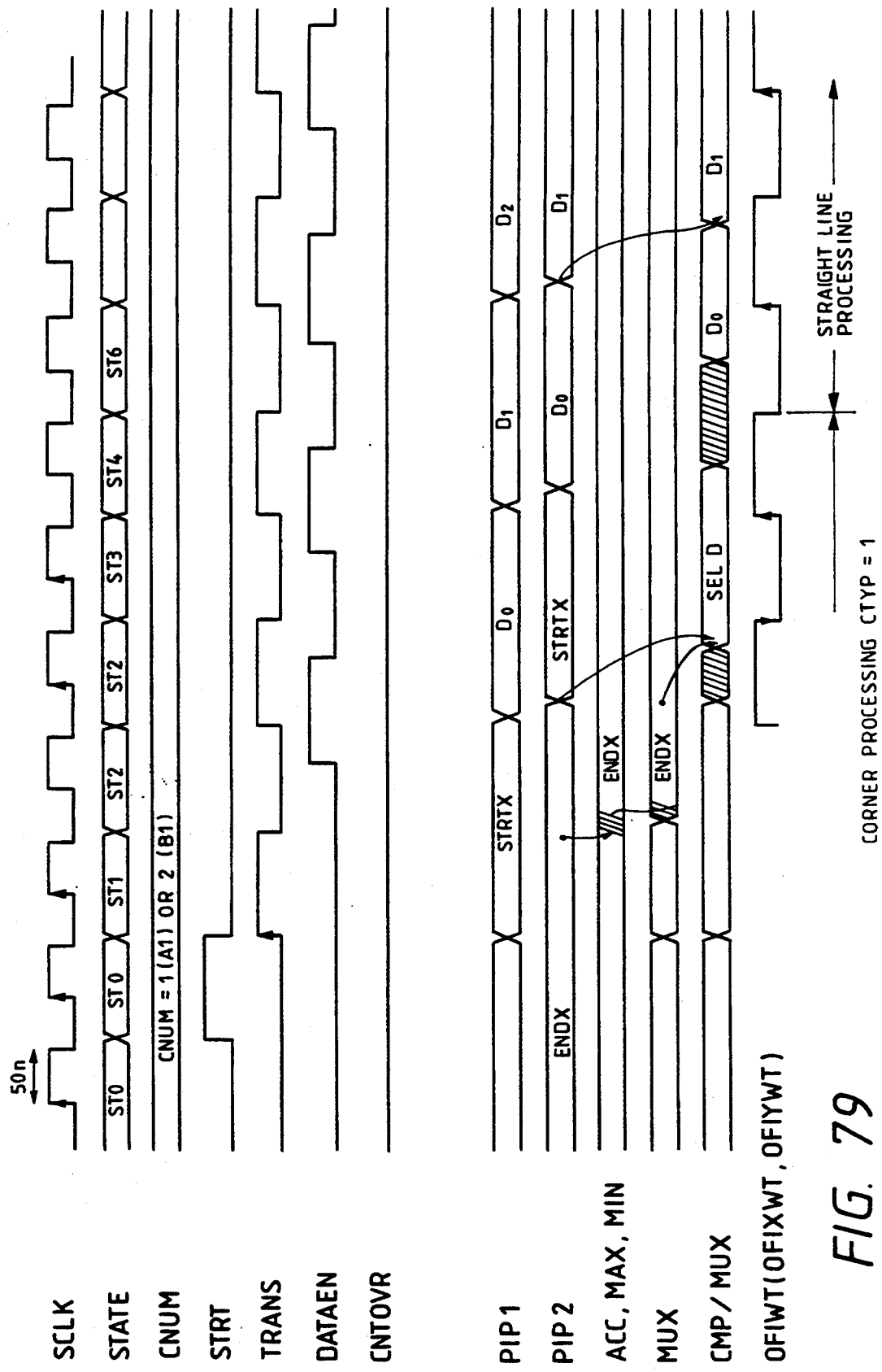
FIG. 79 is a timing chart for the processing of the corners of CTYP1.

FIG. 79 shows the timing chart for the processing of the corners in the CTYP1. In state ST2, the the data END X in the pipeline register PIP2X 83 is latched in the register ACC 93, and further is output to the comparator CMP/MUX 95 by way of the multiplexer 94. Meanwhile, the START X is latched in the pipeline register PIP1X 82 in state ST1 in synchronization with the rising edge of the signal TRANS, and, in state ST2, this START X is transferred to the pipeline register PIP2X 83. In state ST3, the comparator CMP/MUX 95 compares the END X input into it from the multiplexer 94 with the START X input from the pipeline register PIP2X 83, and the comparator selects and outputs either the larger value of these two (in the case of CNUM1) or the smaller value of these (in the case of CNUM 2). The selected data are latched in the output FIFO X 97 in synchronization with the rising edge of the signal OFIXWT 97.

Figure 80:
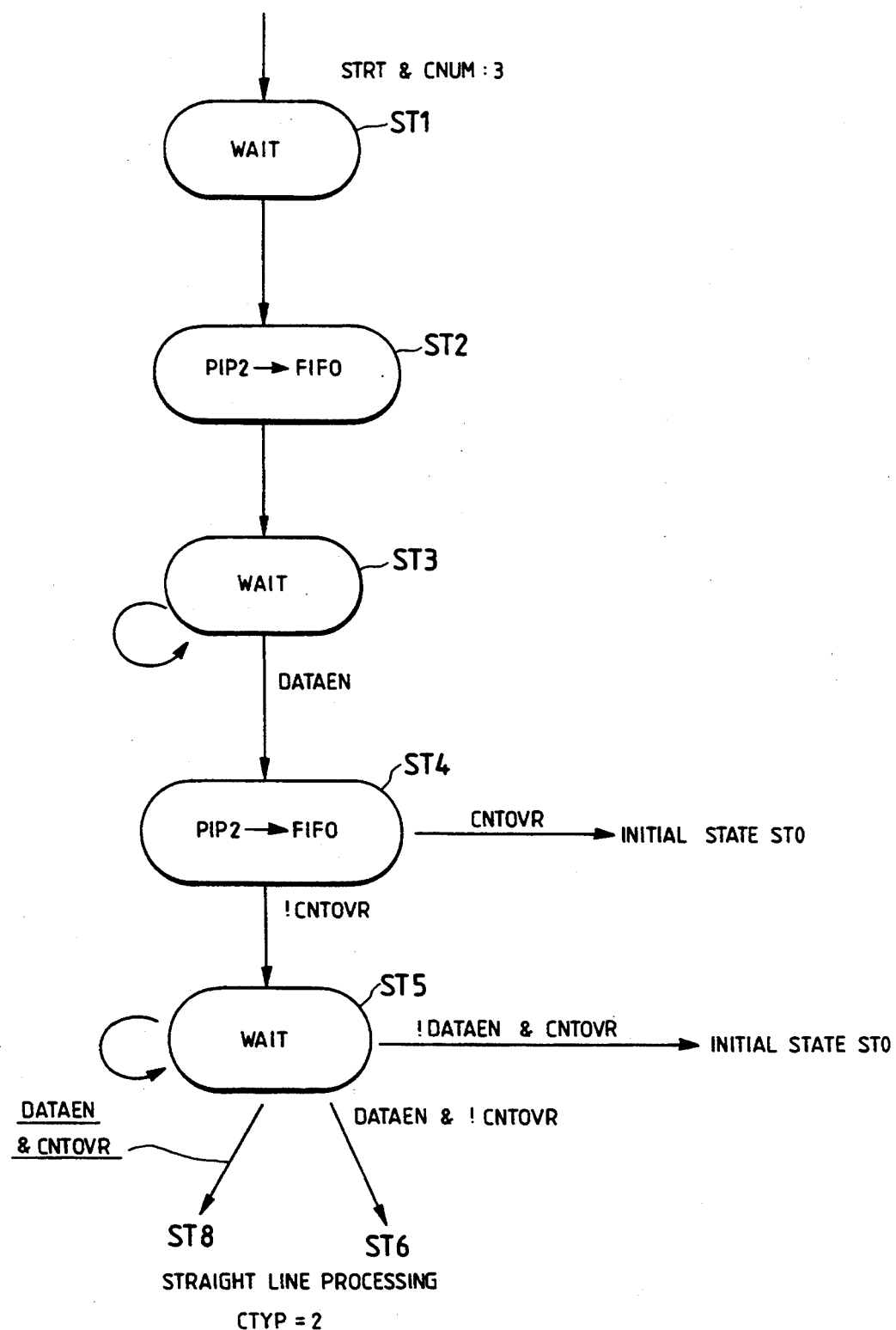
FIG. 80 is a state transition chart for the processing of the corners of CTYP2.

FIG. 80 shows the state transition chart for the processing of corners in the CTYP 2. When the operation has shifted to state ST2 via state ST1, the value in the pipeline register PIP2X 83 is written in the output FIFO X 97. Next, the operation shifts to state ST3 and is kept in the waiting state until the signal DATAEN becomes logical 1, and the operation shifts to state ST4 when DATAEN has become logical 1. Here, the data in the pipeline register PIP2X 83 are written in the output FIFO X 97. When the signal CNTOVR is logical 1, the operation shifts respectively to state ST0, but shifts to state ST5 when CNTOVR is logical 0. In state ST5, the operation shifts to state ST0 when the signal DATAEN is logical 0 and the signal CNTOVR is logical 1; to state ST6 for the processing of the straight line when the signal DATAEN is logical 1 and the signal CNTOVR is logical 0; and to state ST8 for the processing of the straight line when both of the signal DATAEN and the signal CNTOVR are logical 1, but is held in the waiting state in any other case.

Figure 81:
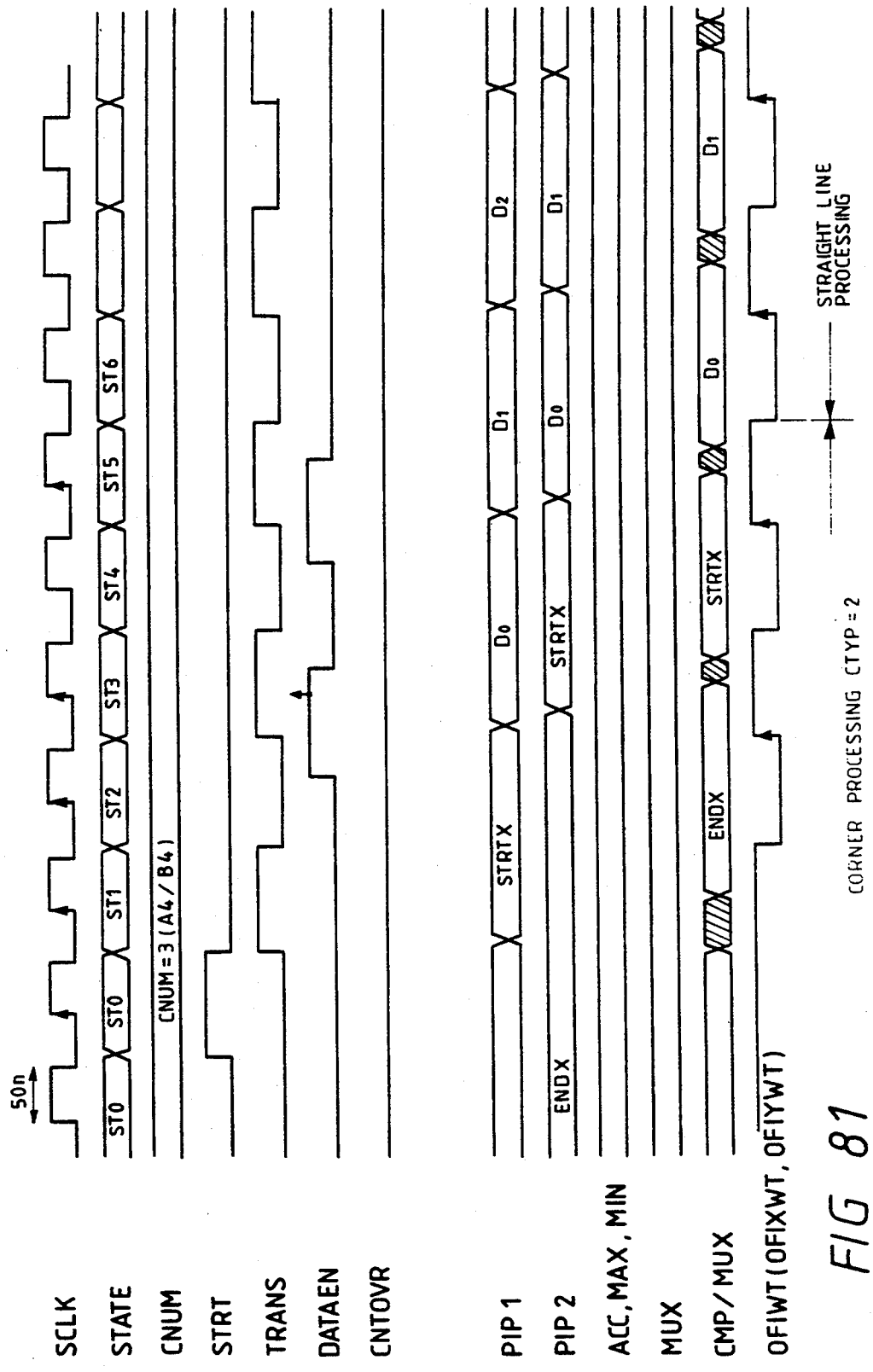
FIG. 81 is a timing chart for the processing of the corners of CTYP2.

FIG. 81 presents the timing chart for the processing of corners in the CTYP 2. The END X is latched in the pipeline register PIP2X 83, and, in state ST1, the next START X is latched in the pipeline register PIP1X 82. In state ST2, the END X of the pipeline register PIP2X 83 is output from the comparator CMP/MUX 95, and is written into the output FIFO X 97 in synchronization with the rising edge of the signal OFIXWT. In state ST3, the START X of the pipeline register PIP1X 82 is transferred to the pipeline register PIP2X 83 in synchronization with the rising edge of the signal TRANS and is output from the comparator CMP/MUX 95. This START X is latched in the output FIFO X 97 in synchronization with the rising edge of the signal OFIXWT state ST4.

Figure 82:
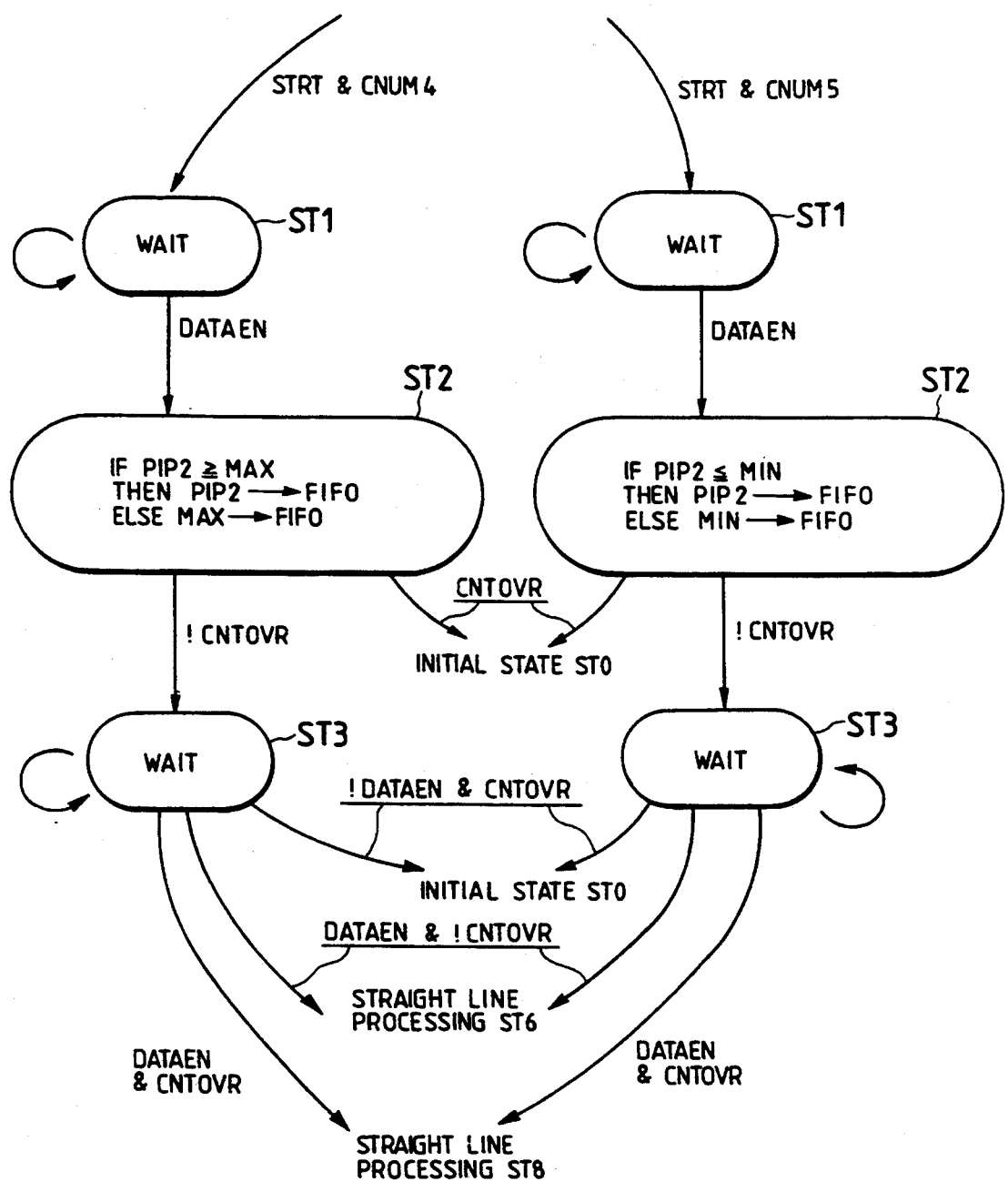
FIG. 82 is a state transition chart for the processing of the corners of CTYP3.

FIG. 82 presents the state transition chart for the processing of the corners in the CTYP 3. The operation is held in the waiting mode when the signal DATAEN is logical 0 with the signal STRT set ON and with the control signal CNUM 4 specified for it, but shifts to the initial state when DATAEN is logical 1 (i.e. when the START X is latched in the pipeline register PIP2X 83).

In state ST2, the value of the pipeline register PIP2X 83 and the value of the register MAX 92 are compared by the comparator CMP/MUX 95. When the former is equal to or larger than the latter, the value of the pipeline register PIP2X 83 is transferred to the output FIFO X 97. When the former value is smaller than the latter, the data in the register MAX 92 are transferred to the output FIFO X 97. Thus, the larger of the value in the register MAX 92 and that of the pipeline register PIP2X 83 is transferred to the output FIFO X 97. In state ST2, the operation shifts to initial state ST0 when the signal CNTOVER is logical 1, but shifts to state ST3 when the said signal is logical 0. In state ST3, the operation shifts respectively to initial state ST0 when the signal CNTOVR is logical 1 while the signal DATAEN is logical 0 ; to state ST6 when the signal CNTOVER is logical 0 while the signal DATAEN is logical 1; and to state ST8 for the processing of the straight line when both the signal CNTOVR and the signal DATAEN are logical 1, but it is held in the waiting state in any other case.

The same processes for CNUM5 are performed as for CNUM4, except that the smaller of the-value in the pipeline register PIP2X 83 and that of the register MIN 91 is output to the output FIFO X 97.

Figure 83:
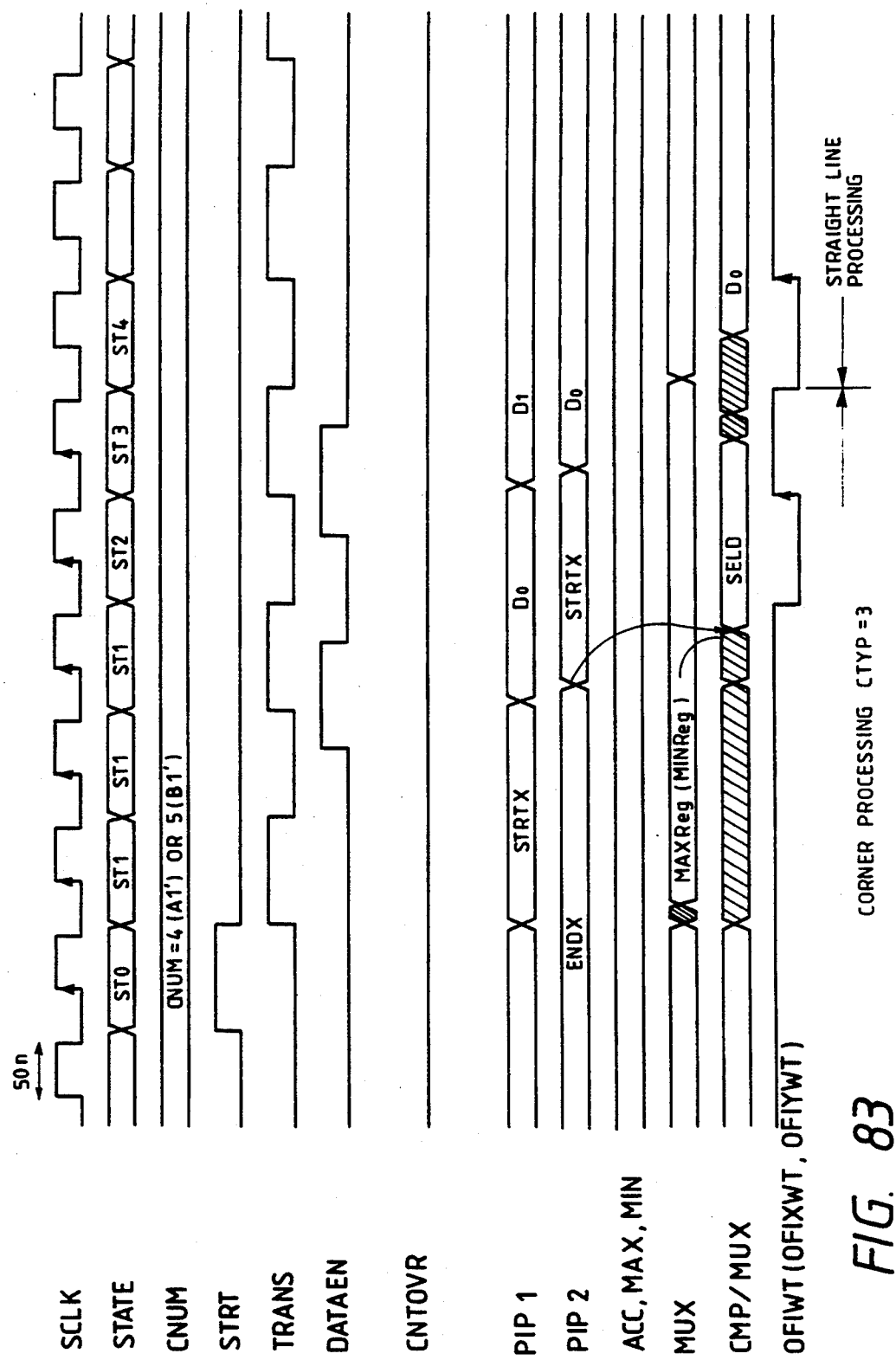
FIG. 83 is a timing chart for the processing of the corners of CTYP3.

FIG. 83 shows the timing chart for the processing of the corners in the CTYP3. In state ST1, the START X is latched in the pipeline register PIP1X 82 and, at the same time, the multiplexer 94 outputs the value of the register MAX 92 (in the case of the CNUM 4) or the value of the register MIN 91 (in the case of the CNUM 5). When the signal DATAEN is set ON, the START X is further transferred to the pipeline register PIP2X 83. In state ST2, the comparator CMP/MUX 95 selects and outputs the larger of the value of the register MAX 92 and that of the START X in the case of the CNUM 4, but the smaller of the value of the register MIN 91 and that of the START X in the case of the CNUM 5 respectively. The selected data are written in the output FIFO X 97 in synchronization with the rising edge of the signal OFIXWT.

Figure 84:
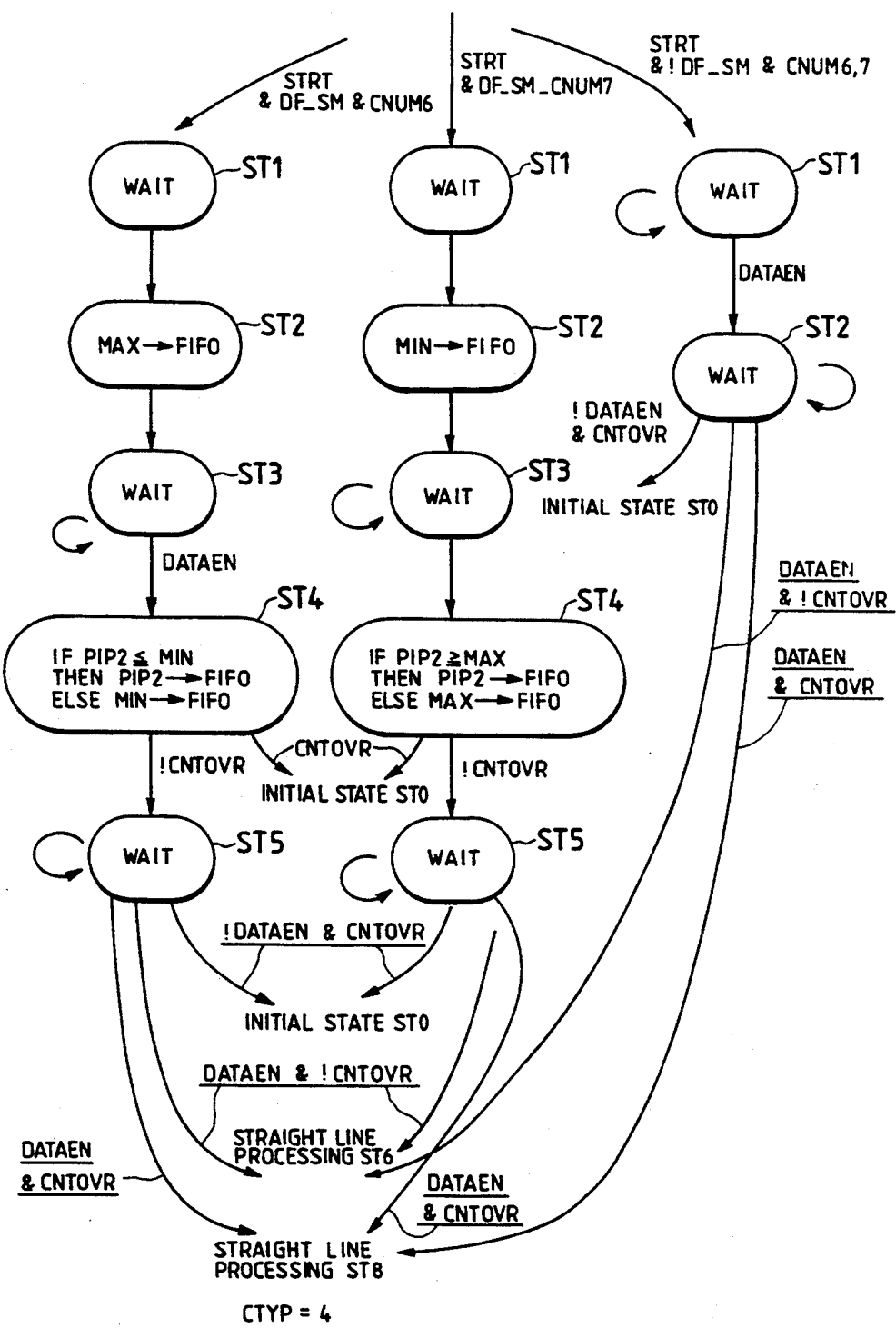
FIG. 84 is a state transition chart for the processing of the corners of CTYP4.

FIG. 84 shows the state transition chart for the processing of corners in the CTYP 4. In the case of the CNUM6, the operation shifts to state ST2 via state ST1, and there the value of the register MAX 92 is written in the output FIFO X 97. Thereafter, the operation shifts o state ST3, where it is kept in the waiting state until the signal DATAEN becomes logical 1. The operation shifts to state ST4 when DATAEN has become logical 1. In state ST4, the value of the pipeline register PIP2X 83 and the value of the register MIN 91 are compared, and the smaller of these values is written in the output FIFO X 97. Furthermore, the operation shifts to state ST0 when the signal CNTOVR is logical 1 and to state ST5 when CNTOVR is logical 0. In state ST5, the operation shifts respectively to state ST0 when the signal DATAEN is logical 0 and the signal CNTOVR is logical 1; to state ST6 for the processing of the straight line when the signal DATAEN is logical 1 and the signal CNTOVR is logical 0; to state ST8 for the processing of the straight line when both of the signal DATAEN and the signal CNTOVR are logical 1; and is held in the waiting state in any other case.

The same processes for CNUM 7 are performed as for CNUM 6, except that the value of the register MIN 91 written to the output FIFO X 97 in state ST2, and the larger of the value of the pipeline register PIP2X 83 and the value of the register MAX 92 is written to the output FIFO X 97 in state ST4.

The operations described above are performed if signal DIF or the signal SAM is logical 1 (in the case of the DIF mode). If the signal is logical 0 (i.e. in the SAM mode), the operation is held in the waiting state until the signal DATAEN becomes logical 1 in state ST1 and thereafter shifts to state ST2. In state ST2, the operation shifts respectively to state ST0 when the signal DATAEN is logical 0 and the signal CNTOVR is logical 1; to state ST6 for the processing of the straight line when the signal DATAEN is logical 1 and the signal CNTOVR is logical 0; to state ST8 for the processing of the straight line when both of the signal DATAEN and the signal CNTOVR are logical 1; and is held in the waiting state in any other case.

Figure 85:
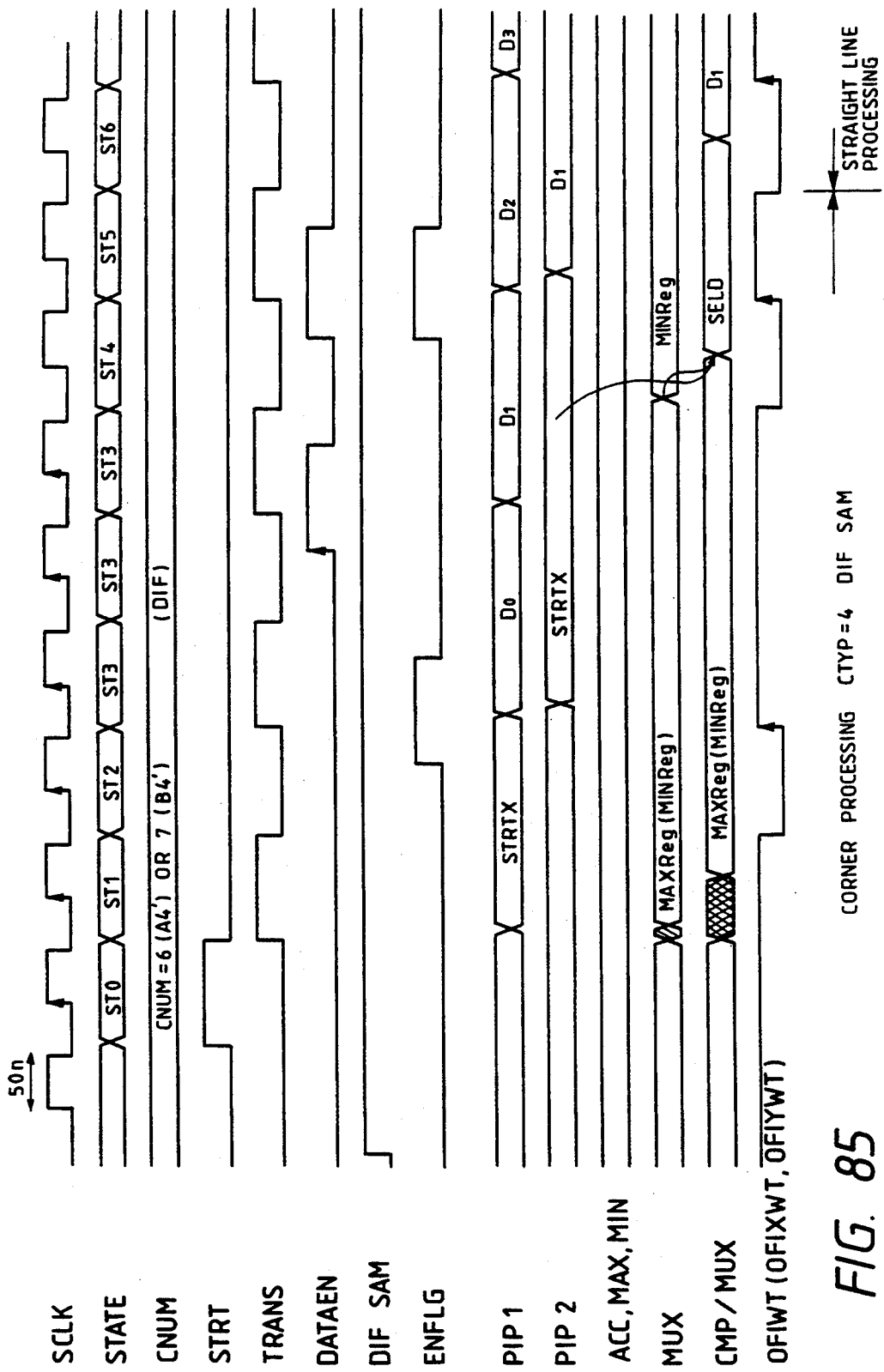
FIGS. 85 and 86 are timing charts for the processing of the corners of CTYP4.

FIG. 85 shows the timing chart for the processing of the corners when the signal DIF or the signal SAM is logical 1 (i.e. in the DIF mode) in the CTYP 4. In state ST1, the multiplexer 94 and also the comparator CMP/MUX 95 select and output the value of the register MIN 91 in the operation with the CNUM 6 and the value of the register MAX 92 when the operation is performed with the CNUM7, respectively. The selected and output value is written to the output FIFO X 97 in synchronization with the timing of the rising edge of the signal 0FIXWT in state ST2. The START X is transferred from the pipeline register PIP1X 82 to the pipeline register PIP2X 83 in state ST3. The START X is compared with the value of the register MIN 91 or the value of the register MAX 92 in state ST4, and the smaller value or the larger value is selected and then written in the output FIFO X 97 at the timing of the rising edge of the signal OFIXWT.

Figure 86:
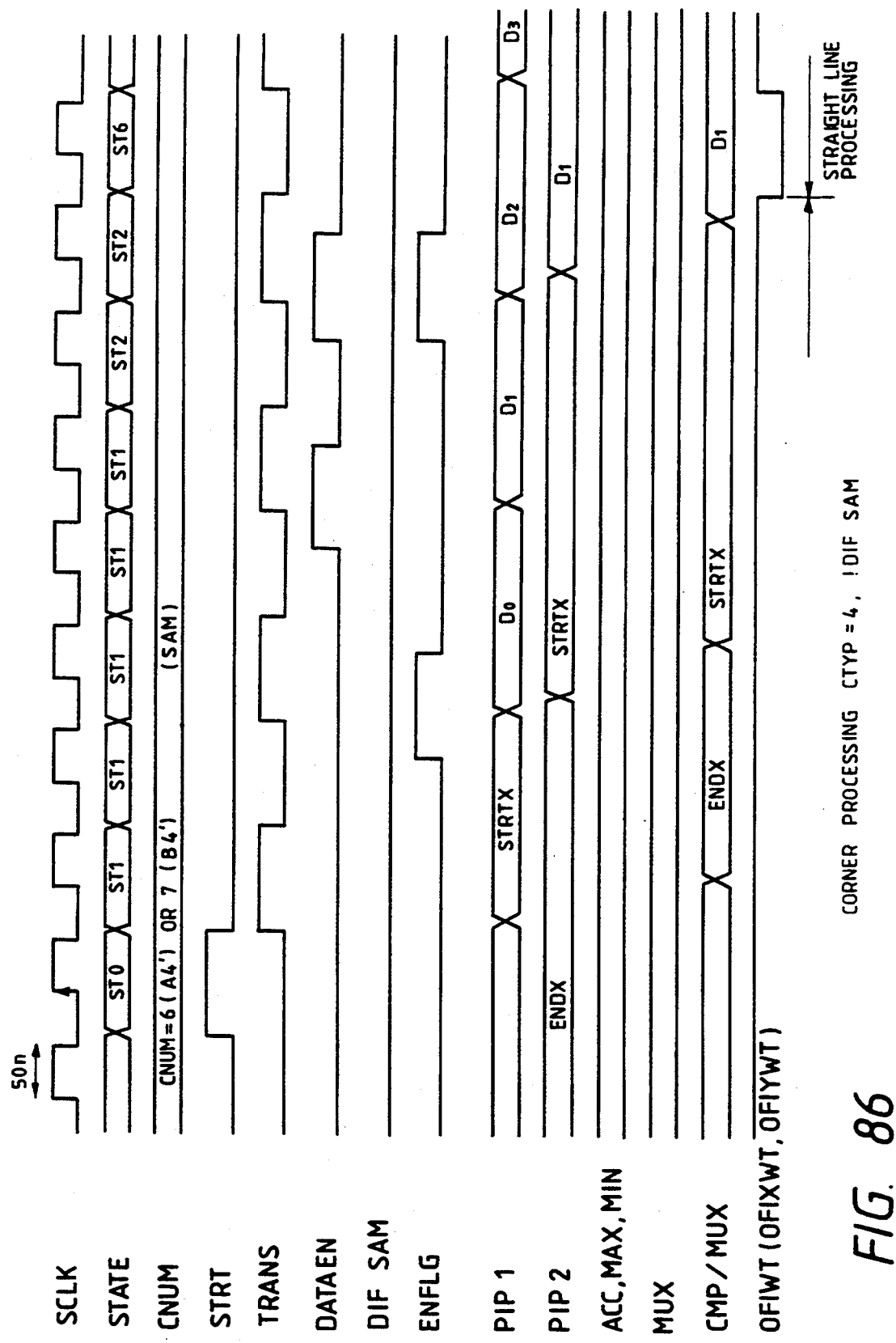

FIG. 86 shows the timing chart for the case which the signal DIF or the signal SAM is logical 0 (i.e. in the SAM mode) in the operation in the CTYP 4. In this case, the START X is latched in the pipeline register PIP1X 82 in state ST1. START X further is transferred to the pipeline register PIP2X 83. The subsequent data $D_0$, $D_1$ are latched successively in the pipeline register PIP1X 82, and, in state ST2, the data $D_1$ are transferred to the pipeline register PIP2X 83 and are output from the comparator CMP/MUX 95.

Figure 87:
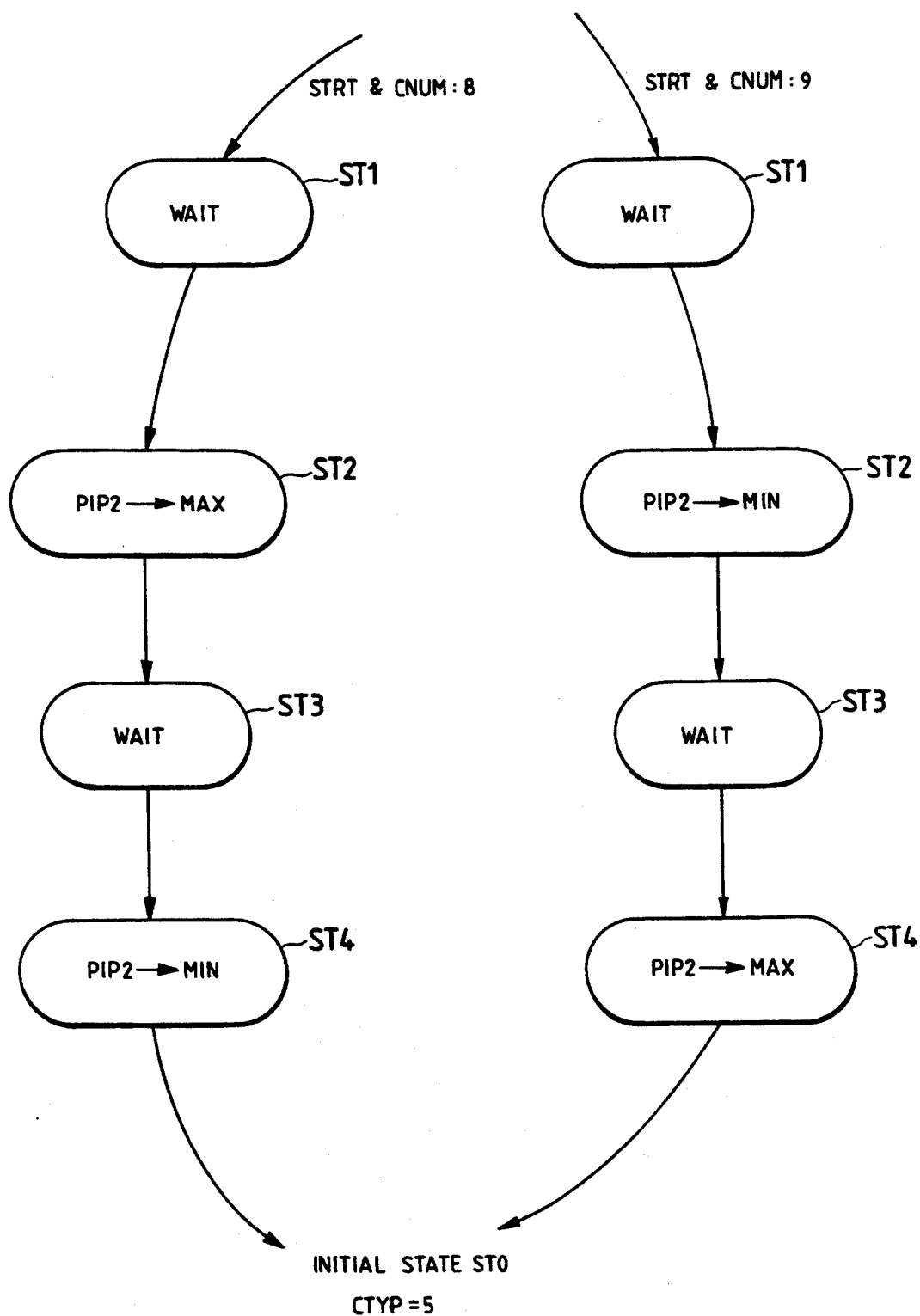
FIG. 87 is a state transition chart for the processing of the corners of CTYP5.

FIG. 87 shows the state transition chart for the processing of the corners in the case of the operation in the CTYP 5. For CNUM 8, the operation shifts to state ST2 via state ST1, and there the value of the pipeline register PIP2X 83 is latched in the register MAX 92. Thereafter, the operation shifts to state ST4 via state ST3, and, after the value of the pipeline register PIP2X 83 is latched in the register MIN 91 in state ST4, the operation shifts to state ST0.

The same processes for CNUM 9 are performed as for CNUM 8, except that the value of the pipeline register PIP2X 83 is transferred to the register MIN 91 in state ST2 and to the register MAX 92 in state ST4.

FIG. 88 shows the timing chart for the processing of the corners in the operations in the CTYP 5. In state ST1, the START X is latched in the pipeline register PIP1X 82, and also the END X of the pipeline register PIP2X 83 is output from the comparator CMP/MUX 95. In state ST2, the END X output from the comparator CMP/MUX 95 is latched in the register MAX 92 (in the case of the CNUM 8) and in the register MIN 91 (in the case of the CNUM9). In state ST3, the START X is transferred from the pipeline register PIP1X 82 to the pipeline register PIP2X 83 and is output from the comparator CMP/MUX 95. This START X is latched in the register MIN 91 (for CNUM 8) or in the register MAX 92 (for CNUM 9).

Figure 89:
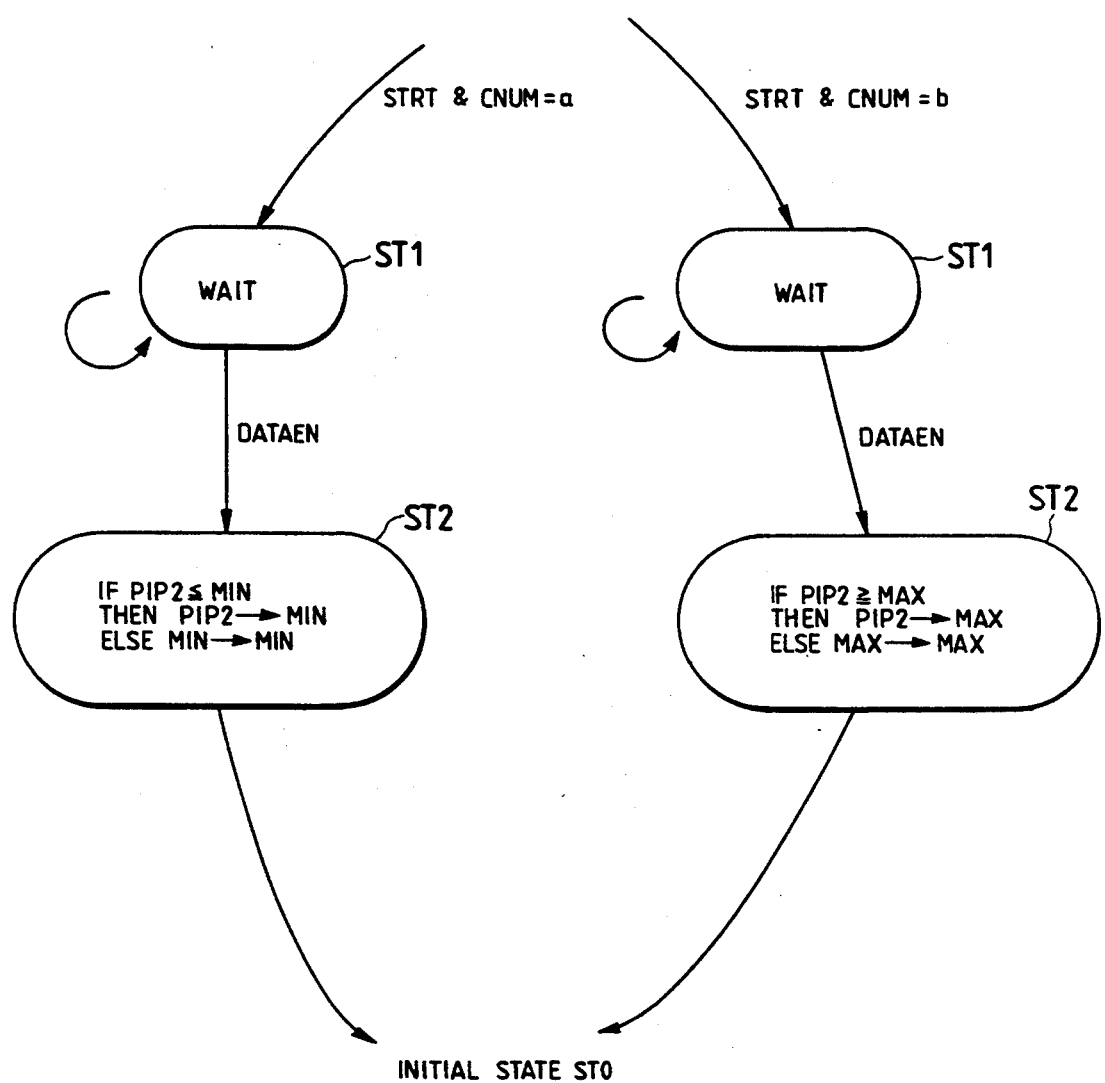
FIG. 89 is a state transition chart for the processing of the corners of CTYP6.

FIG. 89 shows the state transition chart for the processing of the corners in the operation with CTYP 6. For CNUM a, the operation is held in the waiting state until the signal DATAEN becomes logical 1 in state ST1. When DATAEN has become logical 1, the operation shifts to state ST2. The value of the pipeline register PIP2X 83 and the value of the register MIN 91 are compared in state ST2, and the smaller of these values is latched in the register MIN 91, after which the operation shifts to state ST0.

The same processes for CNUMb are performed as for CNUM a, except that the point that the value of the pipeline register PIP2X 83 and the value of the register MAX 92 are compared in state ST2, and the larger of these values is latched in the register MAX 92.

FIG. 90 is the timing chart for the processing of the corners in the CTYP 6. In state ST1, the multiplexer 94 outputs the value of the register MIN 91 (for CNUM a) or the value of the register MAX 92 (for CNUM b), and, at the same time, START X is transferred from the pipeline register PIP1X 82 to the pipeline register PIP2X 83. In state ST2, the comparator CMP/MUX 95 compares START X with the value of the register MIN 91 (for CNUM a) or with the value of the register MAX 92 (for CNUM b), and the smaller or the larger of these values is latched in the register MIN 91 or the register MAX 92, as the case may be at each time.

Figure 91:
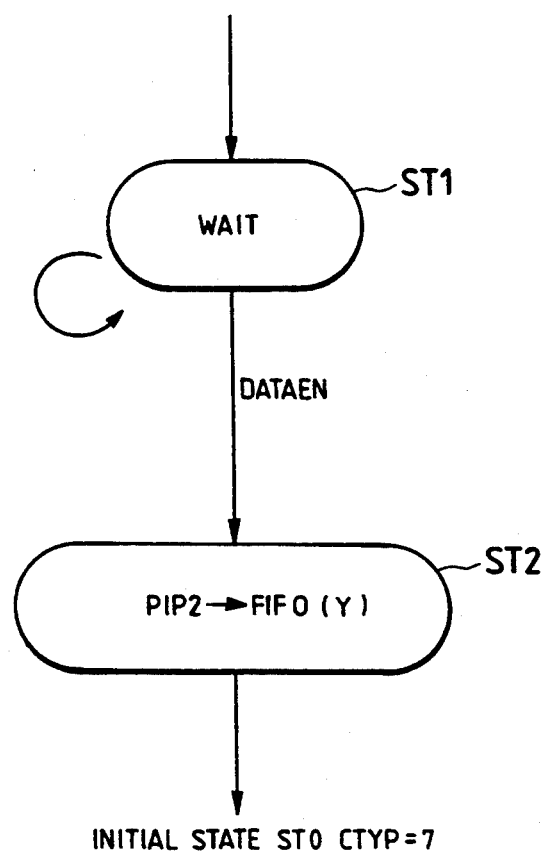
FIG. 91 is a state transition chart for the processing of the commands of CTYP7.

FIG. 91 shows the state transition chart for the processing of the commands in the case of the operation with CTYP 7. In state ST1, the operation shifts to state ST2 when the signal DATAEN becomes logical 1. In state ST2, the data in the pipeline registers are transferred to the output FIFO Y 98, after which the operation returns to state ST0.

FIG. 92 shows the timing chart for the processing of the commands with CTYP 7. In state ST1, the command CMND, which is latched in the pipeline register PIP1Y 84, is transferred to the pipeline register PIP2Y 85, in synchronization with the signal TRANS, when the signal DATAEN is set ON. In state ST2, the command is written in the output FIFO Y 98 at the timing of the rising edge of the signal OFIYWT.

The command which controls the CADM (the sorter 22) is input only into the counter (CAPY) 53, and it is not input into the counter (CAPX) 52. Accordingly, only in the case of this process, only the output FIFO Y 98 operates at the timing set with the signal OFIYWT, but, in the case of the other processes, the data are latched simultaneously in the output FIFO X 97 and the output FIFO Y 98 in synchronization with the signal OFIWT (OFIXWT and OFIYWT).

Figure 93:
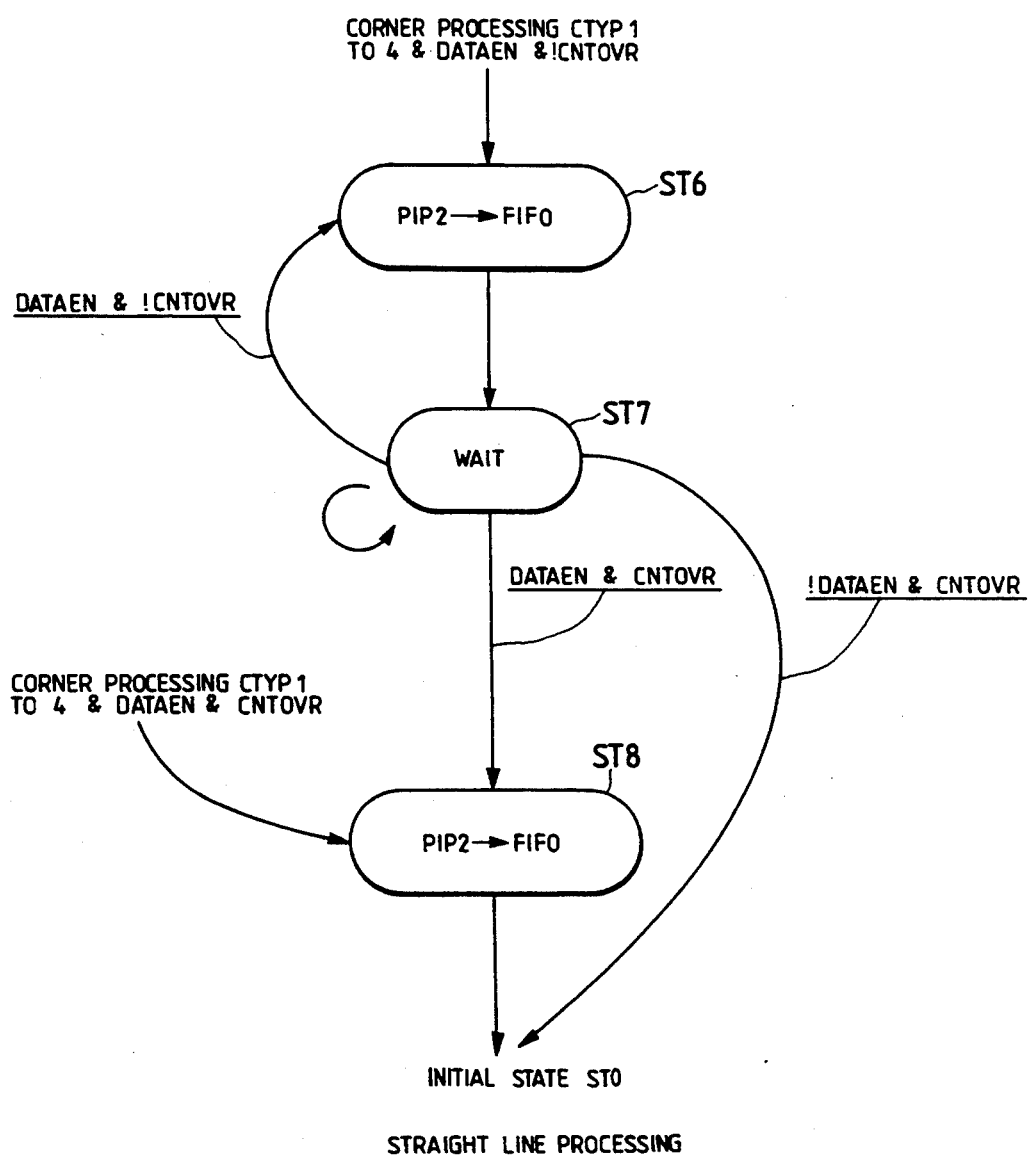
FIG. 93 is a state transition chart for the processing of a straight line.

FIG. 93 shows the state transition chart for the processing of the straight line. If signal DATAEN is logical 1 and the signal CNTOVR is logical 0 in the CTYP1 through 4, the data in the pipeline register PIP2X 83 and the data in the pipeline register PIP2Y 85 are written respectively to the output register FIFO X 97 and the output register FIFO Y 98 in state ST6. Next, the operation shifts to state ST7, and then the operation shifts respectively to state ST0 when the signal DATAEN is logical 0 and the signal CNTOVR is logical 1; to state ST8 when both the signal DATAEN and the signal CNTOVR are logical 1, and to state ST6 when the signal DATAEN is logical 1 and the signal CNTOVR is logical 0. The operation is kept in the waiting state in any other case.

In case both of the signal DATAEN and the signal CNTOVR are logical 1 in the operation with the CTYP1 through 4, or if the operation has shifted from state ST7, the output from the pipeline register PIP2X 83 and the output from the pipeline register PIP2Y 85 are latched respectively in the output FIFO X 97 and the output FIFO Y 98, and the operation thereafter shifts to state ST0.

Figure 94:
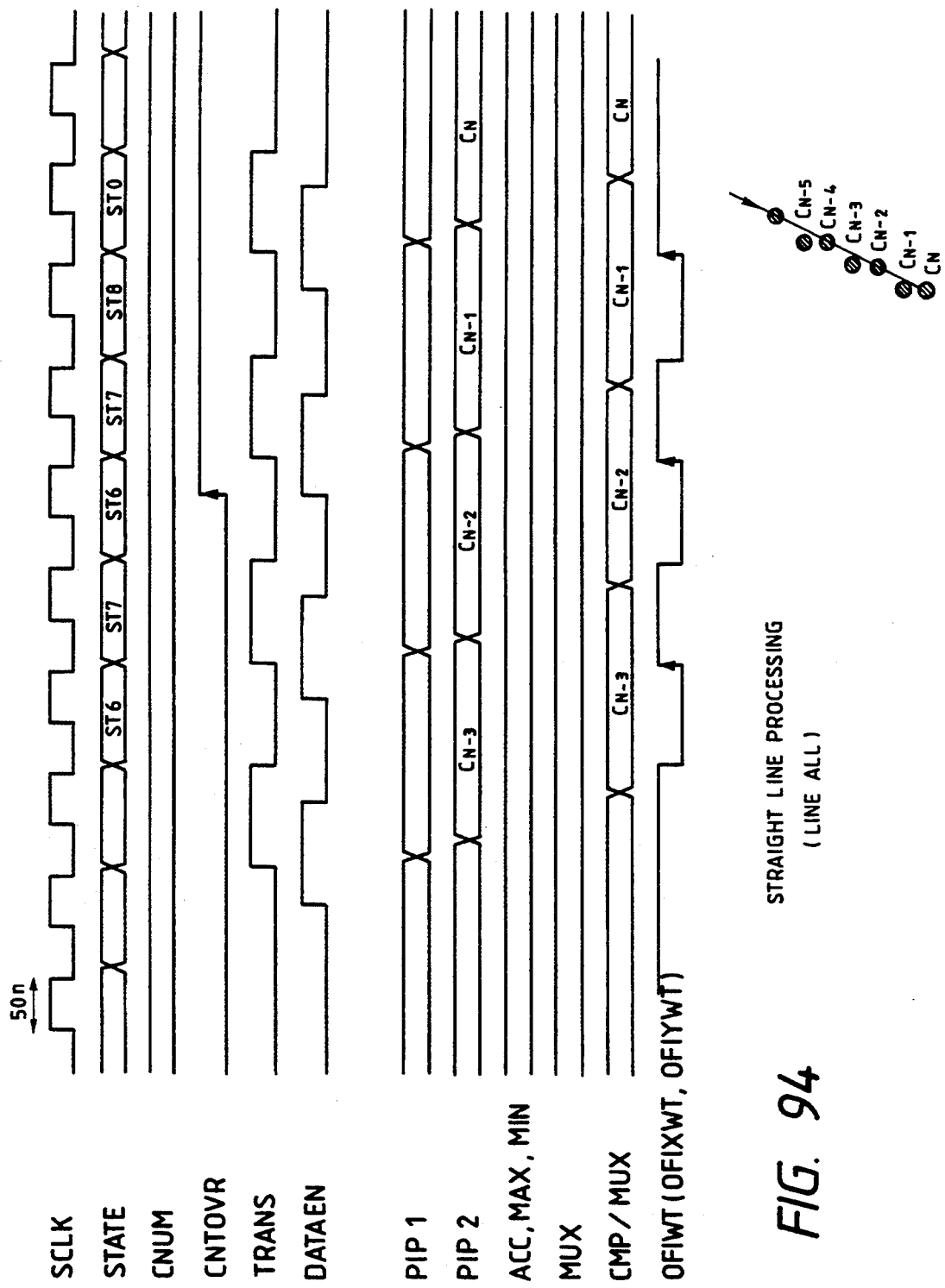
FIG. 94 is a timing chart for the processing of a straight line (LINE ALL)

FIG. 94 shows the timing chart for the processing of the straight line in the proximity of the terminating point $C_N$ in the case of the LINE ALL operation. The state ST6 and ST7 are repeated, and, in each of the states, the data $C_{N-3}$ in the pipeline register PIP2X 83 and the data $C_{N-2}$ in the pipeline register PIP2Y 85 are written successively to the output FIFO X 97 and the output FIFO Y 98, respectively. In state ST7, when the signal DATAEN and the signal CNTOVR become logical 1, the operation shifts to state ST8, and the point $C_{N-1}$, which marks one point before the terminating point $C_N$, is written in the output FIFO X 97 and the output FIFO Y 98. Thereafter, the operation shifts to state ST0.

Figure 95:
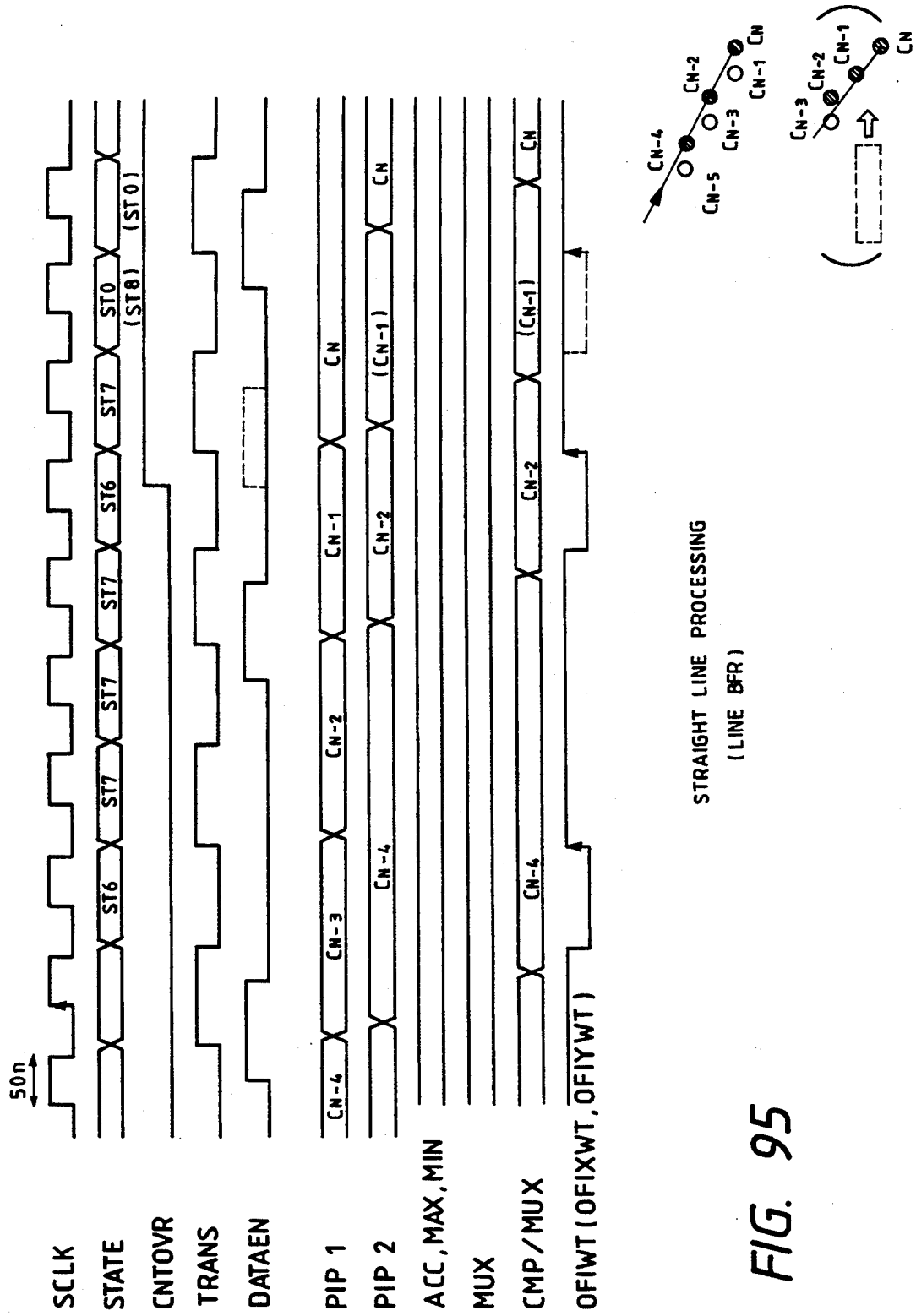
FIG. 95 is a timing chart for the processing of a straight line (LINE BFR)

FIG. 95 shows the timing chart for the processing of the straight line near the proximity of the terminating point $C_N$ in the case of the LINE BFR operation. In state ST6, the output $C_{N-4}$ from the pipeline register PIP2X 83 and the output $C_{N-2}$ from the pipeline register PIP2Y 85 are successively written in the output FIFO X 97 and the output FIFO Y 98, respectively, in synchronization with the rising edge of the signal OFIWT. After that, the operation shifts to state ST0 by way of state ST7.

If the point $C_{N-1}$ immediately preceding the terminating point $C_N$ also is selected, the signal DATAEN is set ON in state ST7, and the operation shifts to state ST8, in which the point $C_{N-1}$ is written in the output FIFO X 97 and the output FIFO Y 98. Thereafter, the operation shifts to state ST0.

Figure 96:
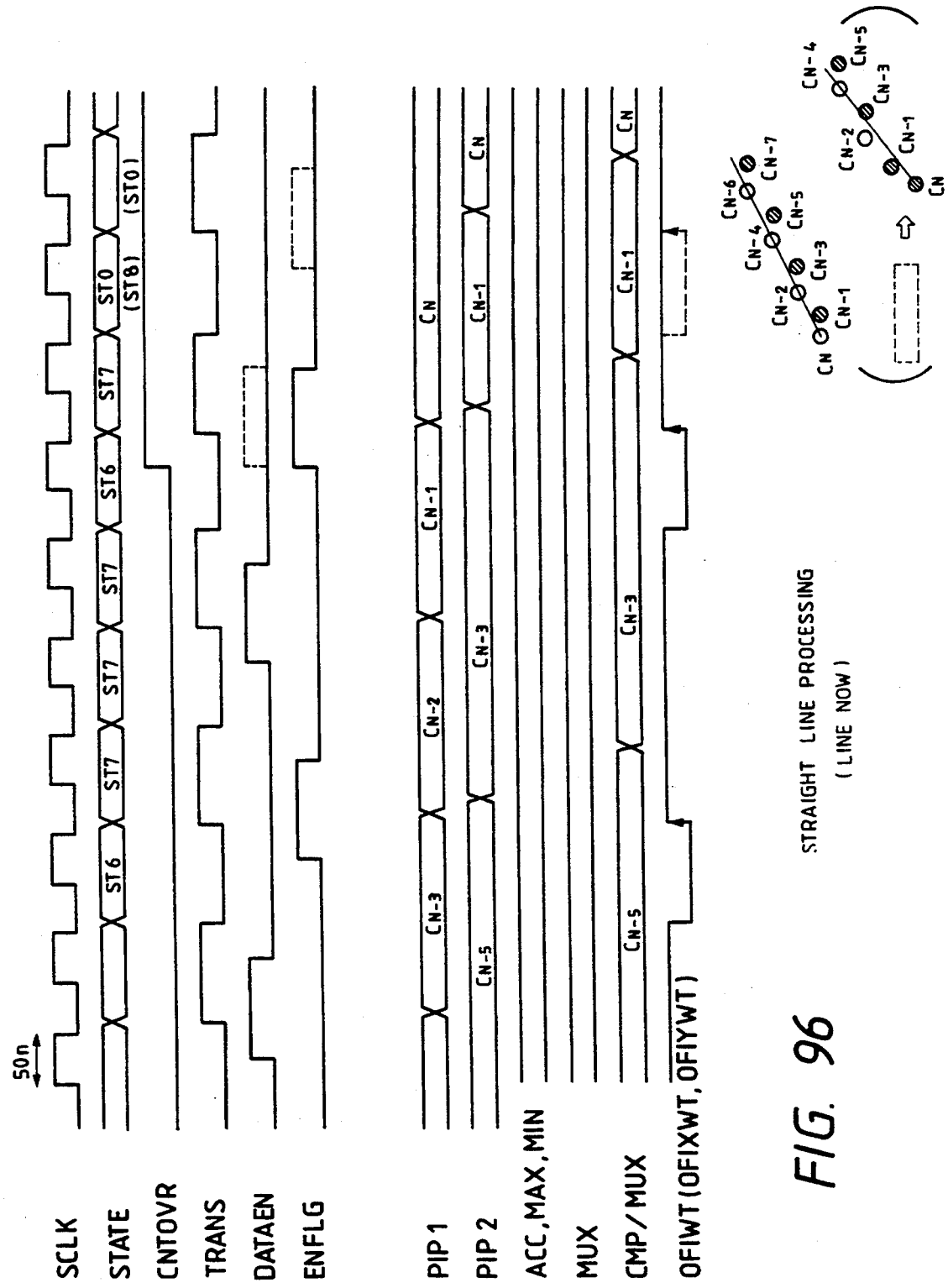
FIG. 96 is a timing chart for the processing of a straight line (LINE NOW)

FIG. 96 shows the timing chart for the processing of the straight line near the terminating point $C_N$ in the case of the LINE NOW operation. In state ST6, the points $C_{N-5}$ and $C_{N-3}$ are written in the output FIFO X 97 and the output FIFO Y 98. Thereafter, if the signal DATAEN is logical 0 in state ST7, the operation shifts to state ST0.

If the terminating point $C_N$ also is selected, the signal DATAEN becomes logical 1 in state ST7, as shown by the broken line in the Figure, and the operation shifts to state ST8. Then, after the point $C_{N-1}$ is written in the output FIFO X 97 and the output FIFO Y 98, the operation shifts to state ST0.

As mentioned above, in the processing of the straight line, the points up to the effective point immediately before the final effective point (i.e. the END X) of the segments of a line are written in the output FIFO. Moreover, the END X is stored in the memory of the pipeline register PIP2 and is used for the processing of the next corner.

Figure 97:
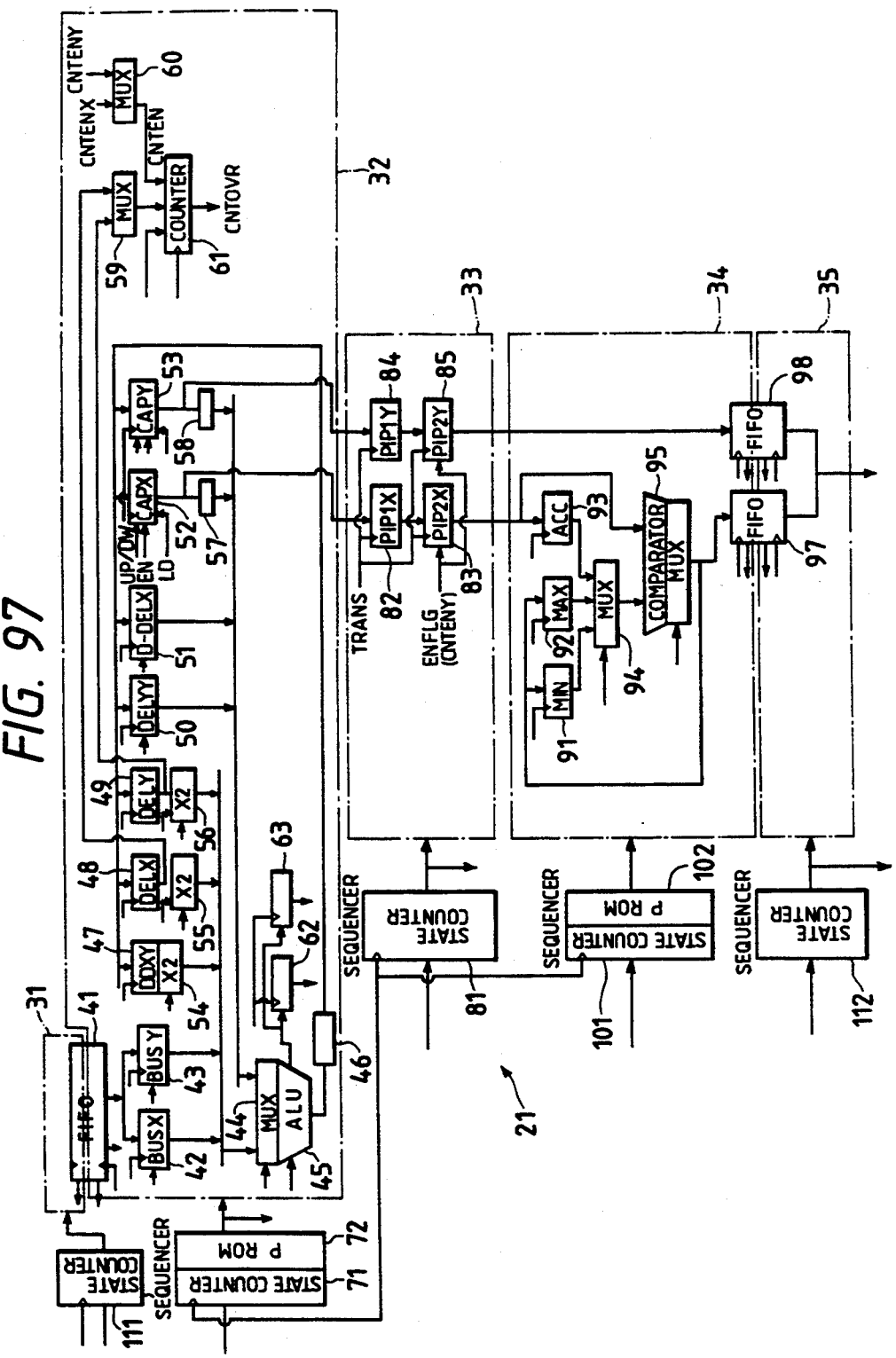
FIG. 97 is the block diagram for the contour coordinate generator.

FIG. 97 is an overall block diagram of the contour coordinate generator 21. In this Figure, state counters 111 and 112 each are composed of a programmable logic device PLD provided with a register. These counter respectively form the sequencer for the input control section 31 and the sequencer for the output control section 35.

Figure 98:
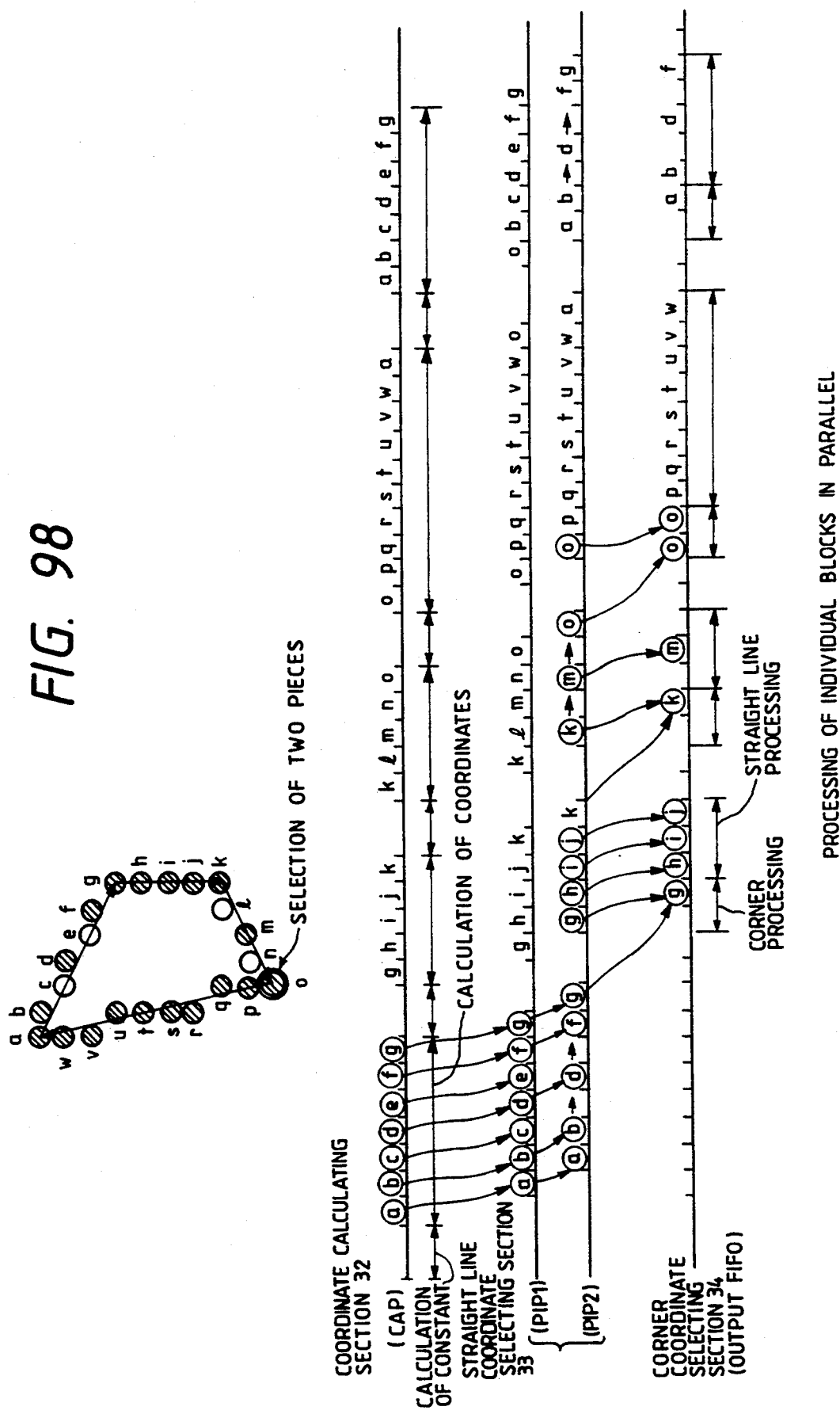
FIG. 98 is a timing chart for the contour coordinate generator.

FIG. 98 presents the timing chart for the overall operations of the contour coordinate generator 21. Now, it is assumed that the data on the polygon composed of the four peaks, a, g, k, and o, are processed in the clockwise rotating direction, and, in the coordinate calculating section 32, arithmetic operations are performed to find the constant for the straight line defined by the starting point a and the terminating point g. Thereafter, the coordinates for the various points between these two points are calculated, and the respective coordinates for the points, a, b, c, d, e, f, and g, are output in regular succession. Subsequently, the same processes are repeated in regular succession with respect to each of the straight lines which are defined by the starting point g and the terminating point k; the starting point k and the terminating point o; the starting point o and the terminating point a; and the starting point a and the terminating point g. For the process in which the point a is taken as a corner, the straight line o a and the straight line a g are necessary, and consequently the straight line a g is processed twice.

The coordinates formed for the individual points by the counters (CAPX) 52 and (CAPY) 53 are transferred in regular succession to the pipeline registers PIP1X 82 and PIP1Y 84, the pipeline registers PIP2X 83 and PIP2Y 85, and the output FIFO X 97 and the output FIFO Y 98 each time one clock TRANS is generated. Although the coordinates for all the points are transferred to the pipeline registers PIP1X 82 and PIP1Y 84, which are positioned on the first stage, only those coordinates for the points which are selected in such a way that two (a plural number of) points are present on the same Y-axis (i.e. the points with hatching executed thereon in the Figure) are transferred to the pipeline registers PIP2X 83 and PIP2Y 85, which are positioned on the second stage. Furthermore, in the corner coordinate selecting section 34, only one point (an odd number of pieces) is present on the same Y-axis in a corner composed, for example, of the point o, and consequently the single point o is selected twice, so that there will be two points on the Y-axis from a formal standpoint. This feature has been introduced in order to make it possible to facilitate the sorting process at the rear stage and the image drawing process between the two points on the Y-axis.

Thus, the coordinates for the points forming the polygon are output from the contour coordinate generator 21 in the regular sequence applied to the tracing of the polygon in the clockwise rotating direction or in the counter-clockwise rotating direction. The sorter 22 provided at the next stage is the device which rearranges these data in a sequence adequate for drawing images with them.

Figure 99:
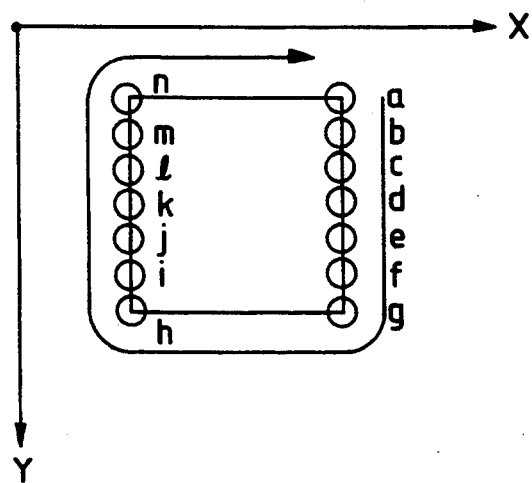
FIGS. 99 and 100 are charts for explaining the sorting process.
Figure 100:
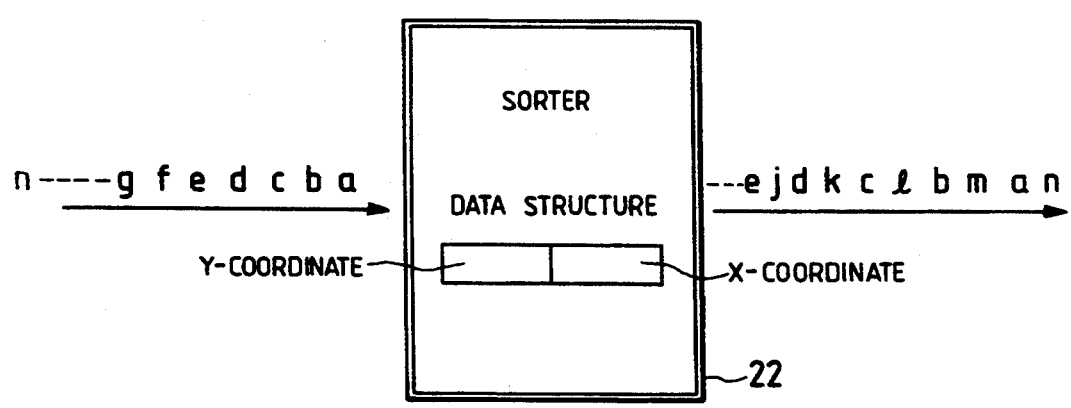

For example, it is assumed that there is a polygon composed of the points a through n, as illustrated in FIG. 99. The contour coordinate generator 21 outputs the coordinates for the points a through n in regular succession in the order of the points on the polygon as traced in the clockwise direction. Then, as illustrated in FIG. 100, the sorter 22 arranges the coordinates for the points in such a way that the two points located on the same Y-axis are set in a pair and additionally that the point with a smaller X-axis coordinate will be positioned before the other, and further that the pair with a smaller value in the Y-axis coordinate will be put in the forward position. That is to say, in the case of the present embodiment, the sequence of the points a, b, c, d, and e ... is re-arranged to form a sequence (n a), (m b), (l c), and (k d).

In order to perform this re-arrangement, the X-coordinates and Y-coordinates for the individual points are combined in such a way that the Y-coordinates will occupy the more important digit. By taking the data (numerals) so combined in sets as single numerals and sorting them so as to position the smaller ones in the preceding places in the sequence, the above-mentioned re-arrangement is accomplished.

Figure 101:
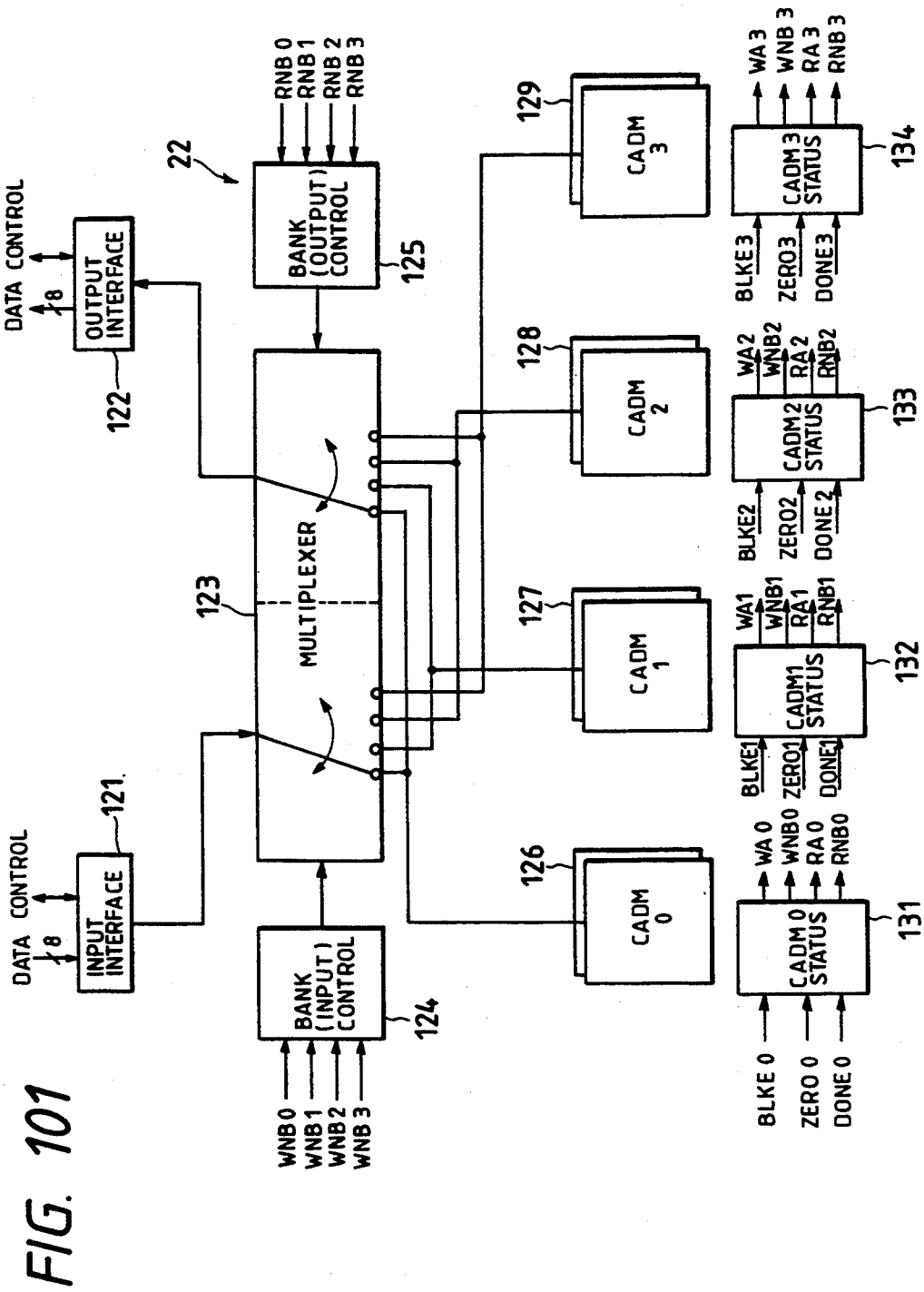
FIG. 101 is a block diagram for the sorting device.

FIG. 101 is a block diagram of the sorter 22, which performs this process as just described, and includes an input interface 121 and an output interface 122. ICs 126 through 129 (with the product name "CADM" (Content Addressable Data Manager), for example) perform the arithmetic operations for sorting the input data in order with the smaller values placed in the earlier positions. The CADMs 126 through 129 are controlled by the sequencers 131 through 134. The sequencer 131 outputs the Write Available Signal WA 0, the Write Next Bank signal WNB 0, the Read Available signal RA 0, and the Read Next Bank signal RNB 0 in correspondence with the data writing completion signal BLKE 0, the sorting completion signal DONE 0, and the data reading completion signal ZERO 0. The other sequencers 132 through 134 perform the same operations.

Multiplexer 123 connects the input interface 121 and the output interface 122 selectively to either one of the CADM 126 and the CADM 129. Bank controller 124 controls the multiplexer 123 in correspondence with the signals WNB 0 through WNB 3 output by the sequencers 131 through 134 and connects the input interface 121 with one of the CADM 126 through 129.

Bank controller 125 controls the multiplexer 123 in correspondence with the signals RNB 0 through RNB 3 output by the sequencers 131 through 134 and connects the output interface 122 to one of the CADMs 126 through 129. When any one of the CADMs 126 through 129 is connected with the input interface 121, it is so designed that the output interface 122 will be connected with another CADM.

Figure 102:
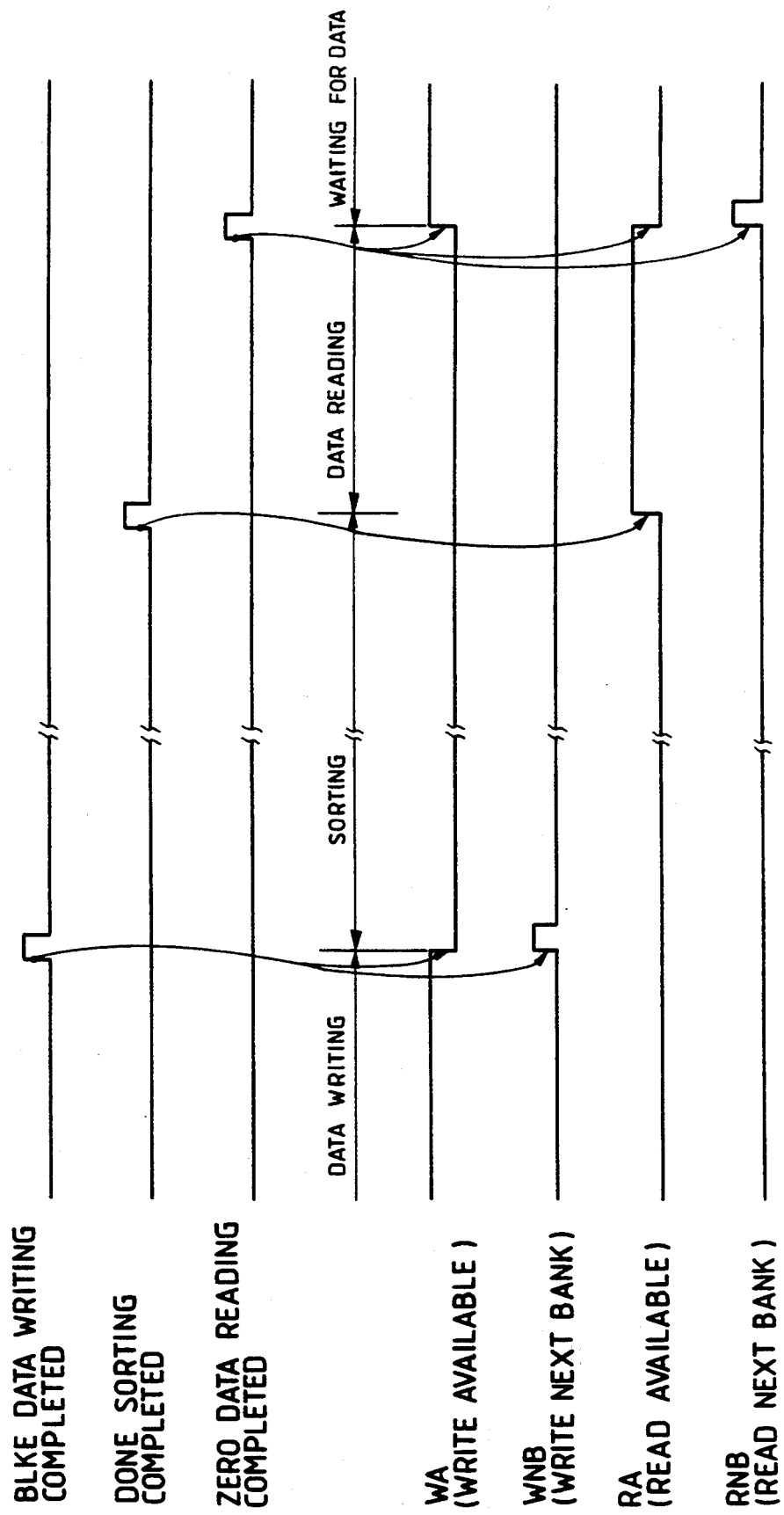
FIGS. 102 and 103 are timing charts for the sorting process.

FIG. 102 shows the timing chart for the sorter 22 of FIG. 101. Upon the completion of writing to any one (for example, 126) of the CADMs 126 through 129, the signal BLKE 0 is generated. At this time, the signal WA0 is reversed from logical 1 to logical 0, which prohibits any subsequent writing, and, at the same time, the CADM 126 starts the sorting operation. On the other hand, the signal WNBi0 is generated in synchronization with the signal BLKE0 and instructs the writing of the data to another CADM (127, for example). The CADM 126 generates the signal DONE 0 upon completion of the sorting operation. At this time, the signal RA 0 is reversed from logical 0 to logical 1, by which the output interface 122 is connected with the CADM 126 and the sorted data are read out. Upon completion of the reading process, the signal ZERO 0 is generated, by which the signal WA0 is reversed to logical 1, making it possible to write to the CADM 126, and thus the operation is put into the waiting state for data input. Also, the signal RA 0 is reversed to logical 0, which prohibits any subsequent reading, and also the signal RNB 0 is generated, and the reading of data from another CADM is thereby instructed.

Figure 103:
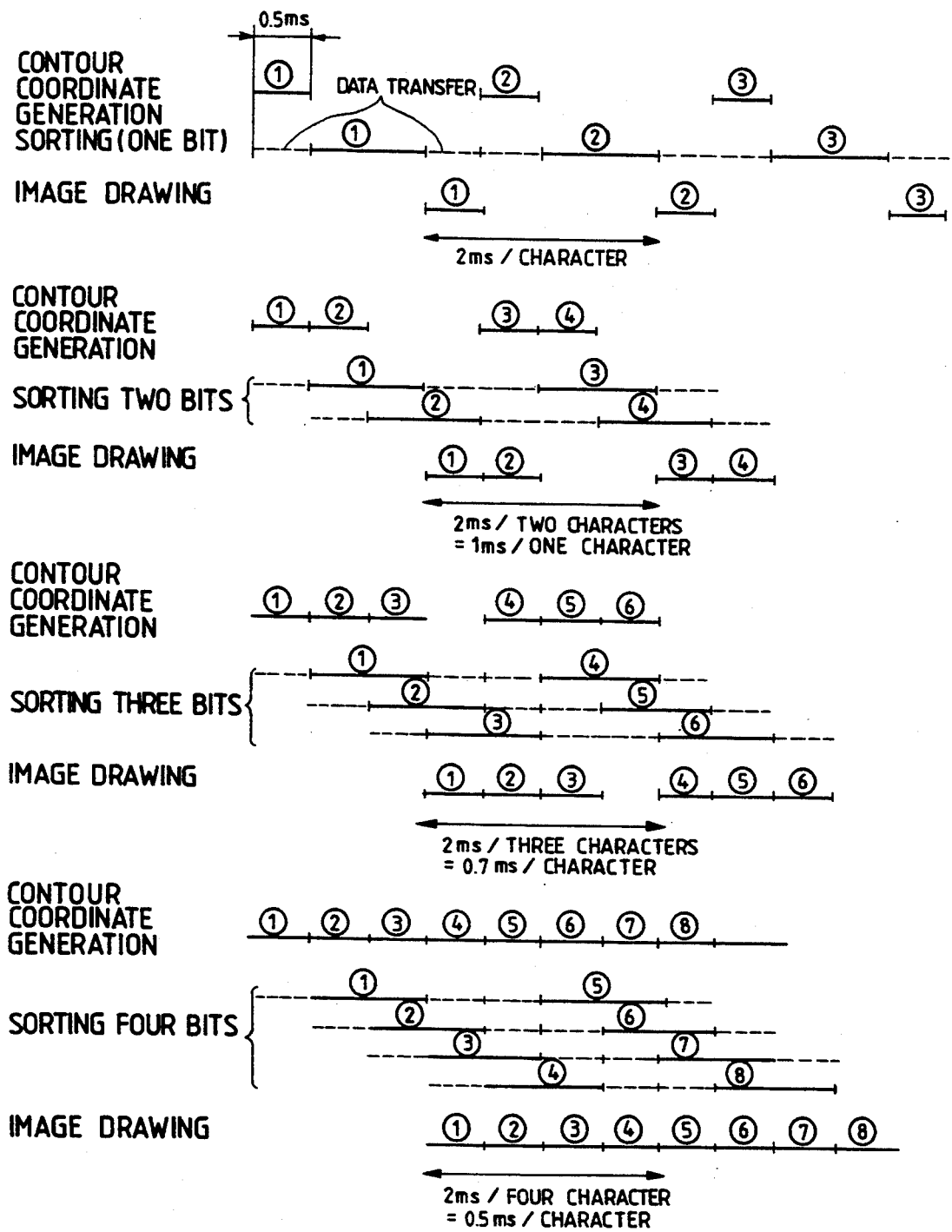

FIG. 103 represents the number of the CADMs 126 through 129 and the timing for the sorting operation. Now, if it is assumed that it takes 0.5 ms for the generation of a contour coordinate for one character (i.e. for the transfer of the data to the sorter 22), 1 ms for the sorting operation, and 0/5 ms for the image drawing process, it is found that a system equipped with a single unit of the CADM will need 2 ms for the drawing of each character because it performs the sorting operation in 1 ms after the data are input in 1 ms and then executes the image drawing process for one character in 0.5 ms after the completion of the sorting operation.

In comparison with this, a system equipped with two units of CADM will be able to draw one character every 1 ms because it is possible to write the data to one of the two CADM units while the other unit is performing the sorting operation. In the same way, a system provided with three units of CADM will be able to draw one character in every 0.7 ms and a system equipped with four units of CADM will be able to draw one character every 0.5 ms.

Thus, when the coordinates as sorted by the sorter 22 are input into the image drawing device 23 provided at the next stage, the image drawing device 23 generates the image drawing data, drawing the character therewith on the bit map 24.

Figure 104:
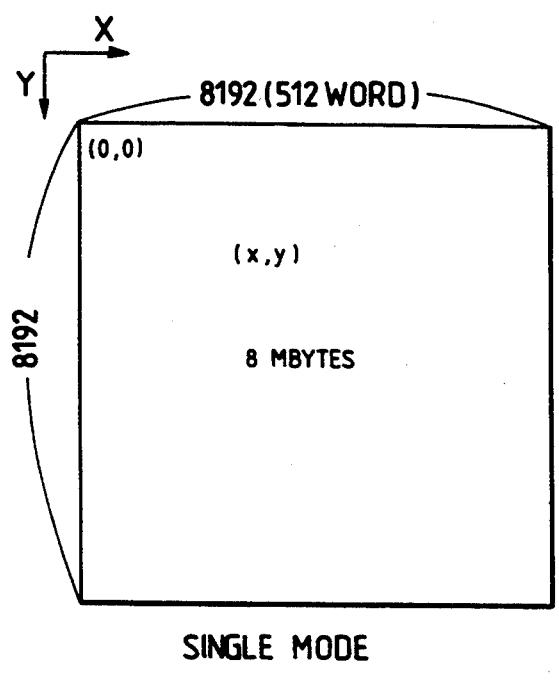
FIGS. 104-107 are charts for explaining the bit map.
Figure 105:
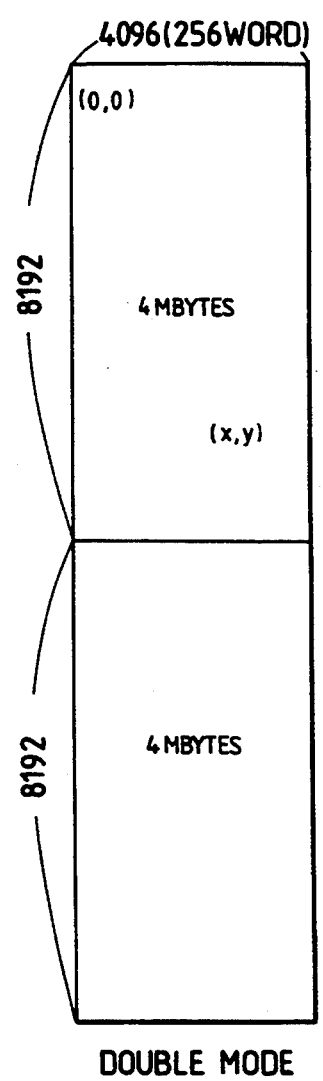

In this invention, the bit map 24 is used in the two modes, the single mode and the double mode. In the case of the operation in the single mode, the bit map 24 is composed of 8192 bits in the X-axis direction, with 16 bits forming one WORD, and 8192 bits in the Y-axis direction, as illustrated in FIG. 104. In the case of the operation in the double mode, the bit map 24 is composed of 4096 bits (i.e. 256 words) in the X-axis direction and 16384 (8192×2) bits in the Y-axis direction, as illustrated in FIG. 105.

Figure 106:
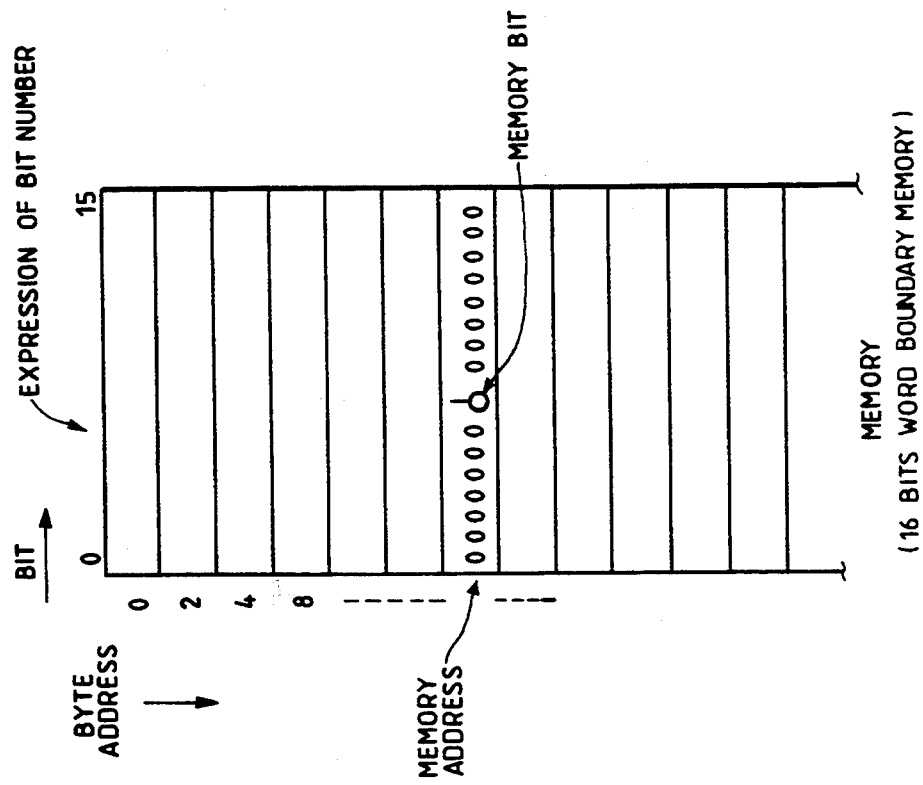

For the representation of the specified coordinate values (X and Y) on the bit map 24 like this with reference to the addresses on the bit map 24 (memory), the bit map 24 is regarded as a 16-bit word boundary memory, as shown in FIG. 106, and the four less significant bits of the X-axis of coordinates are taken as the X bits while the other more significant bits are taken as the X word.

Then, in operation in the single mode, the following equation holds:

Memory (byte) address=(512Y+X word)×2

Memory bit=X bit

In operation in the double mode, the following equation holds:

Memory (byte) address=(256Y+X word)×2

Memory bit=X bit

Figure 107:
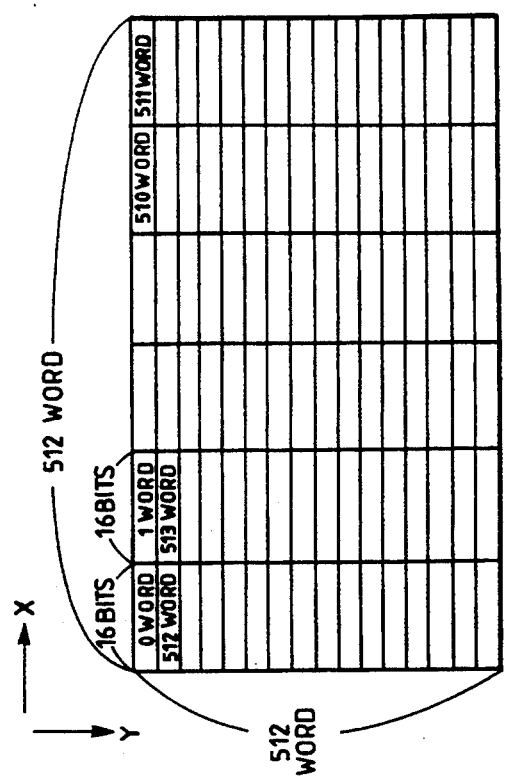

Specifically, now that the bit map 24 is set with the individual words arranged in one column in the vertical direction as shown in FIG. 106, with the memory addresses (i.e. the byte addresses) set in regular sequence from the top part on the left side in the lower rightward direction, with one WORD (two bytes) taken as the unit thereof, as shown in FIG. 107, the position of the word can be specified with reference to the memory address. Moreover, the internal positions of the word can be specified through identification with one of the 16 positions expressed in four bits of the memory bits.

Figure 108:
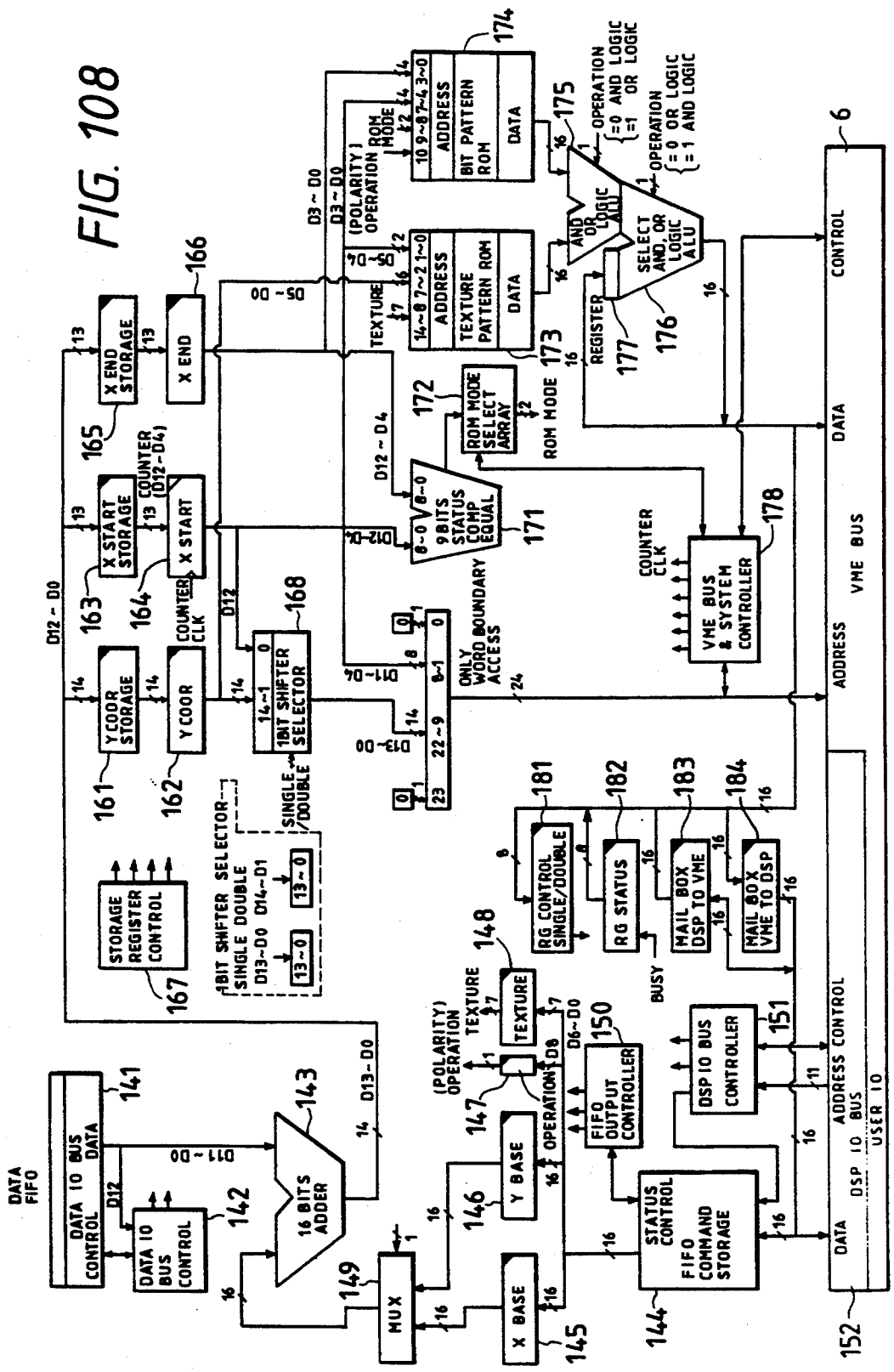
FIG. 108 is a block diagram of the image drawing device.
Figure 109:
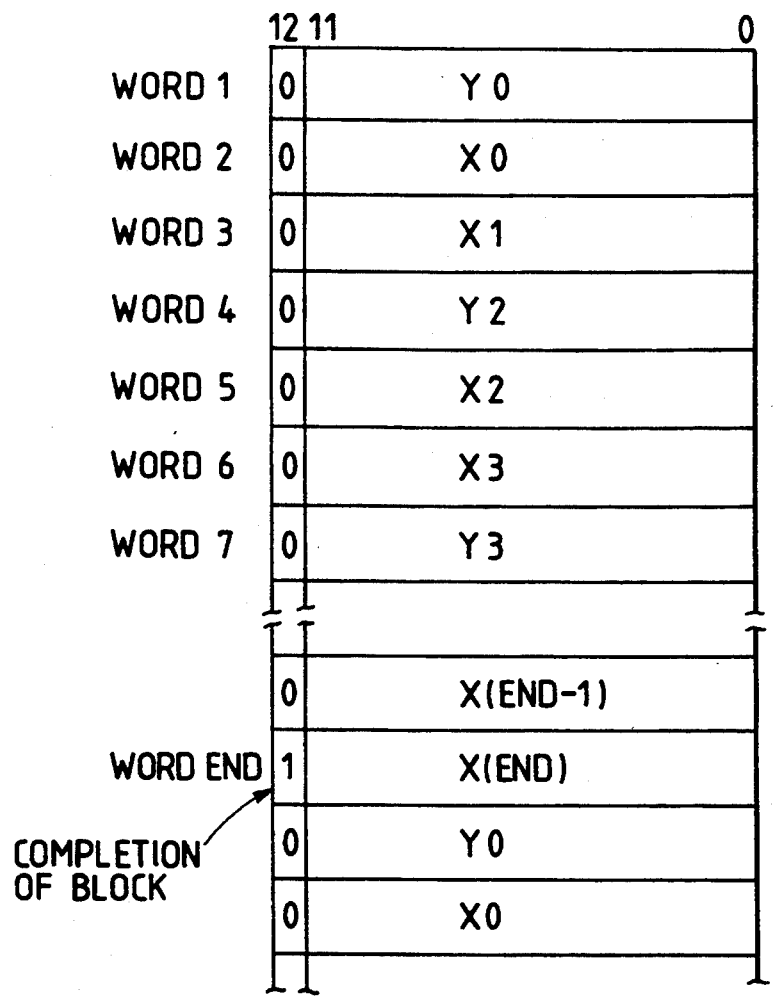
FIG. 109 is a chart for explaining the formats for the image drawing data.

FIG. 108 shows the block diagram of the hardware for the image drawing device 23 which controls the bit map 24 in accordance with these principles. To the data IO bus 141 is input the coordinate data sorted by the sorter 22. This coordinate data (i.e. the image drawing data) is output from the data IO bus 141 according to the format shown in FIG. 109, and is composed of 13 bits, of which the most significant bit (MSB)(D12) expresses the termination (logical 1) or non-termination (logical 0) of the block while the twelve less significant bits express the coordinate. It follows from this that the bit map is capable of representing 4096 types of coordinates in real terms. The MSB is fed into the data IO bus controller 142 while the coordinates are fed into the adder 143. The coordinates are arranged in the order of the Y-coordinates (Y0, Y2, Y3...) for the starting point for the image drawing process, the X-coordinates (X1, X3...) for the terminating point, and the X-coordinates (X1, X3...) for the terminating point (the Y-coordinates for the terminating point are the same as the Y-coordinates for the starting point).

Figure 110:
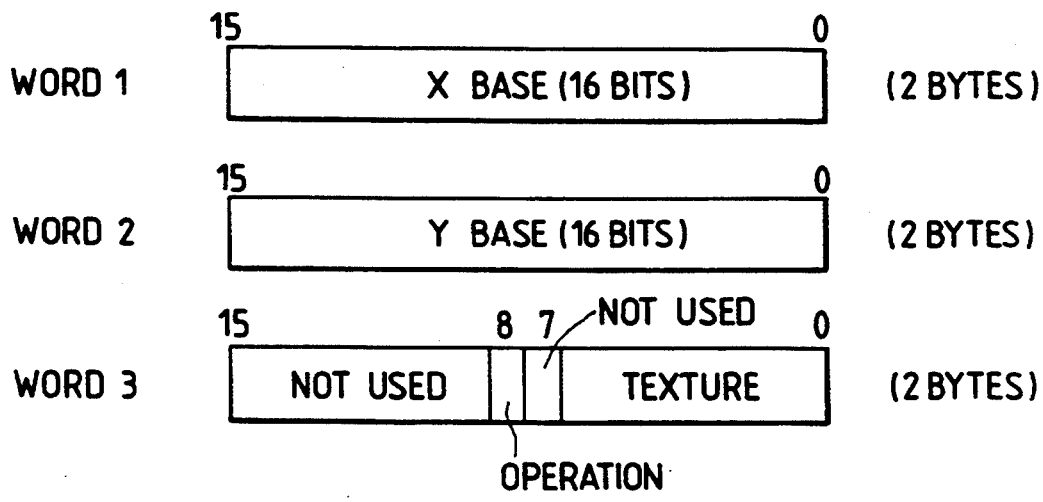
FIG. 110 is a chart for explaining the formats for the image drawing commands.

In the meantime, the RG image drawing commands X BASE, Y BASE, OPERATION, and TEXTURE, are fed from the coordinate converter (DSP) 15 via the DSP IO bus 152, according to the format presented in FIG. 110, to the Command Memory FIFO 144, and stored therein. The RG image drawing command is composed of three words, with the first word containing the X BASE, the second word containing the Y BASE, and the third word containing the OPERATION in the bit D8 and the TEXTURE in the seven less significant bits. The FIFO output controller 150 performs control over the FIFO 144 and outputs the X BASE, Y BASE, OPERATION, AND TEXTURE data for storage in the registers X BASE 145, Y BASE 146, the OPERATION 147, and TEXTURE 148, respectively.

Figure 111:
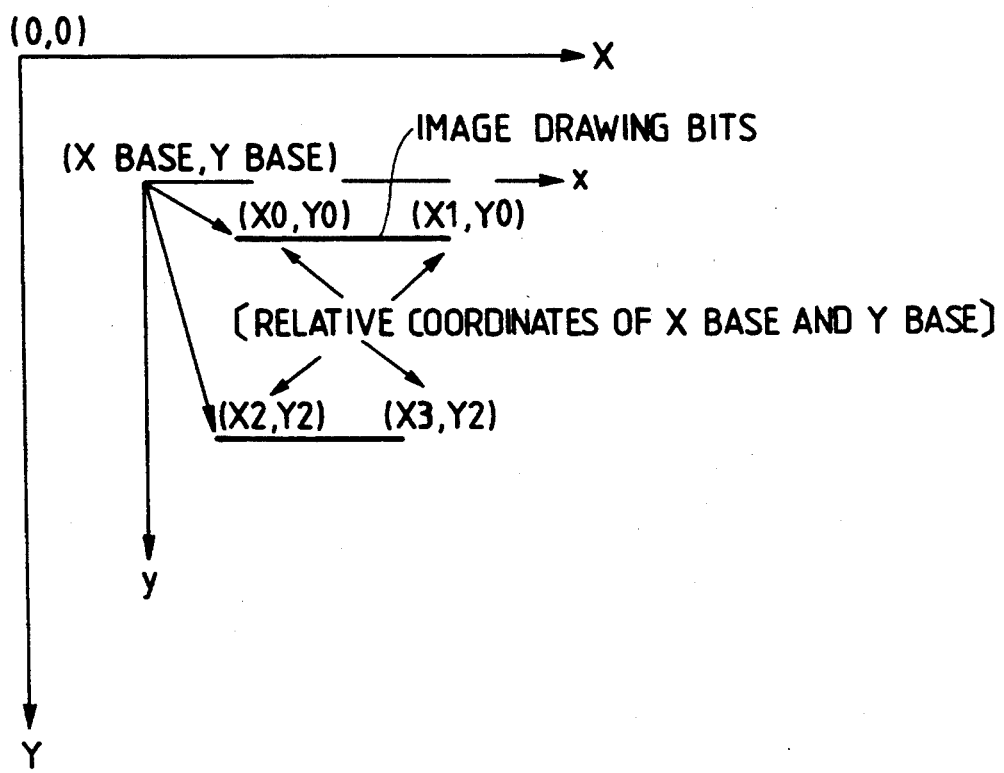
FIG. 111 is a chart for explaining the image drawing device.

X BASE and Y BASE are the X-coordinate and Y-coordinate values to be taken as the image drawing standards for converting the relative coordinates (Y0, X0, X1, Y2, X2, X3...), which are fed from the sorter 22 into absolute coordinates on the bit map 24 as illustrated in FIG. 111. The X BASE assumes the values from −8191 to +8191 in single mode operation and the values from −4095 to +4095 in double mode operation, and the Y BASE assumes the values from −8191 to +8191 in single mode operation and the values from −16383 to +16383 in double mode operation. The output from one of the register X BASE 145 or the register Y bASE 146 is selected by the multiplexer 149 and fed to the adder 143. With the timing controlled by the data IO bus controller 142, the adder 143 adds the Y BASE to the coordinates Y0, Y2 ... and the X BASE to the coordinates X0, X1, X2, X3 ... The storage register controller 167 controls the timing and latches the Y-coordinate, among the coordinates output from the adder 143, in the register Y COOR STORAGE 161, the X-coordinate for the starting point for image drawing in the register X START STORAGE 163, and the X-coordinate in the register XEND STORAGE 165, respectively.

The data latched in the register YCOOR STORAGE 161 are input into the 14 more significant bits of the 1-bit shifter selector 168 via the register YCOOR 162. The data latched in the register XSTART STORAGE 163 are loaded into the counter XSTART 164, which performs the counting-up operation on the basis of the loaded value (the X-coordinate for the starting point) in synchronization with the VME bus and the clock output by the system controller 178. The MSB (D12) in the output from the counter XSTART 164 is fed into the LSB (least significant bit) of the 1-bit shifter selector 168, the nine more significant bits (D4 through D12) are fed to the comparator 171, and the four less significant bits (D0 through D3) are fed to the four bits (D4 through D7) of the bit pattern ROM 174, respectively.

The nine more significant bits (D4 through D12) of the data latched in the register XEND STORAGE 165 are fed to the comparator 171 while the four less significant bits (D0 through D3) are fed into the four less significant bits (D0 through D3) of the bit pattern ROM 174.

In response to the input from the CPU 4, the single mode or the double mode is set in the register controller 181 via the VME bus 6. The signal SINGLE/ DOUBLE, which corresponds to this mode, is fed from the register RG controller 181 to the 1-bit shifter selector 168. The 1-bit shifter selector 168 outputs the input data for the bits D0 through D13 of the Y-coordinate in single mode operation, and the data in the bits D1 through D14 in double mode operation, respectively to the bits D9 through D22 in the addresses of the VME bus 6. Moreover, the bits D4 through D11 of the output from the counter XSTART 164 are fed into the bits D1 through D8 in the addresses of the VME bus 6. The LSB (D0) and the MSB (D23) in the addresses of the VME bus 6 are set at 0.

The preceding operations are illustrated schematically in FIG. 112. In specific terms, the X-coordinates for the starting point or the terminating point for image drawing and their Y-coordinate are expressed in 13 bits respectively in single mode operation. The X word is formed by the nine more significant bits (D4 through D12) in the X-coordinate for the starting point, while the four less significant bits of the X-coordinate (D0 through D3) form the X bit. In double mode operation, on the other hand, one bit is added to the less significant bits of the Y-coordinate, and one bit is decreased as a complement thereof from the more significant bits of the X-coordinate. Then 13 bits in the Y-coordinate and the nine (or eight) more significant bits of the X-coordinate together specify the position of the WORD on the bit map 24, and, as mentioned later, the bit pattern within the WORD is determined by the four less significant bits in the X-coordinate.

The counter X START 164 generates the X-coordinate for the image drawing point by counting up, one by one, the value loaded thereon when the image drawing operation is started from the starting point (X0, Y0) of the X-coordinate towards the terminating point (X1, Y0), as illustrated in FIG. 111. The comparator COMP EQUAL 171 compares this count value with the value in the register XEND 166 (the X-coordinate X at the terminating point). When the two values come into agreement, the comparator COMP EQUAL 171 issues a signal to the ROM MODE SELECT ARRAY 172, which outputs the following ROM mode signals in correspondence with the signal indicating whether or not it is immediately after the start of the image drawing operation, which is output from the VME bus and the system controller 178, and the signal indicating whether or not the X-coordinate of the image drawing point has come into agreement with the X-coordinate of the terminating point, which is fed from the comparator COMP EQUAL 171.

(1) Immediately after the start of the image drawing operation or the agreement of the coordinates ... ROM MODE 11

(2) Immediately after the start of the image drawing operation and the disagreement of the coordinates ... ROM MODE 01

(3) Not immediately after the start of the image drawing operation but the agreement of the coordinates ... ROM MODE 10

(4) Not immediately after the start of the image drawing operation and the disagreement of the coordinates ... ROM MODE 00

This ROM MODE signal is fed to the bits D8 and D9 of the mode signal bit pattern ROM 174. Also, in the MSB (D10) of this bit pattern ROM 174 is input the signal OPERATION, which is output by the register OPERATION 147.

Figure 113:
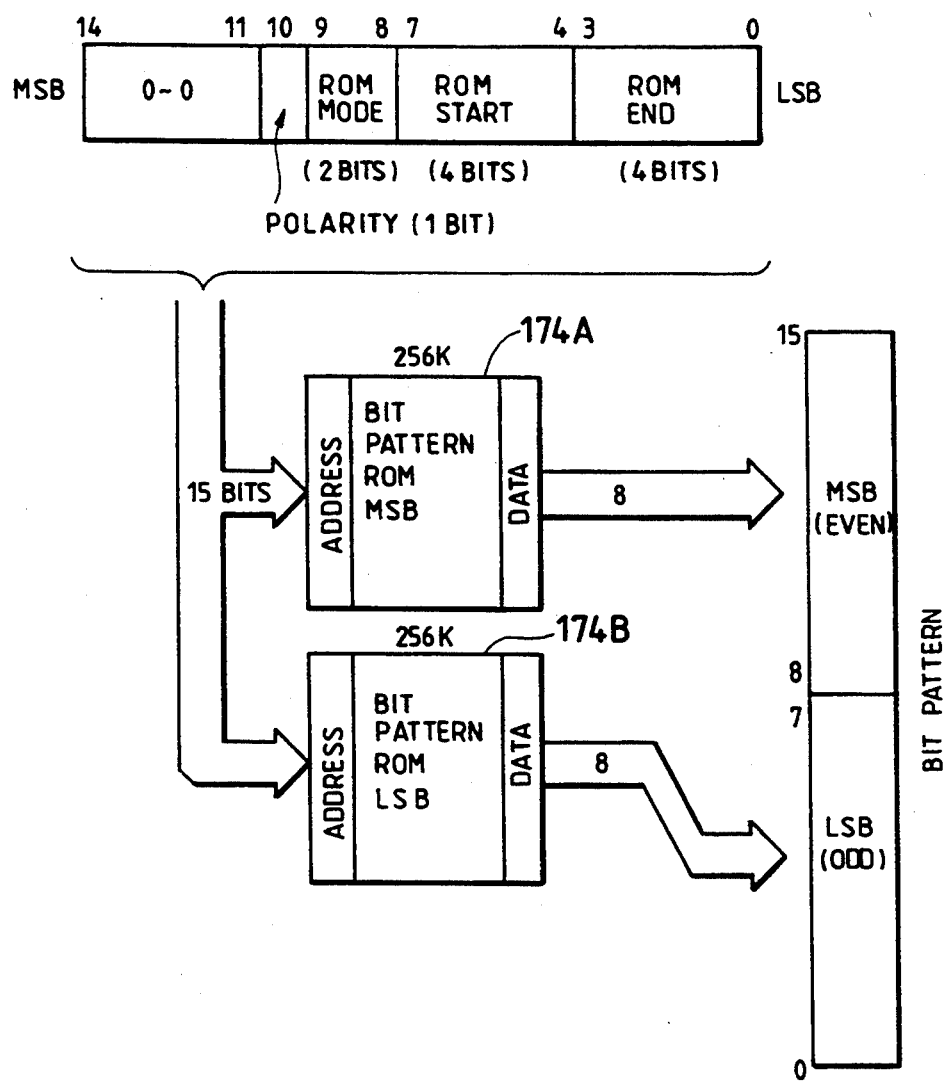
FIG. 113 is a chart for explaining the bit pattern ROM.

As illustrated in FIG. 113, the bit pattern ROM 174 is composed of two parts, 174A and 174B, which respectively generate the eight more significant bits and the eight less significant bits of the prescribed bit pattern which will work in response when the prescribed signal is input. The bit pattern ROM 174 generates a positive pattern when the signal OPERATION (POLARITY) is logical 0 but produces a reversed pattern when that signal is logical 1. Moreover, the pattern generated in correspondence with the data (ROM START) from the counter XSTART 164 and the pattern generated in correspondence with the data (ROM END) from the register XEND are specified respectively as shown in Table 6 and Table 7.

Then, the start pattern (Table 6) is selected when the ROM MODE is 01 while the end pattern (Table 7) is selected when the ROM MODE is 10, and the logical product of the start pattern and the end pattern is generated when the ROM MODE is 00. Moreover, when the ROM MODE is 00, the 16 bit ROM output generates HFFFF when the OPERATION is 0, and generates H0000 when the OPERATION is 1.

TABLE 6

| X START (ROM START) | Generated Pattern |
| --- | --- |
| 0 | HFFFF |
| 1 | H7FFF |
| 2 | H3FFF |
| 3 | H1FFF |
| 4 | H0FFF |
| 5 | H07FF |
| 6 | H03FF |
| 7 | H01FF |
| 8 | H00FF |
| 9 | H007F |
| 10 | H003F |
| 11 | H001F |
| 12 | H000F |
| 13 | H0007 |
| 14 | H0003 |
| 15 | H0001 |

TABLE 7

| X END (ROM END) | Generated Pattern |
| --- | --- |
| 0 | H8000 |
| 1 | HC000 |
| 2 | HE000 |
| 3 | HF000 |
| 4 | HF800 |
| 5 | HFC00 |
| 6 | HFE00 |
| 7 | HFF00 |
| 8 | HFF80 |
| 9 | HFFC0 |
| 10 | HFFE0 |
| 11 | HFFF0 |
| 12 | HFFF8 |
| 13 | HFFFC |
| 14 | HFFFE |
| 15 | HFFFF |

Table 8 shows an example of the bit pattern generated by the bit pattern ROM 174 in correspondence with the input.

TABLE 8

| POLARITY | ROM MODE (Binary) | ROM START (Decimal) | ROM END (Decimal) | Generated Pattern (Hex) |
| --- | --- | --- | --- | --- |
| 0 | 01 | 7 | — | H01FF |
| 0 | 10 | — | 8 | HFF80 |
| 1 | 01 | 7 | — | HFE00 |
| 1 | 10 | — | 8 | H007F |
| 0 | 11 | 2 | 11 | H3FF0 |
| 0 | 11 | 5 | 5 | H0400 |
| 1 | 11 | 2 | 11 | HC00F |
| 1 | 11 | 5 | 5 | HFB00 |
| 0 | 00 | — | — | HFFFF |
| 1 | 00 | — | — | H0000 |

Figure 114A:
FIG. 114 is a chart for explaining the ROM MODE.
Figure 114B:
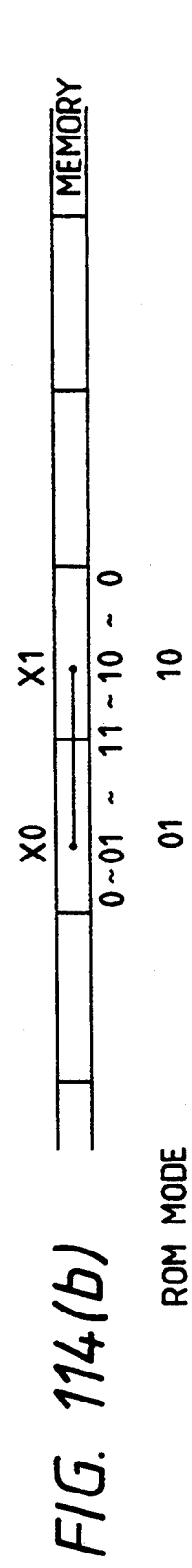
Figure 114C:
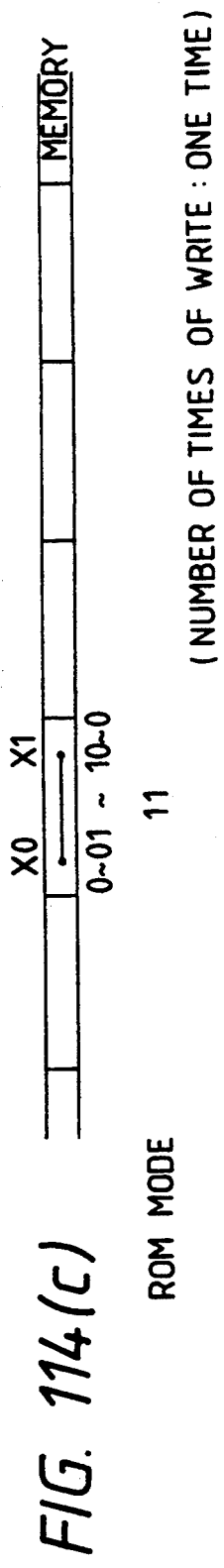

Moreover, FIG. 114 presents examples of the ROM MODE and the image drawing (WRITE) frequencies (Number of words). Ordinarily (when the OPERATION is logical 0 and the mode is the standard OR mode), the starting point X0 is specified for the ROM MODE 01, the terminating point X1 is specified for the ROM MODE 10, and the points intermediate between these two points is specified for the ROM MODE 00. In case the starting point and the terminating point are positioned within one WORD, the ROM MODE 11 is specified. FIGS. 114 (a), (b), and (c) present the cases in which the number of times of WRITE (i.e. the number of WORDS) is 4, 2, or 1, respectively.

Figure 115:
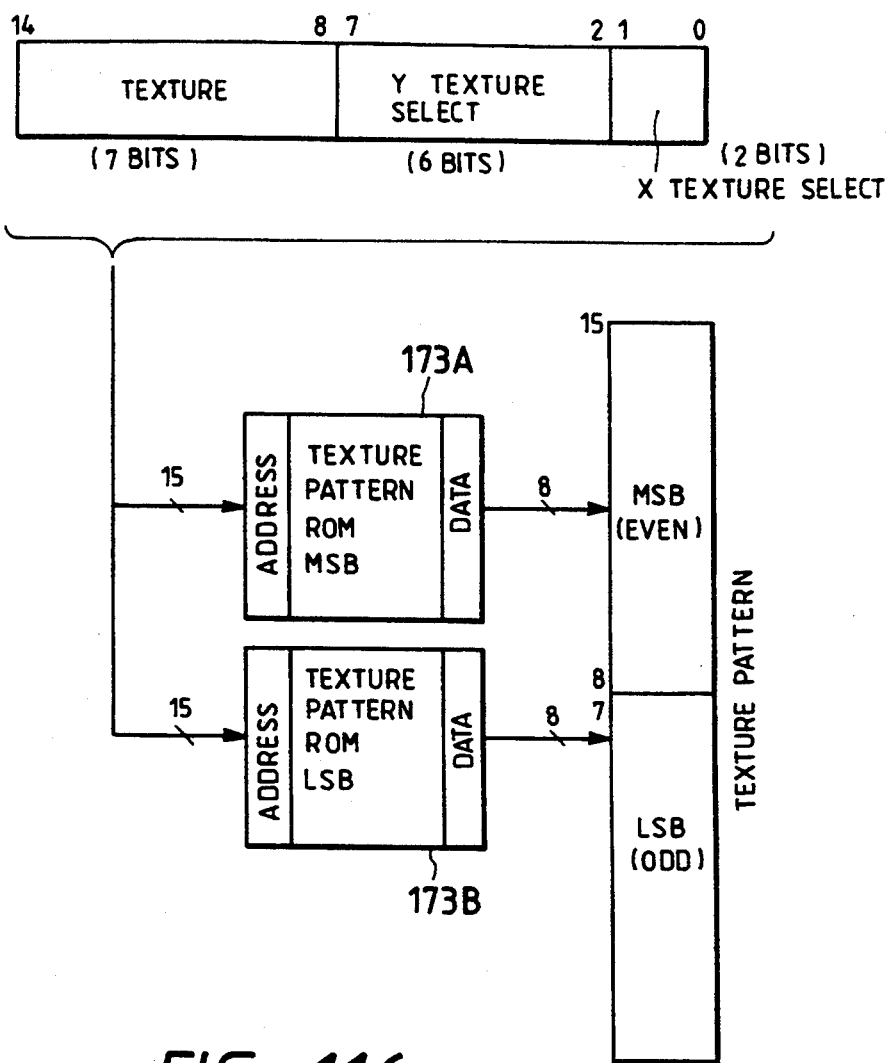
FIG. 115 is a chart for explaining the TEXTURE PATTERN ROM.
Figure 116:
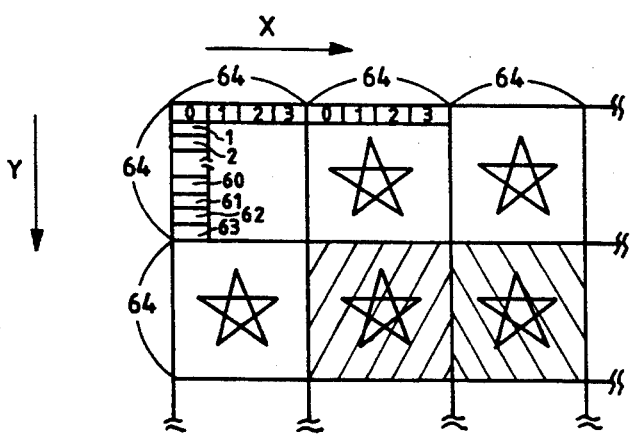
FIG. 116 is a chart for explaining the texture patterns.

As shown in FIG. 115, the texture pattern ROM 173 receives the data TEXTURE fed from the register TEXTURE 148 into the seven more significant bits (D8 to D14) whereas it receives the six less significant bits (D0 to D5) fed from register YCOOR 162 as the Y_TEXTURE into the six middle bits (D2 to D7) thereof. Further, the ROM 173 receives the two less significant bits (D4 and D5), excluding four bits (D0 to D3) for the bit pattern (D0 to D3) from the counter X START 164 as the X_TEXTURE SELECT into the two remaining less significant bits (D0 and D1) thereof. TEXTURE indicates the degrees of density (on the gray scale) from black to white with the values from 0 through 15 and the prescribed geometrical texture, such as hatching, with the values from 16 to 31, while keeping the values from 32 to 127 in reserve for the specification of the other items. The texture pattern ROM 173 is divided into two parts (173A and 173B), which generate the prescribed texture patterns in eight bits each in correspondence with the input data. By this operation, it is made possible to draw the prescribed texture in the area composed of 64×64 bits taken as the unit, as illustrated in FIG. 116. In this case, the WORD (16bits) is taken as the unit in the X-axis direction while the bit is used as the unit in the Y-axis direction.

The output from the BIT PATTERN ROM 174 and the output from the TEXTURE PATTERN ROM 173 are processed with the arithmetic operations performed by the AND OR LOGIC ALU 175. These arithmetic operations are controlled by the output from the register OPERATION 147, and, when the value obtained from those arithmetic operations is logical 0, the logical product (AND) of the two inputs is obtained and, when the value so obtained is logical 1, the logical sum (OR) is determined, respectively through arithmetic operations.

When the specified character or the like is to be written at the specified address on the bit map 24, the data already drawn at the address are read first and are latched in the register 177 by way of the VME bus 6. The AND OR LOGIC ALU 176 performs arithmetic operations on the data from the AND OR LOGIC ALU 175 and the data from the register 177. Also, these arithmetic operations are controlled with the output from the register OPERATION 147, and, when the value thus obtained is logical 0 (the standard OR mode), the logical sum (OR) of the two inputs is determined and, when the said value is logical 1 (the reverse AND mode), the logical product (AND) of the two inputs is found, respectively through arithmetic operations.

Figure 117:
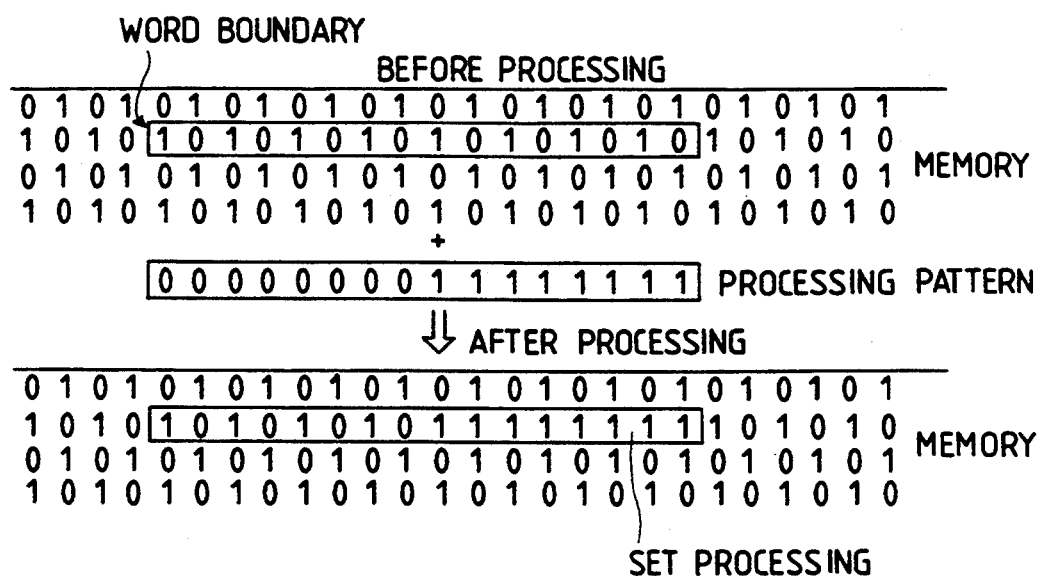
FIG. 117 is a chart for explaining the standard 0R mode.

In the standard OR mode (the setting mode), the image drawing process is performed by setting the value at logical 1 against the state in which the bit map 24 is set at logical 0 and thus is cleared, as illustrated in FIG. 117, but, in case any pattern already has been drawn there, the existing pattern is not deleted, but a new character or the like is written over the existing pattern.

Figure 118:
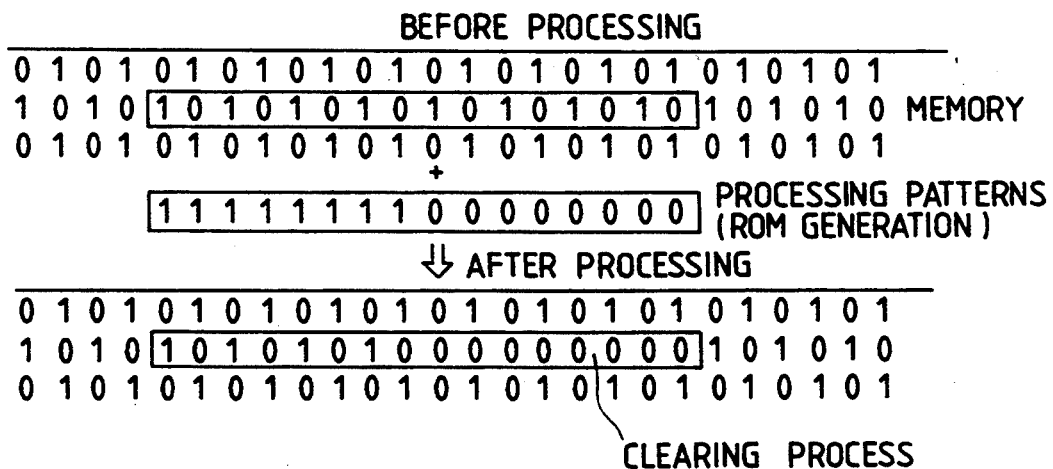
FIG. 118 is a chart for explaining the Reverse AND mode.

In contrast to this, the image drawing process in the reverse AND mode (the clear mode) is performed, as illustrated in FIG. 118, by clearing the bit map 24 to logical 0 against the state in which the said map is set at logical 1.

FIG. 119 shows the format for the seven-bit signal RG CONTROL COMMAND, which is sent out from the CPU 4 to the register RG CONTROLLER 181 via the VME bus 6. In this command format, the value 0 is used to represent the DOUBLE MODE whereas the value 1 is used to represent the SINGLE MODE, the former being set as the default value. The values from 2 through 255 are held as the spare values.

FIG. 120 shows the format for the seven-bit signal RG STATUS, which is sent out from the register RG STATUS 182 to the CPU 4 by way of the VME bus 6. In this command format, the value 0 is used to represent "NOT BUSY" and the value 1 is used to represent "BUSY" while the values from 2 through 255 are held as the spare values. The signal BUSY is set ON when the image drawing device 23 is accessing the bit map 24, when the CPU 4 is prohibited from accessing the bit map 24.

FIG. 121 shows the formats for the transmission and reception of the data from the DSP (the coordinate converting means) 15 to the CPU 4 via the DSP IO bus 152, the register MAILBOX DSP TO VME 183, and the VME bus 6 and also from the CPU 4 to the DSP 15 via the VME bus 6, the register MAILBOX VME TO DSP 184 and the DSP IO bus 152. 16 bits are used for each of these formats.

The register MAILBOX DSP TO VME 183 and the MAILBOX VME TO DSP 184, as well as the FIFO 144, are controlled by the DSP IO BUS CONTROLLER 151.

Figure 122:
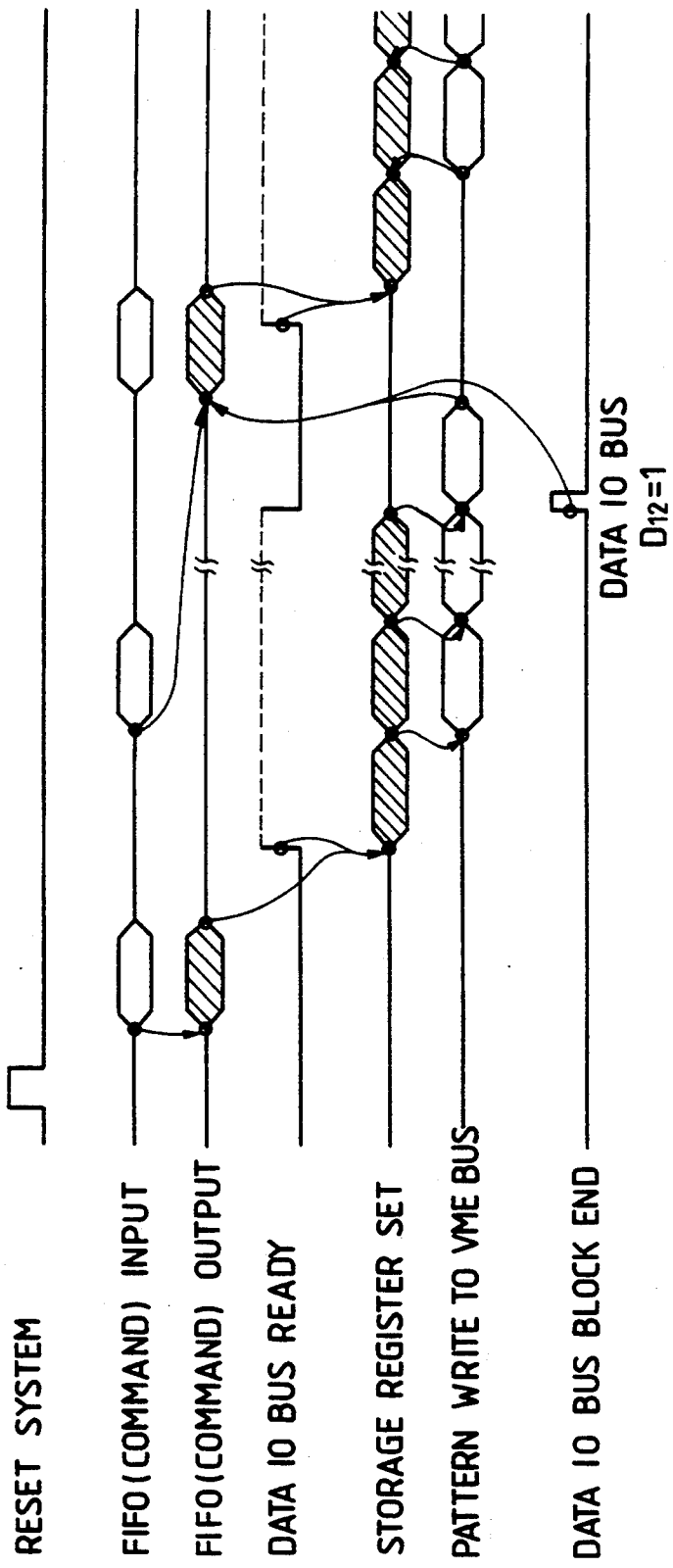
FIG. 122 is a chart for explaining the timing chart for the image drawing system.

FIG. 122 shows the timing chart for system control as performed with the VME bus and the SYSTEM CONTROLLER 178. When the system is once reset with the resetting pulse, a command is input from the DSP IO BUS 152 to the FIFO 144, and the command is further read out and transferred to the register X BASE 145, the YBASE 146, the OPERATION 147, and the TEXTURE 148. When the preparation of the DATA IO BUS 141 is completed, the value of the register X?BASE 145 and the value of the register Y BASE 146 are added to the X-coordinate and the Y-coordinate input from the DATA. IO BUS 141. The obtained values are transferred to the register Y COOR STORAGE 161, the register XSTART STORAGE 163, and the register XEND 165. In correspondence with the data in these registers, the texture pattern ROM 173 and the bit pattern ROM 174 generate the prescribed patterns, which are sent out, together with the address data, to the bit map 24 by way of the VME bus 6. By this operation, the prescribed image drawing process is executed. When the data on the block end are input into the DATA IO BUS 141, the next command is input again from the FIFO 144 after the processing of the final block is completed, and the same processing operation is repeated.

Figure 123:
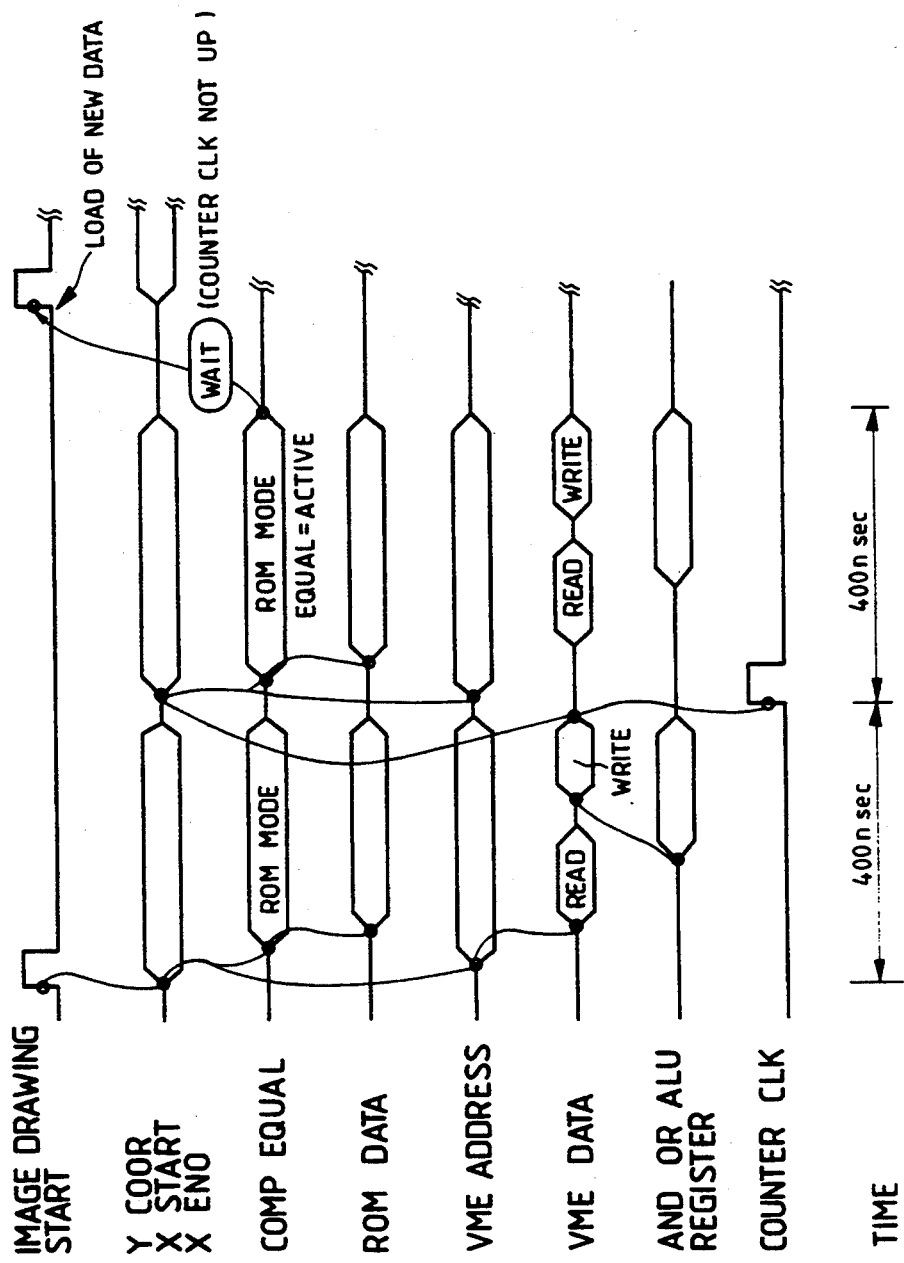
FIG. 123 is a timing chart for the generation of the bit patterns.

FIG. 123 represents the sequence of pattern generation and image drawing with the VME bus and the system controller 178. When the start of the image drawing process is input, the prescribed data are respectively latched in the register Y COOR STORAGE 161, the register XSTART STORAGE 163, and the register XEND STORAGE 165.

On the other hand, the counter XSTART 164 increments the count values successively from the X-coordinate value for the starting point loaded into the said counter and compares those values with the values in the register XEND 166. The ROM MODE SELECT ARRAY 172 generates the prescribed ROM MODE in response to the results obtained from this comparison. The BIT PATTERN ROM 174 generates the prescribed bit pattern in correspondence with this ROM MODE and the data from the register XEND 166. Also, the TEXTURE PATTERN ROM 173 generates the specified texture pattern. These patterns are processed by the ALU 175 and the ALU 176 in correspondence with the signal OPERATION from the register OPERATION 147, and then are written to the specified addresses on the bit map 24.

When the writing of 1 WORD thus is completed, a counter clock is output from the VME bus and the system controller 178, the image drawing point (WORD) being thereby shifted and the next WORD being read out and also written. These operations are performed repeatedly.

Figure 124:
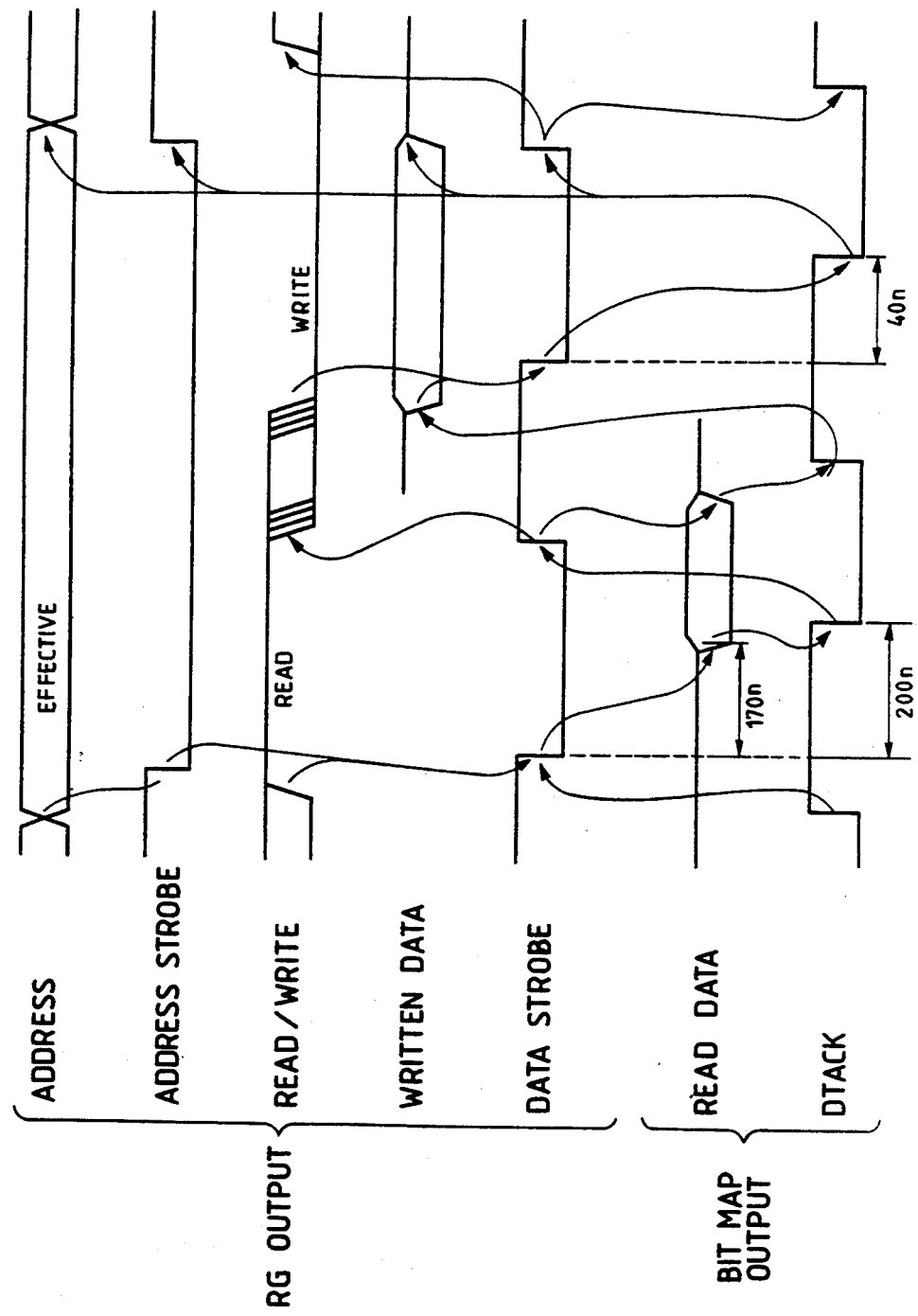
FIG. 124 is a timing chart for the reading and writing operations.

FIG. 124 presents a more detailed timing chart for the operations for reading the data out of the prescribed addresses on the bit map 24 and also writing such data thereon. When the address strobe signal is set at logical 0 after the address data are input, that address signal is found to be effective. When the output signal DTACK from the bit map 24 becomes logical 1 and additionally the signal READ/WRITE of the image drawing (RG) device 23 becomes logical 1 (READ), the data strobe signal of the image drawing device 23 is set at logical 0. In this manner, the data are read out from the bit map 24.

When the reading out of the data is started, the signal DTACK is reversed to logical 0. When the signal DTACK becomes logical 0, the data strobe signal is reversed to logical 1 at the prescribed timing. As a result, the signal READ/WRITE is reversed to logical 0 (WRITE), and the read out data are completed, whereupon the signal DTACK is reversed to logical 1 again. At this time, the written data are output from the image drawing device 23, the data strobe signal being reversed to logical 0 therewith and also the signal DTACK being reversed to logical 0. After that, the data strobe signal is reversed to logical 1 at the prescribed timing, and the written data are completed thereupon. At this time, also the address strobe signal is reversed to logical 1. When the data strobe signal becomes logical 1, the signal DTACK is reversed to logical 1.

Thus, the process of reading the data before the data are written on the bit map 24 with the image drawing device 23 is performed in accordance with the sequence READ MODIFY WRITE. By this, the processing time can be shortened in comparison with the case in which the READ mode is first executed with the address specified therefor and, after this operation is once brought to an end, the WRITE mode is executed with the address specified again.

As described hereinabove, this invention makes it possible to perform printing or the like at high speed because the invention is capable of converting character contour data into coordinate axis data, generating dot data expressive of the contour from the coordinate axis data, sorting the said data in the prescribed sequence, and performing the image drawing operations in correspondence with the sorted data, respectively with the hardware, performing at least two of these processes in parallel.

Also, as described hereinabove, this invention makes it possible to reduce required image drawing time through a reduction of the required number of accesses to the bit map, as compared with the conventional system, which draws the polygon once in the bit map and thereafter scans the bit map to search for and select the starting point and terminating point for the image drawing operation, because the embodiment of this invention selects only the starting point and terminating point for its image drawing process out of the coordinates which form the polygon and draws a character on the bit map while generating the coordinates incremented in regular sequence from the starting point to the terminating point.

While the invention has been described above in detail with reference to certain presently preferred embodiments, various modifications within the scope and spirit of the invention will be apparent to those of working skill in this technical field. Thus, the invention is to be considered as limited only by the scope of the appended claims.

What is claimed is:

1. A high-quality character generating system comprising:
   a first memory for storing outline fonts composed of character contour data;
   coordinate converting means, connected to said first memory, for converting coordinates of said character contour data into vector coordinates;
   contour coordinate generating means, connected to said coordinate converting means, for generating dot data corresponding to the contours of characters from said vector coordinates;
   sorting means, connected to said contour coordinate generating means, for sorting the dot data output from the contour coordinate generating means according to prescribed rules to generate sorted data;
   image drawing means, connected to said sorting means, for generating character data as dots from said sorted data; and
   a second memory for storing the character data as dots corresponding to the output from the image drawing means;
   wherein at least two of the coordinate converting means, the contour coordinate generating means, the sorting means, and the image drawing means each operate in parallel.

2. A high-quality character generating system as claimed in claim 1, wherein said contour coordinate generating means comprises:
   input control means for storing vector coordinates received from said coordinate converting means;
   coordinate calculating means for reading out coordinates for a starting point and an ending point, and calculating and generating straight line coordinates for a straight line connecting said starting point and said ending point;
   straight line coordinate selecting means for selecting only those of said straight line coordinates defining said character contour;
   corner coordinate selecting means for selecting corner coordinates defining a corner; and
   output control means for outputting said straight line coordinates and corner coordinates to said sorting means.

3. A high-quality character generating system comprising:
   a first memory for storing character contour data;
   contour coordinate generating means for generating character contour coordinates based on said character contour data;
   coordinate selecting means for selecting ones of said character contour coordinates, so that an even number of the selected coordinates will be arranged in a direction of an image drawing axis;
   image drawing means for generating further coordinates, incremented by a predetermined value in the direction of the image drawing axis, from selected coordinates in odd-number positions in the direction of the image drawing axis out of the selected coordinates, until the further coordinates so generated correspond to the selected coordinates in the even-number positions; and a second memory for storing character data generated by said image drawing means;

wherein the specified character is drawn in correspondence with the selected and further coordinates from the odd-number position to the even-number position as generated by the image drawing means.

4. A high-quality character generating system as claimed in claim 3, wherein said contour coordinate generating means comprises:

input control means for storing said character contour data received from said first memory;

coordinate calculating means for reading out coordinates for a starting point and an ending point, and calculating and generating straight line coordinates for a straight line connecting said starting point and said ending point;

straight line coordinate selecting means for selecting only those of said straight line coordinates that define said character contour;

corner coordinate selecting means for selecting corner coordinates defining a corner; and output control means for outputting said straight line coordinates and corner coordinates to said image drawing means.

5. A method of generating high-quality characters, said method comprising the following steps:

storing outline fonts composed of character contour data;

converting coordinates of said character contour data into vector coordinates;

generating dot data corresponding to the contours of characters from said vector coordinates and providing output accordingly;

sorting the dot data output from said generating step according to prescribed rules to generate sorted data;

generating character data as dots from said sorted data; and storing the character data as dots corresponding to the output from said second generating step;

wherein at least two of the converting step, the first and second generating steps, and the sorting step are each performed in parallel.

6. A method as claimed in claim 5, wherein said first generating step comprises the following steps:

storing vector coordinates received from said converting step;

reading out coordinates for a starting point and an ending point, and calculating and generating straight line coordinates for a straight line connecting said starting point and said ending point;

selecting only those of said straight line coordinates that define said character contour;

selecting corner coordinates that define a corner; and outputting said straight line coordinates and corner coordinates for use in said sorting step.

7. A method of generating high-quality characters, said method comprising the following steps: storing character contour data;

generating character contour coordinates based on said character contour data;

selecting ones of said character contour coordinates, so that an even number of the selected coordinates will be arranged in a direction of an image drawing axis;

generating further coordinates, incremented in predetermined step in the direction of the image drawing axis, from selected coordinates in odd-number positions in the direction of the image drawing axis out of the selected coordinates, until the further coordinates so generated correspond to the selected coordinates in the even-number positions; and storing character data generated by said second generating step;

wherein the specified character is drawn in correspondence with the selected and further coordinates from the odd-number position to the even-number position as generated by the second generating step.

8. A method as claimed in claim 7, wherein said first generating step comprises:

storing said character contour data received from said storing step;

reading out coordinates for a starting point and an ending point, and calculating and generating straight line coordinates for a straight line connecting said starting point and said ending point;

selecting only those of said straight line coordinates that define said character contour;

selecting corner coordinates that define a corner; and outputting said straight line coordinates and corner coordinates for use in said second generating step.

9. A high-quality character generating system as claimed in claim 1, wherein said coordinate converting means includes at least one of: means for effecting a reduction of said character; means for effecting an enlargement of said character; means for effecting an inclination of said character; means for effecting a rotation of said character; and means for effecting a horizontal shift of said character.

10. A method as claimed in claim 5, wherein said converting step comprises at least one of the following steps:

effecting a reduction of said character;
effecting an enlargement of said character;
effecting an inclination of said character;
effecting a rotation of said character; and
effecting a horizontal shift of said character.

11. A high-quality character generating system comprising:

first memory for storing character contour data;
coordinate converting means for converting the character contour data stored in said first memory into character contour coordinates;

contour coordinate generating means for generating dot data indicative of a contour of a specified character based on the contour coordinate output from said coordinate converting means;

sorting means for sorting the dot data from said contour coordinate generating means according to prescribed rules to generate sorted data;

image drawing means for generating character data as dots from the sorted data; and a second memory for storing the character data as dots corresponding to an output of said image drawing means, wherein said contour coordinate generating means comprises:

an arithmetic section for calculating coordinates of the dot data;

a first selecting means for selecting dot data forming a straight line from the coordinates of dot data received from said arithmetic section;

a second selecting means for receiving the dot data from said first selecting means and for selecting dot data forming a corner and allowing other dot data to be output in order; and control section for controlling timing of output and input data from and to said first and second selecting means.

12. A high-quality character generating system as recited in claim 11, wherein said sorting means comprises:

a plurality of Content Addressable Data Managers (CADM) for ordering said dot data in an order with smaller values placed in earlier positions;

an input interface;

an output interface;

a multiplexor connected to said plurality of CADMs, said input interface and said output interface;

control means for controlling said multiplexor to connect said input interface to a first CADM and to connect said output interface to a second CADM different from said first CADM depending upon a processing state of said control means, wherein the input interface is connected to the contour coordinate generating means and the output interface is connected to the image drawing means and ordering operations are performed in parallel in the plurality of CADMs.

13. A high-quality character generating system comprising:

first memory for storing character contour data;

coordinate converting means for converting the character contour data stored in said first memory into contour coordinates;

contour coordinate generating means for generating dot data indicative of a contour of a specified character based on the contour coordinate output from said coordinate converting means;

sorting means for sorting the dot data from said contour coordinate generating means according to prescribed rules to generate sorted data;

image drawing means for generating character data as dots from the sorted data; and a second memory for storing the character data as dots corresponding to an output of said image drawing means, wherein said contour coordinate generating means comprises:

an arithmetic section for calculating coordinates of the dot data;

a first selecting means for selecting dot data forming a straight line from the coordinates of dot data received from said arithmetic section;

a second selecting means for receiving the dot data from said first selecting means and for selecting dot data forming a corner and allowing other dot data to be output in order; and control section for controlling timing of output and input data from and to said first and second selecting means and, wherein said sorting means comprises:

a plurality of Content Addressable Data Managers (CADM) for ordering said dot data in an order with smaller values placed in earlier positions;

an input interface;

an output interface;

a multiplexor connected to said plurality of CADMs, said input interface and said output interface;

control means for controlling said multiplexor to connect said input interface to a first CADM and to connect said output interface to a second CADM different from said first CADM depending upon a processing state of said control means, wherein the input interface is connected to the contour coordinate generating means and the output interface is connected to the image drawing means and ordering operations are performed in parallel in the plurality of CADMs.

14. A high-quality character generating system comprising:

first memory for storing character contour data;

coordinate converting means for converting the character contour data stored in said first memory into character contour coordinates;

contour coordinate generating means for generating dot data indicative of a contour of a specified character based on the contour coordinate output from said coordinate converting means;

sorting means for sorting the dot data from said contour coordinate generating means according to prescribed rules to generate sorted data;

image drawing means for generating character data as dots from the sorted data; and a second memory for storing the character data as dots corresponding to an output of said image drawing means, wherein said contour coordinate generating means comprises:

an arithmetic section for calculating coordinates of the dot data;

first selecting means for selecting dot data forming a straight line in a direction not substantially parallel with a drawing direction of said drawing means;

second selecting means for selecting ones of said character contour coordinates defining a corner so that an even number of the selected coordinates will be arranged in a drawing direction and remaining coordinates will be output; and said sorting means sorting the dot data so as to be arranged in the drawing direction in order and said drawing means draw from an odd-number dot output from said sorting means to a next even-number dot output therefrom to draw a specified character.

* * * * *

UNITED STATES PATENT AND TRADEMARK OFFICE
CERTIFICATE OF CORRECTION

PATENT NO. : 5,426,727
DATED : June 20, 1995
INVENTOR(S) : Masayuki Sugiura, et. al.

It is certified that error appears in the above-indentified patent and that said Letters Patent is hereby corrected as shown below:

Title page, item [30], Foreign Application Priority Data, change the first number to --1-12496--.

Signed and Sealed this

Third Day of June, 1997

Attest:

BRUCE LEHMAN

Attesting Officer

Commissioner of Patents and Trademarks